(12) United States Patent
Josephson et al.

(10) Patent No.: US 11,226,714 B2
(45) Date of Patent: Jan. 18, 2022

(54) SYSTEMS, APPARATUSES, INTERFACES AND IMPLEMENTING METHODS FOR DISPLAYING AND MANIPULATING TEMPORAL OR SEQUENTIAL OBJECTS

(71) Applicant: Quantum Interface, LLC, Austin, TX (US)

(72) Inventors: Jonathan Josephson, Austin, TX (US); Robert W. Strozier, Houston, TX (US)

(73) Assignee: QUANTUM INTERFACE, LLC, Austin, TX (US)

( * ) Notice: Subject to any disclaimer, the term of this patent is extended or adjusted under 35 U.S.C. 154(b) by 0 days.

(21) Appl. No.: 17/023,555

(22) Filed: Sep. 17, 2020

(65) Prior Publication Data

US 2021/0132770 A1 May 6, 2021

Related U.S. Application Data

(63) Continuation of application No. 16/296,114, filed on Mar. 7, 2019, now Pat. No. 10,788,948.

(60) Provisional application No. 62/639,917, filed on Mar. 7, 2018.

(51) Int. Cl.
| | | |
|---|---|---|
| *G06F 3/0481* | (2013.01) | |
| *G06F 3/0482* | (2013.01) | |
| *G06F 3/01* | (2006.01) | |
| *G06F 3/0484* | (2013.01) | |

(52) U.S. Cl.
CPC .......... *G06F 3/04815* (2013.01); *G06F 3/012* (2013.01); *G06F 3/013* (2013.01); *G06F 3/014* (2013.01); *G06F 3/0482* (2013.01); *G06F 3/04845* (2013.01)

(58) Field of Classification Search
CPC .......... G06F 3/011; G06F 3/012; G06F 3/013; G06F 3/014; G06F 3/04815; G06F 3/0482; G06F 3/0484; G06F 3/04845
See application file for complete search history.

(56) References Cited

U.S. PATENT DOCUMENTS

| | | |
|---|---|---|
| 7,831,392 B2 | 11/2010 | Josephson et al. |
| 7,861,188 B2 | 12/2010 | Josephson et al. |
| 8,788,966 B2 | 7/2014 | Josephson et al. |
| 9,345,957 B2 | 5/2016 | Geisner et al. |
| 9,703,388 B2 | 7/2017 | Josephson et al. |
| 9,746,935 B2 | 8/2017 | Josephson et al. |
| 9,971,492 B2 | 5/2018 | Chandler et al. |

(Continued)

FOREIGN PATENT DOCUMENTS

| | | |
|---|---|---|
| JP | 2010019643 A | 1/2010 |
| JP | 2012068854 A | 4/2012 |

(Continued)

*Primary Examiner* — Stacy Khoo
(74) *Attorney, Agent, or Firm* — Robert W. Strozier

(57) ABSTRACT

Systems, apparatuses, interfaces, and methods for visualizing time progressions in VR/AR/MR/XR environments, wherein the systems include a processing unit or a processor, a display device, and at least one VR/AR/MR/XR input device, wherein the systems, apparatuses, interfaces, and methods display projects or structures that have tasks, goals, targets, and/or events that have or will occur in a given time sequence along a time line, wherein the systems and methods also display a selection and control object and a temporal direction and speed control object.

20 Claims, 165 Drawing Sheets

(56) References Cited

U.S. PATENT DOCUMENTS

Figure 1A:
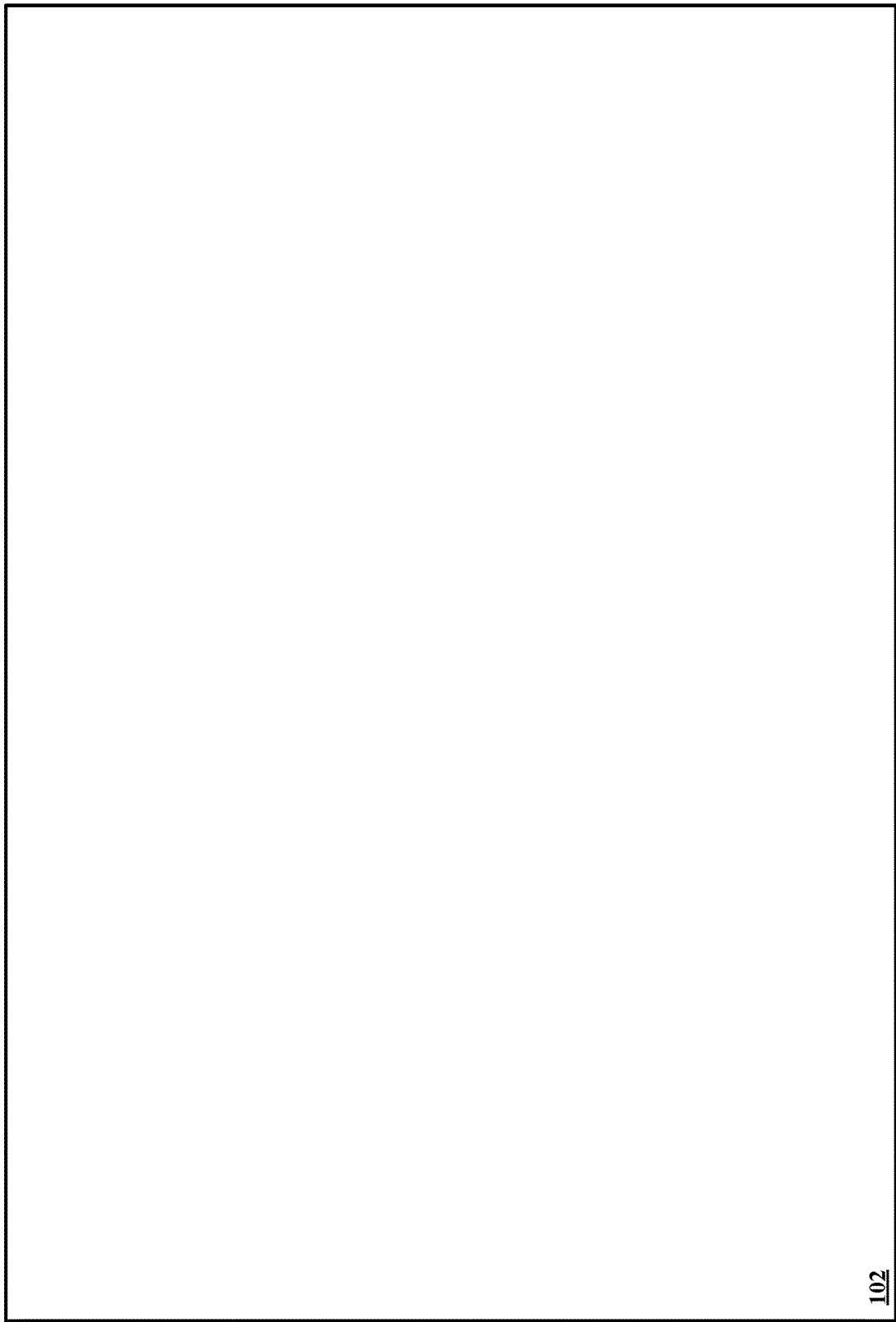

| | | |
|---|---|---|
| 10,263,967 B2 | 4/2019 | Josephson et al. |
| 10,289,204 B2 | 5/2019 | Josephson |
| 10,503,359 B2 | 12/2019 | Josephson |
| 2002/0122072 A1 | 9/2002 | Selker |
| 2005/0033168 A1 | 2/2005 | Shifrin |
| 2008/0034331 A1 | 2/2008 | Josephson et al. |
| 2009/0031240 A1 | 1/2009 | Hildreth |
| 2010/0134425 A1 | 6/2010 | Storrusten |
| 2010/0333030 A1 | 12/2010 | Johns |
| 2011/0043443 A1 | 2/2011 | Kawano et al. |
| 2011/0055773 A1 | 3/2011 | Agarawala et al. |
| 2011/0066981 A1 | 3/2011 | Chmielewski et al. |
| 2011/0221974 A1 | 9/2011 | Stern et al. |
| 2011/0289456 A1 | 11/2011 | Reville et al. |
| 2011/0316888 A1 | 12/2011 | Sachs et al. |
| 2012/0050157 A1 | 3/2012 | Latta et al. |
| 2012/0092251 A1 | 4/2012 | Hashimoto et al. |
| 2012/0216143 A1 | 8/2012 | Shiplacoff et al. |
| 2012/0249310 A1 | 10/2012 | Hotaling |
| 2012/0299849 A1 | 11/2012 | Homma et al. |
| 2013/0054576 A1 | 2/2013 | Karmarkar et al. |
| 2013/0104079 A1 | 4/2013 | Yasui et al. |
| 2013/0135194 A1 | 5/2013 | Josephson |
| 2013/0135195 A1 | 5/2013 | Josephson et al. |
| 2013/0293530 A1 | 11/2013 | Perez et al. |
| 2015/0113483 A1 | 4/2015 | Van Der Westhuizen et al. |
| 2015/0135132 A1 | 5/2015 | Josephson et al. |
| 2016/0320860 A1 | 11/2016 | Josephson et al. |
| 2017/0139556 A1 | 5/2017 | Josephson et al. |
| 2017/0180336 A1 | 6/2017 | Josephson et al. |
| 2017/0269705 A1 | 9/2017 | Josephson et al. |
| 2018/0004283 A1 | 1/2018 | Mathey-Owens et al. |
| 2020/0057488 A1 * | 2/2020 | Johnson ............... G01C 21/005 |

FOREIGN PATENT DOCUMENTS

| | | |
|---|---|---|
| JP | 2012108842 A | 6/2012 |
| WO | 2007128035 A1 | 11/2007 |
| WO | 2013049864 A1 | 4/2013 |
| WO | 2013095677 A1 | 6/2013 |

* cited by examiner

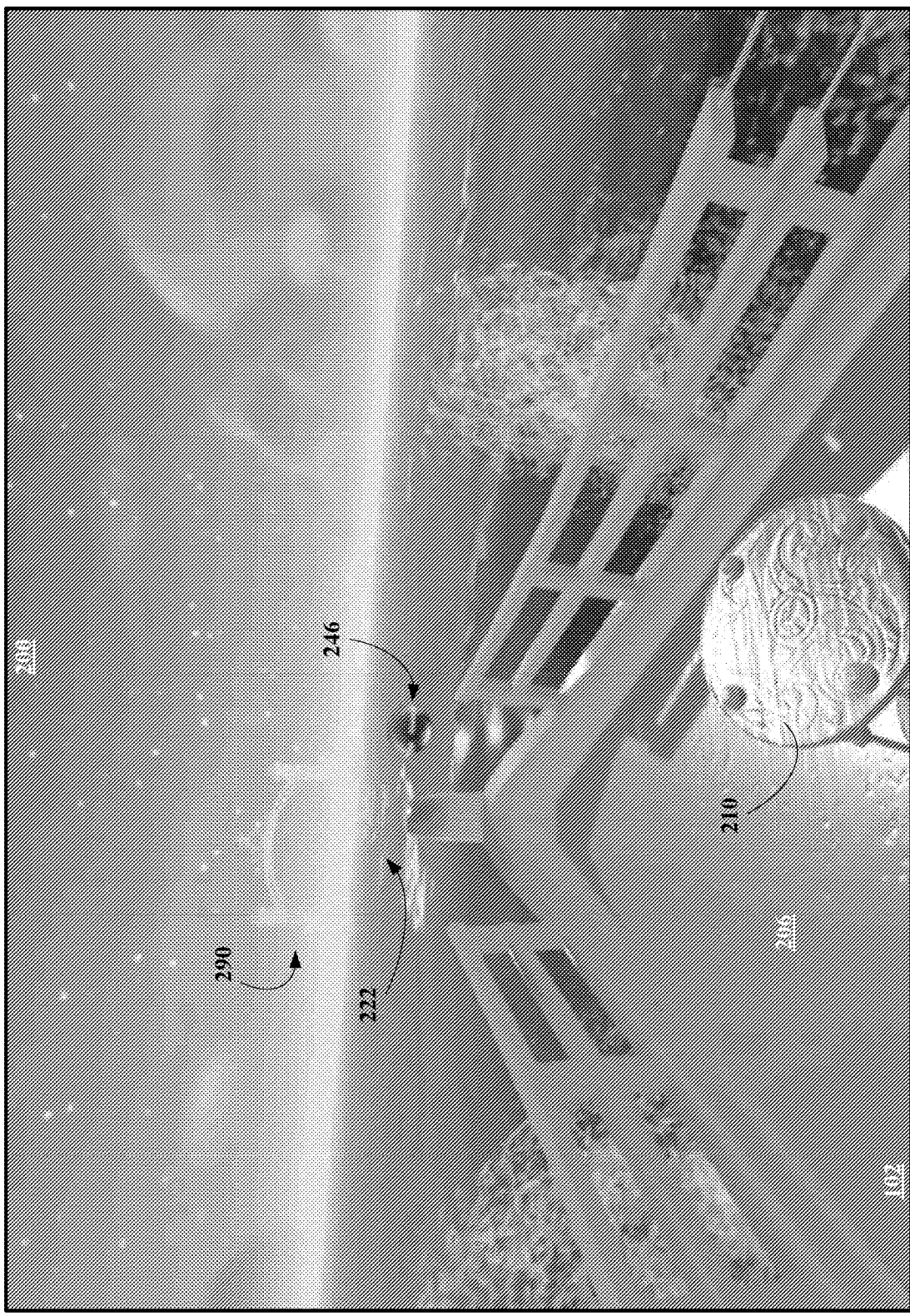

Example of Digital Training Manual: Human Slavery Training

⊕ (1) A person commits an *offense* if the person *arranges or facilitates* the *travel* of another person ("V") with a view to V being *exploited*.

⊕ (2) It is irrelevant whether V consents to the travel (whether V is an adult or a child).

⊕ (3) A person may in particular arrange or facilitate V's travel by recruiting V, transporting or transferring V, harbouring or receiving V, or transferring or exchanging control over V.

⊕ (4) "Travel" means-- (a) arriving in, or entering, any country, (b) departing from any country, (c) travelling within any country.

702

700

FIG. 7A

Example of Digital Training Manual: Human Slavery Training

⊕ (1) A person commits an *offense* if the person *arranges or facilitates* the *travel* of another person ("V") with a view to V being *exploited*.

⊕ (2) It is irrelevant whether V consents to the travel (whether V is an adult or a child).

⊕ (3) A person may in particular arrange or facilitate V's travel by recruiting V, transporting or transferring V, harbouring or receiving V, or transferring or exchanging control over V.

⊕ (4) "Travel" means— (a) arriving in, or entering, any country, (b) departing from any country, (c) travelling within any country.

702

700

FIG. 7B

Example of Digital Training Manual: Human Slavery Training

(1) A person commits an *offense* if the person *arranges or facilitates* the *travel* of another person ("V") with a view to V being *exploited*.

(2) It is irrelevant whether V consents to the travel (whether V is an adult or a child).

(3) A person may in particular arrange or facilitate V's travel by recruiting V, transporting or transferring V, harbouring or receiving V, or transferring or exchanging control over V.

(4) "Travel" means— (a) arriving in, or entering, any country, (b) departing from any country, (c) travelling within any country.

FIG. 7L

Example of Digital Training Manual: Human Slavery Training

(1) A person commits an *offense* if the person *arranges or facilitates* the travel of another person ("V") with a view to V being *exploited*.

(2) It is irrelevant whether V consents to the travel (whether V is an adult or a child).

(3) A person may in particular arrange or facilitate V's travel by recruiting V, transporting or transferring V, harbouring or receiving V, or transferring or exchanging control over V.

(4) "Travel" means— (a) arriving in, or entering, any country, (b) departing from any country, (c) travelling within any country.

FIG. 7M

Example of Digital Training Manual: Human Slavery Training

⊕ (1) A person commits an *offense* if the person *arranges* ~~assignment~~ *tries to travel* of another person ("V") with a view to V being *exploited*.

⊕ (2) It is irrelevant whether V consents to the travel (whether V is an adult or a child).

⊕ (3) A person may in particular arrange or facilitate V's travel by recruiting V, transporting or transferring V, harbouring or receiving V, or transferring or exchanging control over V.

⊕ (4) "Travel" means— (a) arriving in, or entering, any country, (b) departing from any country, (c) travelling within any country.

FIG. 70

Example of Digital Training Manual: ...ery Training

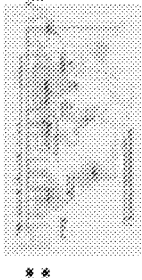

 (1) A person commits an *offense* if the person *arranges or facilitates* V's *travel* of another person ("V") with a view to V being *exploited*.

 (2) It is irrelevant whether V consents to the travel (whether V is an adult or a child).

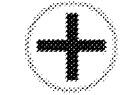 (3) A person may in particular arrange or facilitate V's travel by recruiting V, transporting or transferring V, harbouring or receiving V, or transferring or exchanging control over V.

 (4) "Travel" means— (a) arriving in, or entering, any country, (b) departing from any country, (c) travelling within any country.

FIG. 7P

Example of Digital Training Manual: Human Slavery Training

 (1) A person commits an *offense* if the person *arranges or facilitates* the *travel* of another person ("V") with a view to V being *exploited*.

 (2) It is irrelevant whether V consents to the travel (whether V is an adult or a child).

 (3) A person may in particular arrange or facilitate V's travel by recruiting V, transporting or transferring V, harbouring or receiving V, or transferring or exchanging control over V.

 (4) "Travel" means— (a) arriving in, or entering, any country, (b) departing from any country, (c) travelling within any country.

FIG. 7Q

Example of Digital Training Manual: Human Slavery Training

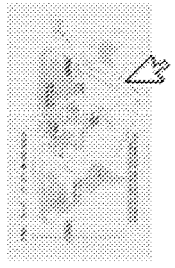

⊕ (1) A person commits an *offense* if the person *arranges or facilitates* the *travel* of another person ("V") with a view to V being *exploited*.

⊕ (2) It is irrelevant whether V consents to the travel (whether V is an adult or a child).

⊕ (3) A person may in particular arrange or facilitate V's travel by recruiting V, transporting or transferring V, harbouring or receiving V, or transferring or exchanging control over V.

⊕ (4) "Travel" means— (a) arriving in, or entering, any country, (b) departing from any country, (c) travelling within any country.

FIG. 7R

Example of Digital Training Manual: Human Slavery Training

 (1) A person commits an *offense* if the person *arranges or facilitates* the *travel* of another person ("V") with a view to V being *exploited*.

 (2) It is irrelevant whether V consents to the travel (whether V is an adult or a child).

 (3) A person may in particular arrange or facilitate V's travel by recruiting V, transporting or transferring V, harbouring or receiving V, or transferring or exchanging control over V.

 (4) "Travel" means— (a) arriving in, or entering, any country, (b) departing from any country, (c) travelling within any country.

FIG. 7T

Example of Digital Training Manual: Human Slavery Training

 (1) A person commits an *offense* if the person *arranges or facilitates* the *travel* of another person ("V") with a view to V being *exploited*.

 (2) It is irrelevant whether V consents to the travel (whether V is an adult or a child).

 (3) A person may in particular arrange or facilitate V's travel by recruiting V, transporting or transferring V, harbouring or receiving V, or transferring or exchanging control over V.

 (4) "Travel" means— (a) arriving in, or entering, any country, (b) departing from any country, (c) travelling within any country.

FIG. 7U

Example of Digital Training Manual: Human Slavery Training

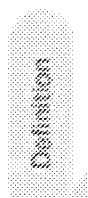 Definition

 Examples

 Relevant Info

⊕ (1) A person commits an *offense* if the person *arran...* *ates* the *travel* of another person ("V") with a view to V being *explo...*

⊕ (2) It is irrelevant whether V consents to the travel (whether V is an adult or a child).

⊕ (3) A person may in particular arrange or facilitate V's travel by recruiting V, transporting or transferring V, harbouring or receiving V, or transferring or exchanging control over V.

⊕ (4) "Travel" means— (a) arriving in, or entering, any country, (b) departing from any country, (c) travelling within any country.

702

700

FIG. 7V

FIG. 7W

Example of Digital Training Manual: Human Trafficking Training

> Travel means moving the V anywhere into, out of or within a country (1) A person commits an *offense* if the person *arranges or facilitates* the *travel* of another person ("V") with a view to V being *exploited*.

(2) It is irrelevant whether V consents to the travel (whether V is an adult or a child).

(3) A person may in particular arrange or facilitate V's travel by recruiting V, transporting or transferring V, harbouring or receiving V, or transferring or exchanging control over V.

(4) "Travel" means— (a) arriving in, or entering, any country, (b) departing from any country, (c) travelling within any country.

Example of Digital Training Manual: Human Slavery Training

Travel means moving the "V" anywhere into, out of or within a country.

⊕ (1) A person commits an *offense* if the person *arranges or facilitates* the *travel* of another person ("V") with a view to V being *exploited*.

⊕ (2) It is irrelevant whether V consents to the travel (whether V is an adult or a child).

⊕ (3) A person may in particular arrange or facilitate V's travel by recruiting V, transporting or transferring V, harbouring or receiving V, or transferring or exchanging control over V.

⊕ (4) "Travel" means— (a) arriving in, or entering, any country, (b) departing from any country, (c) travelling within any country.

702

700

FIG. 7Z

Example of Digital Training Manual: Human Slavery Training

 (1) A person commits an *offense* if the person *arranges or facilitates* the *travel* of another person ("V") with a view to V being *exploited*.

 (2) It is irrelevant whether V consents to the travel (whether V is an adult or a child).

 (3) A person may in particular arrange or facilitate V's travel by recruiting V, transporting or transferring V, harbouring or receiving V, or transferring or exchanging control over V.

 (4) "Travel" means— (a) arriving in, or entering, any country, (b) departing from any country, (c) travelling within any country.

FIG. 7AB

Example of Digital Training Manual: Human Slavery Training

⊕ (1) A person commits an *offense* if the person *arranges or facilitates* the *travel* of another person ("V") with a view to V being *exploited*.

⊖ (2) It is irrelevant whether V consents to the travel (whether V is an adult or a transport... (Id).

*Definitions*  *Examples*

⊕ (3) A person... articular arrange or facilitate V's travel by recruiting V, transport... transferring V, harbouring or receiving V, or transferring or exchang... ...ver V.

*Assessment*

⊕ (4) "Travel" means— (a) arriving in, or entering, any country, (b) departing from any country, (c) travelling within any country.

FIG. 7AC

Example of Digital Training Manual: Human Slavery Training

(1) A person commits an *offense* if the person *arranges or facilitates* the *travel* of another person ("V") with a view to V being *exploited*.

(2) It is irrelevant whether V consents to the travel (whether V is an adult or a child).

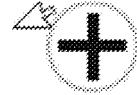
(3) A person may in particular arrange or facilitate V's travel by recruiting V, transporting or transferring V, harbouring or receiving V, or transferring or exchanging control over V.

(4) "Travel" means— (a) arriving in, or entering, any country, (b) departing from any country, (c) travelling within any country.

FIG. 7AD

Example of Digital Training Manual: Human Slavery Training

 (1) A person commits an *offense* if the person *arranges or facilitates* the *travel* of another person ("V") with a view to V being *exploited*.

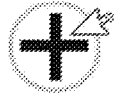 (2) It is irrelevant whether V consents to the travel (whether V is an adult or a child).

 (3) A person may in particular arrange or facilitate V's travel by recruiting V, transporting or transferring V, harbouring or receiving V, or transferring or exchanging control over V.

 (4) "Travel" means— (a) arriving in, or entering, any country, (b) departing from any country, (c) travelling within any country.

702

700

FIG. 7AE

Example of Digital Training Manual: Human Slavery Training

- (1) A person commits an *offense* if the person *arranges or facilitates* the *travel* of another person ("V") with a view to V being *exploited*.
  - Definition
  - Examples
  - Indicators
  - Accountability
  - Assessment + (2) It is ... ether V consents to the travel (whether V is an adult or a child).

+ (3) A person may in particular arrange or facilitate V's travel by recruiting V, transporting or transferring V, harbouring or receiving V, or transferring or exchanging control over V.

+ (4) "Travel" means— (a) arriving in, or entering, any country, (b) departing from any country, (c) travelling within any country.

FIG. 7AF

Example of Digital Training Manual: Human Slavery Training

 (1) A person commits an *offense* if the person *arranges or facilitates* the *travel* of another person ("V") with a view to V being *exploited*.

 (2) It is irrelevant whether V consents to the travel (whether V is an adult or a child).

 (3) A person may in particular arrange or facilitate V's travel by recruiting V, transporting or transferring V, harbouring or receiving V, or transferring or exchanging control over V.

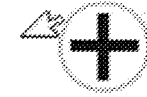 (4) "Travel" means— (a) arriving in, or entering, any country, (b) departing from any country, (c) travelling within any country.

FIG. 7AG

Example of Digital Training Manual: Human Slavery Training (1) A person commits an *offense* if the person *arranges or facilitates* the *travel* of another person ("V") with a view to V being *exploited*.

(2) it is irrelevant whether V consents to the travel (whether V is an adult or a child).

(3) A person may in particular arrange or facilitate V's travel by recruiting V, transporting or transferring V, harbouring or receiving V, or transferring or exchanging control over V.

(4) "Travel" means— (a) arriving in, or entering, any country, (b) departing from any country, (c) travelling within any country.

FIG. 7AH

Example of Digital Training Manual: Human Slavery Training

⊕ (1) A person commits an *offense* if the person *arranges or facilitates* the *travel* of another person ("V") with a view to V being *exploited*.

⊕ (2) It is irrelevant whether V consents to the travel (whether V is an adult or a child).

⊕ (3) A person may in particular arrange or facilitate V's travel by recruiting V, transporting or transferring V, harbouring or receiving V, or transferring or changing control over V.

⊕ (4) "Trav *Indicates* a) arriving in, or entering, any country, (b) departing from any country, (c) travelling within any country.

FIG. 7AI

Example of Digital Training Manual: Human Slavery Training

⊕ (1) A person commits an *offense* if the person *arranges or facilitates* the *travel* of another person ("V") with a view to V being *exploited*.

⊕ (2) It is irrelevant whether V consents to the travel (whether V is an adult or a child).

⊕ (3) A person may in particular arrange or facilitate V's travel by recruiting V, transporting or transferring V, harbouring or receiving V, or transferring or changing control over V.

⊕ (4) "Tra... Indicators 3) arriving in, or entering, any country, (b) departing from any country, (c) Precautions within any country.
Examples
Accountability

702

FIG. 7AJ

Example of Digital Training Manual: Human Slavery Training (1) A person commits an *offense* if the person *arranges or facilitates* the *travel* of another person ("V") with a view to V being *exploited*.

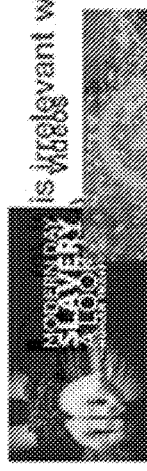

images

... is irrelevant whether V consents to the travel (whether V is an adult or a ...

... in particular arrange or facilitate V's travel by recruiting V, ...bouring or receiving V, or transferring or transporting or exchanging con...

(4) "Travel" means-- (a) arriving in, or entering, any country, (b) departing from any country, (c) travelling within any country.

FIG. 7AL

Example of Digital Training Manual: Human Slavery Training (1) A person commits an *offense* if the person *arranges or facilitates* the *travel* of another person ("V") with a view to V being *exploited*.

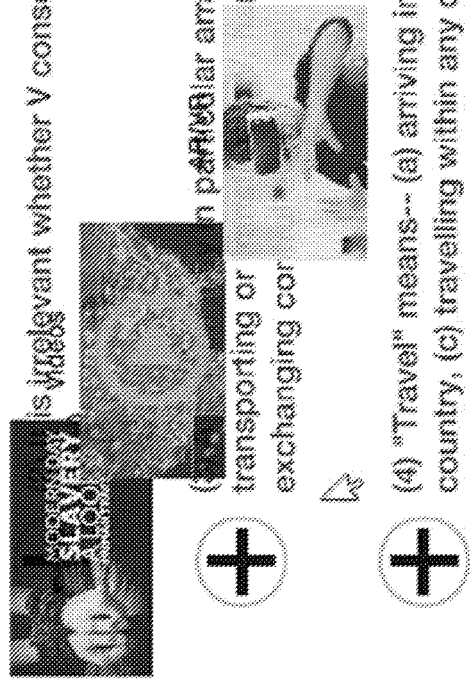

is irrelevant whether V consents to the travel (whether V is an adult or a n particular arrange or facilitate V's travel by recruiting V,
rbouring or receiving V, or transferring or
transporting or
exchanging co (4) "Travel" means— (a) arriving in, or entering, any country, (b) departing from any country, (c) travelling within any country.

FIG. 7AM

Example of Digital Training Manual: Human Slavery Training

⊕ (1) A person commits an *offense* if the person *arranges or facilitates* the *travel* of another person ("V") with a view to V being *exploited*.

⊕ (2) It is irrelevant whether V consents to the travel (whether V is an adult or a child).

⊕ ...ticular arrange or facilitate V's travel by recruiting V, harbouring or receiving V, or transferring or exchanging con...

⊕ (4) "Travel" means— (a) arriving in, or entering, any country, (b) departing from any country, (c) travelling within any country.

702 ⸺ 700

FIG. 7AN

SYSTEMS, APPARATUSES, INTERFACES AND IMPLEMENTING METHODS FOR DISPLAYING AND MANIPULATING TEMPORAL OR SEQUENTIAL OBJECTS

RELATED APPLICATIONS

This application is a continuation of U.S. patent application Ser. No. 16/296,114 filed Mar. 7, 2019, which claims the benefit of and provisional priority of U.S. Provisional Patent Application Ser. Nos. 62/639,917 filed 7 Mar. 2018 (Mar. 7, 2018) and 62/666,842 file 4 May 2018 (May 4, 2018).

This application is related to (a) U.S. patent application Ser. No. 16/245,206 filed 10 Jan. 2019; (b) Ser. No. 16/148,971 filed 1 Oct. 2018; (c) Ser. No. 15/968,872 filed 2 May 2018; (d) Ser. No. 15/781,061 filed 1 Jun. 2018; (e) Ser. No. 15/781,057 filed 1 Jun. 2018; (f) Ser. No. 15/781,050 filed 1 Jun. 2018; Ser. No. 15/645,503 filed 10 Jul. 2017; (g) Ser. No. 15/615,342 filed 6 Jun. 2017; (h) Ser. No. 15/255,107 filed 1 Sep. 2016; (i) Ser. No. 15/210,832 filed 14 Jul. 2016; (j) Ser. No. 14/731,335 filed 4 Jun. 2015; (k) Ser. No. 14/504,393 filed 1 October 14; and (l) Ser. No. 14/504,391 filed 1 Oct. 2014. This application is related to (a) U.S. Pat. No. 9,971,492 issued 15 May 2018; (b) U.S. Pat. No. 9,746,935 issued 29 Aug. 2017; (c) U.S. Pat. No. 9,703,388 issued 77 July 2017; (d) U.S. Pat. No. 8,788,966 issued 22 Jul. 2014, (e) U.S. Pat. No. 7,861,188 issued 28 Dec. 2010; and (f) U.S. Pat. No. 7,831,932 issued 9 Nov. 2010. All incorporated by reference per closing paragraph.

BACKGROUND OF THE DISCLOSURE

1. Field of the Disclosure

Embodiments of the present disclosure relate to systems, apparatuses, interfaces, and methods implementing them for visualizing time progression objects, time-based project objects or temporal construct objects in virtual reality (VR), augmented reality (AR), mixed reality (MR), or cross reality (XR) (VR/AR/MR/XR) environments or CG environments as a short hand reference.

In particular, embodiments of the present disclosure relate to systems, apparatuses, and interfaces include one or more processing units or processors, one or more display devices, and one or more input devices, wherein the systems, apparatuses, and interfaces and the methods implementing them are configured to display temporal objects such as time progression objects, time-based project objects, or other types of temporal objects. Temporal objects include tasks, goals, targets, objectives, processes, routines, targets, and/or events that have or will occur in a sequence such as a time line, process line, story line, etc. The systems, apparatuses, and interfaces and methods implementing them also display selection and control objects and temporal direction and speed control objects, wherein the projects and structures may be of a finite duration or a continuous duration. In certain embodiments, the tasks, goals, targets, objectives, processes, routines, targets, and/or events may be represented by orbs, elongated orbs, continuous geometrical objects, any other 2D, 3D or 4D object, or combinations thereof that may be labeled with names, colored based on characteristics, otherwise highlighted (e.g., priority, importance, type, etc.), and wherein the time line may be traversed by a displayed a 2D, 3D, or 4D CG structure (e.g., a land based vehicle such as car, truck, motorcycle, bike, etc., water based vehicle such as a boat, ship, jet ski, etc., air based vehicle such as a plane, glider, parasail, etc., a space based vehicle such as a spaceship, space plane, space capsule, etc., any other type of 2D, 3D, or 4D VR structure, or combination or collections thereof).

2. Description of the Related Art

Virtual reality, augmented reality, mixed reality, or cross reality (VR/AR/MR/XR or CG) environments have been used in games and in other systems that permit a user to visualize and interact with the environment. While there are many systems and methods implementing CG environments, there is still a need in the art for improved systems and methods for visualizing and interacting with CG environments associated with time lines for project management, lawsuit management, corporate management, corporate funding management, and other operations that may be represented by time lines.

SUMMARY OF THE DISCLOSURE

Embodiments of this disclosure provide systems, apparatuses and interfaces including one or more processing units or a processors, one or more display devices, and one or more input devices, wherein the input device(s) is(are) configured to generate outputs in response to activity of the type detected or sensed by the input device(s) and the processor unit(s) is(are) configured to (1) receive the outputs from the input devices, (2) initialize the display of a CG environment, if a CG environment is not already displayed, (3) control visualization, selection, activation, change, modification, augmentation, and/or manipulation of one temporal/sequential objects including a plurality of tasks, goals, targets, objectives, processes, routines, targets, and/or events, and (4) traverse the one or more temporal objects. In certain embodiments, the processors are also configured to (5) switch between one or more temporal/sequential objects. In other embodiments, the initializing, controlling, traversing, and/or switching may be based on: (a) motion inputs, (b) gesture inputs, (c) hard select inputs, (d) acoustic inputs, (e) tactile inputs, or (e) any combination of thereof.

Embodiments of this disclosure provide methods for implementing the systems, apparatuses and interfaces of this disclosure, wherein the systems, apparatuses and interfaces include one or more processing units or processors, one or more display devices, and one or more input devices, wherein the methods include receiving at one or more of the processing inputs from one or more of the input devices and initializing in or on the display device a CG environment, if a CG environment is not already displayed. The methods also include controlling visualization, selection, activation, change, modification, augmentation, and/or manipulation of one or more temporal objects, wherein each of the temporal/sequential objects includes a plurality of tasks, goals, targets, content, objectives, processes, routines, targets, and/or events. The methods also include traversing one or more temporal objects in the forward or reverse direction. Of course, the user may pause the traversal as well. The methods may also include switching between temporal/sequential objects. In certain embodiments, the displaying, controlling, traversing, and/or switching may be based: (a) motion inputs, (b) gesture inputs, (c) hard select inputs, (d) acoustic inputs, (e) tactile inputs, or (e) any combination of thereof. Henceforth, any reference to time or temporal refer to any object the includes information or content occurring sequentially.

BRIEF DESCRIPTION OF THE DRAWINGS OF THE DISCLOSURE

Figure 1B:
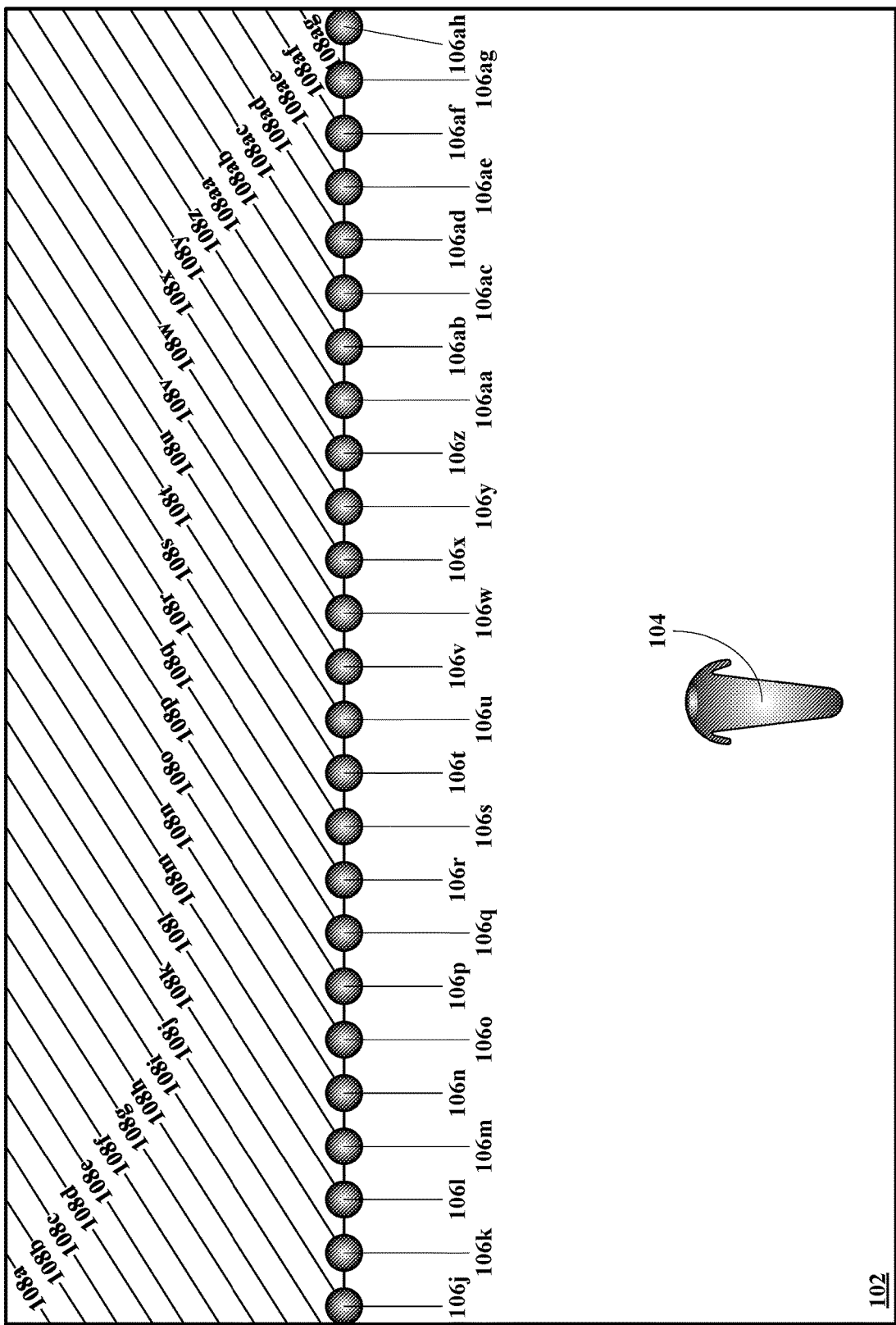
Figure 1C:
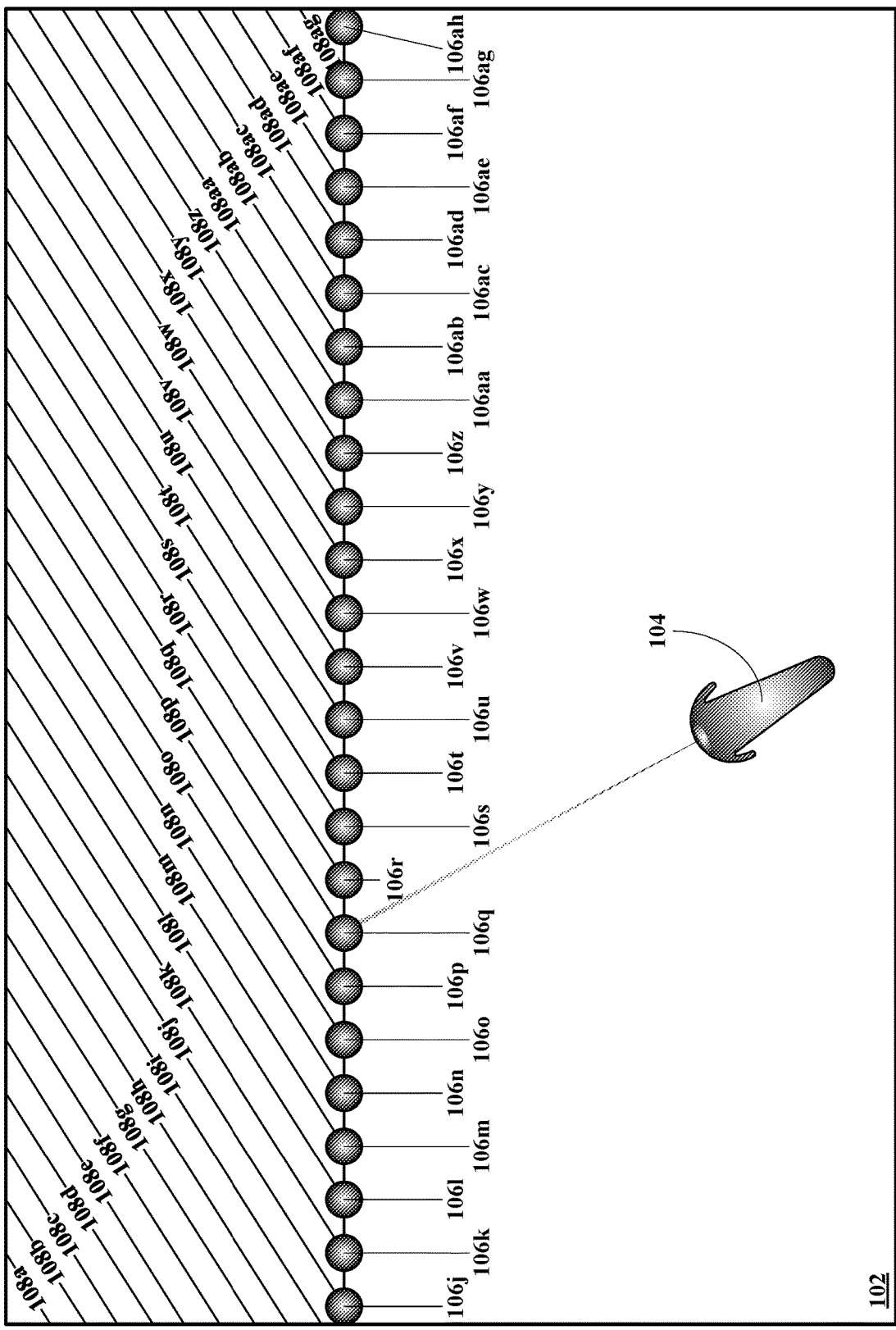

The disclosure can be better understood with reference to the following detailed description together with the appended illustrative drawings in which like elements are numbered the same:

FIGS. 1A-C depict a sequence of display screens starting with a blank screen, then detecting an input above a threshold via an input device populating the screen with a plurality of time lines and selectable orbs associated with each time line and a selection object and/or attribute(s), and then activating the selection object and/or attributes(s) based on the input or a further input to interact with the object field or environment, or point a beam from the selection object to an specific time line orb selecting and/or controlling the orb and/or attributes thereof.

Figure 2A:
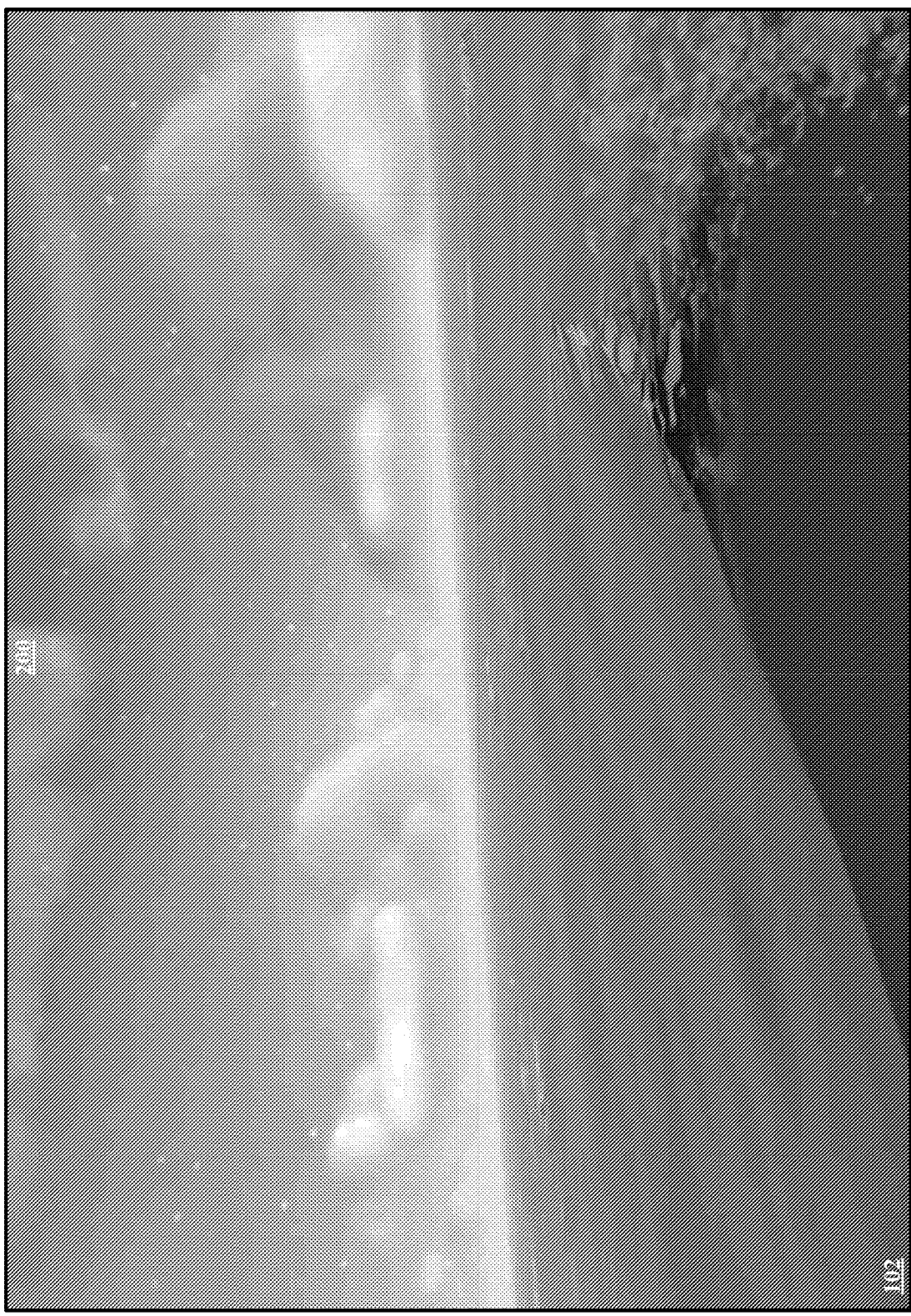

FIGS. 2A-DD depict a sequence of display screens evidencing traversal along a given time line in a water-based vehicle (sailboat), wherein outputs from an input device is used by a processor to control a selection object and time direction objects and to select and activate tasks, goals, events, etc. associated with the time line, wherein the tasks, goals, events, etc. may have one or more attributes, subtasks, subgoals, subevents, etc. which may be selected, activated, edited, manipulated, etc. The selection protocol is visualized in a darkened sky via changes in the virtual objects and/or light beams radiating from a star in the darkened sky towards the selection orb or from the selection object to a star in the darkened sky, which displays the contents associated with the particular task, goal, event, etc., attributes, subtasks, subgoals, subevents, etc.

Figure 3A:
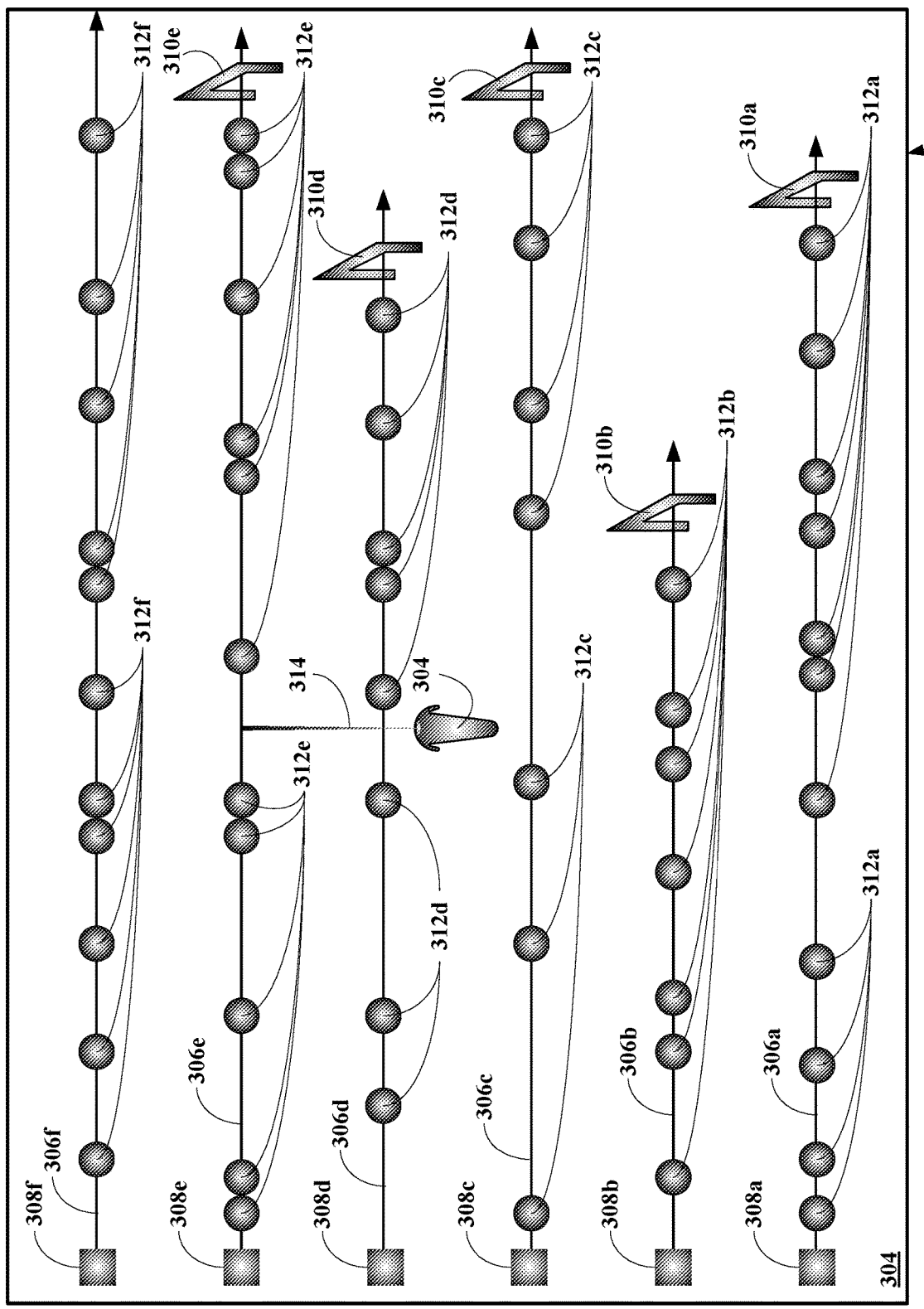
Figure 3B:
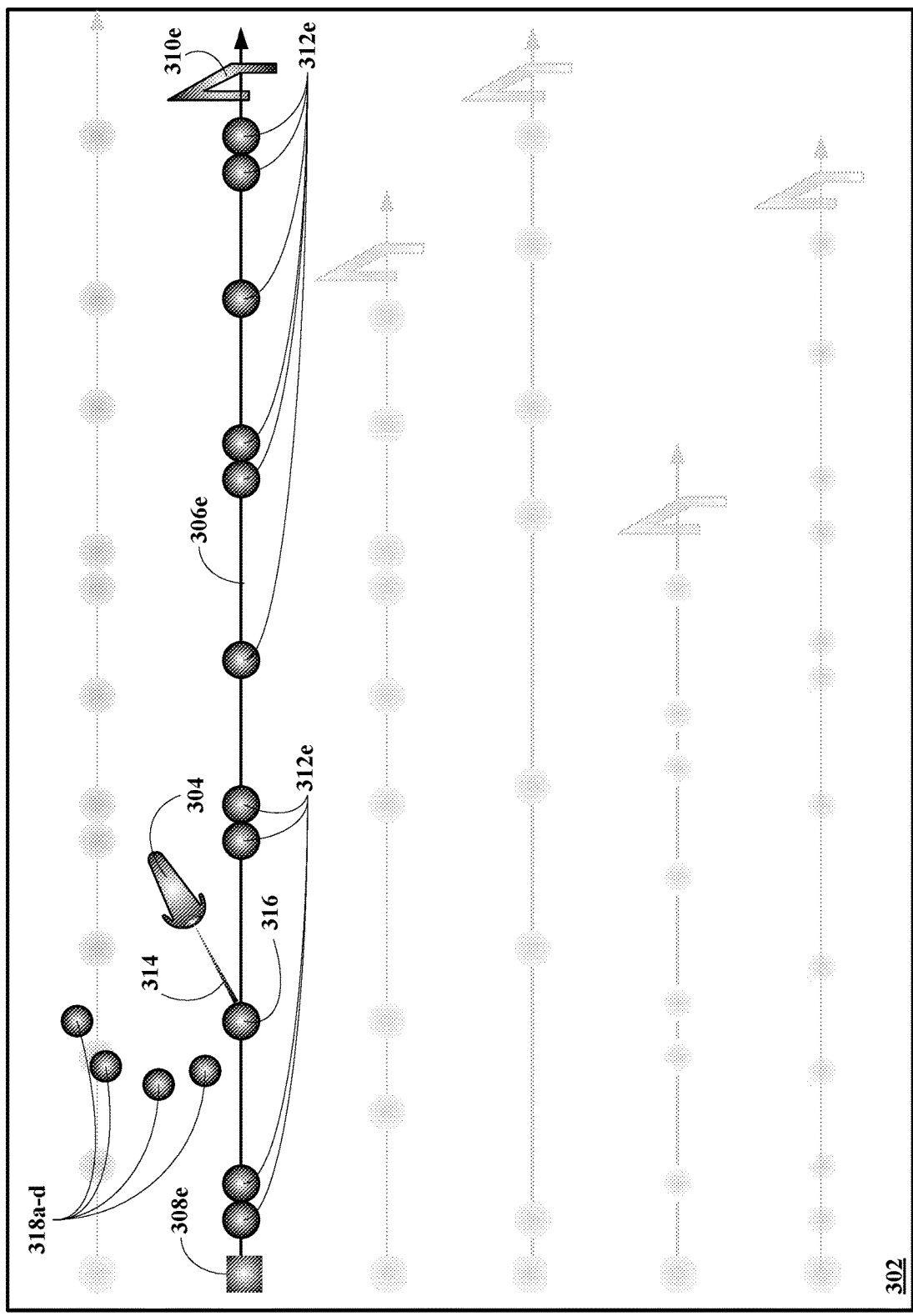
Figure 3C:
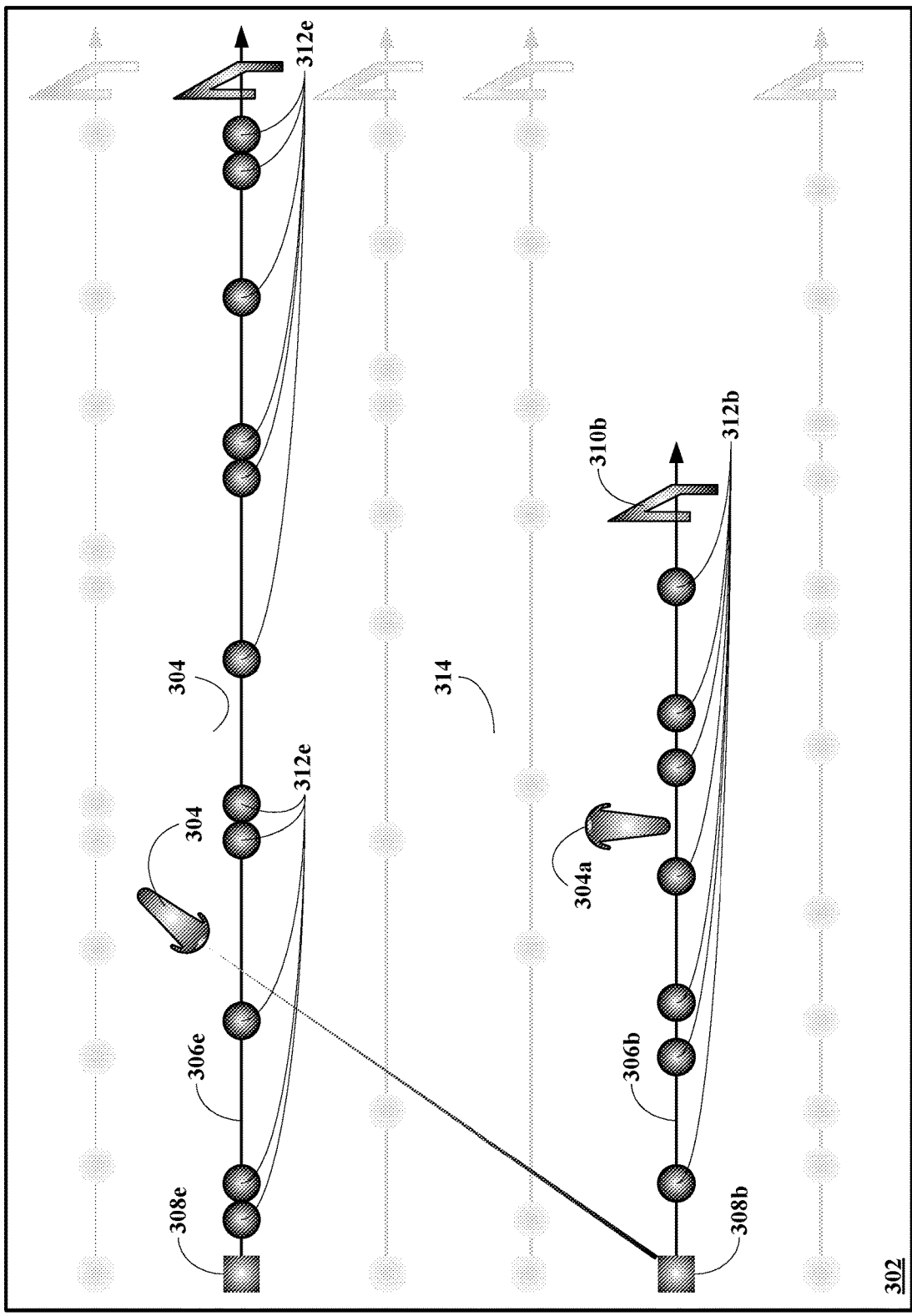

FIGS. 3A-C depict a top view of a sequence of display screens populated with a plurality of time lines, each time line includes different tasks, goals, events, etc. represented by orbs distributed along each time line and a selection object situated in a center of the first screen, wherein the processor is configured to select a particular time line or a set of time lines, traverse along the selected time line or line and activate particular tasks, goals, events, etc. along the selected time line or lines, wherein the selection may be to the start, finish or anywhere along the time line. Selection of a particular time line or lines causes the other time line to be displayed in a faded format and the active time line or line displayed in non-faded format. Selection again is evidence by a position and/or light beams radiating from the selection object to a particular time line, wherein each selected time line remains active. In this configuration, the traversal along the time line is not shown as in FIG. 2A-DD.

FIGS. 4A-D depict a sequence of display screens populated with a plurality of time lines and associated scenes, each time line different tasks, goals, events, etc. represented by orbs distributed along each time line and a selection object situated in a center of the first screen, wherein the processor is configured to select a particular time line or a set of time lines, traverse along the selected time line or line and activate particular tasks, goals, events, etc. along the selected time line or lines, wherein the selection may be to the start, finish or anywhere along the time line. Selection of a particular time line or lines causes the other time line to be displayed in a faded format and the active time line or line displayed in non-faded format. Selection again is evidence by position and/or light beams radiating to or from the selection object to a particular time line, wherein each selected time line remains active.

Figure 5A:
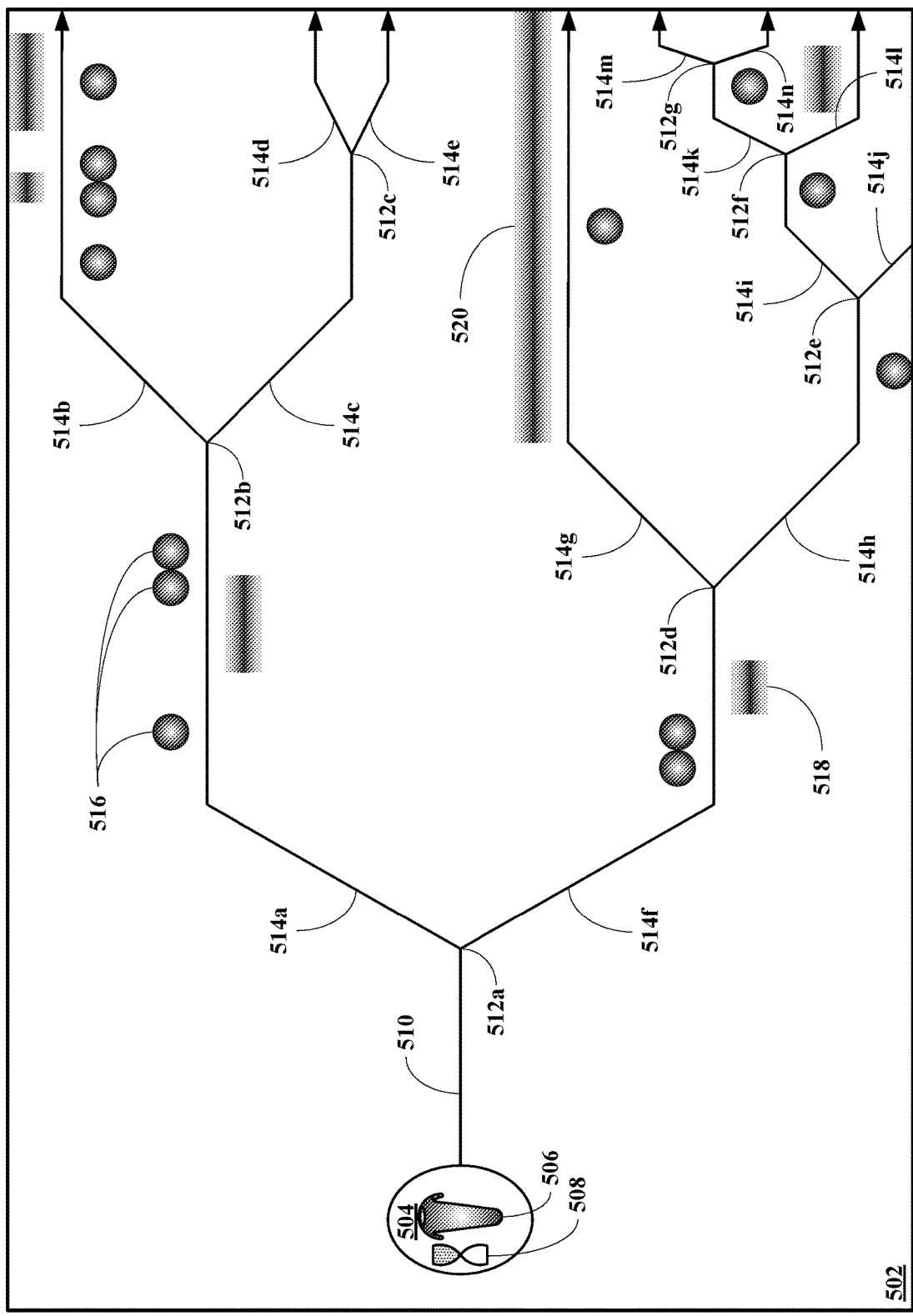
Figure 5B:
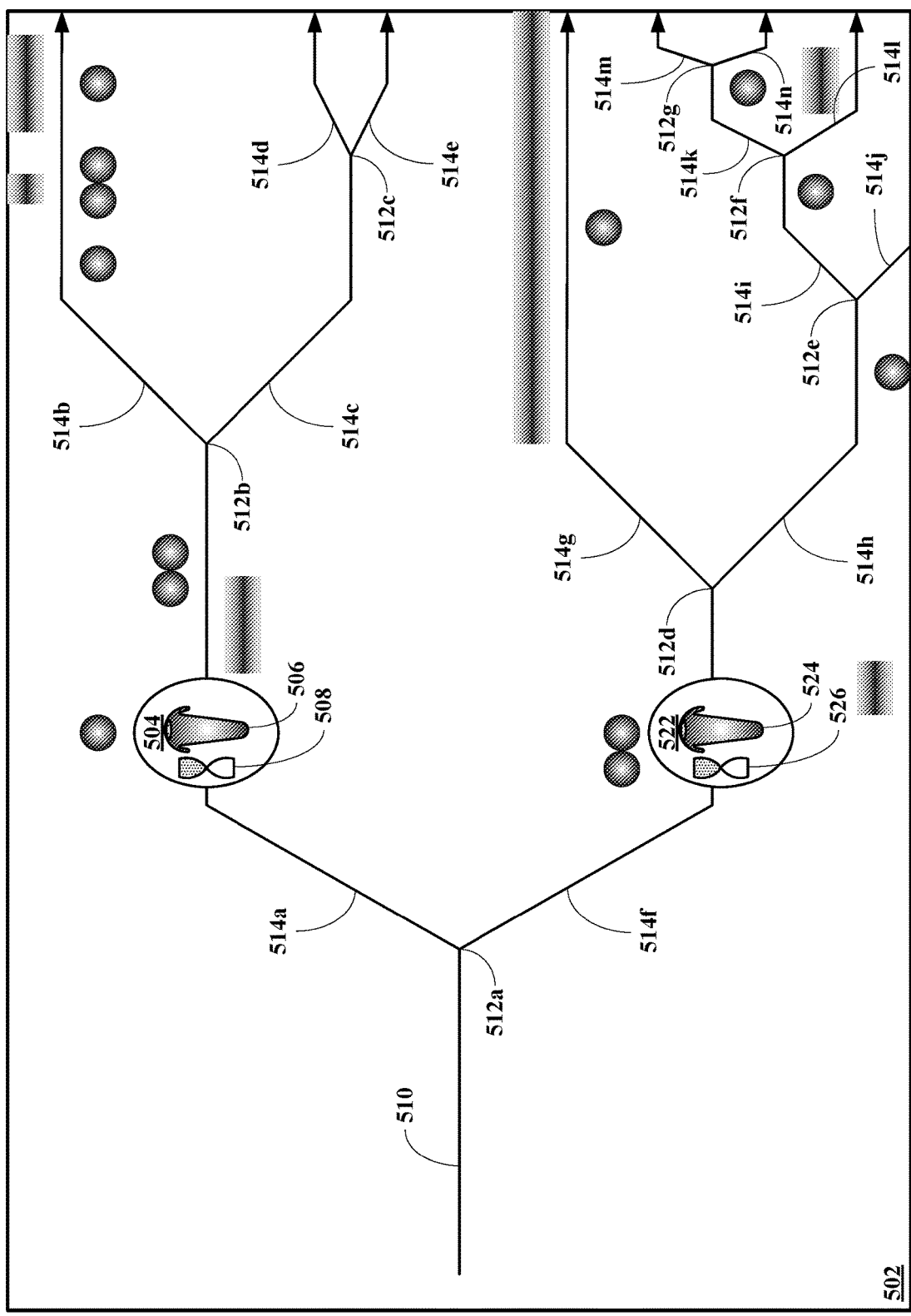
Figure 5C:
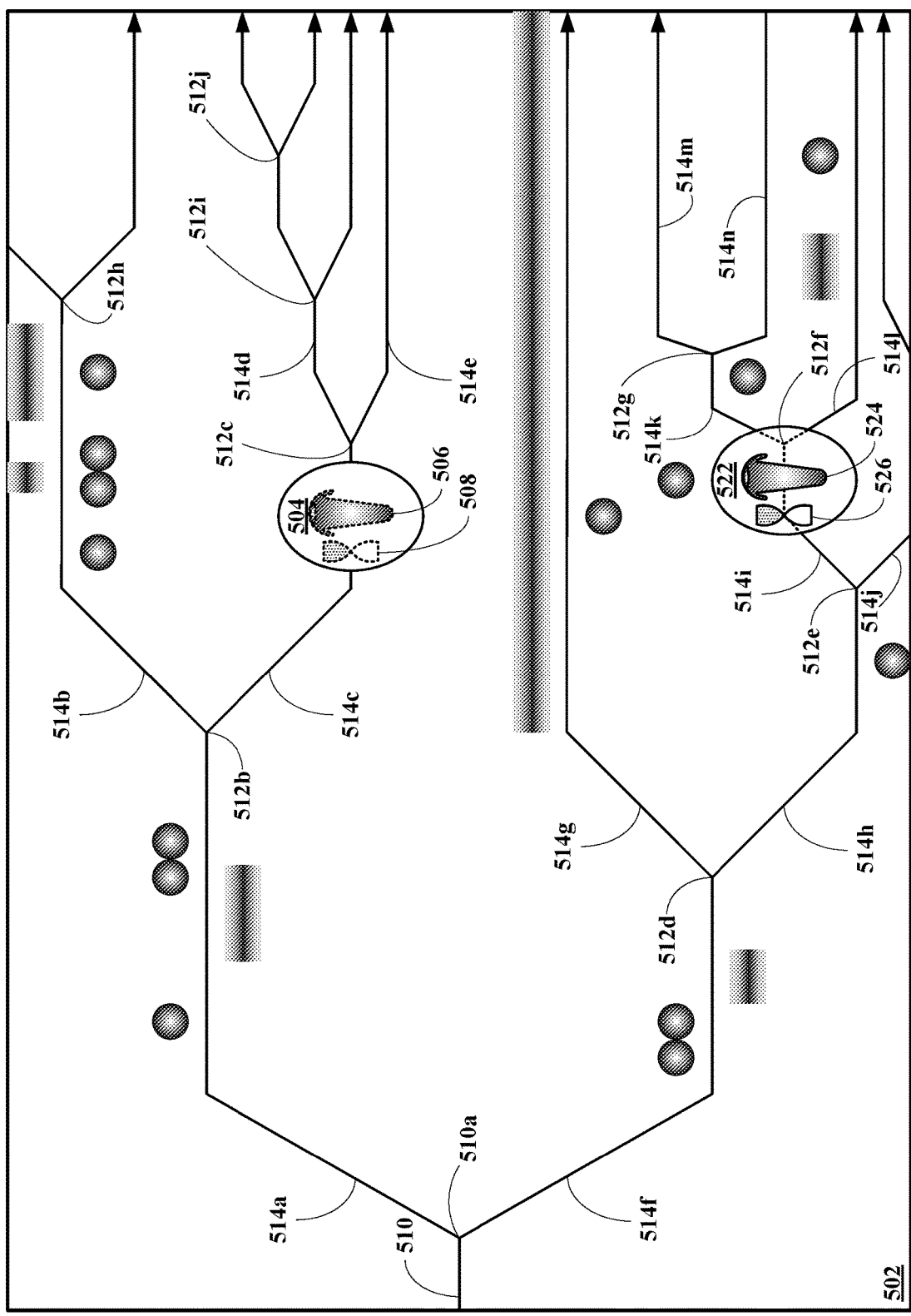

FIGS. 5A-C depict a sequence of display screens populated with a time line having a number of branches and a selection object and time direction object and processor configured to traverse the time line along one branch, some of the branches or all of the branching based on input output by an input device.

Figure 6A:
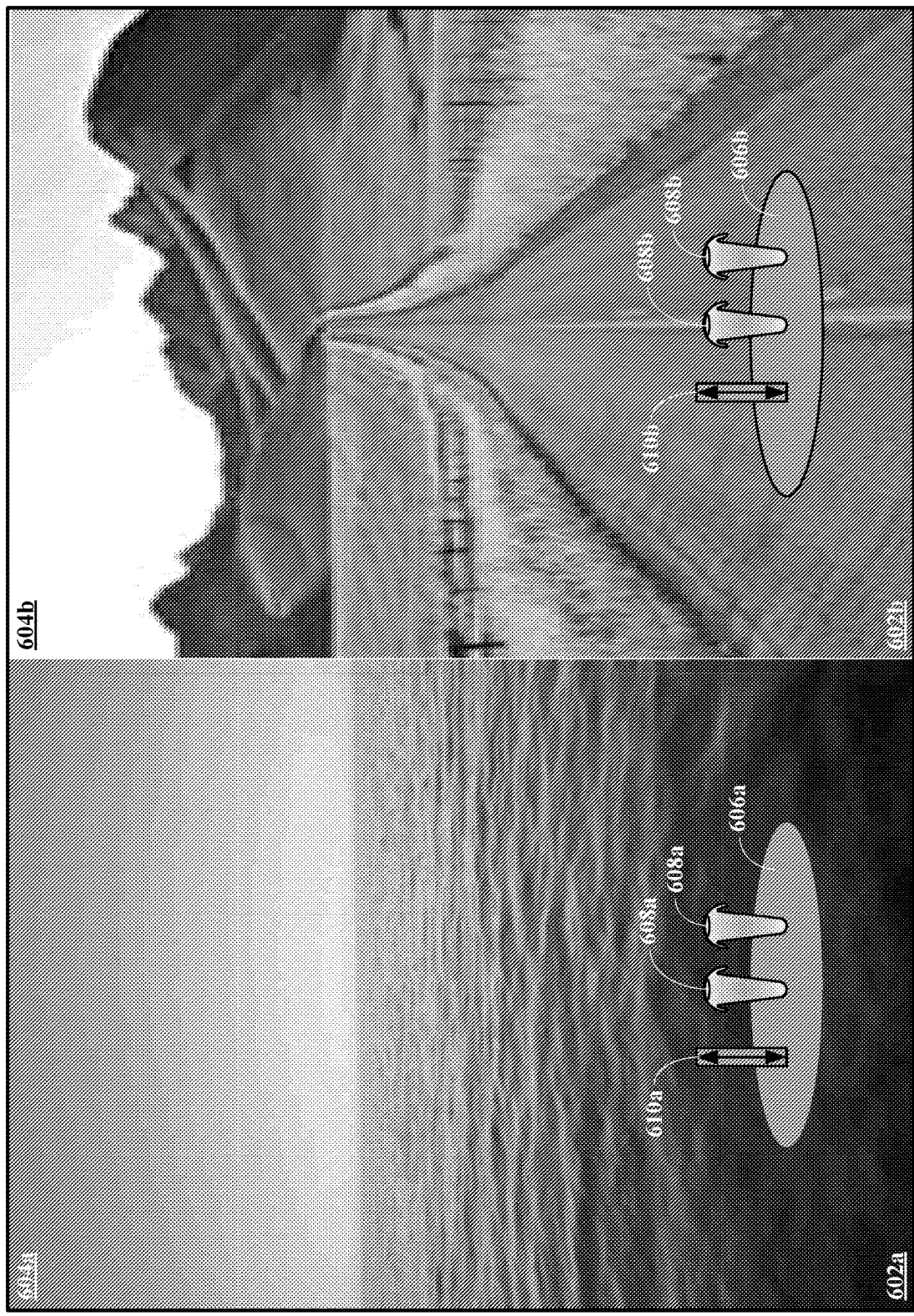
Figure 6B:
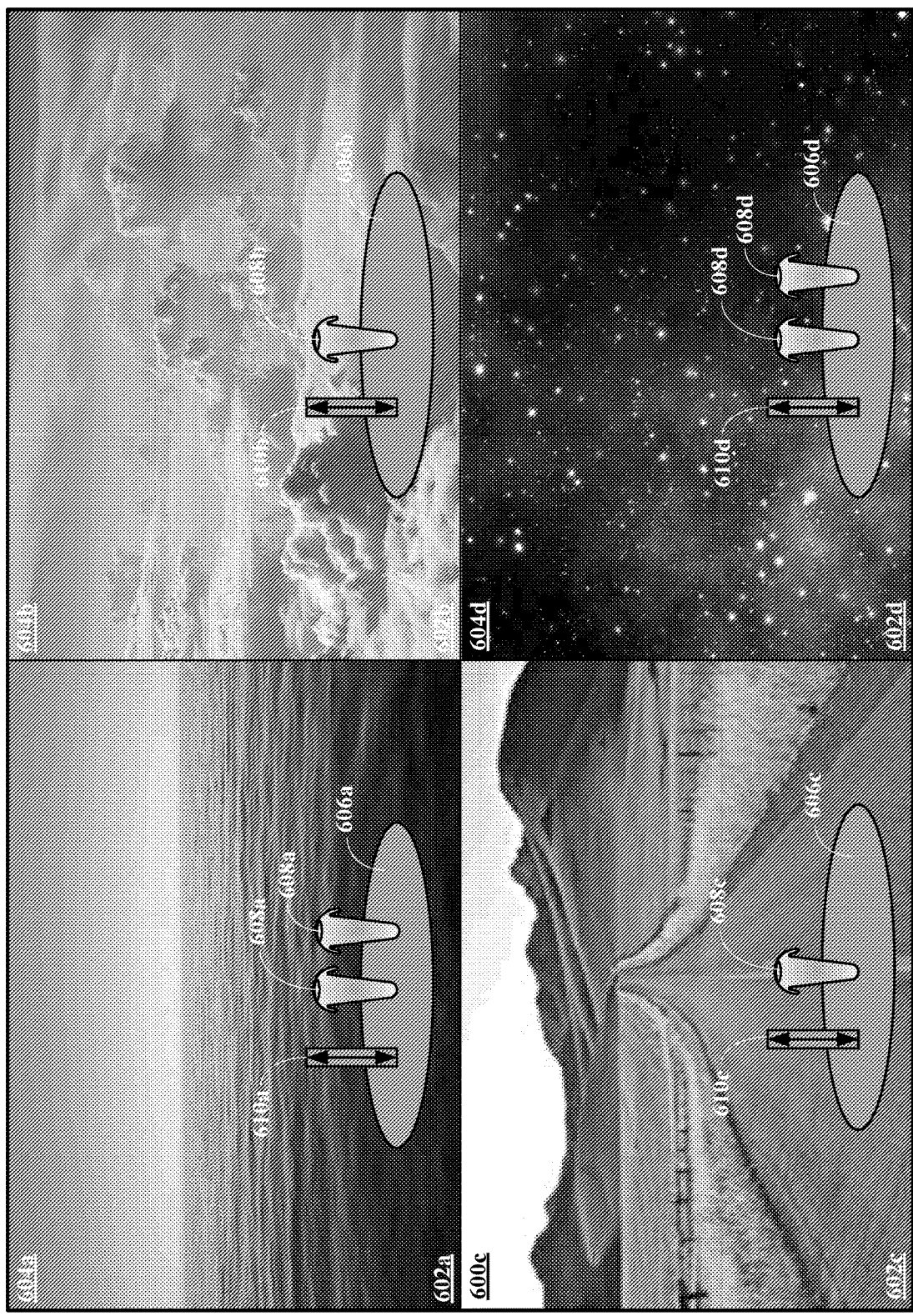
Figure 6C:
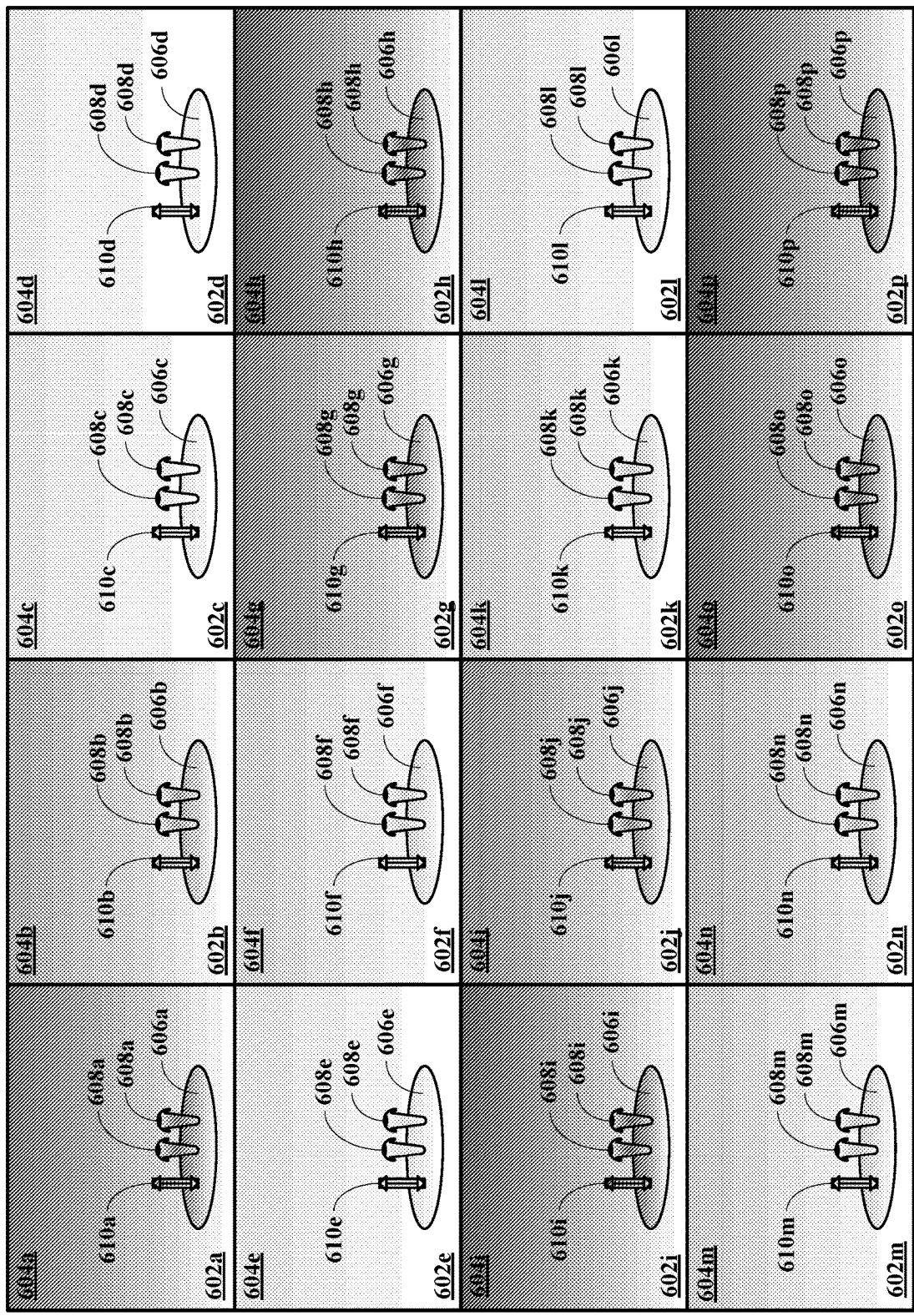

FIGS. 6A-C depict a sequence of display screens evidencing screen split in two different time lines in different scape formats, four different time lines in different scape formats, or sixteen different time lines in different scape formats.

Figure 7C:
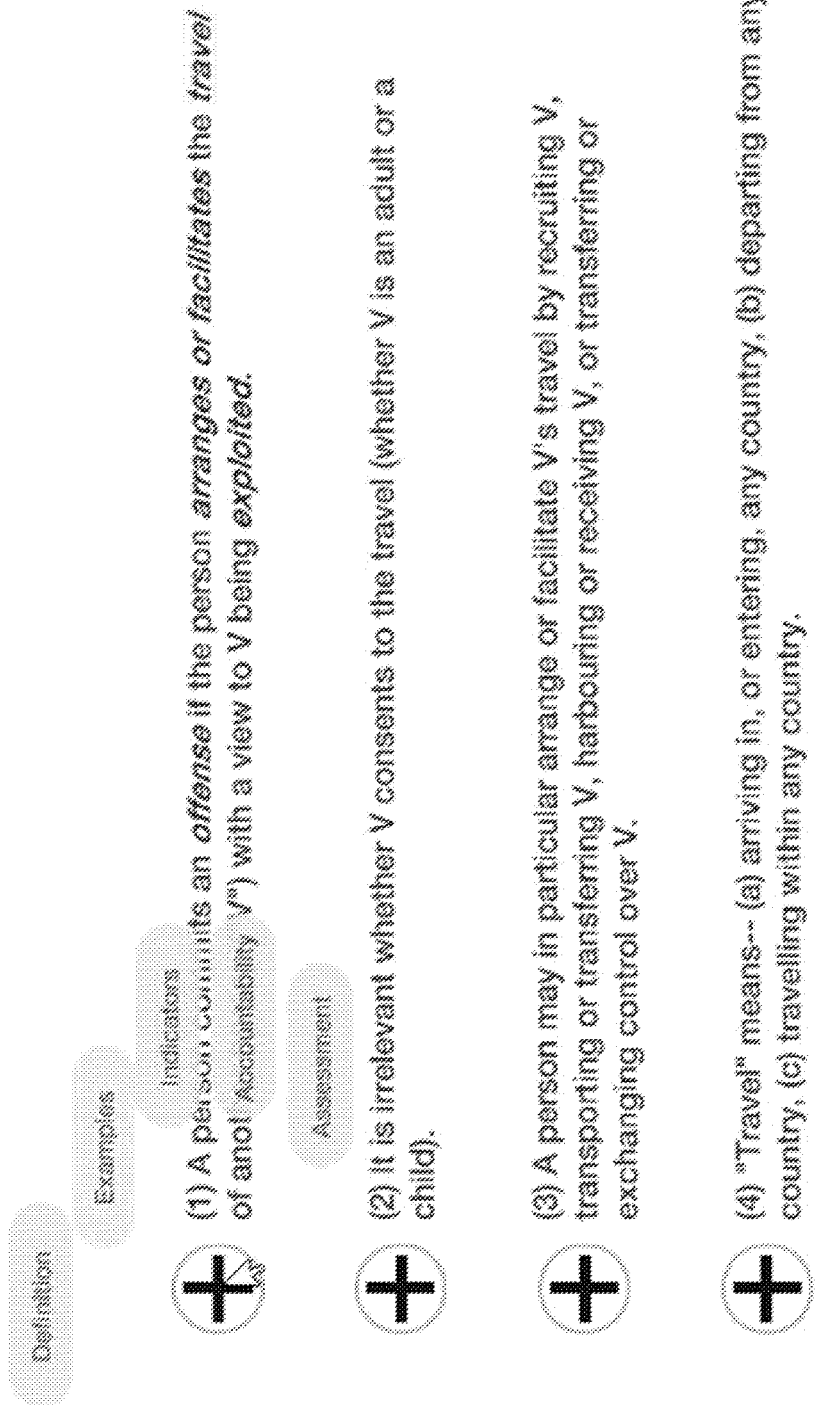
Figure 7D:
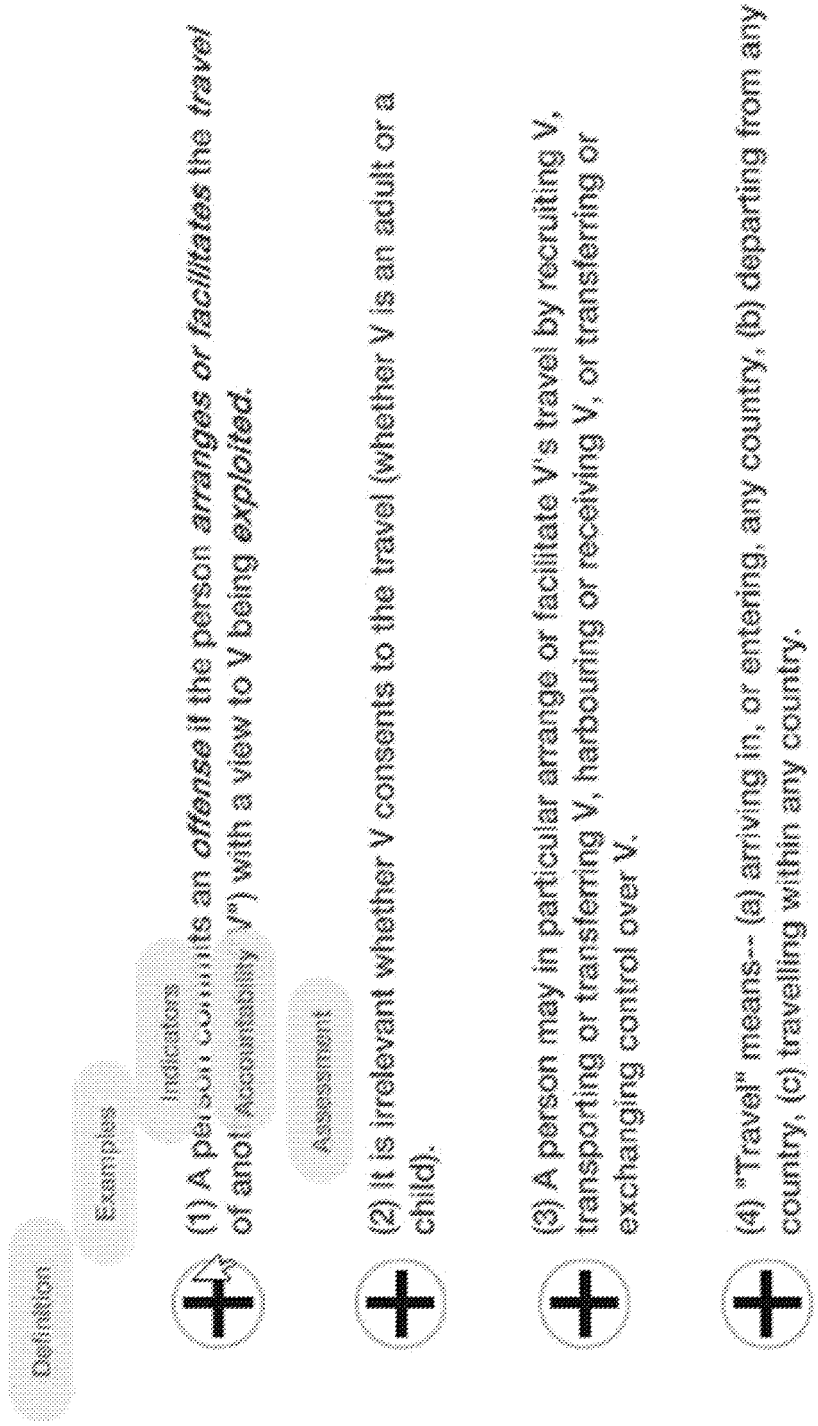
Figure 7E:
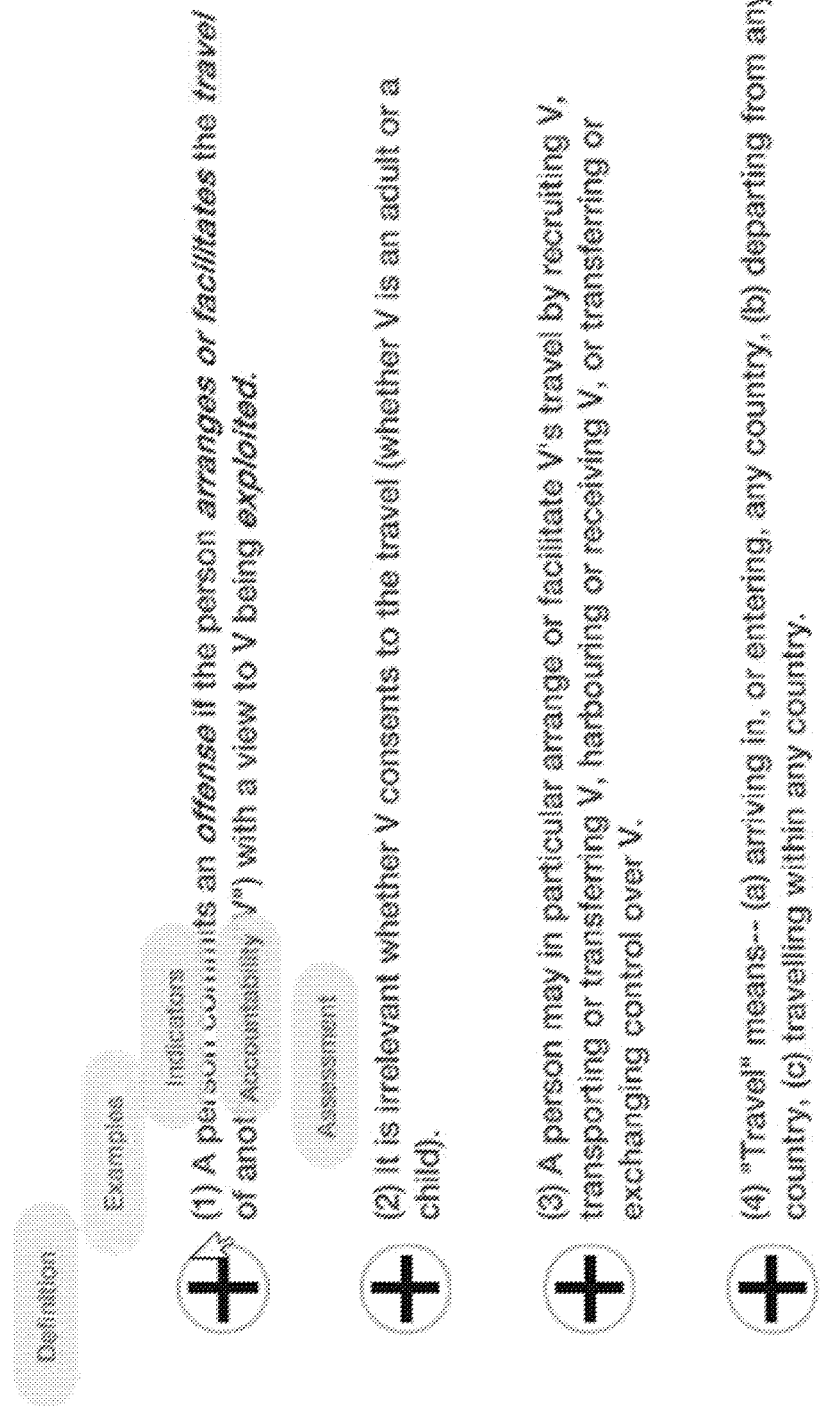
Figure 7F:
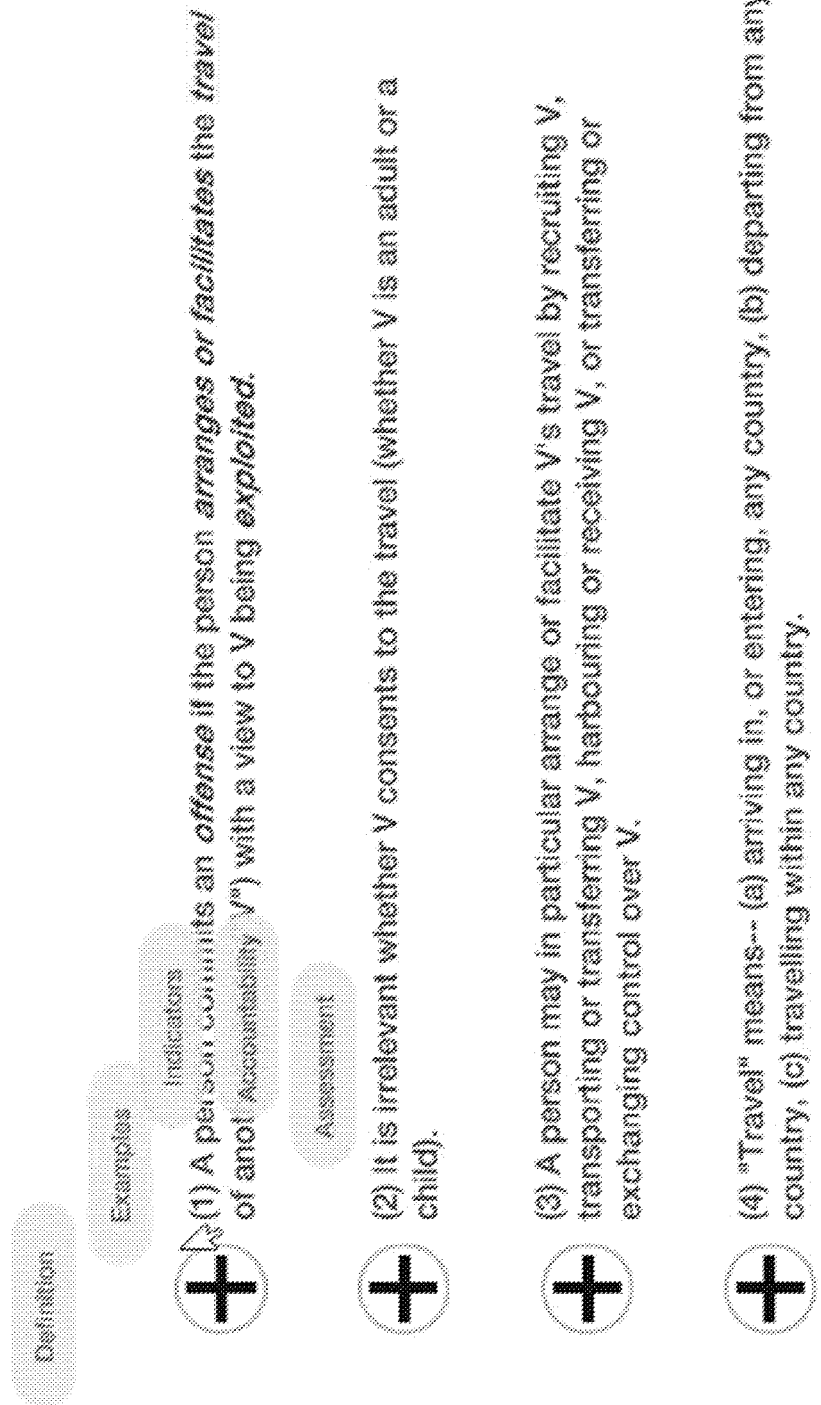
Figure 7G:
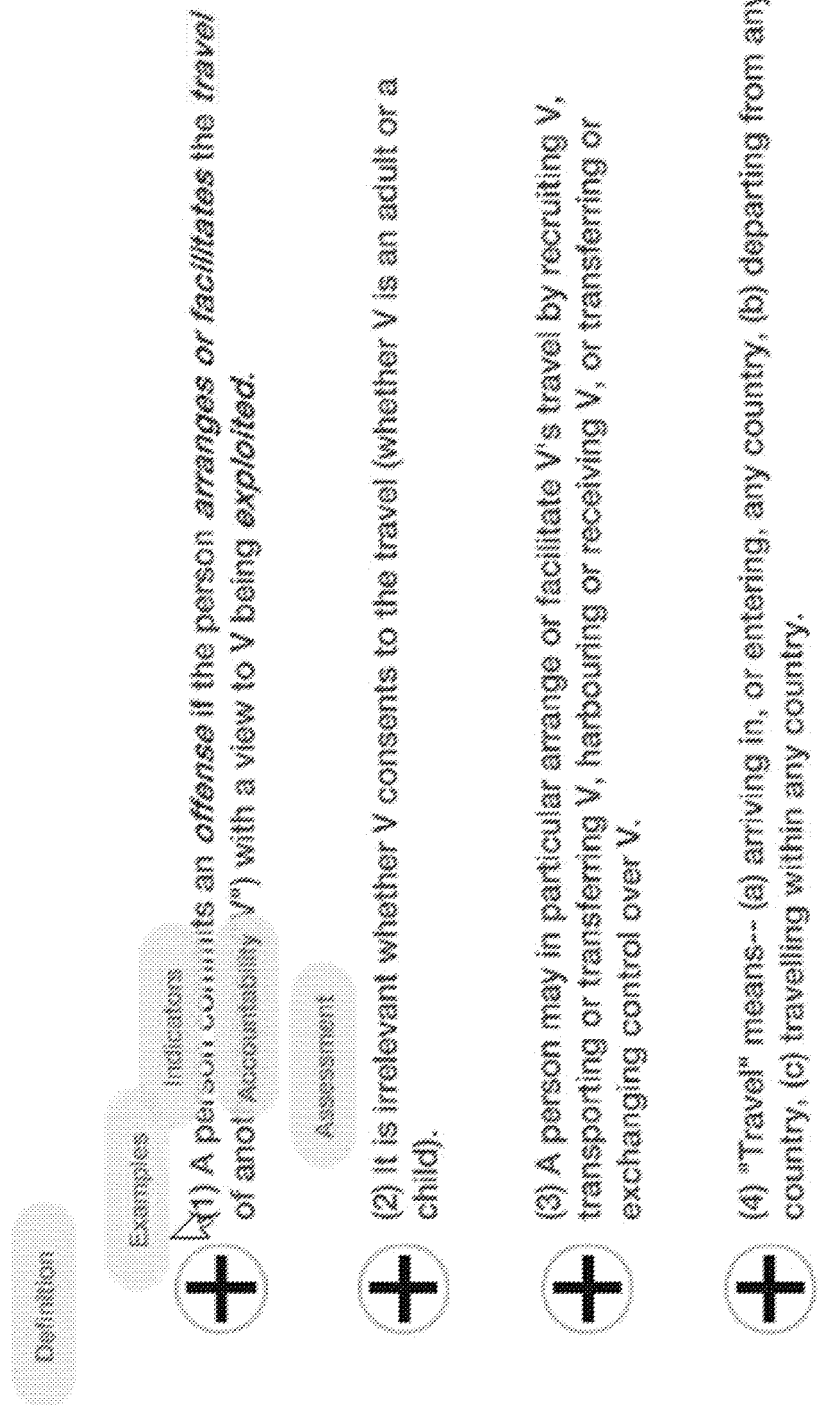
Figure 7H:
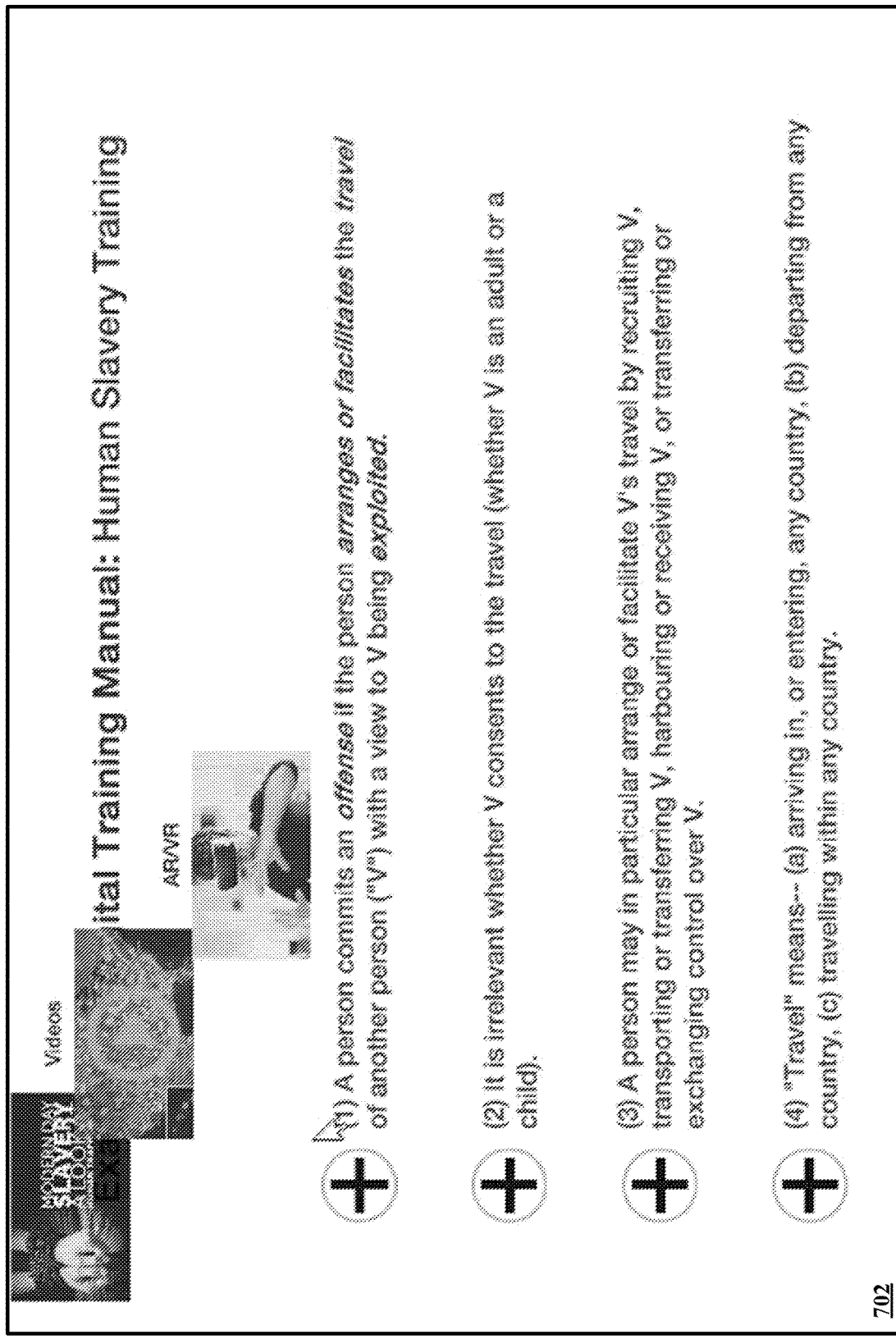
Figure 71:
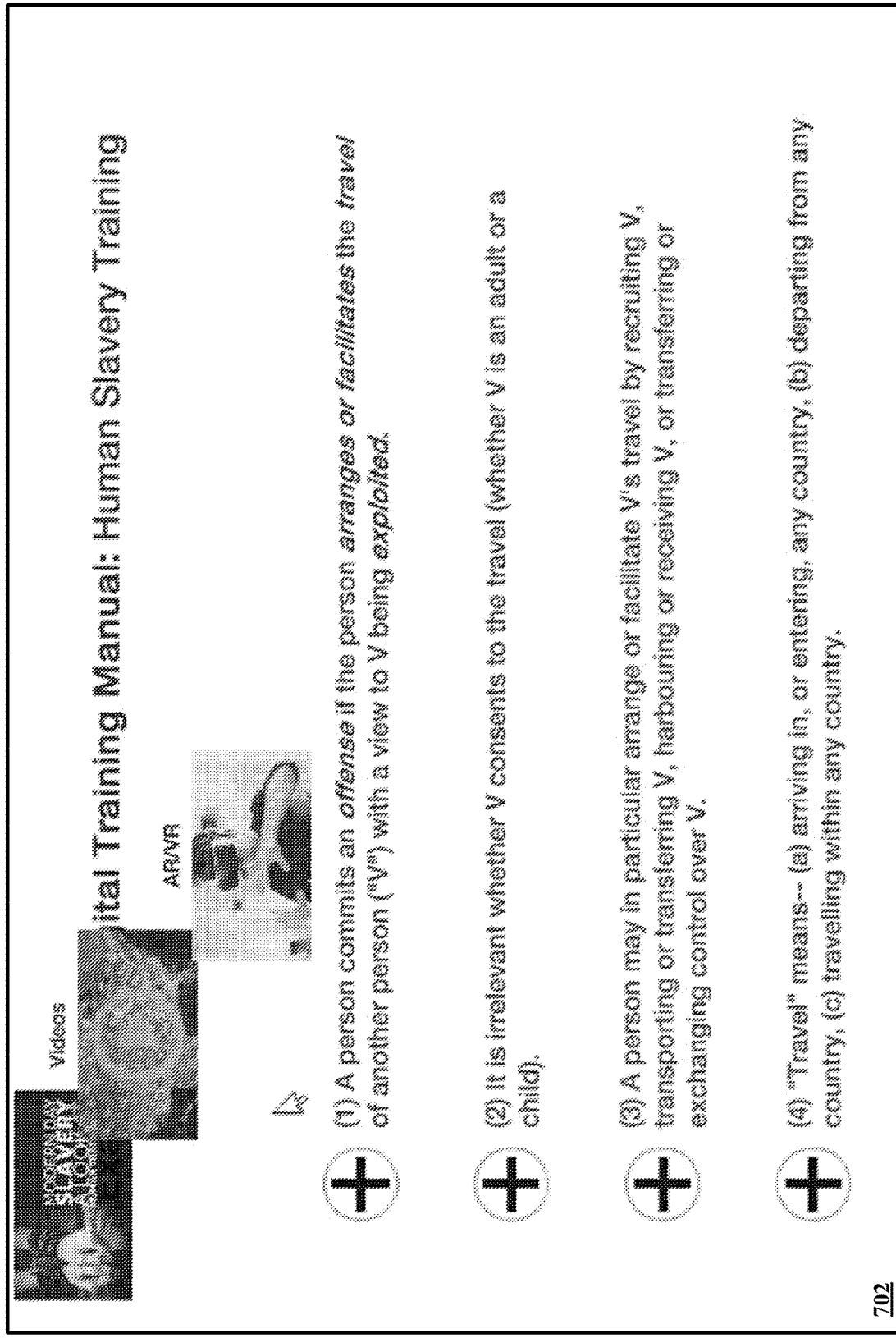
Figure 7J:
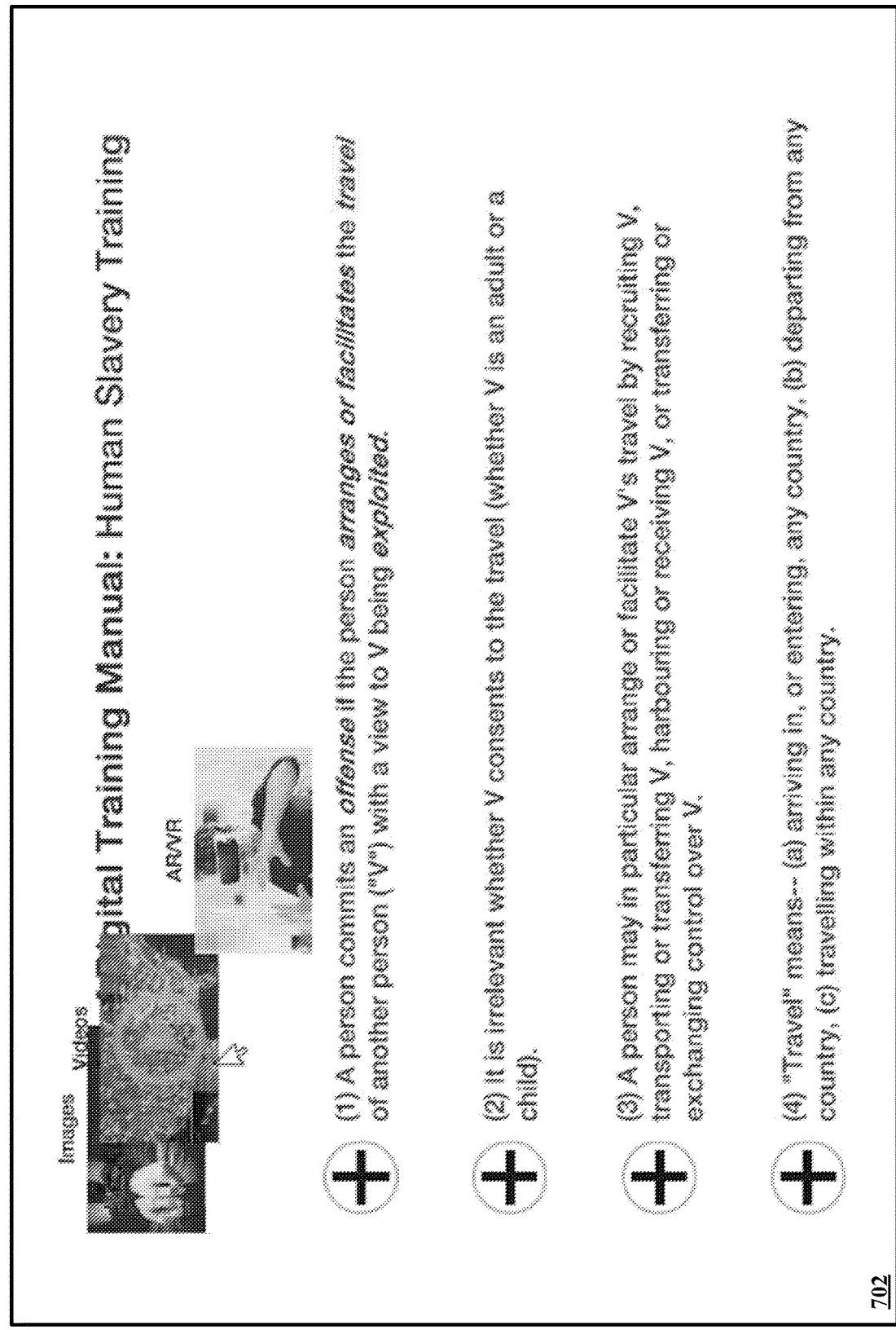
Figure 7K:
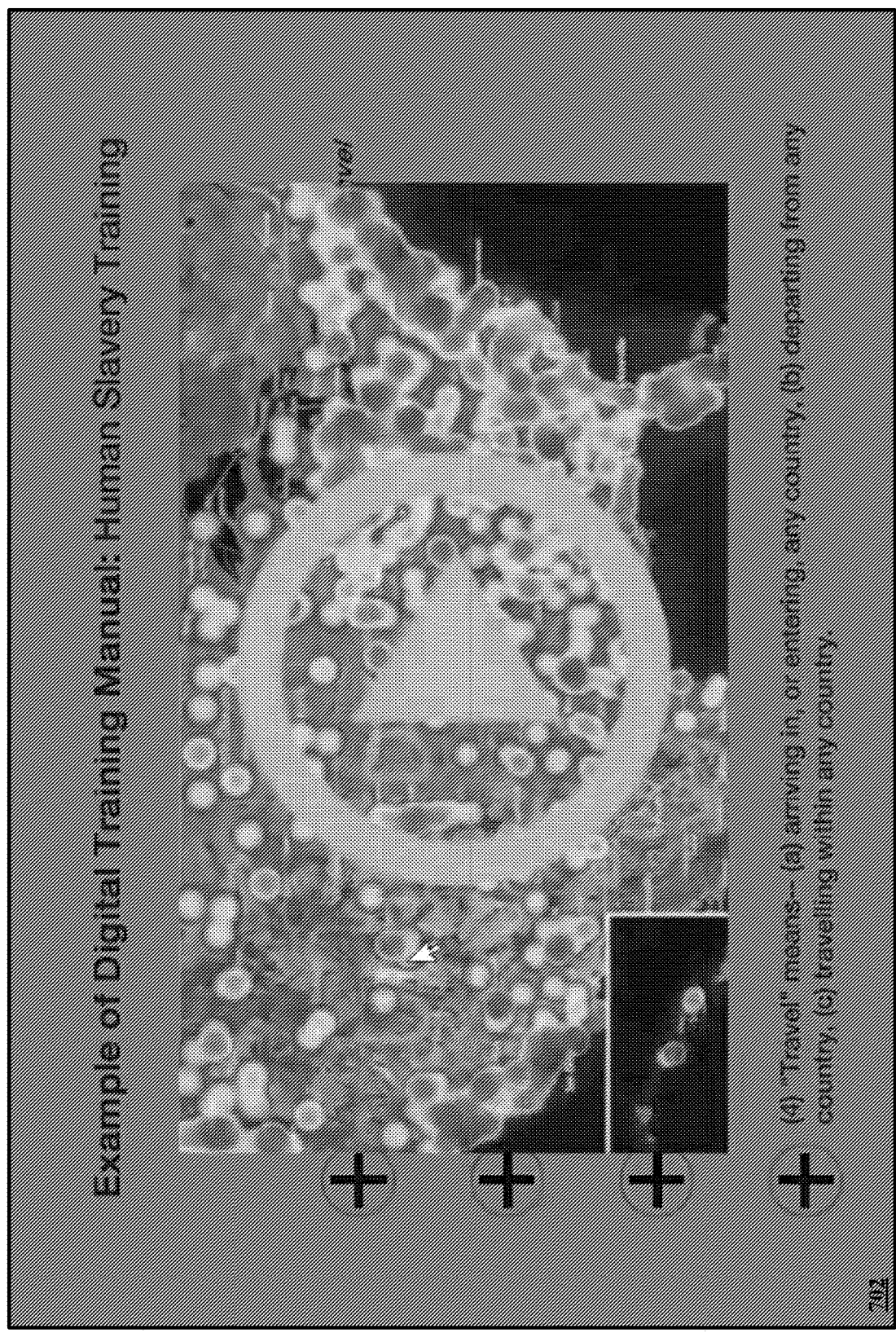
Figure 7N:
Figure 7S:
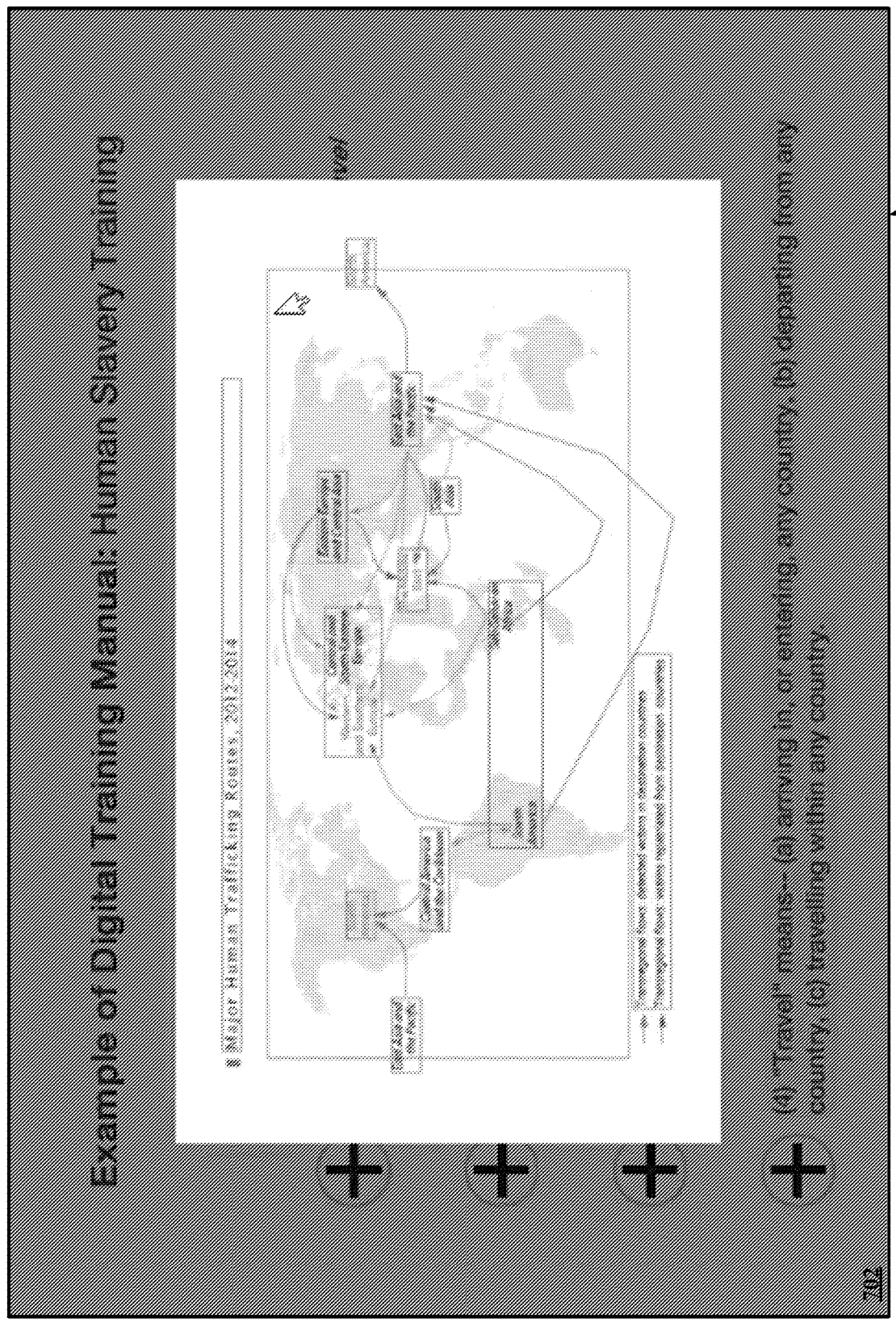
Figure 7X:
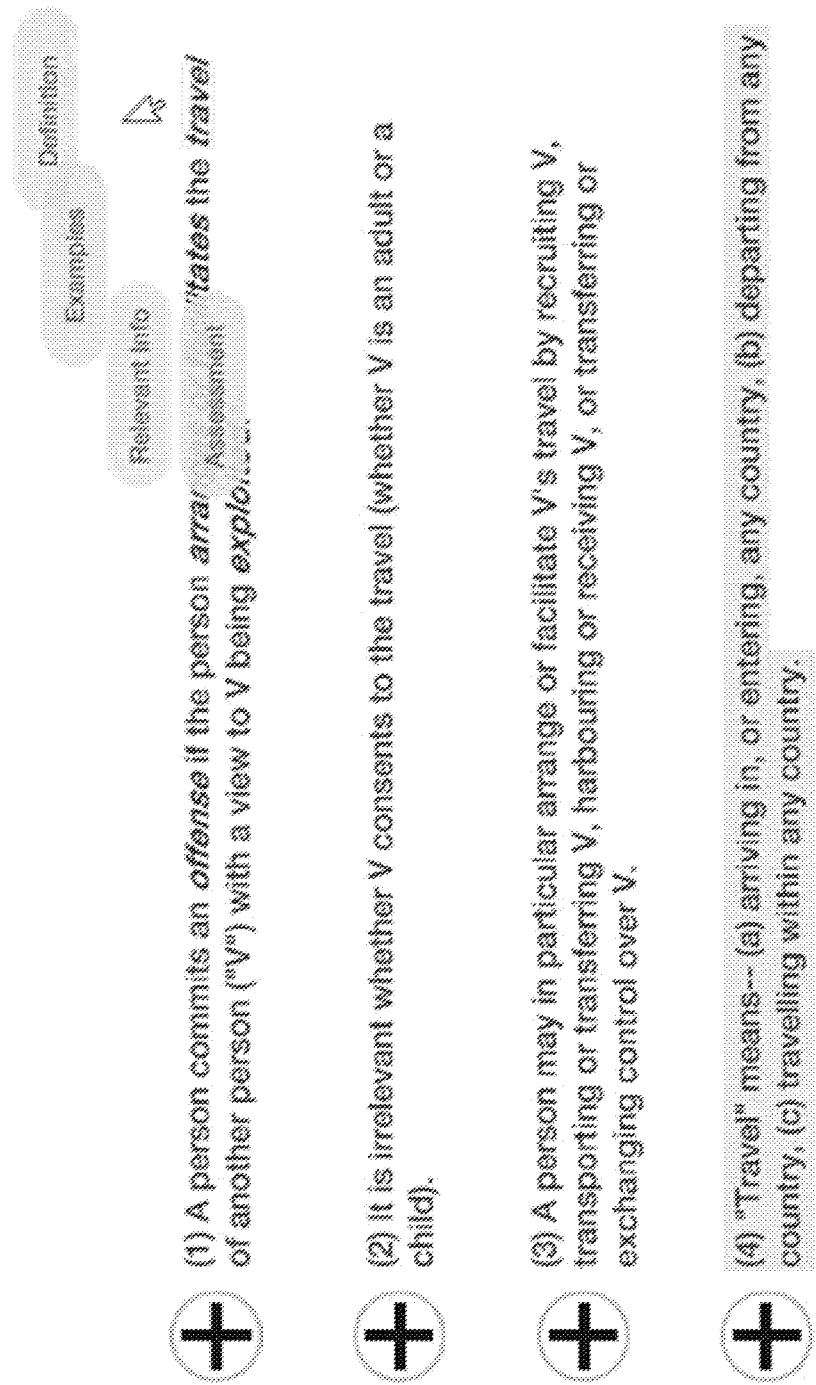
Figure 7A:
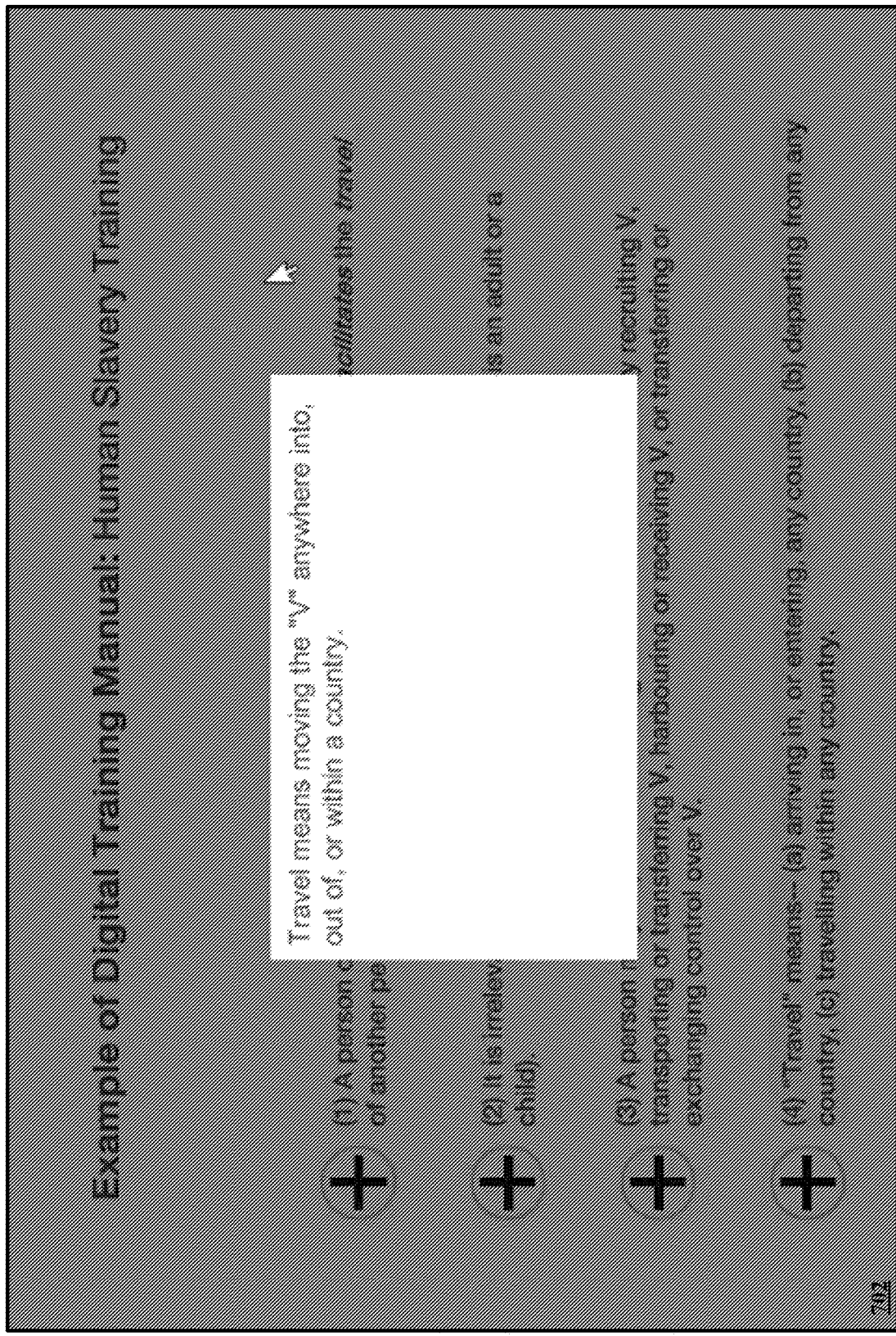
Figure 7A:
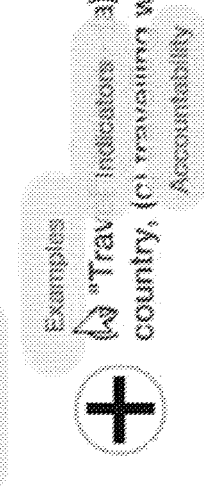
Figure 7A:
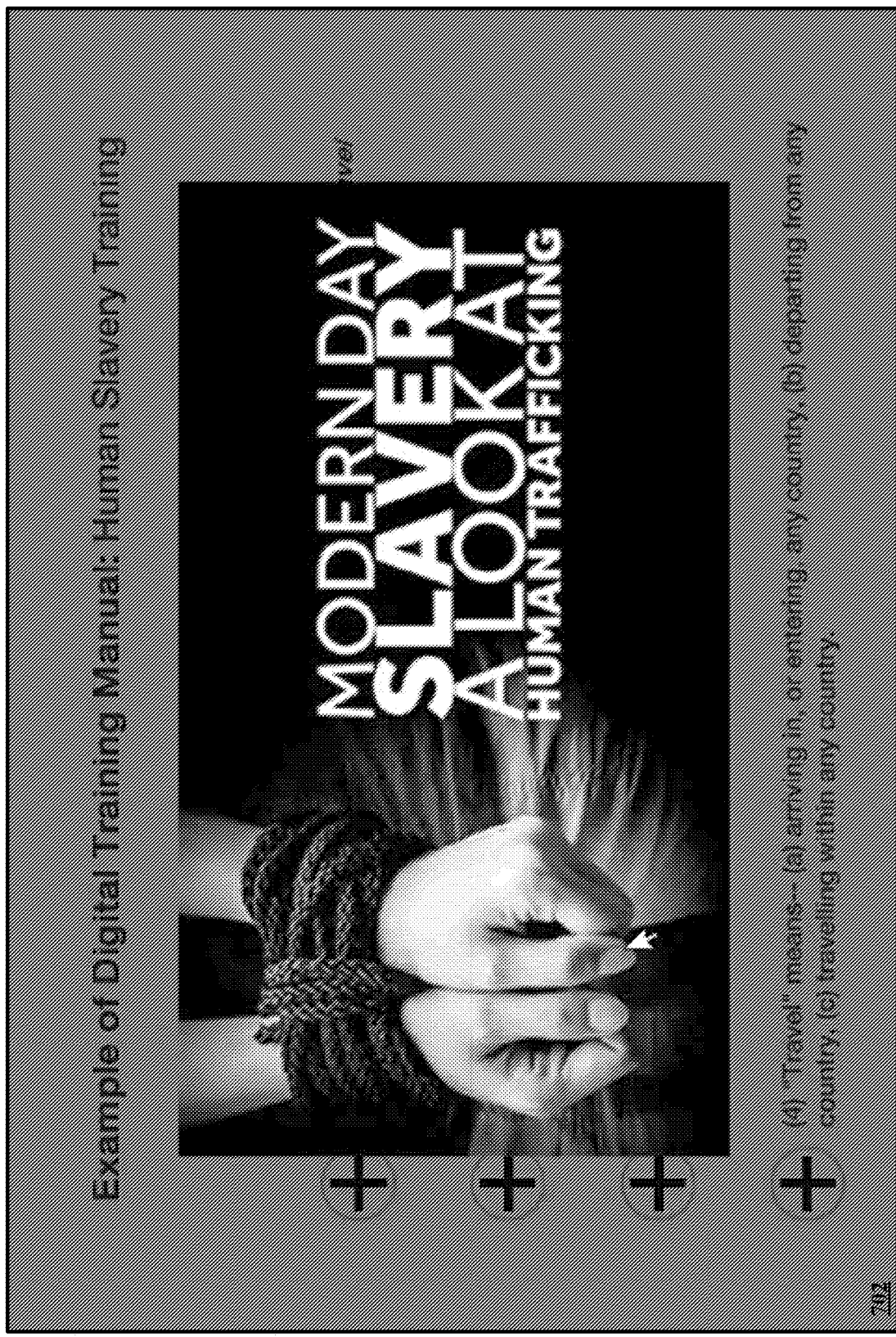

FIGS. 7A-AO depict a sequence of display screens evidencing interaction with a text documents concerning a process or project and interacting with hot or active fields within the document that have objects and/or attributes associated therewith and using motion to select, discrimination, and activate a particular object or attribute associate with a particular hot or active field.

DEFINITIONS USED IN THE DISCLOSURE

The term "at least one", "one or more", or "one or a plurality" means one or two or more. Additionally, these three terms are used interchangeably within this disclosure. For example, at least one device means one or more devices or one device and a plurality of devices.

The term "about" means that a value of a given quantity is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

The term "a" or "an" or "the" are both singular and plural and references to a singular item may be construed at applying to plural items depending on context.

The term "motion" and "movement" are often used interchangeably and mean motion or movement that is capable of being detected by a motion sensor within an active zone of the sensor, which produces inputs for processors to process. Thus, if the sensor is a forward viewing sensor and is capable of sensing motion within a forward extending conical active zone, then movement of anything within that active zone that meets certain threshold detection criteria, will result in a motion sensor output, where the output may include at least direction, velocity, and/or acceleration. The motion may be of the sensor itself, or any combination of sensors moving, motion within sensing zones, or any combination or numbers of these. Of course, the sensors do not need to have threshold detection criteria, but may simply generate output anytime motion or any kind is detected. The processing units can then determine whether the motion is an actionable motion or movement and a non-actionable motion or movement.

The term "motion inputs" mean outputs from motion sensing input devices based on motion or movement sensed with an active zone of devices received by a processor.

The term "gesture inputs" mean outputs from motion sensing input devices based on gestures (specific motion or movement patterns) sensed with an active zone of the devices received by a processor.

The term "hard select inputs" mean outputs from hard select input devices based on clicking, button pushing, tapping, touching, keying, or other hard selection protocols received by a processor The term "acoustic inputs" mean outputs from acoustic input devices based on sounds, spoken words, or other acoustic received by a processor The term "tactile inputs" means output from tactile input devices based on touch, pressure, pressure changes, tapping, or other tactile actions received by a processor.

The term "motion sensor" or "motion sensing component" means any sensor or component capable of sensing motion of any kind by anything with an active zone area or volume, regardless of whether the sensor's or component's primary function is motion sensing.

The term "real object" or "real-world object" means any real-world device or article that is capable of being controlled by a processing unit. Real objects include objects or articles that have real-world presence including physical, mechanical, electro-mechanical, magnetic, electro-magnetic, electrical, or electronic devices or any other real-world device that can be controlled by a processing unit.

The term "virtual object" means any construct generated in a virtual world or by a computer and displayed by a display device and that are capable of being controlled by a processing unit. Virtual objects include objects that have no real-world presence, but are still controllable by a processing unit. These objects include elements within a software system, product or program such as icons, list elements, menu elements, generated graphic objects, 2D and 3D graphic images or objects, generated real-world objects such as generated people, generated animals, generated devices, generated plants, generated landscapes and landscape objects, generate seascapes and seascape objects, generated skyscapes or skyscape objects, or any other generated real-world or imaginary objects.

The term "temporal objects" refers to any object that includes information that occurs in a progression regardless of whether the progression in time based or just processes directionally. Of course, the user may traverse the object in a forward or reverse direction so that the user may review what has been completed or may view what is being completed, or what is not yet completed.

The term "entity" means a human or an animal or robot or robotic system (autonomous or non-autonomous.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a real-world object under the control of a human or an animal or a robot and include such articles as pointers, sticks, or any other real-world object that can be directly or indirectly controlled by a human or animal or a robot.

The term "VR" means virtual reality—computer-simulated reality, replicates an environment that simulates a physical presence in places in the real world or an imagined world, allowing the user to interact in that world.

The term "AR" means augmented reality—mixture of real world images and/or objects and virtual images and objects—a live, direct or indirect view of a physical, real-world environment whose elements are augmented (or supplemented) by computer-generated sensory input such as sound, video, graphics or GPS data.

The term "MR" means mixed reality—sometimes referred to as hybrid reality merges real and virtual worlds to produce new environments and visualizations, where physical and digital objects co-exist and interact in real time.

The term "XR" means X Reality (XR or Cross Reality) consists of technology-mediated experiences that combine digital and/or biological realities. It also stands for any kind of virtual environment that may be coupled with the real-world environment. XR typically means extended reality, which describes environments including virtual content identified with points in the real world or a virtual, software, or an other environment or combination of these.

The terms VR, AR, MR, and XR are sometimes collectively referred to herein as computer-generated environments or short as "CG environments".

The terms "CG environment" means any combination of real and virtual objects, attributes, characteristics, properties, images, videos, content, and/or information displayed in an environment on a display device.

The term "time line" means any project, process, story, or other matter or form that involves a sequence of tasks, goals, targets, objectives, processes, routines, targets, events, etc. and/or combinations thereof to be accomplished in a specific order whether temporal or otherwise. These projects, processes, stories, or other matter or forms that occur in a specific sequence are generally referred to as a time line.

DETAILED DESCRIPTION OF THE DISCLOSURE

The inventors have constructed systems, apparatuses, and interfaces along with implementing methods utilizing hardware and software associated with the systems, apparatuses, and interfaces to construct virtual reality (VR), augmented reality (AR), mixed reality (MR), and/or cross reality (XR) environments designed to display, control, and manipulate temporal or sequential formatted information in the form of "selectable temporal/sequential objects". The systems, apparatuses, and interfaces and implementing methods are configured to select and traverse one or more temporal/sequential objects in a vessel, a vehicle, or other virtual movable member. The systems, apparatuses, and interfaces and implementing methods are also configures to display one or more selection objects and a time or sequence direction indicator. The systems, apparatuses, and interfaces and implementing methods use motion, gesture, acoustic, tactile, and/or hard select inputs to interact with the objects. The terms sequential objects and temporal objects are sometimes used interchangeably to refer to objects that include tasks that are temporal, i.e., occur along a time line, or sequential, i.e., occur along a sequence line.

In certain embodiments, the temporal/sequential objects are presented by orbs or other CG constructs. The orbs or other CG constructs may represent executable tasks or tasks to be accomplished or completed or content that may be interacted with, changed, augmented, modified, and/or manipulated. In other embodiments, the inventors use motion sensed using a headset (head tracking and/or eye tracking) so for example when a user looks up, it may trigger the sky to go to night mode in which stars appear evidencing a temporal tasks or sequential tasks or content. The selection and/or interaction processes may be indicated by a change in star attributes (brighten, identifiers, etc.). The stars may represent companies, clients, investors, etc. that are associated with the temporal/sequential objects. The systems, apparatuses, and interfaces may use light rays to represent relationships between tasks or content. The traversal through one or more temporal/sequential objects may be represented as a journey. The journey through a temporal object may be envisioned as navigating a ship along a navigable water way or a space ship through a navigable space way. The time line or sequence may be represented by a reflection off the water viewed looking towards a horizon, which corresponds to a path the ship is taking. A temporal/sequence direction object such as an hour glass may be displayed to provide a user the ability to stop or to move backward and forward along a time line of a temporal or time-based object or along a sequence of a sequential-based object. A sail may represent a particular identified object such as a corporation such as the XYZ Corp. The time line or sequence may then represent a process to help startups (e.g., a ship named "Big Idea") through the journey of taking an idea through the stages of startup and ultimately to successful implementation. For example, the journey may include collecting assets, displaying the assets, displaying potential investors and inventor interests, displaying potential customers and customer interests, displaying educational content, and displaying tasks required to build or implement a successful startup strategy.

The present systems, apparatuses, and interfaces and implementing methods represent an effective process for conveying temporal or sequential objects or projects in a storing telling format designed to improve comprehension and visualization of the objects or projects. The present systems, apparatuses, and interfaces and implementing methods utilize many known applications implemented in a new manner and fashion within a unique CG environment. The systems, apparatuses, and interfaces and implementing methods maybe utilize inputs from one or more input devices including motion/movement inputs, hard select inputs, acoustic inputs, tactile inputs, and/or gesture inputs in CG 2D, 3D, and/or 4D environments. The present systems, apparatuses, and interfaces and implementing methods may be implements as a training platform or digital learning platform.

For example, the systems, apparatuses, and interfaces may be a tablet computer including a standard operating procedure (SOP) or set of operational laws, rules, elements, etc. The systems, apparatuses, and interfaces may display the SOP, laws, rules, elements, etc. in sentence format on a display device. In this configuration, each word of the sentence is a selectable object that may include associated selectable objects, items, or content. When a particular word is selected and/or activated using any of the input formats described herein, the systems, apparatuses, and interfaces causes the associated selectable items, objects, attributes, characteristics, or information content to pop out around the selected word, to be displayed around the selected word, and/or to be displayed in a special viewing area. These associated items, objects, attributes, characteristics, and/or content may be definitions, related videos, test questions, measures, CG constructs describing the word, experiences, images, and/or any other type of related information, experience and/or associated attributes or characteristics. Word selection and selection of associated items, objects, attributes, characteristics, and/or content may be chosen using in input format set forth herein. The selection process may also involve selection prediction based on learned user behavior relating to motion or movement associated with invoking an of the input formats. In certain embodiments, the systems, apparatuses, and interfaces use predictions based on past user behavior to predict word and associated items, objects, attributes, characteristics, and/or content selection. In certain embodiments, the systems, apparatuses, and interfaces the user to immediately go to a particular associated choice by moving to or towards a particular choice, then moving to or towards a particular associated choice, which selects and performs an action associated with the choice. For example, as the user moves towards a word, the systems, apparatuses, and interfaces may cause the display device(s) to begin to display the associated choices, wherein the choices become selectable as the word selection becomes more certain. For example, if the motion contacts the word, contacts an active area surrounding the word, or is predicted to a degree of certainty based on the motion, then the selection is certain, save in implementation requiring a confirmation from a second input device. In other embodiments, the motion intersects a particular word or the motion direction would intersect a particular word or the motion direction predicts a particular word to a desired degree of certainty. In other embodiment, the systems, apparatuses, and interfaces are configured as motion proceeds, but before a particular word has been selected, to display all associated items, objects, attributes, characteristics, and/or content about all aligned or substantially aligned words. In other embodiments, as the word selection becomes more definite, then the associated items, objects, attributes, characteristics, and/or content of the other words fade. Additionally, the other words may fade. Once a word selection has been made, the moving towards or using another input format, selects and activates one of the associated items, objects, attributes, characteristics, and/or content. For example, if the associated items, objects, attributes, characteristics, and/or content is a "VR Experience", then the systems, apparatuses or interfaces cause the VR experience to be selected and simultaneously activated allowing the user to immediately go to a VR experience associated with that word. If the selectable choice is a document, a video, audio file, song, or an image, then the input would simultaneously select and open the document, image, audio file, song, or video for view and/or further interaction. If a video, this choice may also provide associated video control attributes such as seek, forward, reverse, pause, play, volume, audio format, video format, etc. In certain embodiments, the systems, apparatuses, and interfaces may open the video with preset values of controllable video attributes or the user may on the file control the video attributes before or during video activation. There may also be associated menus with the totality of each sentence, phrase, or section, and even the whole document or experience. This same type of interaction may be used in all CG environments described herein. For instance, all the aforementioned menu elements and interactions may occur inside a CG environment, where interacting with head movement, eye movement, eye gaze, other body parts movements, audible commands, any other human or animal cognizable input/output or combinations thereof that may open the associated menus, including going back to the first touch system, at the related points. The sentences, phrases or sections may also include points or nodes for traversing through the sentences. All these points, nodes, associated information, etc., are matched together, and this network of related information may show relationships between words or associated features of the words via chords, rays, or other graphic (and/or audible or haptic) representations, including flashing, pulsing, landing marker-type effects, etc. These relationships may show singly or in multiple occurrences at once. These relationships are designed to assist a user in understanding or visualizing relationships between all of the words, data, processes and attributes and provide the ability to get anywhere from any point. This is a novel many-to-many relationship for a digital learning and training system.

The present systems, apparatuses, and interfaces and the implementing methods also include nausea negating features in CG environments. The nausea negating features may comprise a light pattern in periphery of the display that remains steady with the horizon, being a white glow or matrix or array of whitish dots that move as the head or eyes or other body part moves. In a CG environment or CG experience (such as virtual roller coaster ride), the head may remain stable, but the viewers perspective moves with an angle of the car on the coaster rails in the virtual ride. This experience may create the user to become nauseate, because the physical head is not moving with the virtual perspective. To compensate, the present systems, apparatuses, and interfaces and implementing methods display one or more markers such as glowing markers, "glows", or an intense spots, which may be white or colored, at an outer periphery of the CG environment that remain constant with a virtual horizon. If the user moves his/her head at an angle, the markers remain at the horizon and adjust according to both the scene and head motion so that the markers stay level with the horizon. The markers may pulse as well. The inventors believe that the markers will trigger the middle brain through peripheral vision to intuitively trigger the brain to accept a secondary input separate from the frontal lobe, which is being triggered by the cones and front-looking aspects of vision. This combination causes the brain to process the information differently, and reduces the nausea effect.

The nausea effect has already been shown to be a side effect associated with continuous movement within a tessellated locomotion CG environment.

In certain embodiments, the systems, apparatuses, and interfaces and implementing methods are also configured to indirectly or directly provide interactions with a VR or CG cloud. In VR or CG clouds, every point in environment or space may be a location having associated with information and/or content such as personal data and informational nodes connected to each geophysical location, etc. In a full VR experience, the same thing happens, except that some or all of the locations are not associated real-world locations. Thus, the systems, apparatuses, and interfaces and implementing methods may be configured to interact with environments including one or more points within the environment that has content, information, objects, and/or attributes associated therewith. The systems, apparatuses, and interfaces and implementing methods may be configured to indicated "active points" and as the active points are selected via the methods set forth herein, the content, information, objects, and/or attributes associated therewith are displayed so that the systems, apparatuses, and interfaces and implementing methods may select and/or active the associated content, information, objects, and/or attributes.

In certain embodiments, the systems, apparatuses, and interfaces and implementing methods are also configured to display one or more levels of subobjects, sublists, submenus, and/or any other level associated content as each object, list, menu, or any other item is approached. As motion continues, the systems, apparatuses, and interfaces and implementing methods are also configured to scroll through these subobjects, sublists, submenus, etc. based on an initial or first motion and based the initial motion and further motion to select and activate subobjects, sublists, submenus, and/or any other level associated content as set forth herein.

In certain embodiments, the systems, apparatuses, and interfaces and implementing methods are also configured to utilize input from any human and/or animal cognizable input device to interact with CG environments in accord with the methodology set forth herein. The systems, apparatuses, and interfaces and implementing methods are also configured to use the inputs to initial displaying of GC environments, scrolling through objects, lists, items, and/or menus. The systems, apparatuses, and interfaces and implementing methods are also configured to use the inputs to select and activate particular objects, items, sublists, submenus, subobjects, etc. The systems, apparatuses, and interfaces and implementing methods are also configured to display any level of content in menu or list based systems. Thus, if the systems, apparatuses, and interfaces and implementing methods are being used to navigate through levels of lists or menu, then the systems, apparatuses, and interfaces and implementing methods may be configures to show any level of the list or menu system for ready scrolling and/or selecting and activating any object or item at any displayed level. Additionally, the systems, apparatuses, and interfaces and implementing methods may be configured to display sublevels associated with a particular level.

Embodiments of this disclosure, broadly relate to apparatuses comprising a processor and an interface including a first input device and a display device. The interface is configured to receive, from the first input device, outputs. The processor is configured to in response to a first output from the first input device having at least one property exceeding at least one threshold criterion (a) display, on the display device, one or more selectable temporal and/or sequence objects, each of the selectable temporal objects including one or more selectable associated objects and/or attributes distributed along a time line and each of the selectable sequence objects including one or more selectable associated objects and/or attributes distributed along a sequence, (b) select a particular object aligned with a direction of the first output, and (c) display, on the display device, a computer generated (CG) environment associated with the particular temporal/sequence object, wherein the CG environment comprises a scene or scape, a vehicle, a selection object or an avatar, directional control object, a path, anti-nausea objects, and a plurality of selectable object distributed along the path, wherein the selectable objects may have one or more subobjects associated therewith or the selectable objects form a navigate tree structure. The processor is further configured to in response to a further input from the first input device corresponding to movement of the selectable object, the processor is further configured to (a) activate the directional control object, (b) rotate the directional control object forward to propel the vehicle forward through the scene along the path or backward through the scene along the path, (c) select a selectable object when the selectable object comes into the vehicle due to the vehicle progresses along the path to the selectable object and display subobjects associated with selectable object about the selectable object, or (d) select and activate a subobject. In certain embodiments, the input device comprises an eye or head tracking sensor, gloves, a body sensor, a controller, a camera, a body position sensor, an optical sensor, a motion sensor, or a combination thereof. In other embodiments, the interface is further configured to receive, from a second input device, a second input; and the processor is further configured to prior to selecting the particular object and in response to the second input, confirm the selection of the particular object. In other embodiments, the interface is further configured to receive, from the first input device, further input; and the processor is further configured to activate the directional control object, rotate the directional control object forward to propel the vehicle forward through the scene along the path or backward through the scene along the path, select a selectable object when the selectable object comes into the vehicle due to the vehicle progresses along the path to the selectable object and display subobjects associated with selectable object about the selectable object, or select and activate a subobject until the vehicle progresses to the end of the path.

Embodiments of this disclosure, broadly relate to mobile apparatuses comprising a processor and an interface including a first input device and a display device. The interface is configured to receive, from the first input device, outputs. The processor configured to in response to a first output from the first input device having at least one property exceeding at least one threshold criterion (a) display, on the display device, one or more selectable temporal and/or sequence objects, each of the selectable temporal objects including one or more selectable associated objects and/or attributes distributed along a time line and each of the selectable sequence objects including one or more selectable associated objects and/or attributes distributed along a sequence, (b) select a particular object aligned with a direction of the first output, and (c) display, on the display device, a computer generated (CG) environment associated with the particular temporal/sequence object, wherein the CG environment comprises a scene or scape, a vehicle, a selection object or an avatar, directional control object, a path, anti-nausea objects, and a plurality of selectable object distributed along the path, wherein the selectable objects may have one or more subobjects associated therewith or the selectable objects form a navigate tree structure. The processor further configured to in response to a further input from the first input device corresponding to movement of the selectable object, the processor is further configured to (a) activate the directional control object, (b) rotate the directional control object forward to propel the vehicle forward through the scene along the path or backward through the scene along the path, (c) select a selectable object when the selectable object comes into the vehicle due to the vehicle progresses along the path to the selectable object and display subobjects associated with selectable object about the selectable object, or (d) select and activate a subobject. In certain embodiments, the input device comprises an eye or head tracking sensor, gloves, a body sensor, a controller, a camera, a body position sensor, an optical sensor, a motion sensor, or a combination thereof. In other embodiments, the interface is further configured to receive, from a second input device, a second input; and the processor is further configured to prior to selecting the particular object and in response to the second input, confirm the selection of the particular object. In other embodiments, the interface is further configured to receive, from the first input device, further input; and the processor is further configured to (a) activate the directional control object, (b) rotate the directional control object forward to propel the vehicle forward through the scene along the path or backward through the scene along the path, (c) select a selectable object when the selectable object comes into the vehicle due to the vehicle progresses along the path to the selectable object and display subobjects associated with selectable object about the selectable object, or (d) select and activate a subobject until the vehicle progresses to the end of the path.

Embodiments of this disclosure, broadly relate to methods implemented on an apparatus comprising a processor and an interface including a first input device and a display device. The methods comprising receiving, from a first input device, a first input from an interface including the first input device and a display device, wherein the first input has at least one property exceeding at least one threshold criterion; displaying, on the display device, one or more selectable temporal and/or sequence objects, each of the selectable temporal objects including one or more selectable associated objects and/or attributes distributed along a time line and each of the selectable sequence objects including one or more selectable associated objects and/or attributes distributed along a sequence; selecting a particular object aligned with a direction of the first output; displaying, on the display device, a computer generated (CG) environment associated with the particular temporal/sequence object, wherein the CG environment comprises a scene or scape, a vehicle, a selection object or an avatar, directional control object, a path, anti-nausea objects, and a plurality of selectable object distributed along the path, wherein the selectable objects may have one or more subobjects associated therewith or the selectable objects form a navigate tree structure; and in response to a further input from the first input device corresponding to movement of the selectable object: activating, via the processor, the directional control object, rotating the directional control object forward to propel the vehicle forward through the scene along the path or backward through the scene along the path, selecting a selectable object when the selectable object comes into the vehicle due to the vehicle progresses along the path to the selectable object and display subobjects associated with selectable object about the selectable object, or selecting and activing a subobject. In certain embodiments, the input device comprises an eye or head tracking sensor, gloves, a body sensor, a controller, a camera, a body position sensor, an optical sensor, a motion sensor, or a combination thereof. In other embodiments, receiving, from a second input device, a second input; and prior to selecting the particular object and in response to the second input, confirming the selection of the particular object. In other embodiments, receiving, from the first input device, further input; and activating, via the processor, the directional control object, rotating the directional control object forward to propel the vehicle forward through the scene along the path or backward through the scene along the path, selecting a selectable object when the selectable object comes into the vehicle due to the vehicle progresses along the path to the selectable object and display subobjects associated with selectable object about the selectable object, or selecting and activating a subobject, until the vehicle progresses to the end of the path.

SUITABLE COMPONENTS FOR USE IN THE DISCLOSURE

The motion sensing devices or motion sensors may also be used in conjunction with displays, keyboards, touch pads, touchless pads, sensors of any type, pens, pencils, remotes, or other devices associated with a computer, a notebook computer or a drawing tablet or any mobile or stationary device. The motion sensors may be optical sensors, acoustic sensors, thermal sensors, optoacoustic sensors, any other sensor or combination of sensors that senses movement or changes in movement, or mixtures or combinations thereof. The sensors may be digital, analog or a combination of digital and analog. For camera systems, the systems may sense motion within a zone, area or volume in front of the lens. Optical sensors may operate in any region of the electromagnetic spectrum including, without limitation, RF, microwave, near IR, IR, far IR, visible, UV or mixtures or combinations thereof. Acoustic sensor may operate over the entire sonic range which includes the human audio range, animal audio ranges, or combinations thereof. EMF sensors may be used and operate in any region of a discernable wavelength or magnitude where motion can be discerned. Moreover, LCD screen(s) may be incorporated to identify which devices are chosen or the temperature setting, etc.

Moreover, the interface may project a virtual control surface and sense motion within the projected image and invoke actions based on the sensed motion. The motion sensor associated with the interfaces of this disclosure can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors.

Suitable electrical devices, hardware devices and/or appliances capable of being controlled by the control systems and/or switches of this disclosure, include, without limitation, any electrical and/or hardware device or appliance having attributes which can be controlled by a switch, a joy stick or similar type controller, or software program(s) and/or object(s) and/or elements, objects and attributes, and/or attributes. Exemplary examples of such attributes include, without limitation, ON, OFF, intensity and/or amplitude, impedance, capacitance, inductance, software attributes, lists or submenus of software programs or objects, virtual and/or real objects in a display, mobile device or gaming system, or any other controllable electrical and/or electro-mechanical function and/or attribute of the device. Exemplary examples of electrical devices and/or appliances include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, energy management systems, medical devices, robots, robotic control systems, UAV, equipment and machinery control systems, hot and cold water supply devices, air conditioning system, heating systems, ventilation systems, air handling systems, security systems, computers and computer systems, chemical plant control systems, manufacturing plant control systems, satellite control systems, computer operating systems and other software systems, objects or programs, remote control systems, or the like or mixtures or combinations thereof.

Suitable systems that are amenable to control by the interface of this disclosure include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, Kiosks and educational or informational systems, databases, software programs and applications, interne browsers, accounting systems, inventory systems, inventory display systems, military systems, control systems, VR systems, AR systems, MR systems, XR systems, or the like, or mixtures or combinations thereof.

Suitable digital processing units (DPUs) include, without limitation, any digital processing unit capable of accepting input from a singular or plurality of devices, touches, or objects and converting at least some of the input into output designed to select and/or control attributes of one or more of the devices or objects. Exemplary examples of such DPUs include, without limitation, microprocessor, microcontrollers, or the like manufactured by Intel, Motorola, Erricsson, HP, Samsung, Hitachi, NRC, Applied Materials, AMD, Cyrix, Sun Microsystem, Philips, National Semiconductor, Via Electonics, Qualcomm, or any other manufacture of microprocessors or microcontrollers.

Suitable analog processing units (APUs) include, without limitation, any analog processing unit capable of accepting input from a singular or a plurality of devices, touches, or objects and converting at least some of the input into output designed to control attributes of one or more of the devices or objects. Such analog devices are available from manufacturers such as Analog Devices Inc.

Suitable display devices include, without limitation, cathode ray tube display (CRT) devices, light-emitting diode display (LED) devices, electroluminescent display (ELD) devices, electronic paper (E Ink) devices, plasma display panel (PDP) devices, liquid crystal display (LCD) devices, organic light-emitting diode display (OLED) devices, projection devices, rear projection devices, holographic devices, other devices for displaying information in 2D, 3D, or 4D.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, any other device capable of sensing motion, changes in EMF, changes in wave form, or the like or arrays of such devices or mixtures or combinations thereof.

Suitable VR/AR/MR input devices include, without limitation, motion sensing devices, tracker devices such as head tracking devices, eye tracking devices, body tracking devices, body part tracking devices, etc. The tracker devices may be magnetic, optical, acoustic, mechanical, inertial, etc., data glove devices such as optical fiber gloves, mechanical gloves, resistance gloves, optical gloves, microphone devices, devices of aquisition of 3D models, 2 DOF devices, 3-6 DOF devices, kinetic devices such as Microsoft® Kinect®, image sensing devices, depth sensing devices, haptic devices, any other devices for supplying input to control objects in 2D, 3D, and/or 4D, and combinations thereof.

DETAILED DESCRIPTION OF THE DRAWINGS
OF THE DISCLOSURE

Selectable Temporal Object or Sequence Objects

Referring to FIGS. 1A-C, a sequence of display screens is displayed starting with a blank screen, then detecting an input above a threshold via an input device populating the screen with a plurality of time lines and selectable orbs associated with each time line and a selection object, and then activating the selection object based on the input or a further input to point a beam from the selection object to an specific time line orb selecting the orb.

Looking at FIG. 1A, a system, apparatus, or interface, generally 100, is shown to include a display area 102. The display area 102 is in a dormant state or a sleep state or an inactivate state. This state is changed only when the processing unit received output from a VR/AR/MR/VR input device, wherein the output exceeds at least one output threshold criteria.

Looking at FIG. 1B, once activated by an output from the input device exceeding the at least one threshold, the display area 102 becomes populated by a selection object 104 shown here as an elongated shape having distending horns and a central circular depression in a top from which a light beam emanates for selection, activation, control, manipulation, and augmentation of time lines, orbs or other object(s) in the VR/AR/MR/VR environment. The display area 102 include a plurality of time line selection orbs 106j-ah corresponding to time lines 108j-ag, where selection orbs 106a-i are outside of the display area 102 as is time line 108ah.

Looking at FIG. 1c, the processor has receive a signal from the input device causing the selection object 104 to rotate so that the center of the circular central depression of the selection object 104 points towards time line selection orb 106q once activated by an output from the input device exceeding the at least one threshold, the display area 108 becomes populated by a selection object 110 shown here as an elongated shape having distending horns and a central circular depression in a top from which a light beam emanates for selection, activation, control, manipulation, and augmentation of time lines, orbs, information, data, or other object(s) in the VR/AR/MR/VR environment. The display area 102 include a plurality of time line selection orbs 112j-ah corresponding to time lines 114j-ag, where selection orbs 106a-i are outside of the display area 102 as is time line 108ah. These may represent arrays or multiple of time lines or nodes of data/attributes, etc. It should be recognized that the selection object 104, shown here as an actual CG object may equally be part of an avatar of the user. Thus, the selection object 104 may be a figure of an avatar or a hand or eye or head so that the selection object 104 may be operate on head or eye movement, eye gazing, or hand or finger movement or movement of any other part of an avatar or other part of a CG construct.

Referring to FIGS. 2A-2DD, a sequence of display screens is displayed in the display area 102 evidencing traversal along the time line 106q in a water-based vehicle (sailboat) through a seascape 200, wherein outputs from the VR/AR/MR/VR input device is used by a processor to control a selection object and/or a time direction object and to select, activate, edit, manipulate, augment, alter, and/or modify tasks, goals, objectives, events, etc. associated with the time line, wherein the tasks, goals, events, etc. may have one or more attributes, subtasks, subgoals, subevents, etc. which may be selected, activated, edited, manipulated, augmented, altered, and/or modified. The selection protocol is visualized in a darkened sky via light beams radiating from the selection orb towards a star in the darkened sky, which then displays content associated with particular tasks, goals, events, etc., attributes, subtasks, subgoals, subevents, etc. or combination thereof.

FIG. 2A through FIG. 2AS illustrate the system traversing the time line 106q using the directional control object and selection object to control traversal through the time line 106q and manipulating and selecting a first event orb.

Figure 2B:
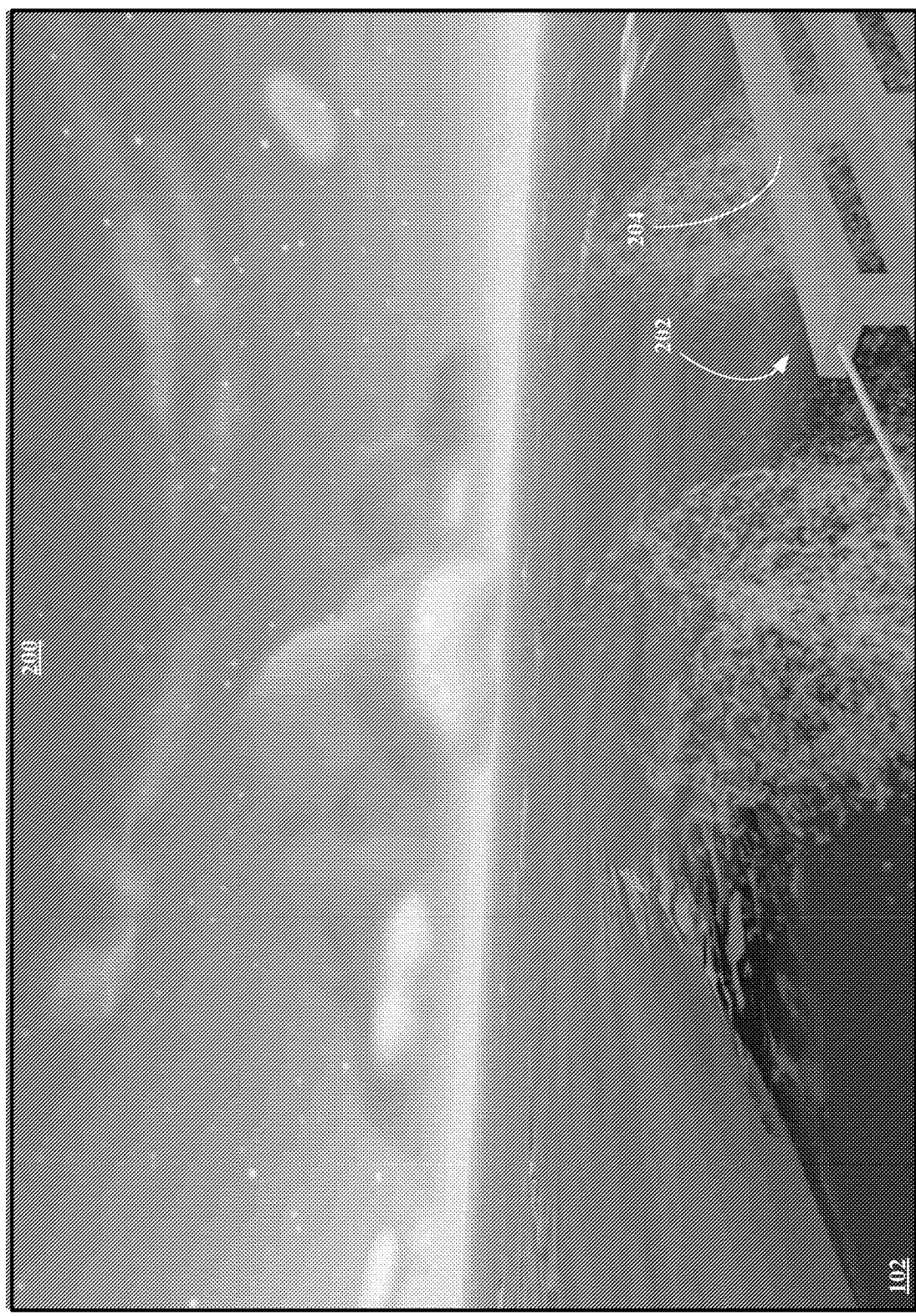

Looking at FIG. 2A, the system receives an output signal from the input device indicating that the user is looking out the port or left side out of the sailboat 202. Looking at FIG. 2B, the system receives further input from the input device indicating that the user's gaze is moving toward the starboard bringing a rail 204 of the sailboat 202 into view. Looking at FIG. 2C, the system receives further input from the input device indicating that the user's gaze is still moving toward the starboard bringing a deck 206 and well as the rail 204 of the sailboat 202 into view. Looking at FIG. 2D, the system receives further input from the input device indicating that the user's gaze is still moving toward the starboard bringing a bow 208 as well as the rail 204 and the deck 206 of the sailboat 202 and a temporal (sequence) direction/control object (may be an hourglass, captain's wheel, joystick, etc.) 210 into view. Looking at FIG. 2E, toward the starboard bringing a sail 212 as well as the rail 204 of the sailboat 202 into view. Looking at FIG. 2F, the system receives further input from the input device indicating that the user's gaze is moving up towards the sail 212 bringing a mast 214 of the sailboat 202 into view as well as a field called Logo and another field called Company Name on the sail 212 evidencing that the particular time line 106q is a company and the time line 106q is associated with the company's progress and processes into the future. Looking at FIG. 2G, the system receives further input from the input device indicating that the user's gaze is moving down from the sail 212 bringing the bow 208, the rail 204, and deck 206 as well as the mast 214 into view. Looking at FIG. 2H, the system receives further input from the input device indicating that the user's gaze is moving towards port still showing the sail 212, the deck 206, the rail 204, the mast 214, and the bow 208 and bringing an active deck portion 216. Looking at FIG. 2I, the system receives further input from the input device indicating that the user's gaze is moving still towards the port still showing the deck 206 and the rail 204 and bringing the temporal/sequence direction/control object 210 into view. Looking at FIG. 2J, the system receives further input from the input device indicating that the user's gaze is moving down towards the temporal/sequence direction/control object 210 still showing the deck 206, the deck portion 216, and the rail 204 and bringing the bow 208 into view. The temporal/sequence direction/control object 210 is shown situated in a horizontal orientation. Looking at FIG. 2K, the system receives further input from the input device indicating that the user's gaze is focused on the temporal/sequence direction/control object 210 still showing the deck 206, the deck portion 216, the rail 204 and the bow 208 and brining a selection/control object 218 into view. Looking at FIG. 2L, the system receives further input from the input device indicating that the user's gaze is still focused on the temporal/sequence direction/control object 210 still showing the deck 206, the deck portion 216, the rail 204 and the bow 208 and brining the selection object 218 closer to temporal/sequence direction/control object 210. Looking at FIG. 2M, the system receives further input from the input device indicating that the user's gaze is still focused on the temporal/sequence direction/control object 210 still showing the deck 206, the deck portion 216, the rail 204 and the bow 208 and brining the selection object 218 closer to the temporal/sequence direction/control object 210. Looking at FIG. 2N, the system receives further input from the input device indicating that the user's gaze is still focused on the temporal/sequence direction/control object 210 still showing the deck 206, the deck portion 216, the rail 204 and the bow 208 and brining the selection object 218 into contact with (or close proximity to) the temporal/sequence direction/control object 210 causing the selection object 218 to become active. Looking at FIG. 2O, the system receives further input from the input device indicating that the user's is using the active selection object 218 to control the temporal/sequence direction/control object 210. Looking at FIG. 2P, the system receives further input from the input device indicating that the user's using the active selection object 218 to rotate the temporal/sequence direction/control object 210 towards a vertical orientation (moving in a direction) also showing a direction indicator 220. Looking at FIG. 2Q, the system receives further input from the input device indicating that the user's using the active selection object 218 to rotate the temporal/sequence direction/control object 210 more towards the vertical orientation also showing the direction indicator 220. As the temporal/sequence direction/control object 210 rotates towards the vertical orientation, the sailboat 202 move forward at an ever increasing speed until the temporal/sequence direction/control object 210 is vertically oriented at which point the speed becomes constant. Looking at FIG. 2R, the system receives further input from the input device indicating that the user's using the active selection object 218 to rotate the temporal/sequence direction/control object 210 more towards the vertical orientation also showing the direction indicator 220 and increasing the speed of forward progress shown as a path 222. Looking at FIG. 2S, the system receives further input from the input device indicating that the user's using the active selection object 218 to rotate the temporal/sequence direction/control object 210 more towards the vertical orientation also showing the direction indicator 220 and increasing the speed of forward progress shown as the path 222. Looking at FIG. 2T, the system receives further input from the input device indicating that the user's using the active selection object 218 to rotate the temporal/sequence direction/control object 210 to the vertical orientation also showing the direction indicator 220 and now moving at constant speed forward along the path 222.

Figure 2C:
Figure 2D:
Figure 2E:
Figure 2F:
Figure 2G:
Figure 2H:
Figure 2I:
Figure 2J:
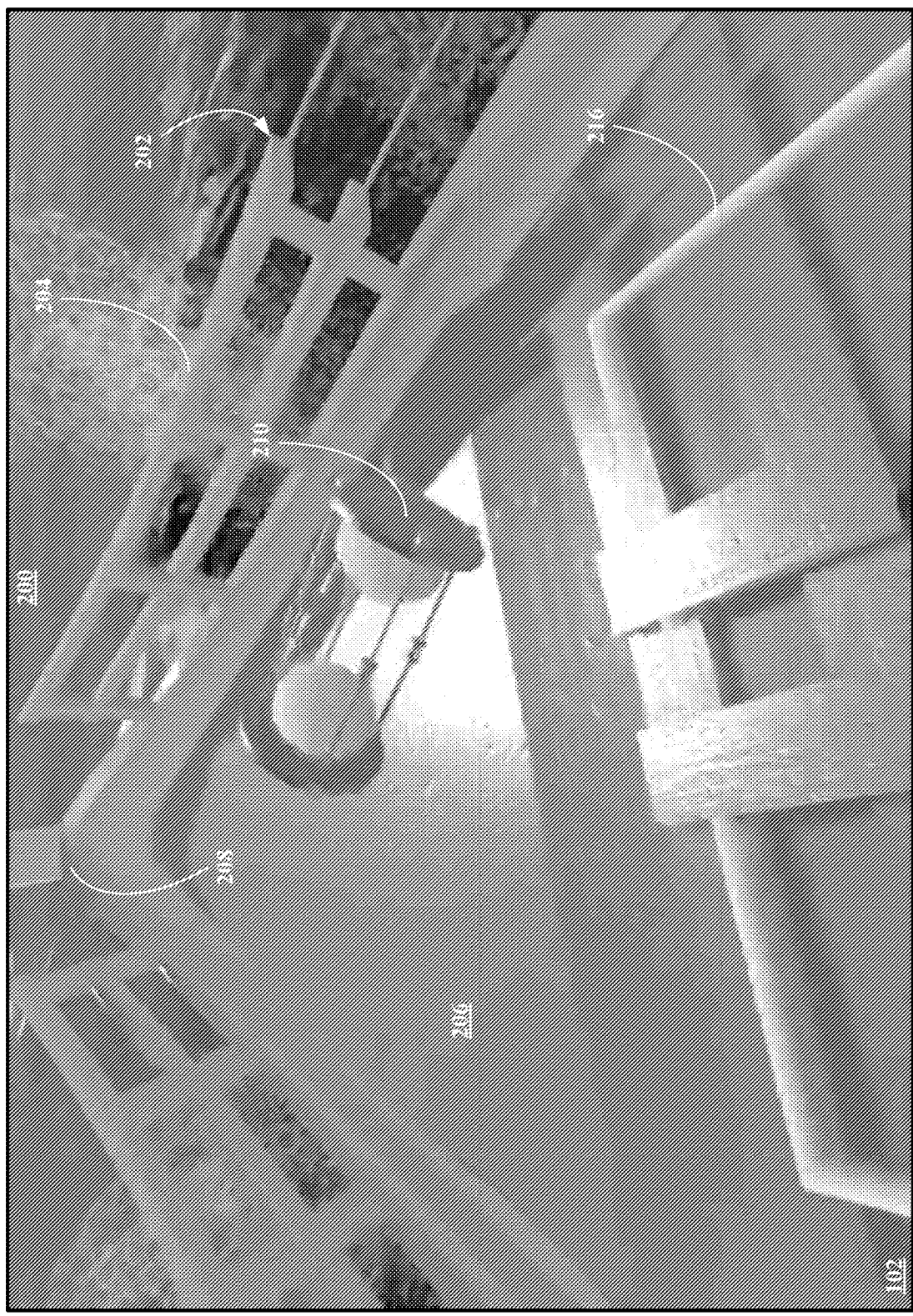
Figure 2K:
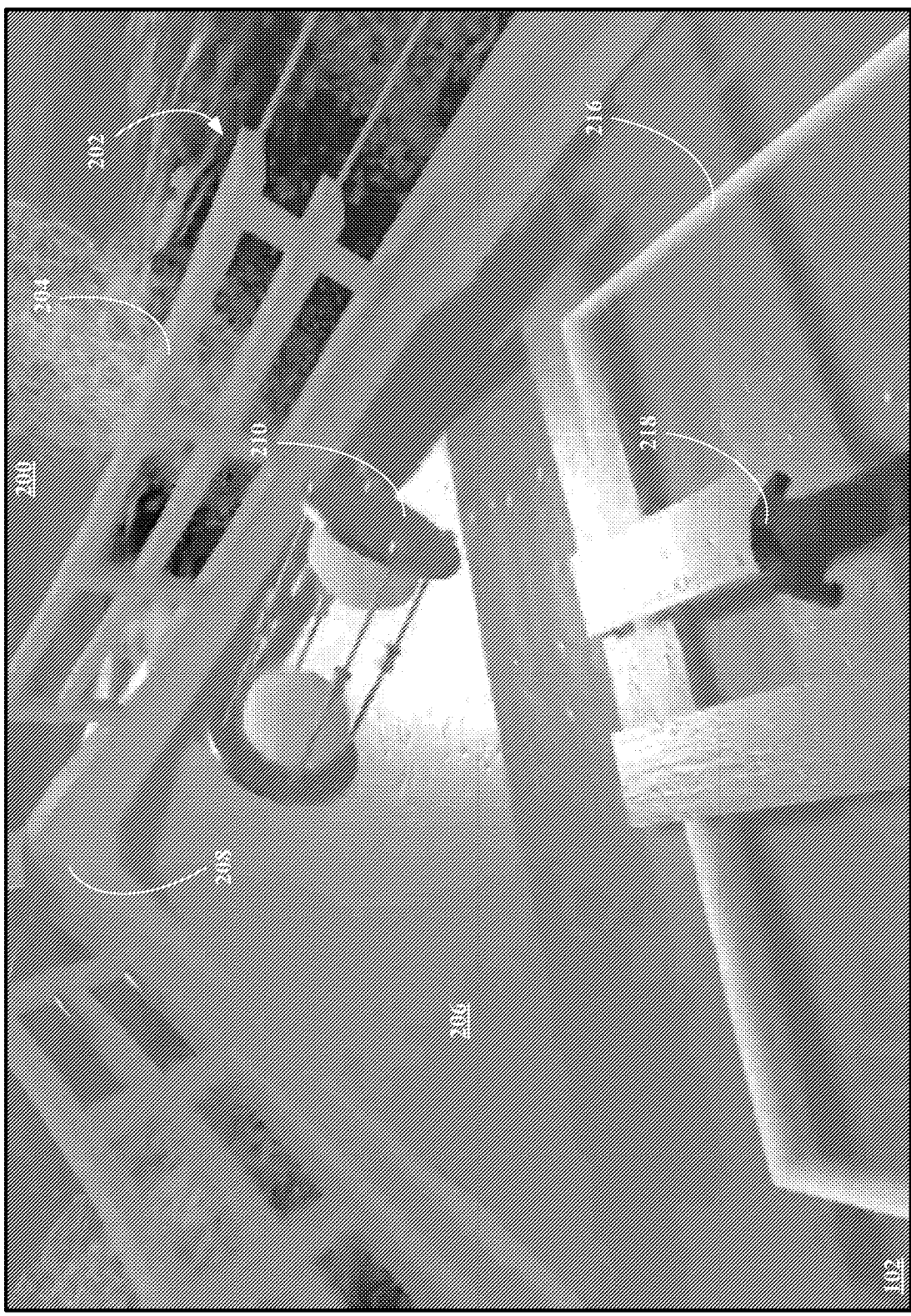
Figure 2L:
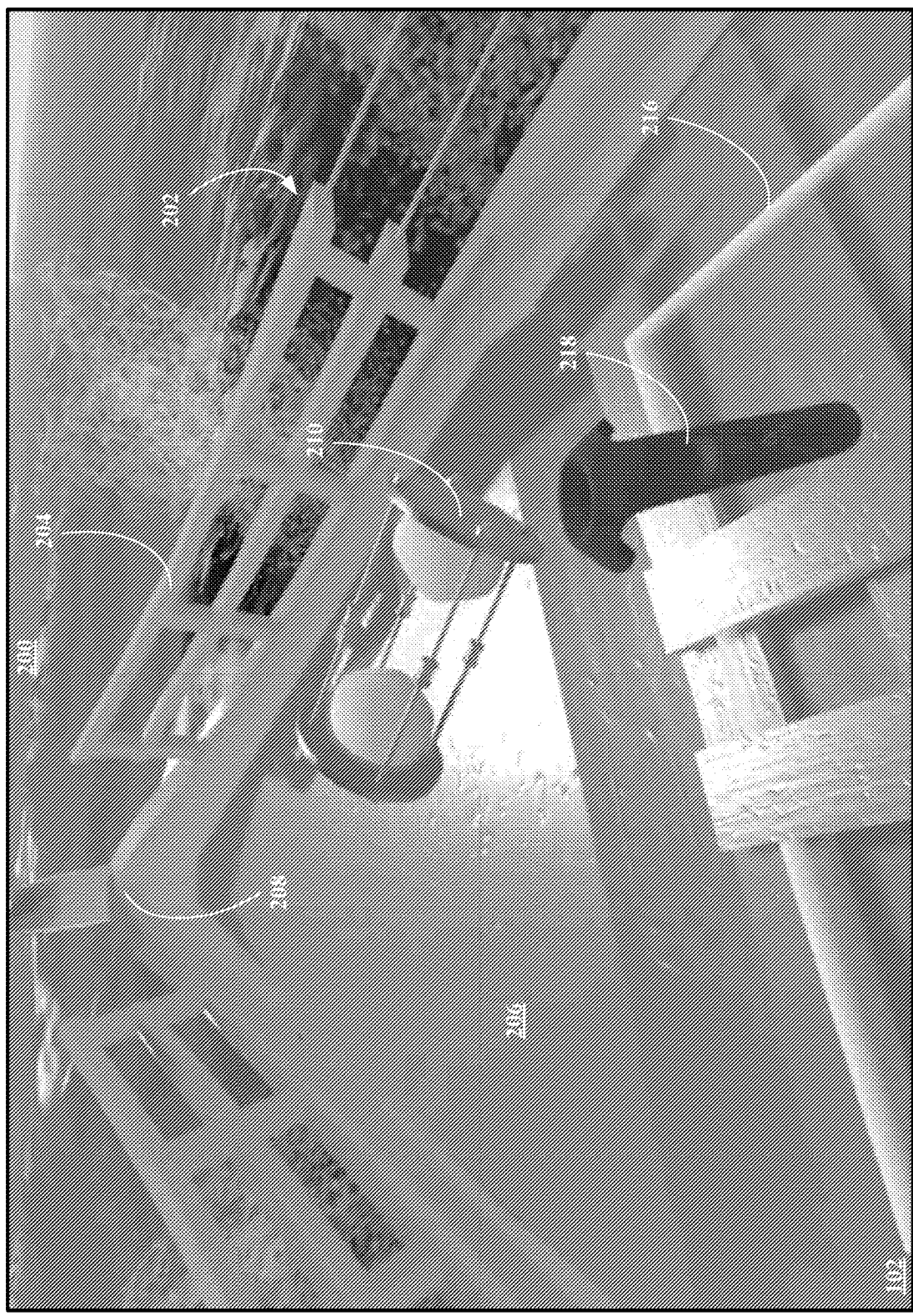
Figure 2M:
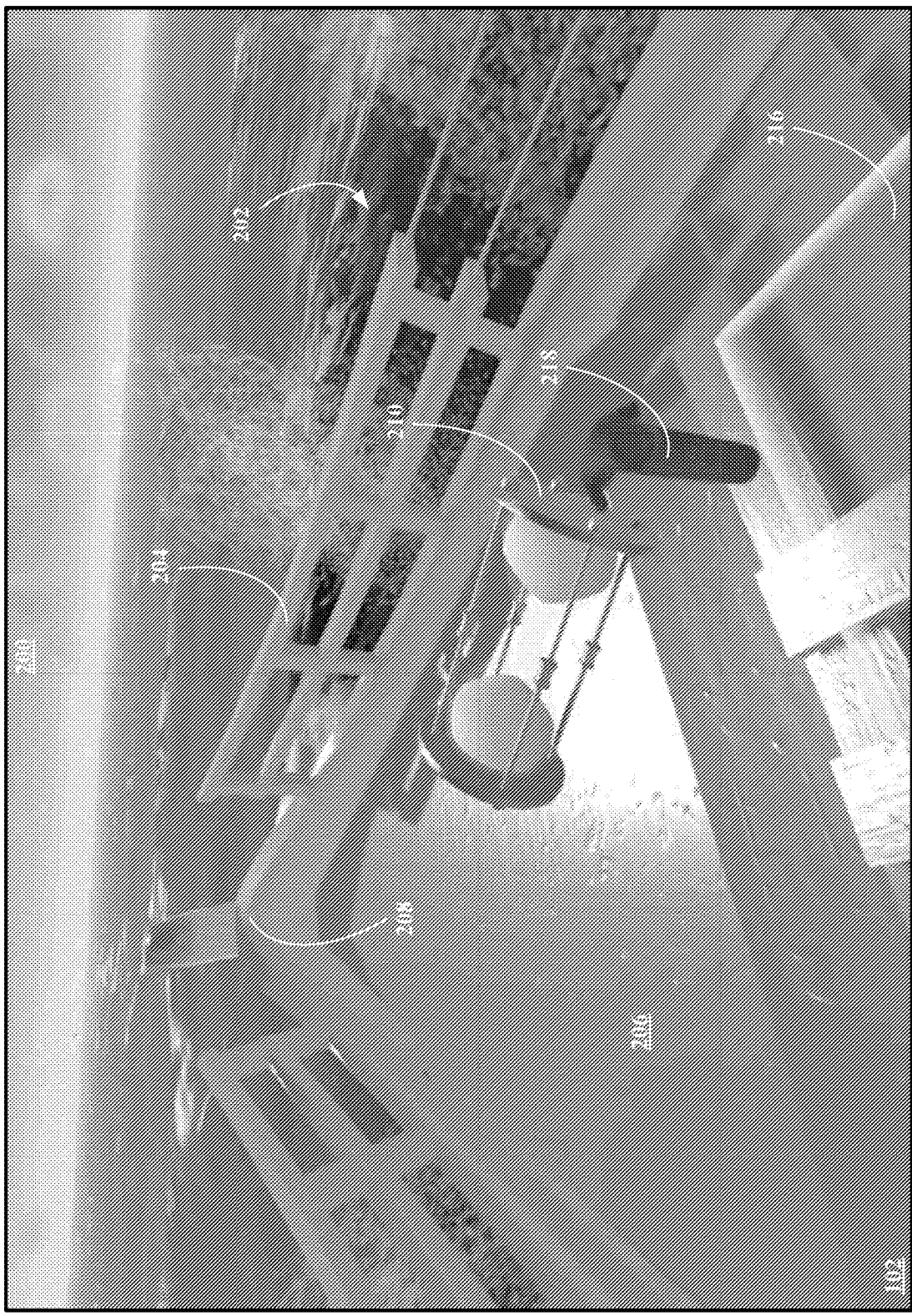
Figure 2N:
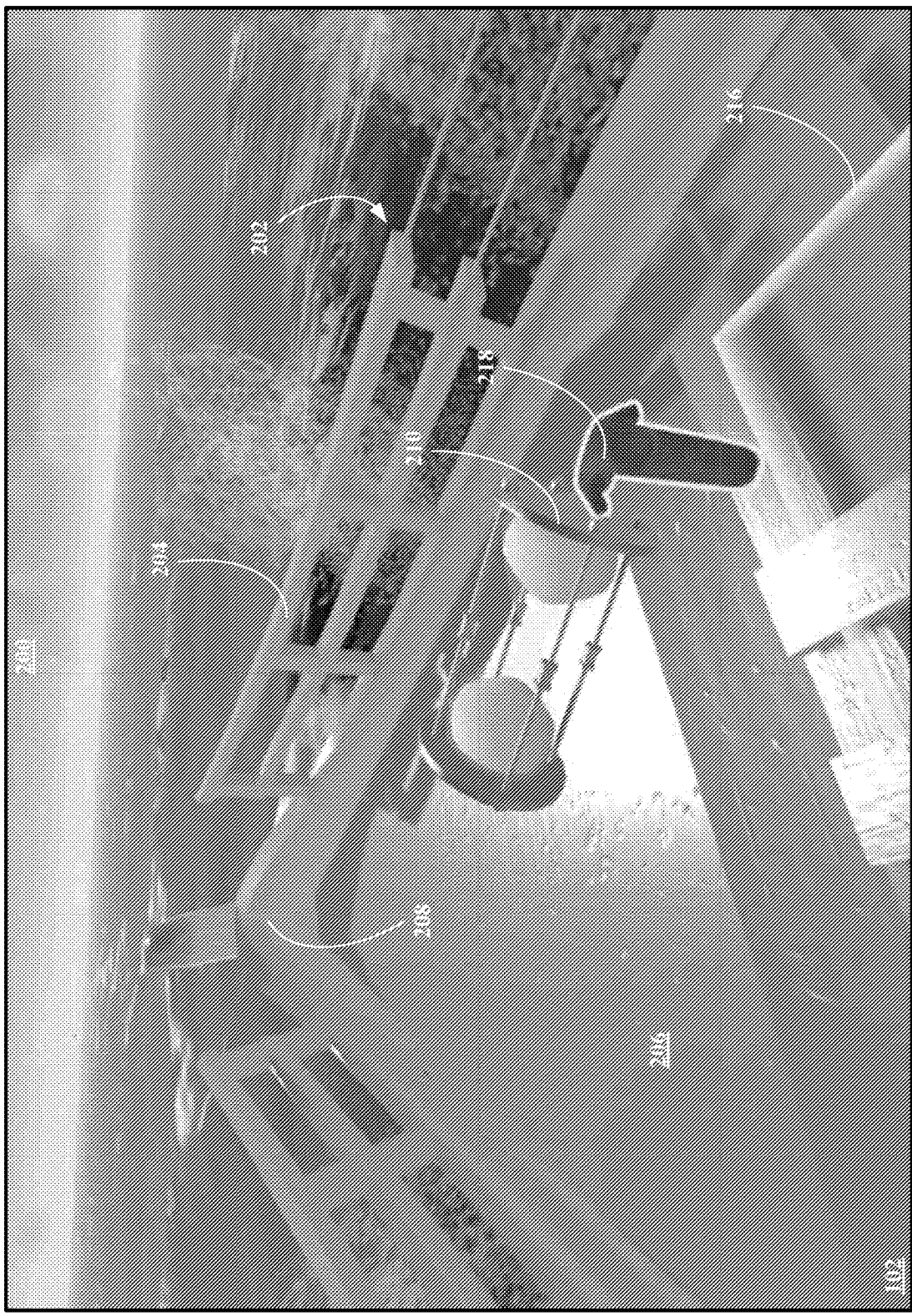
Figure 2O:
Figure 2P:
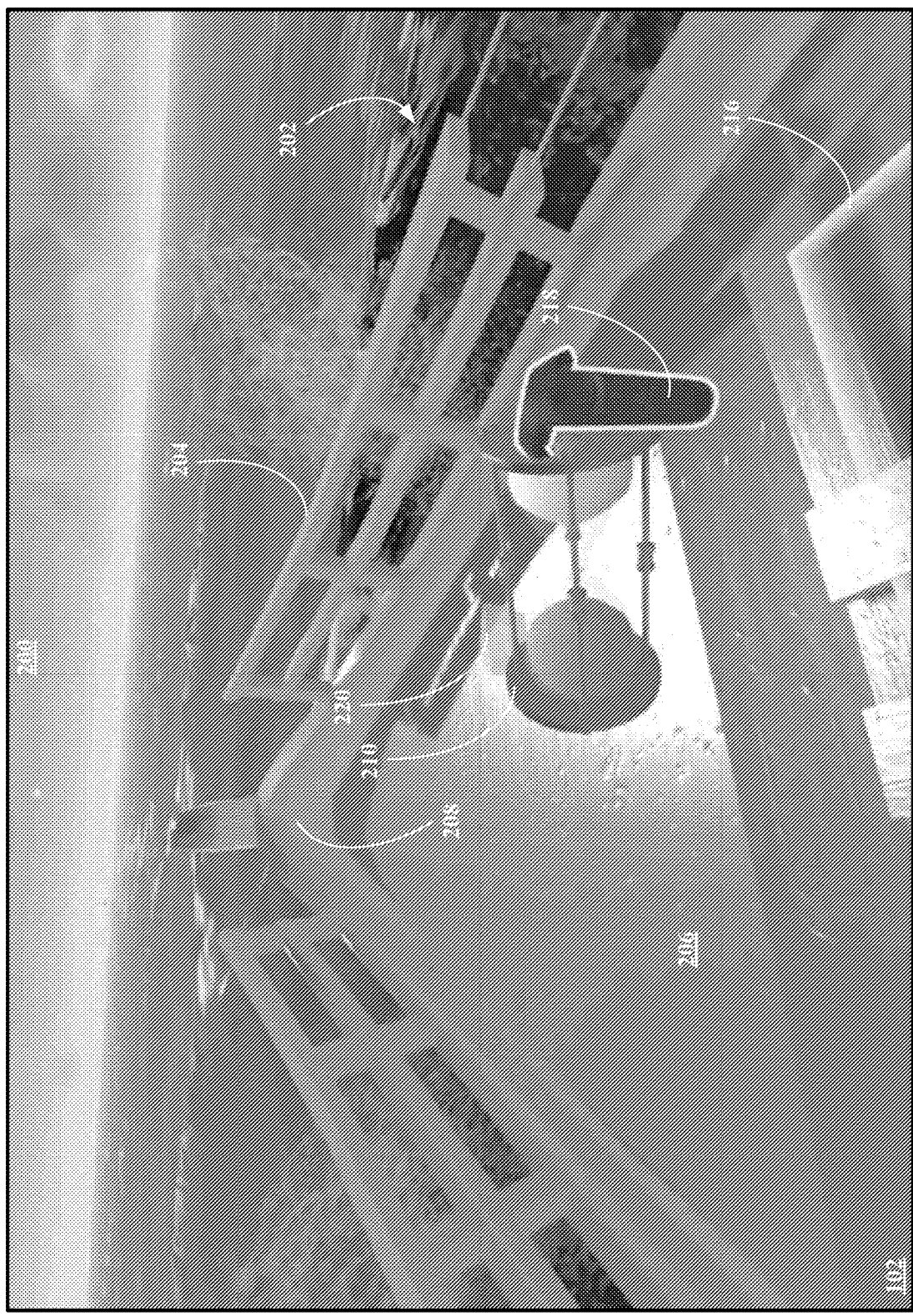
Figure 2Q:
Figure 2R:
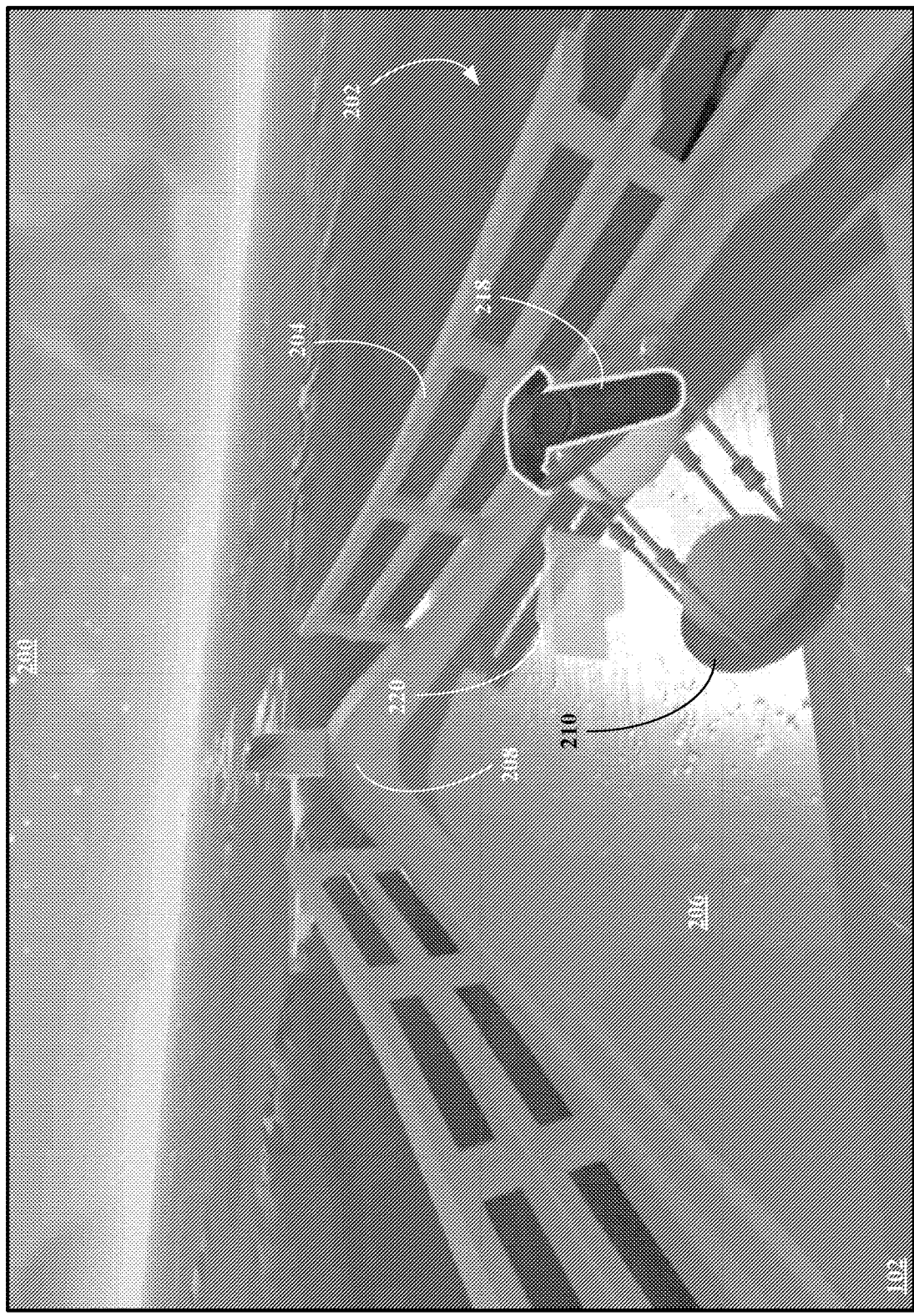
Figure 2S:
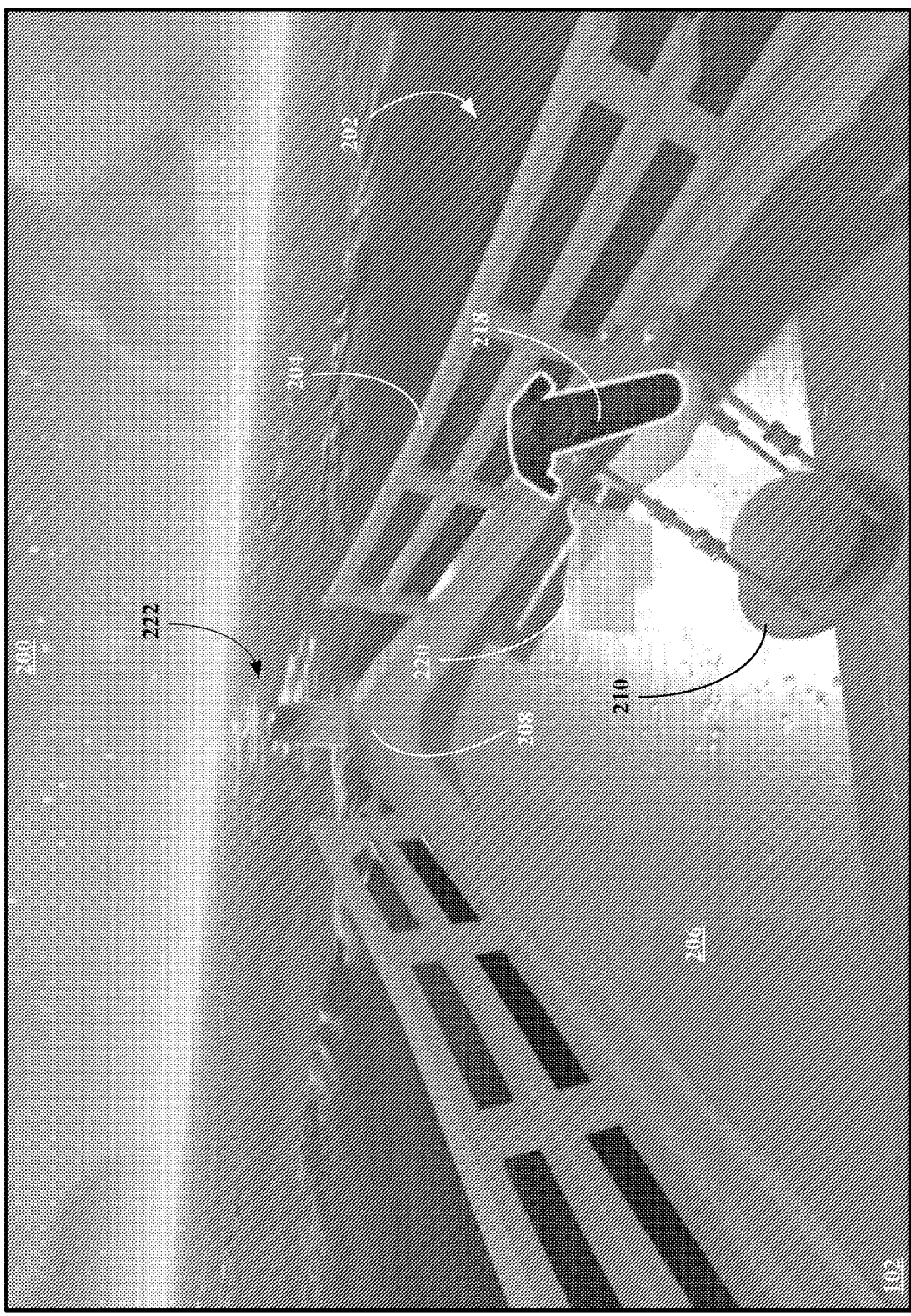
Figure 2T:
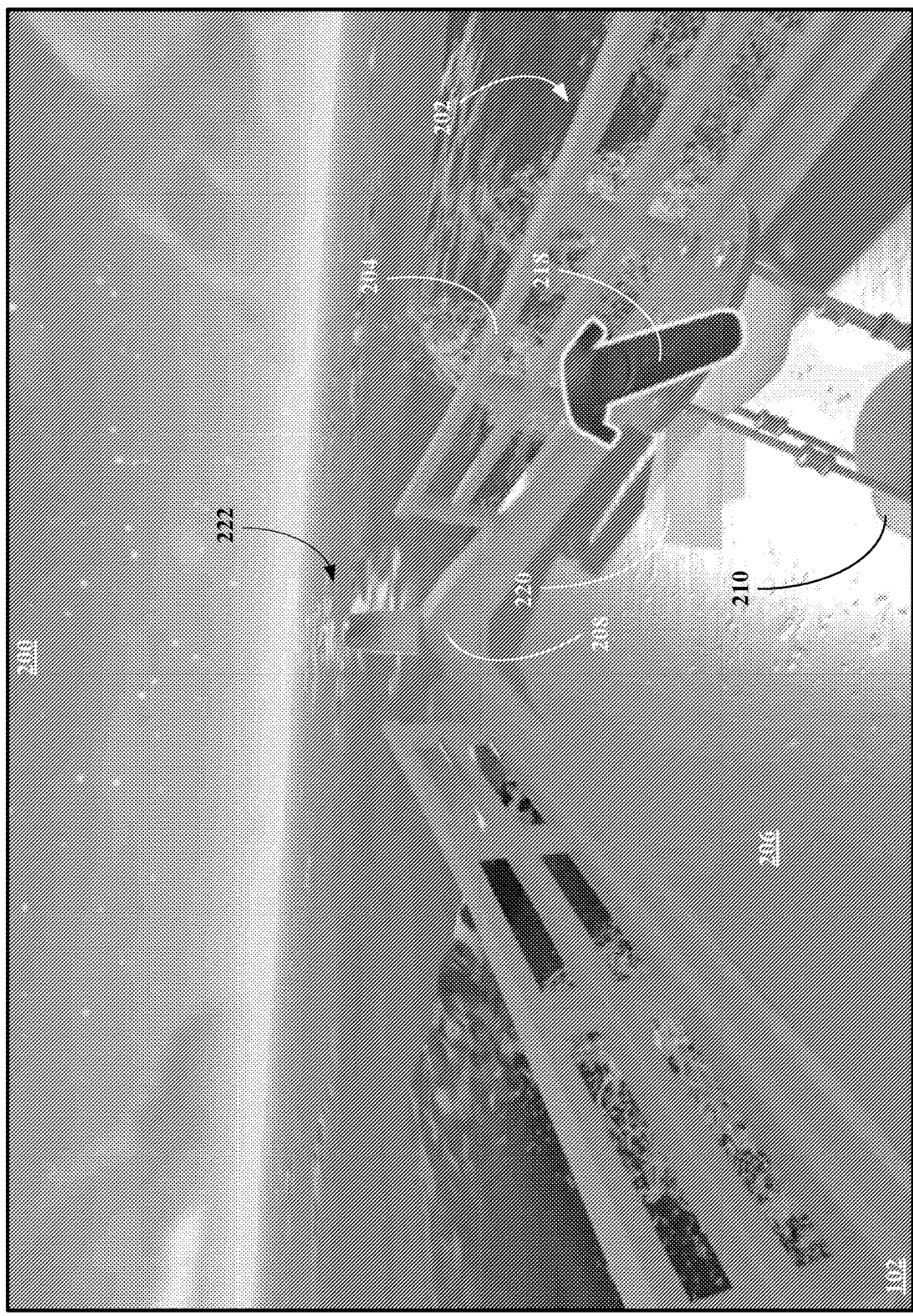
Figure 2U:
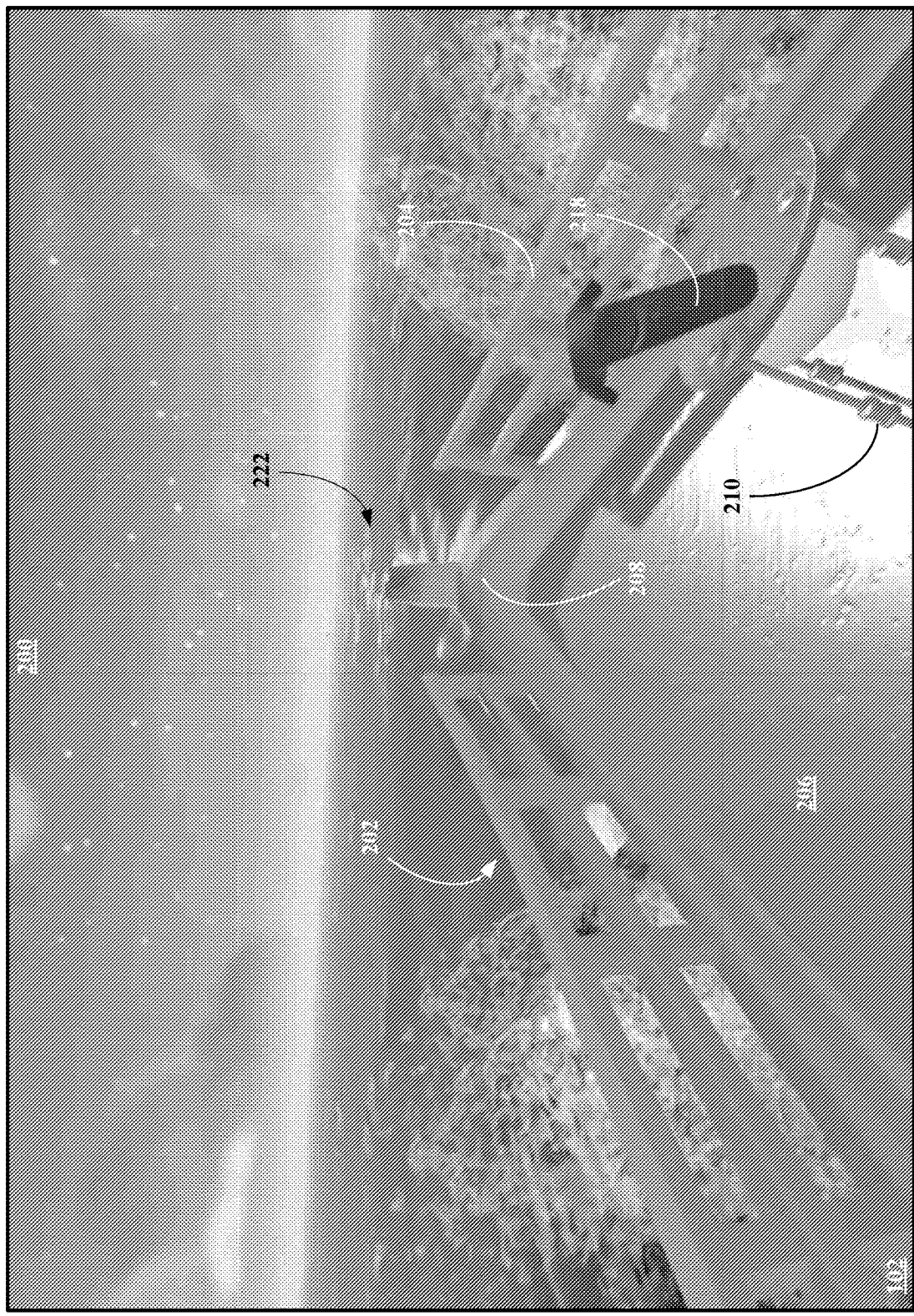
Figure 2V:
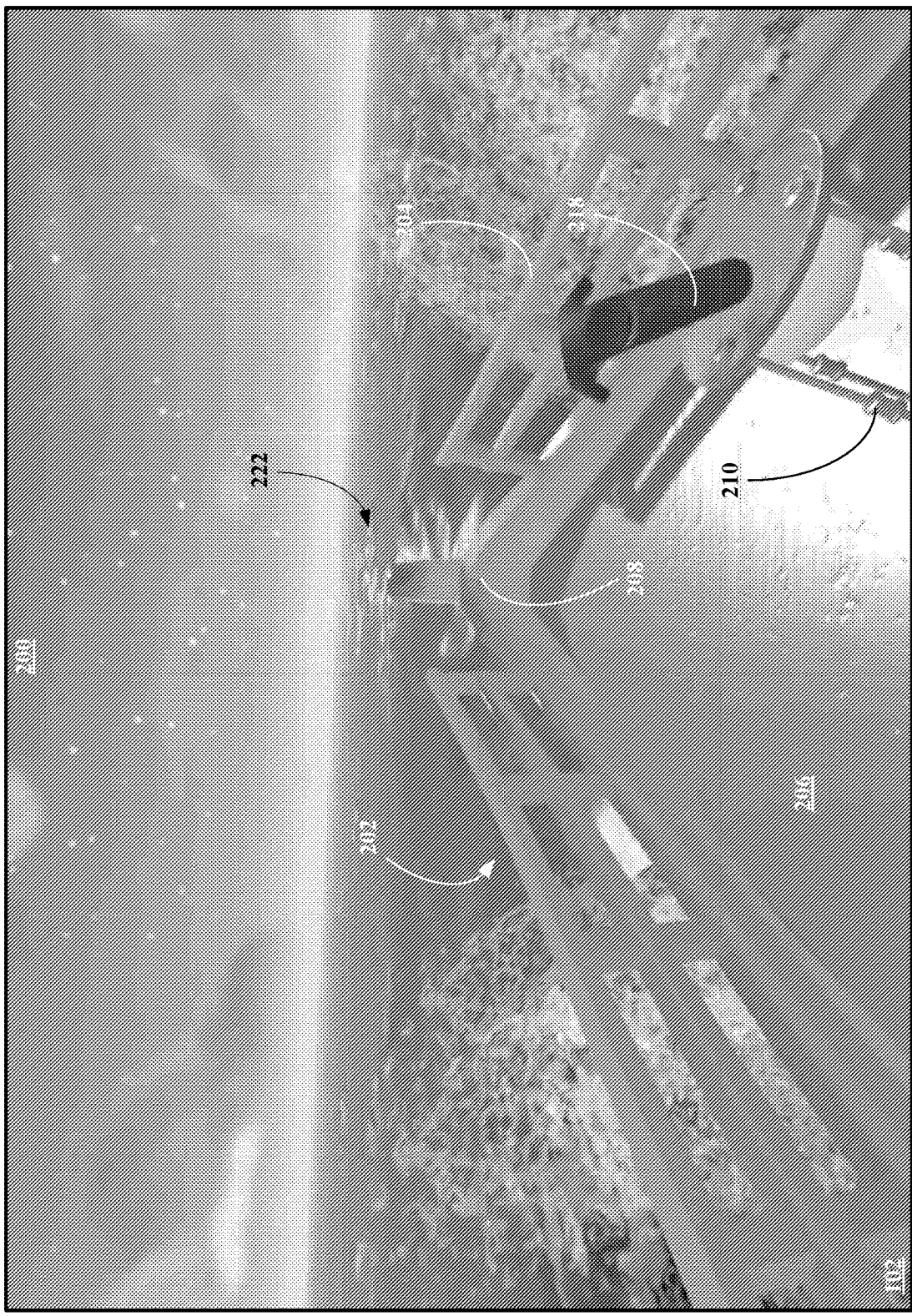
Figure 2W:
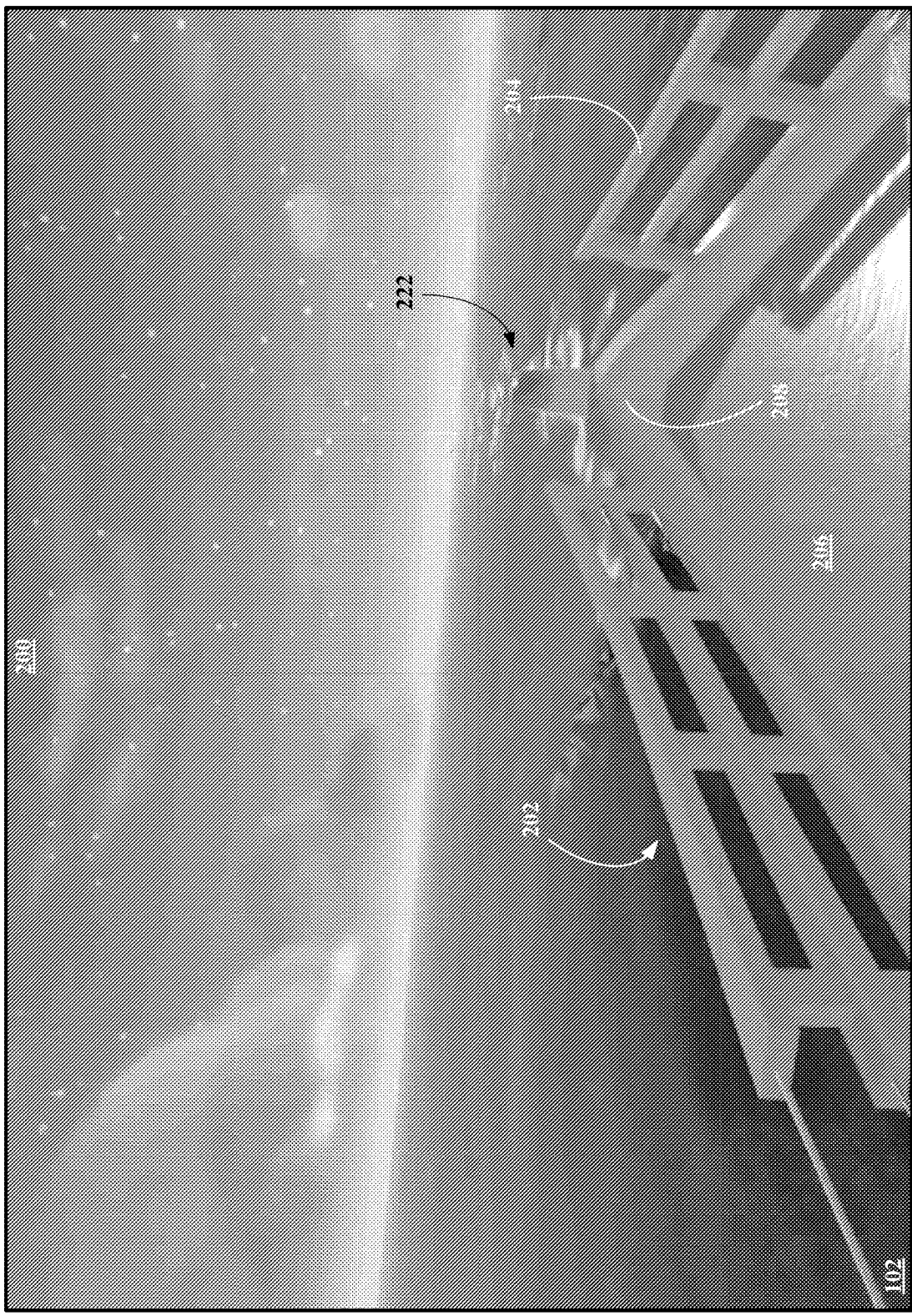
Figure 2X:
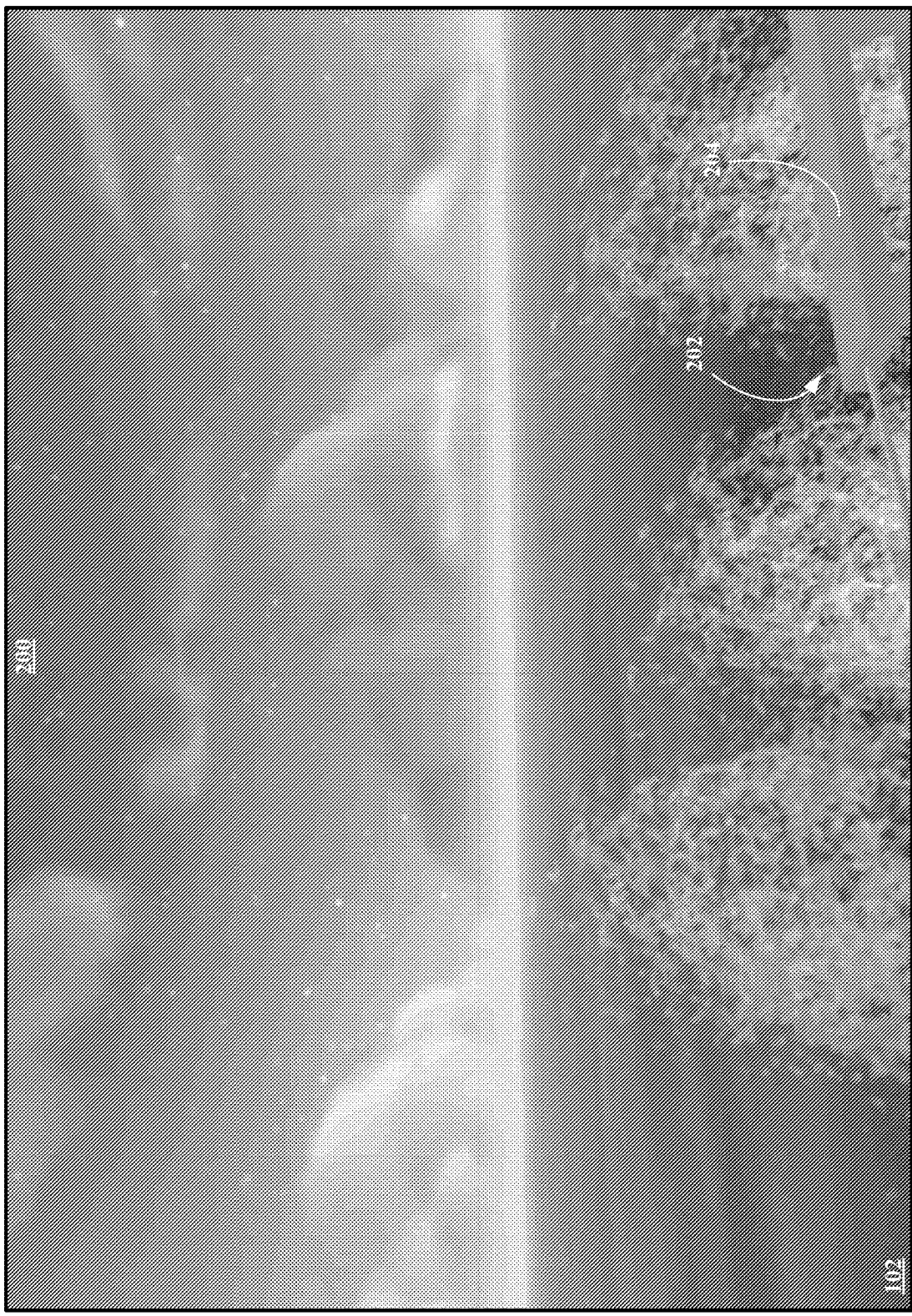
Figure 2Y:
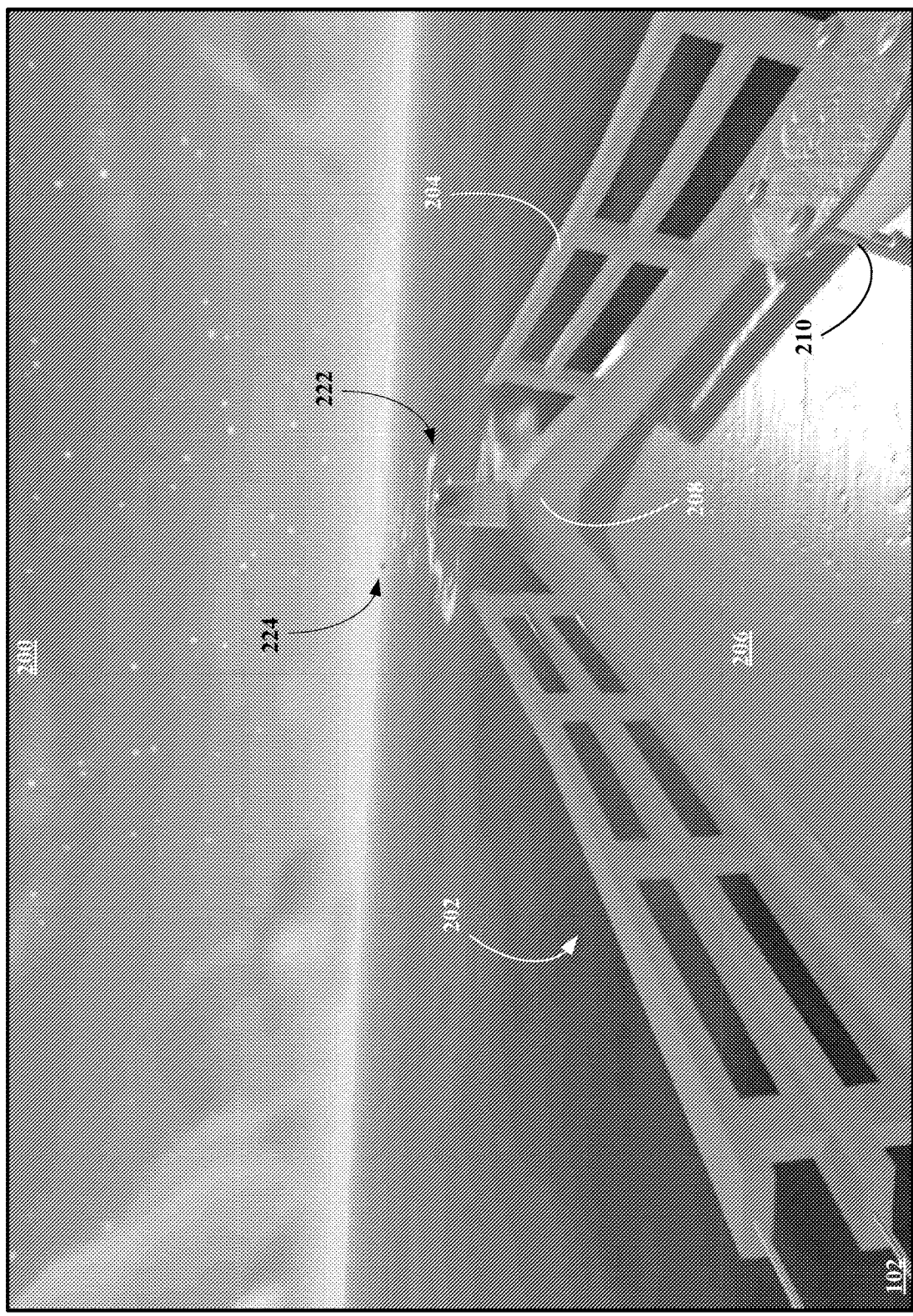
Figure 2Z:
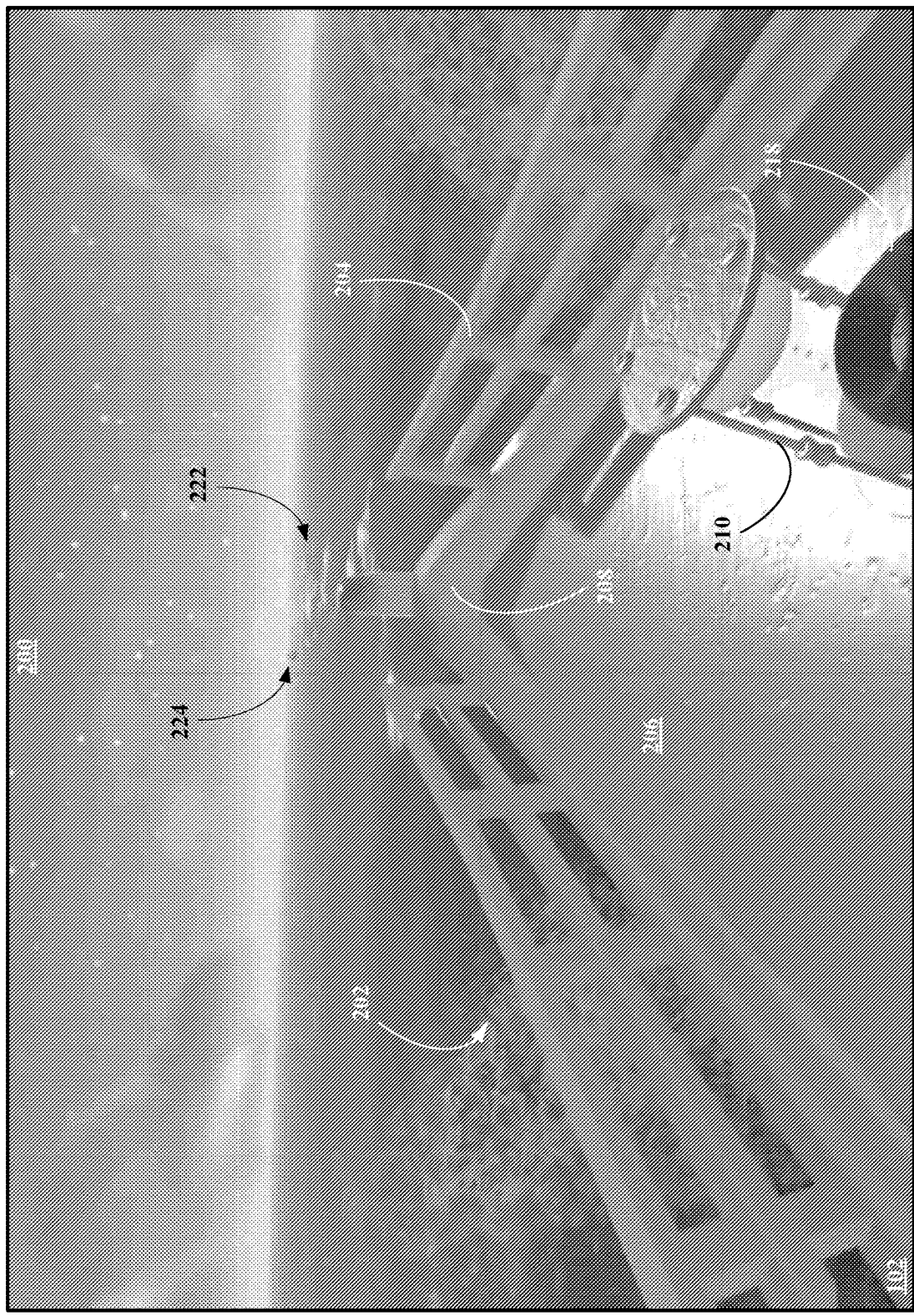
Figure 2A:
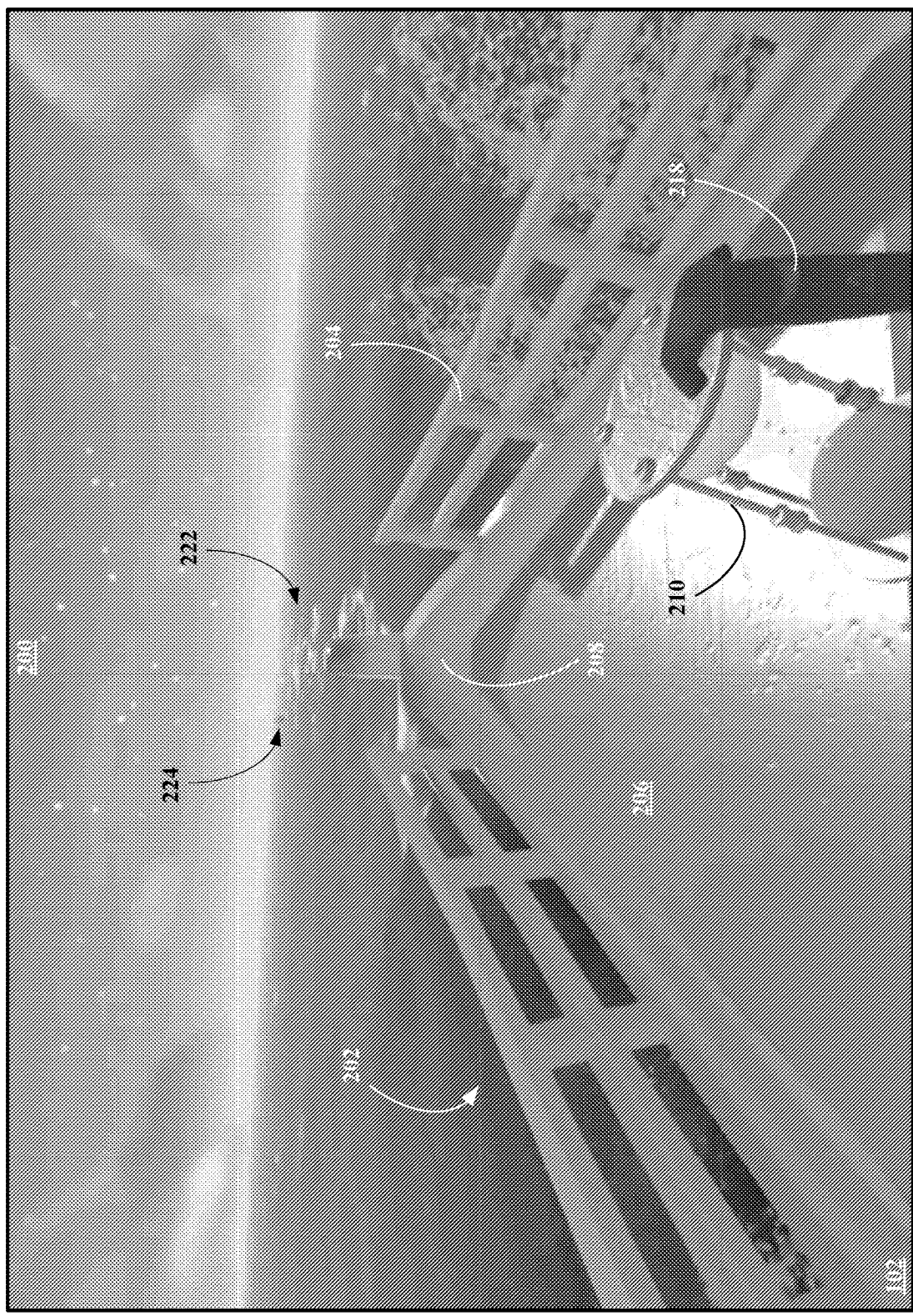
Figure 2A:
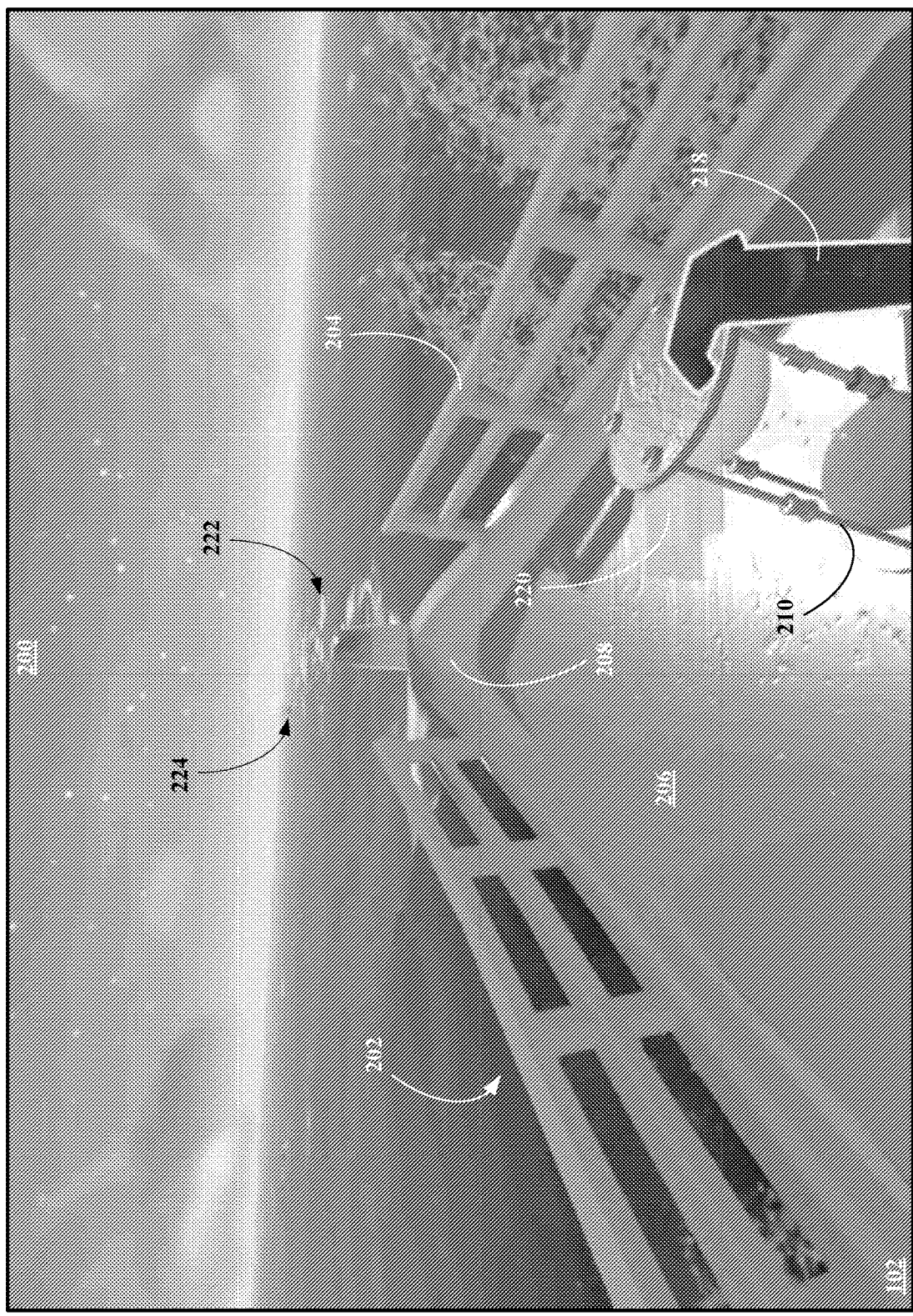
Figure 2A:
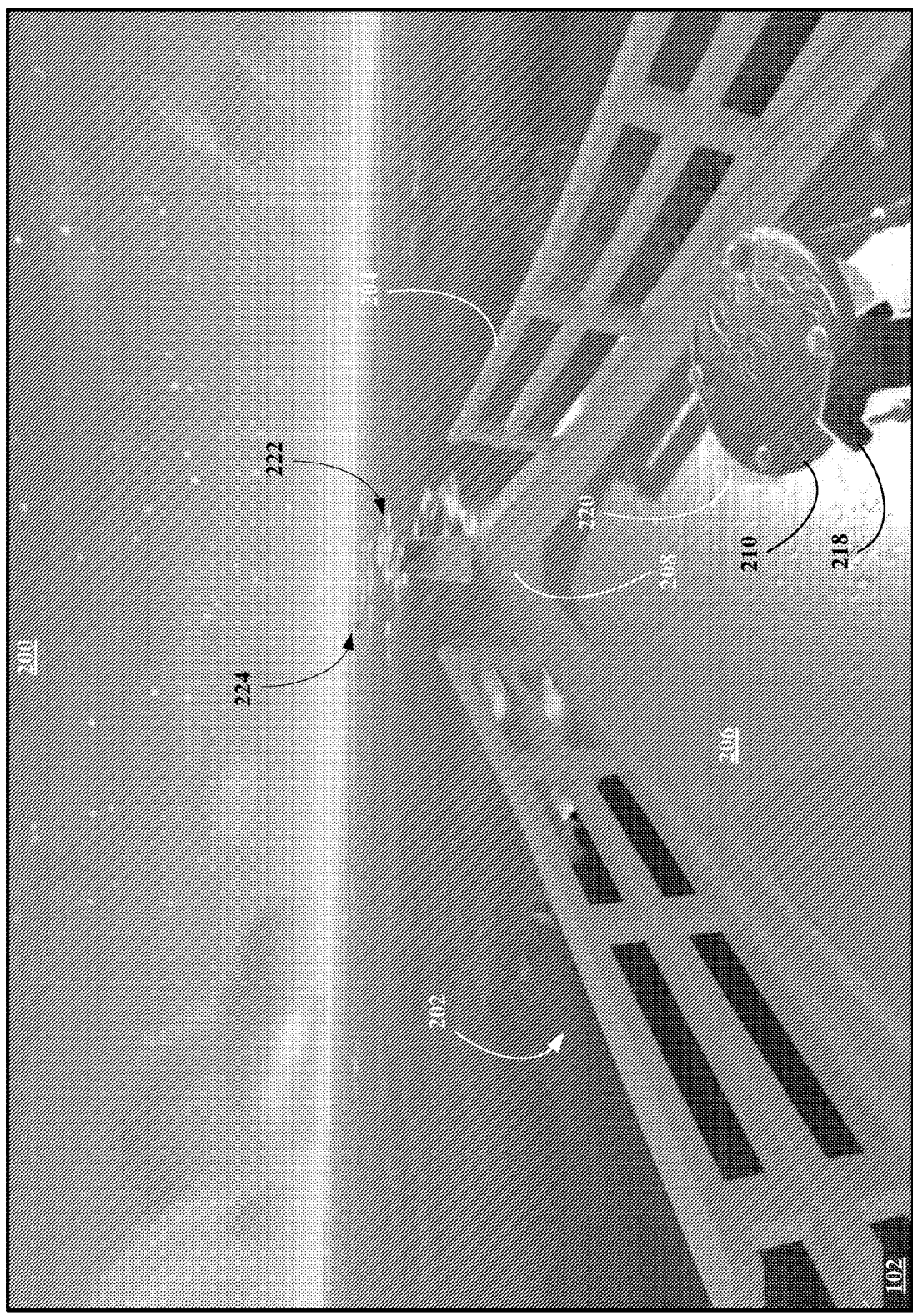
Figure 2A:
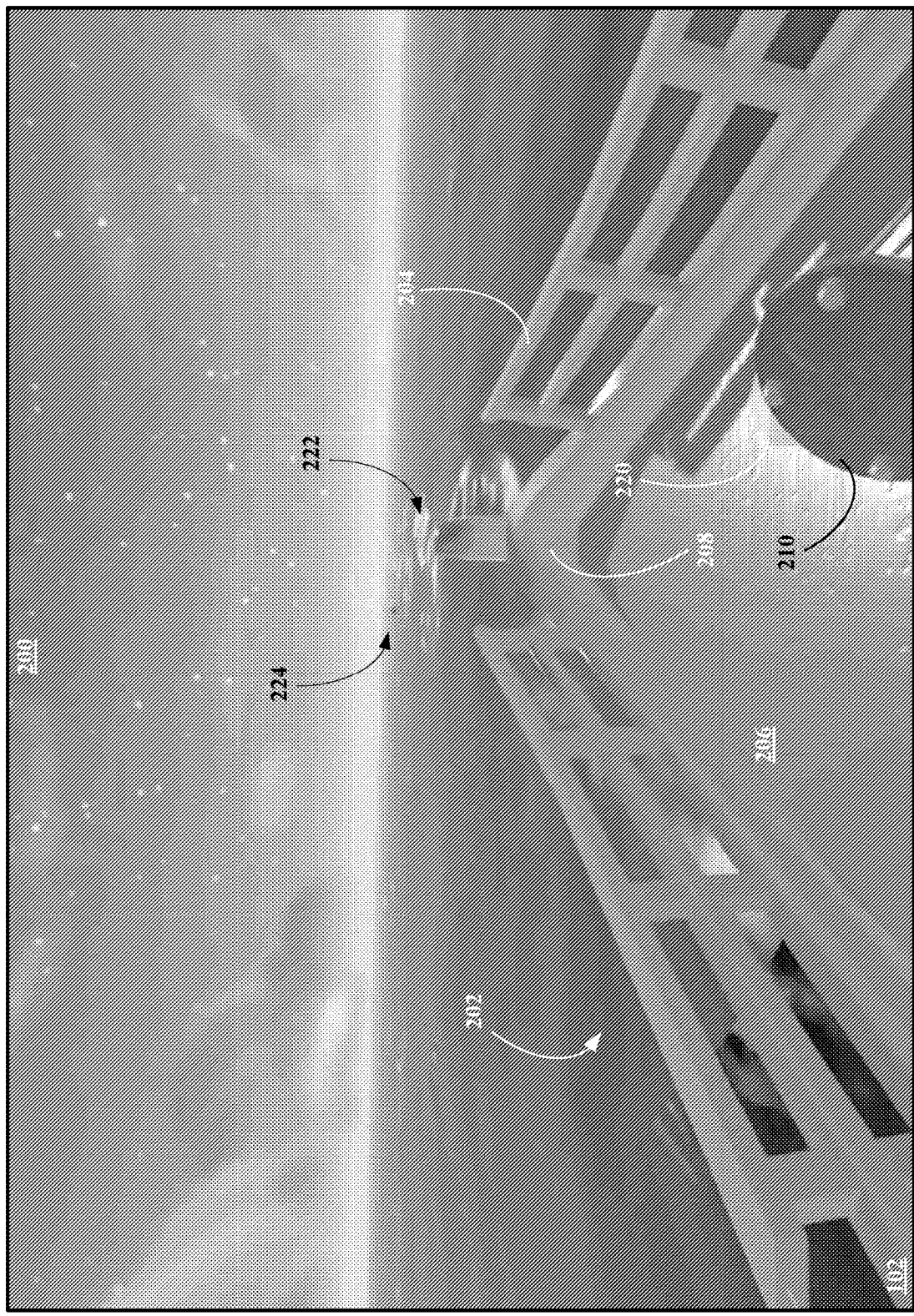
Figure 2A:
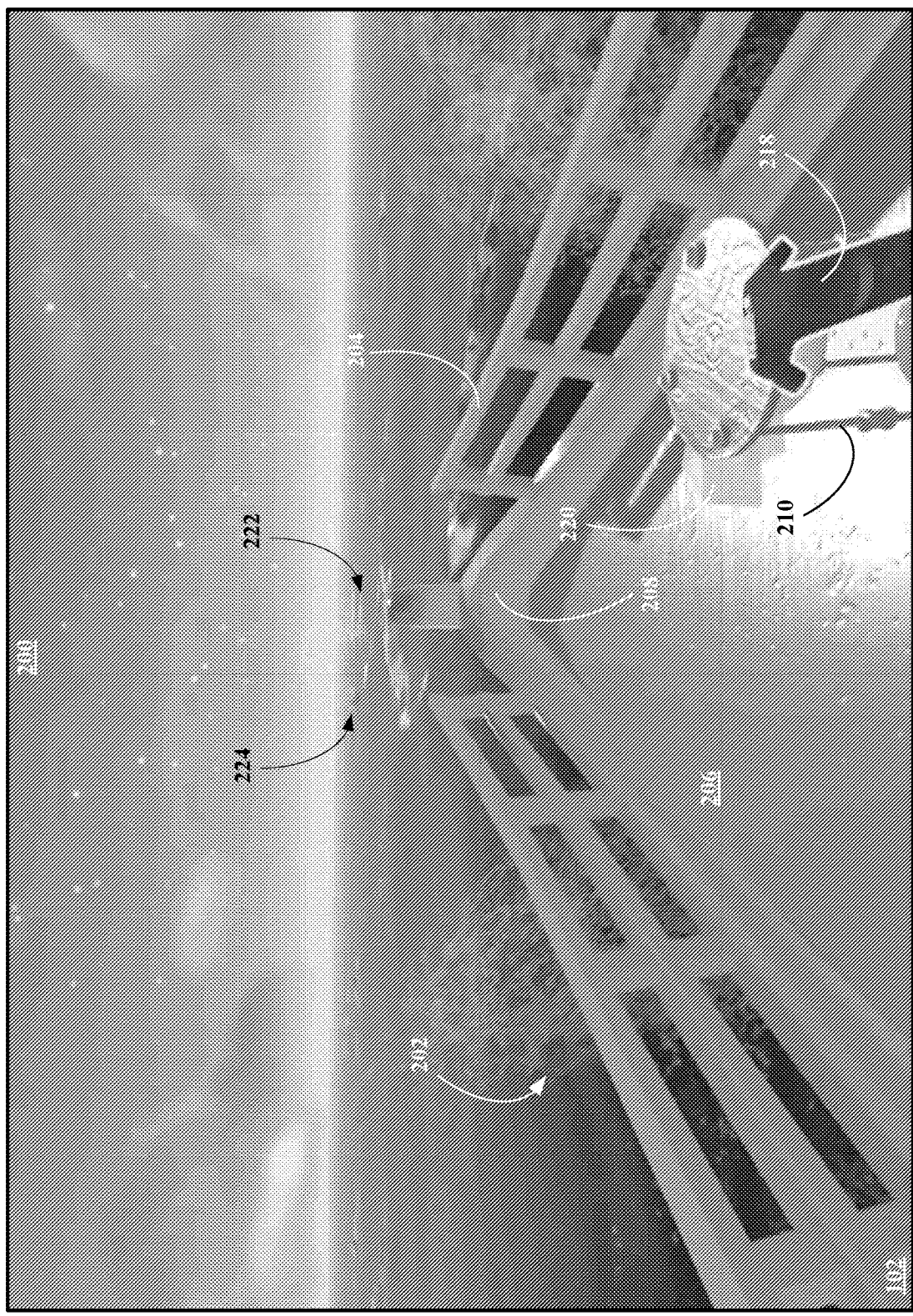
Figure 2A:
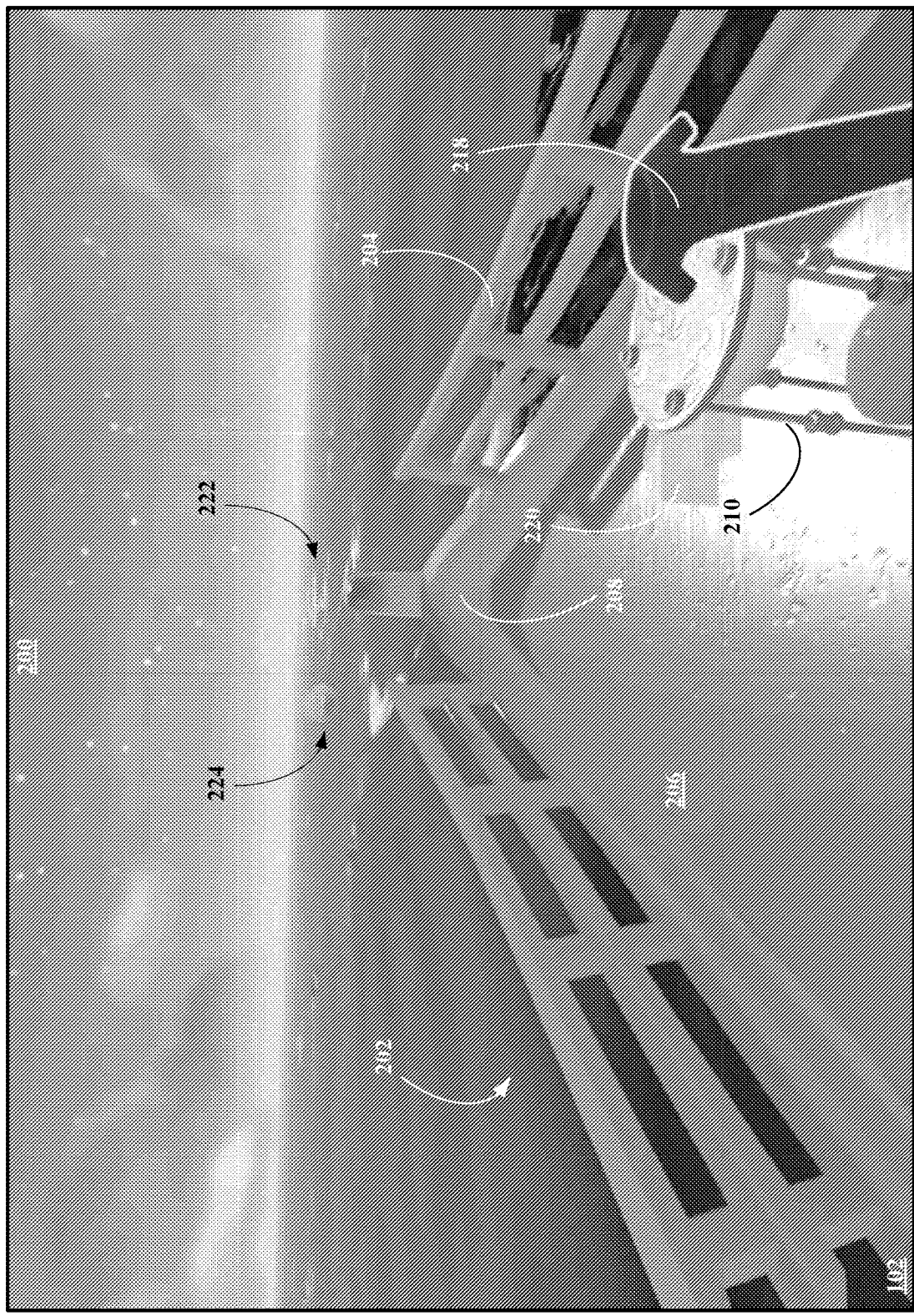
Figure 2A:
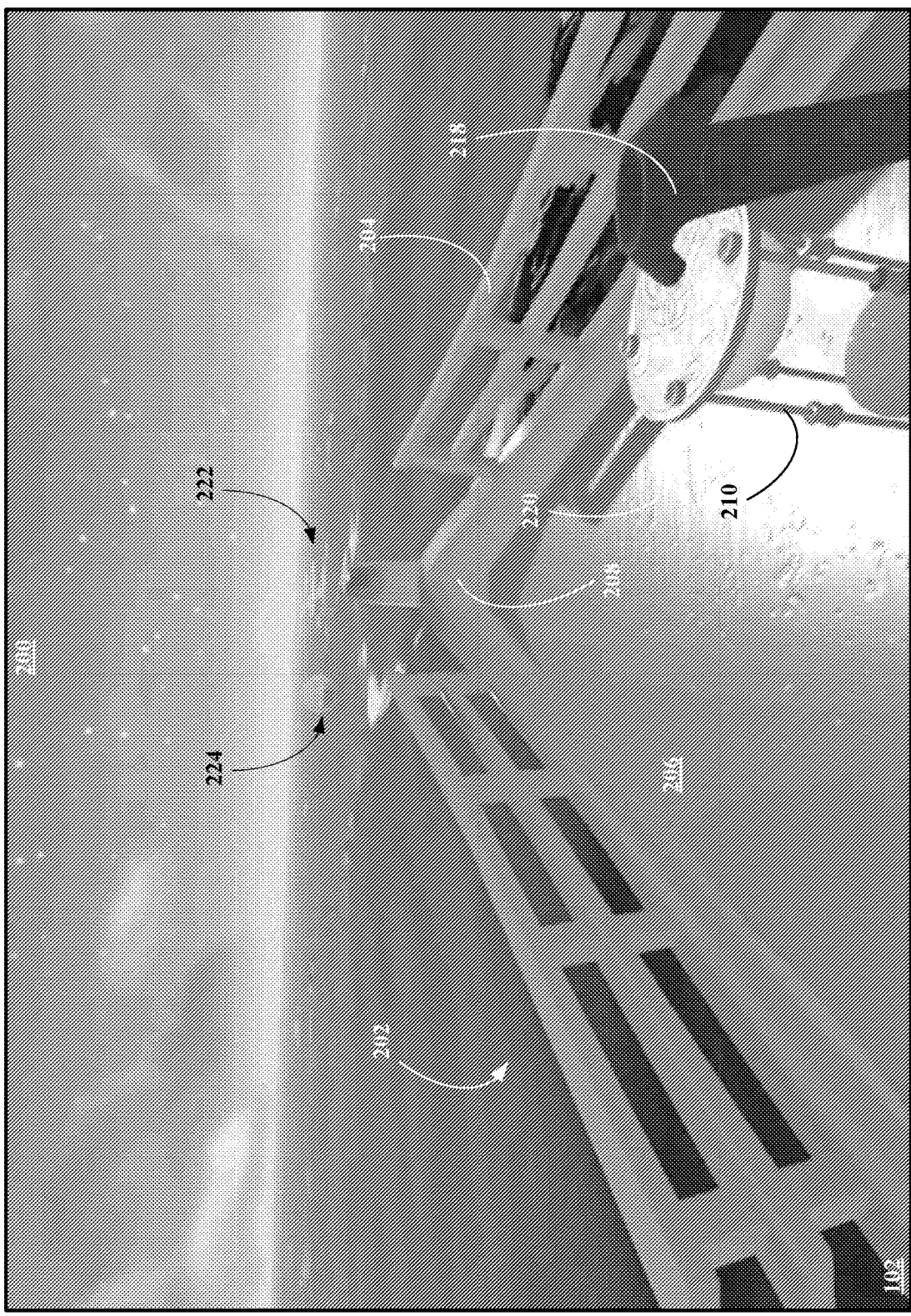
Figure 2A:
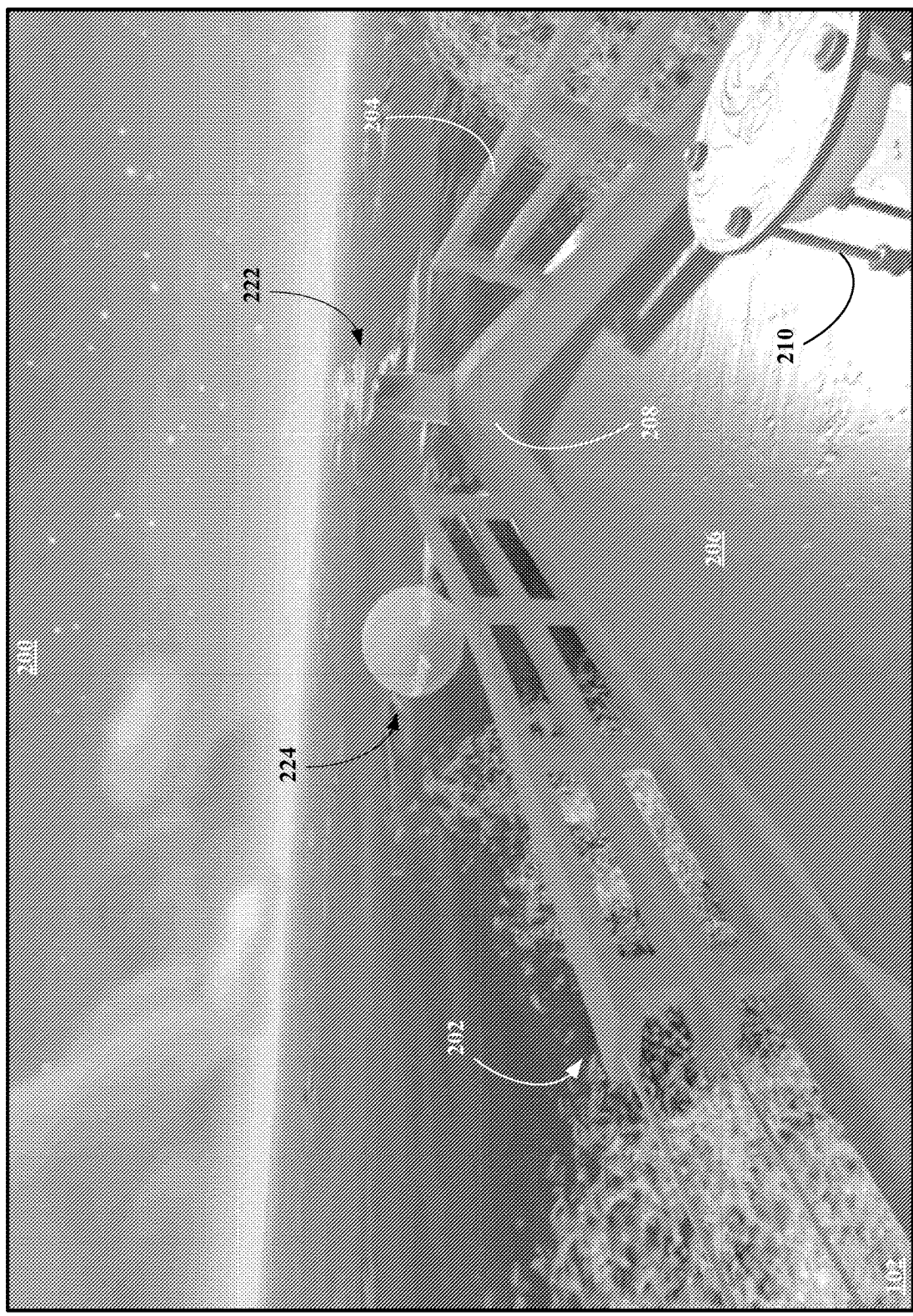
Figure 2A:
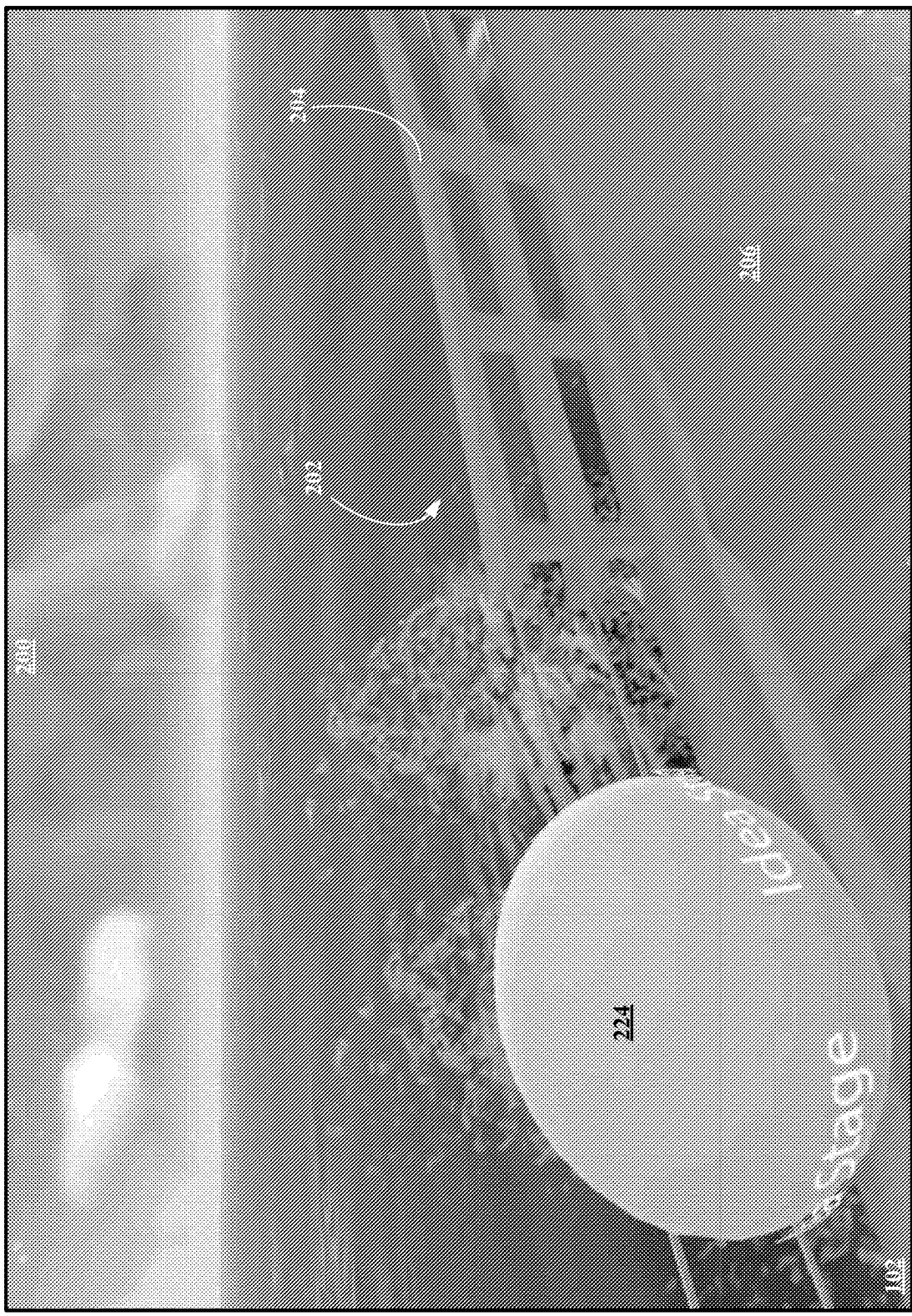
Figure 2A:
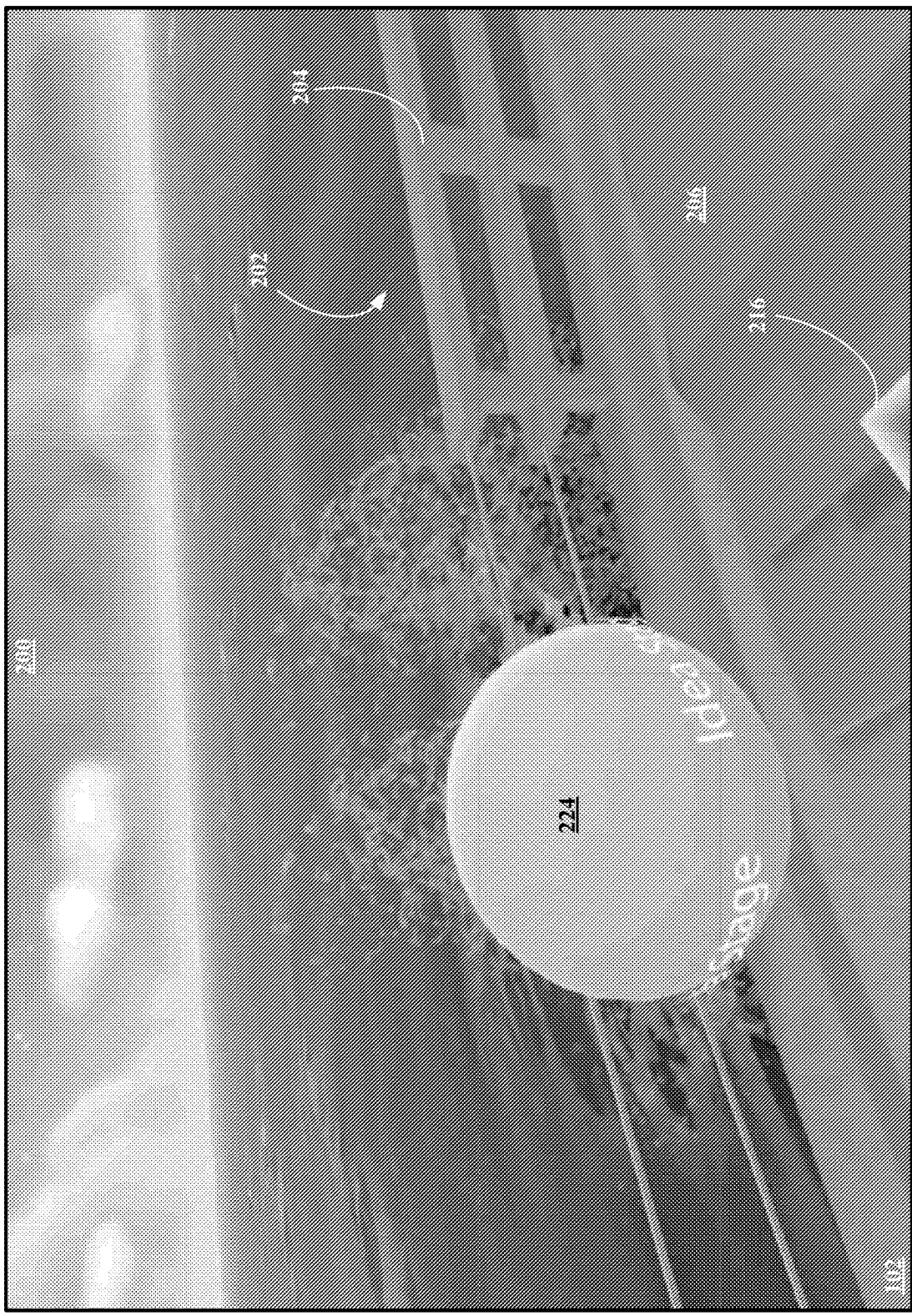
Figure 2A:
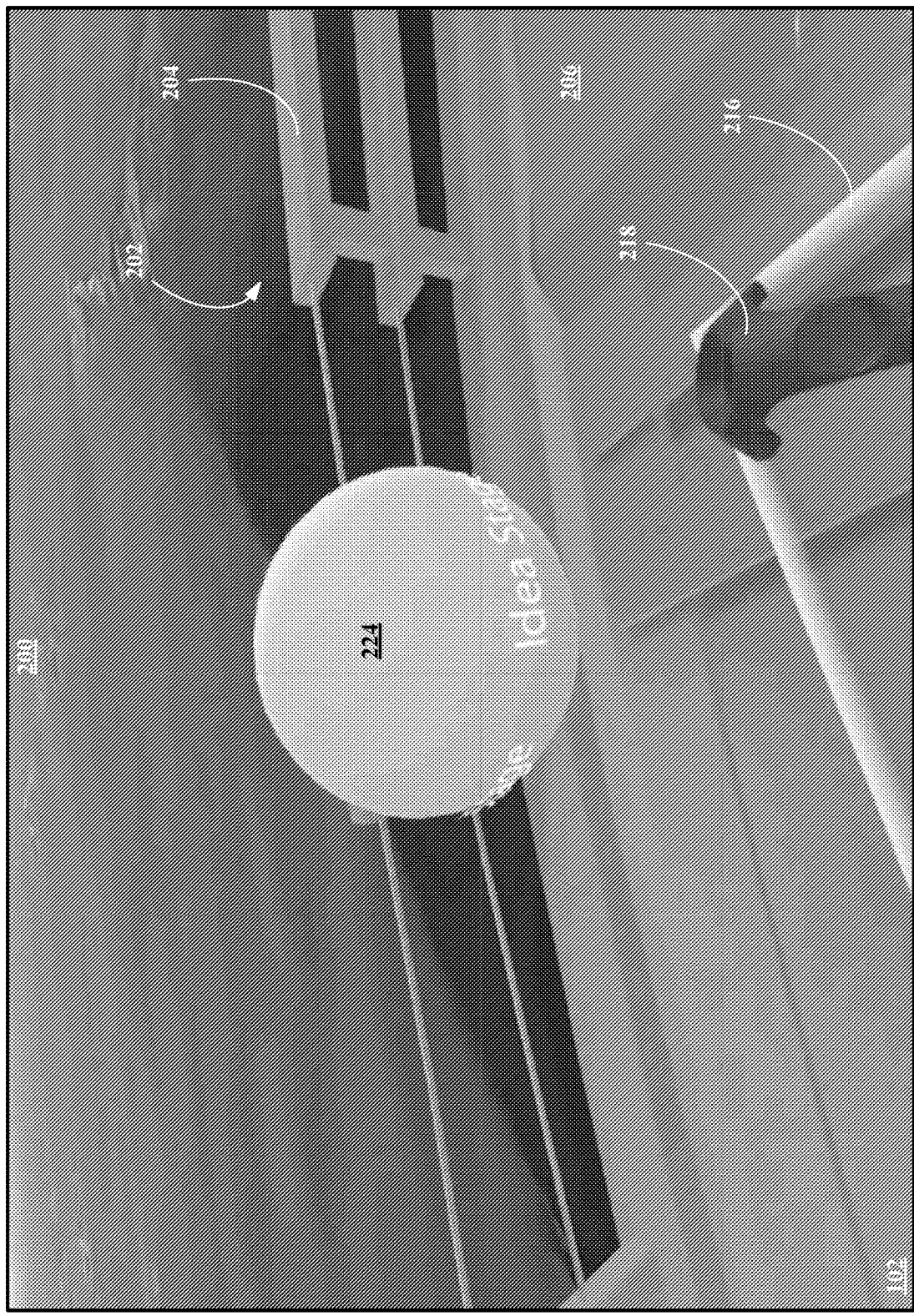
Figure 2A:
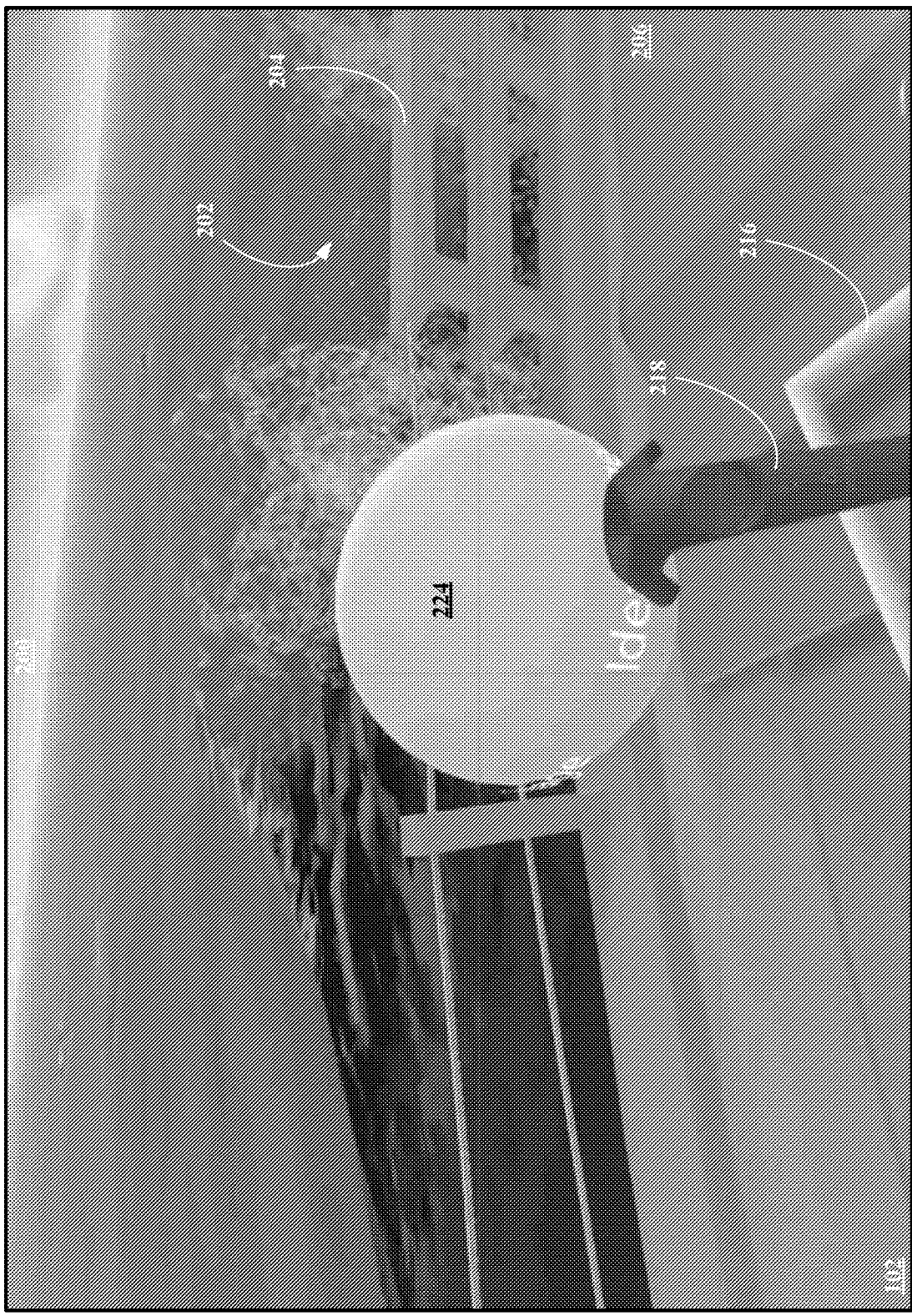
Figure 2A:
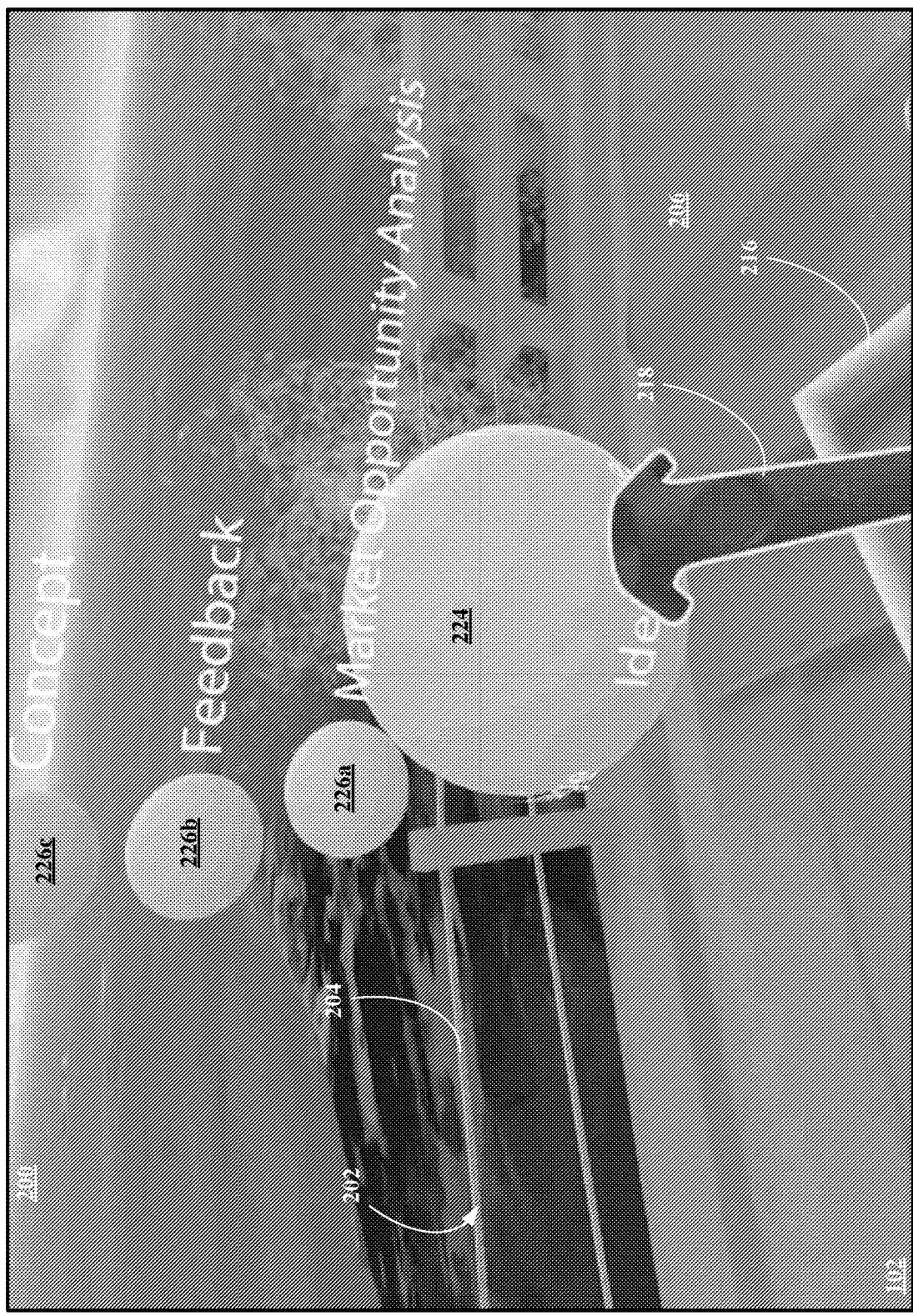
Figure 2A:
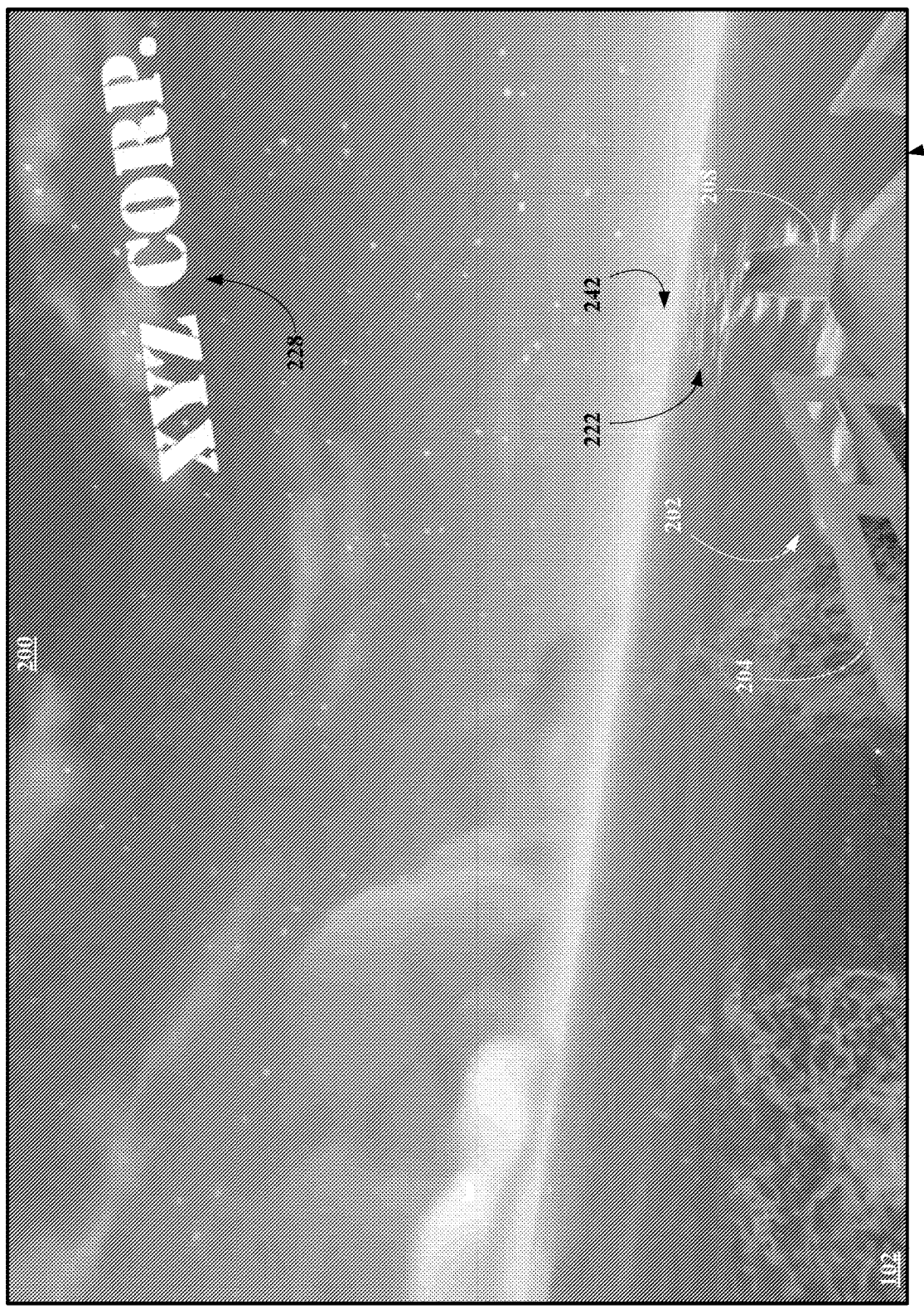
Figure 2A:
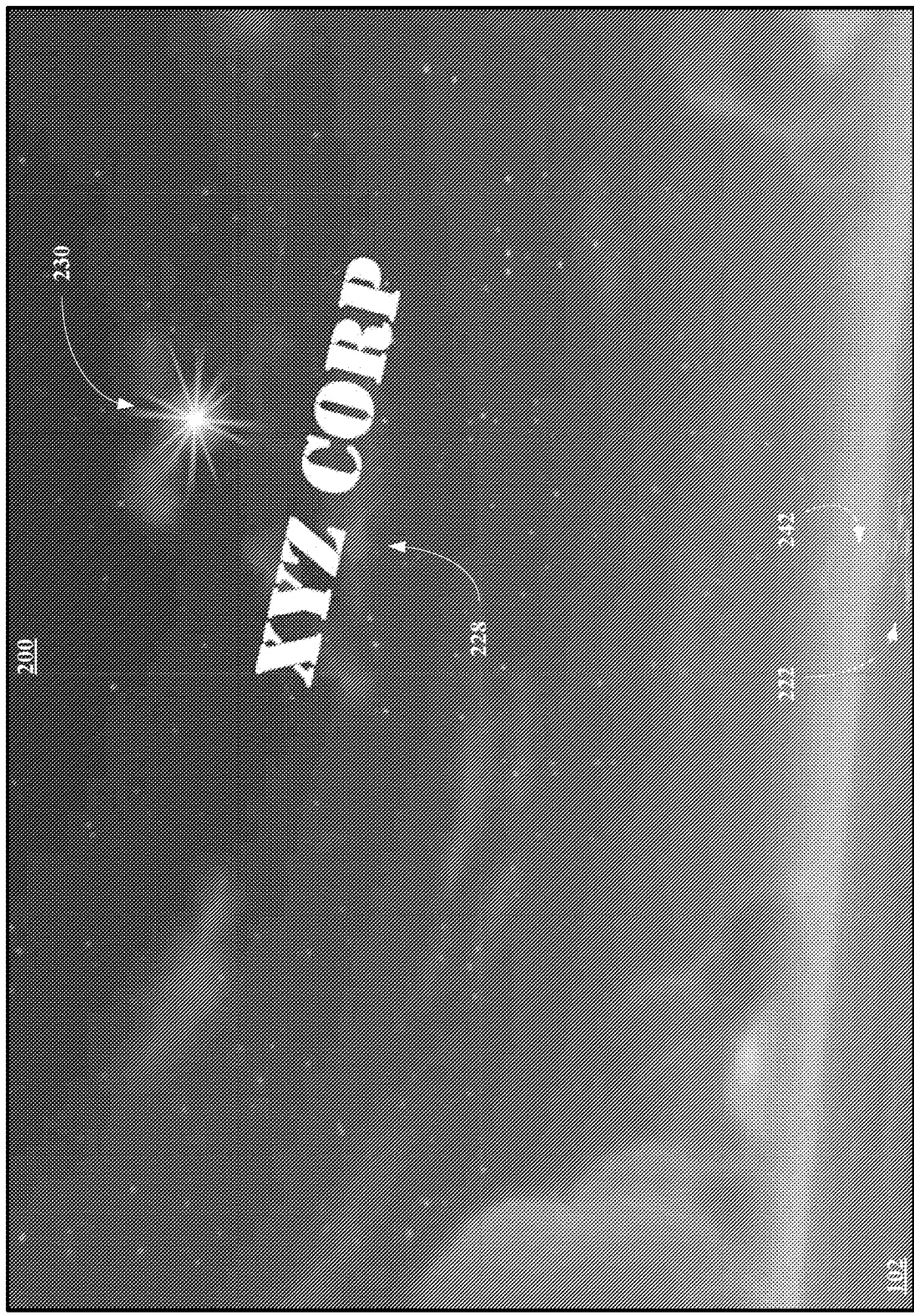
Figure 2A:
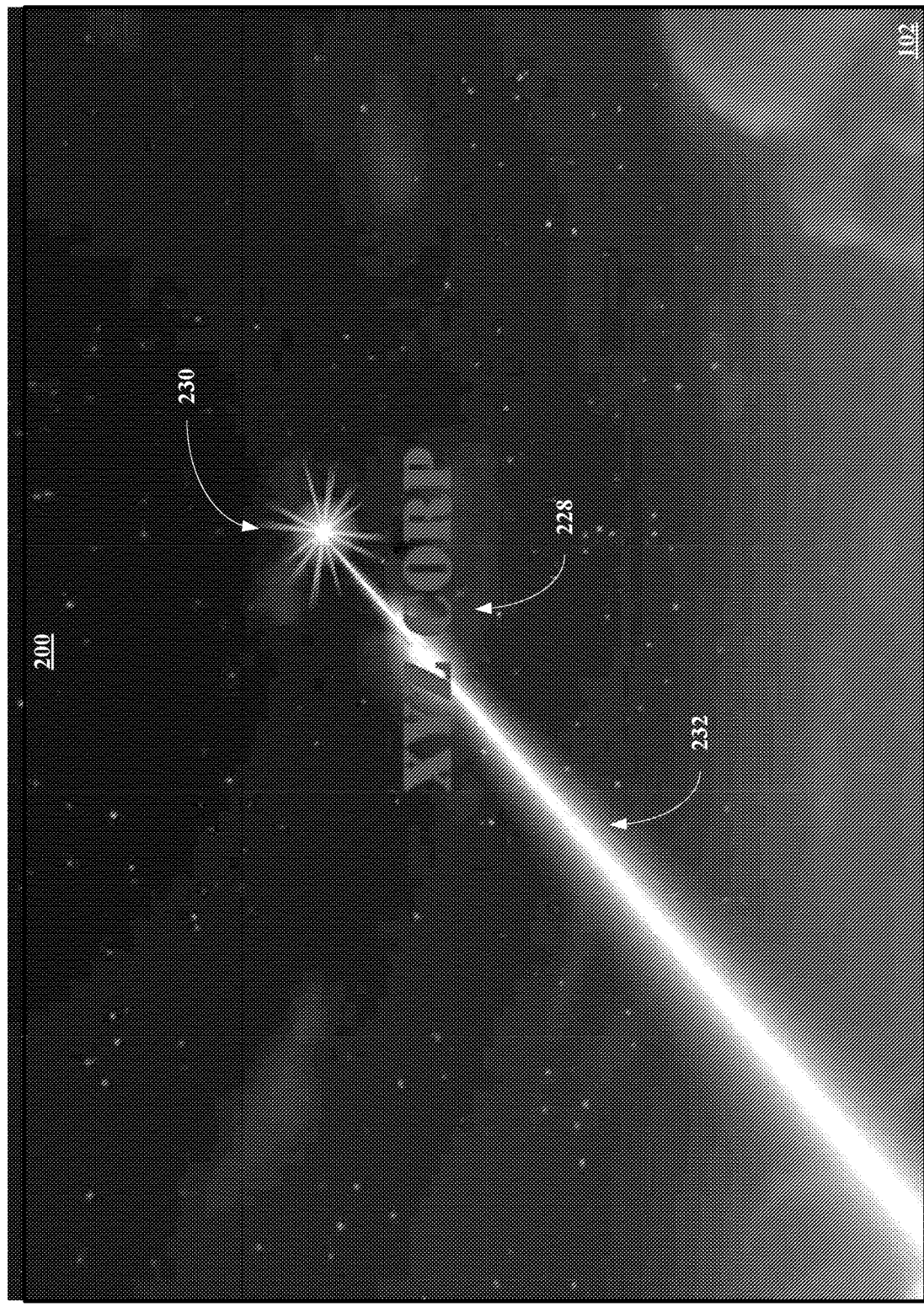
Figure 2A:
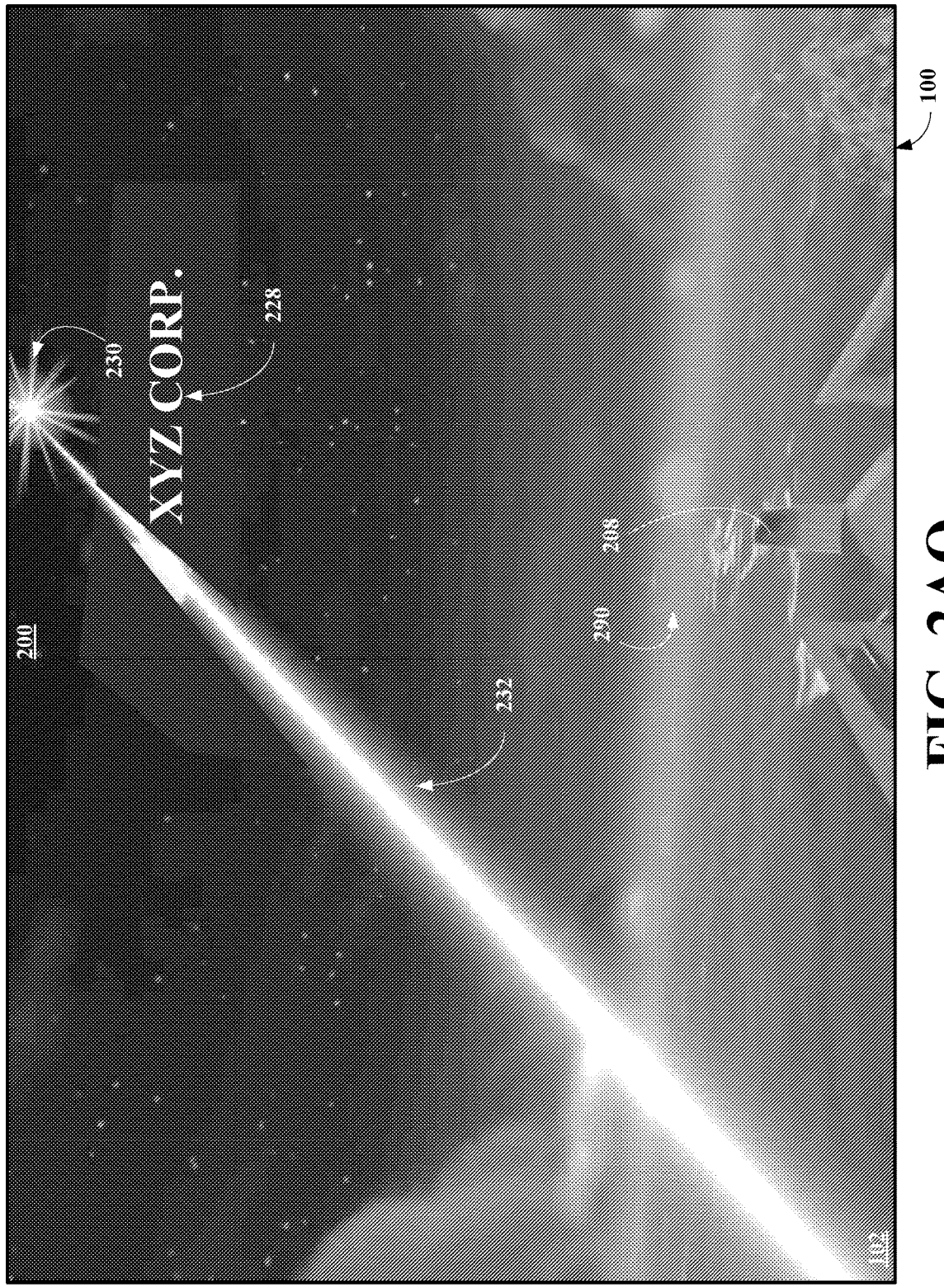
Figure 2A:
Figure 2A:
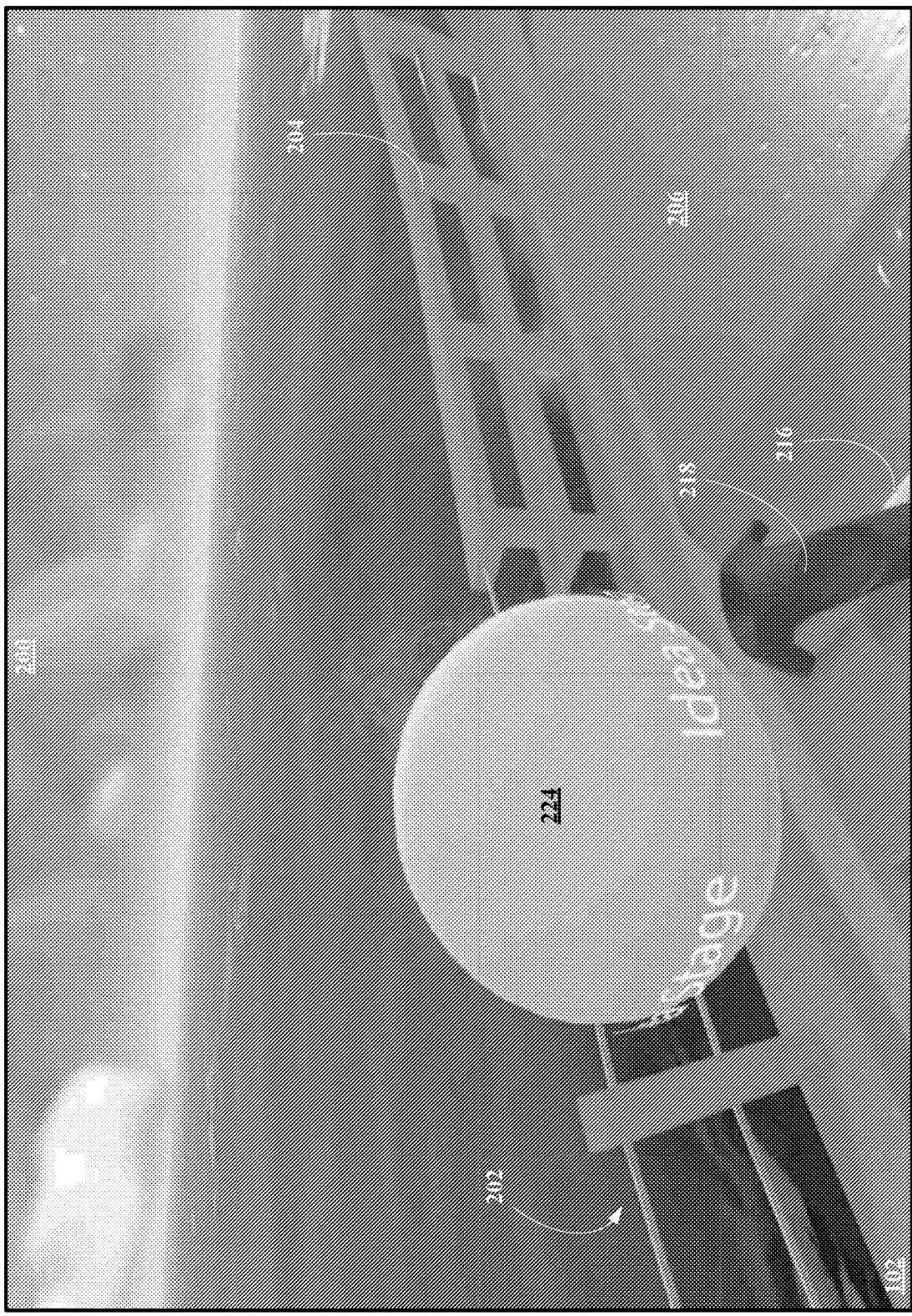
Figure 2A:
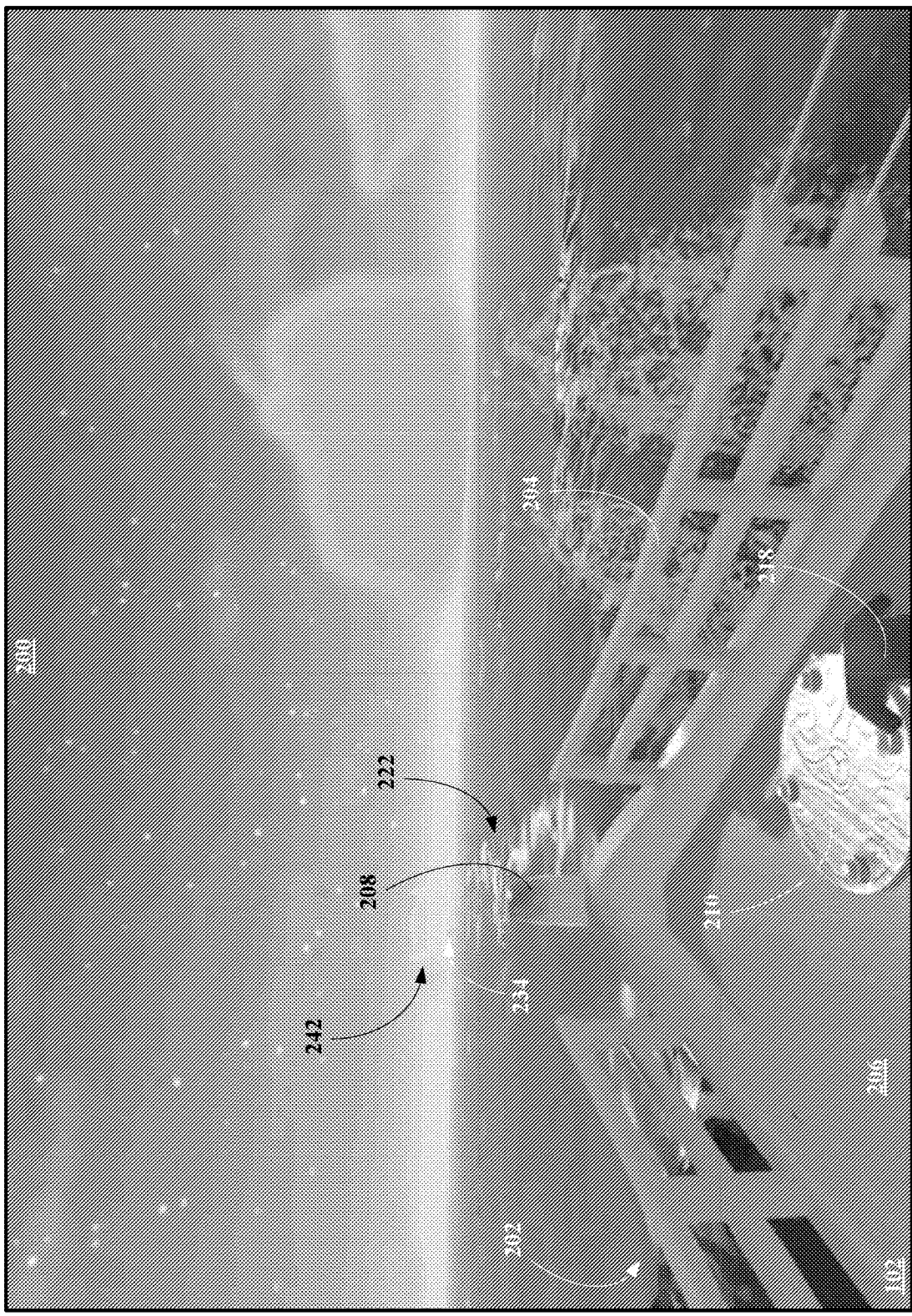
Figure 2A:
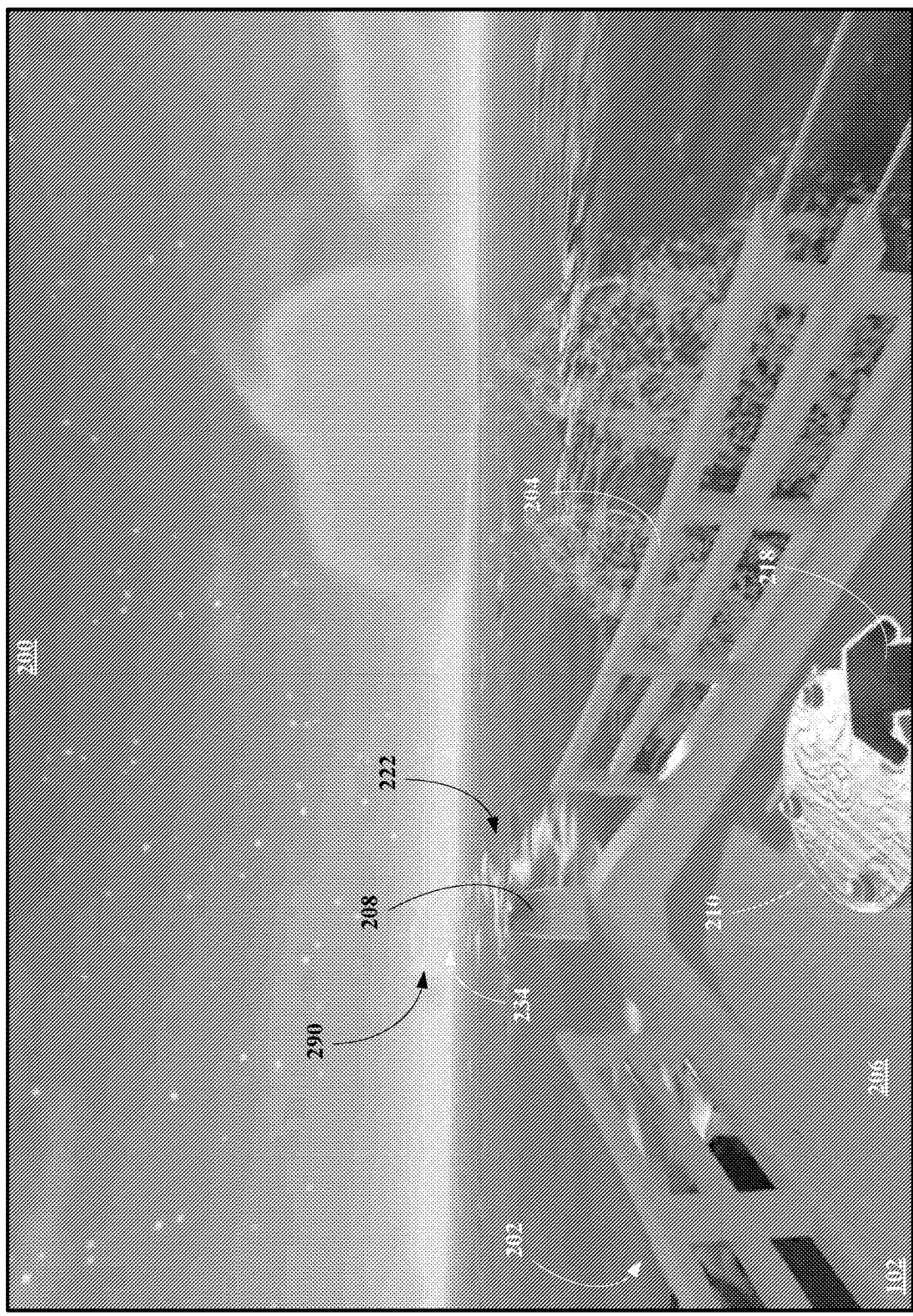
Figure 2A:
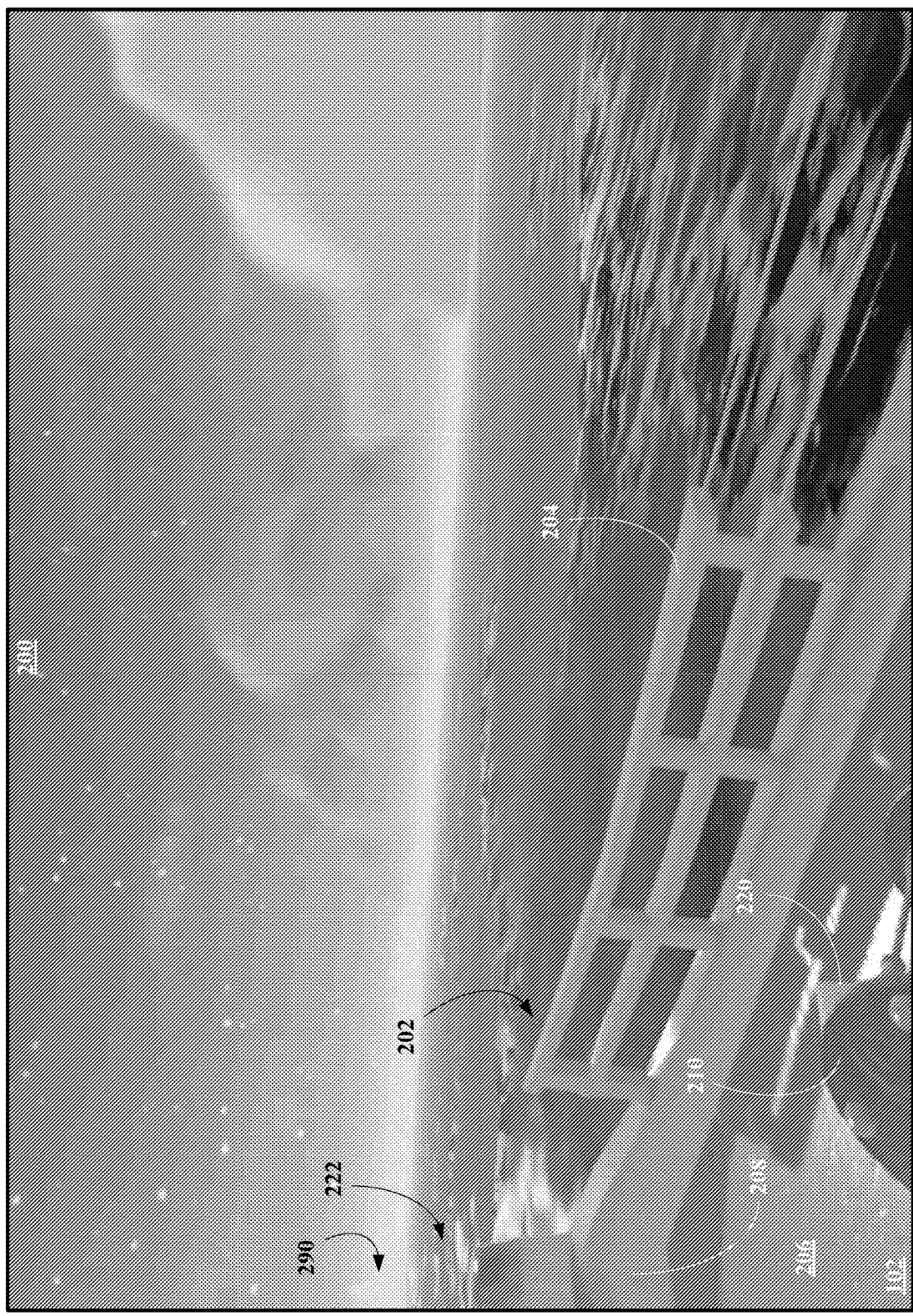
Figure 2A:
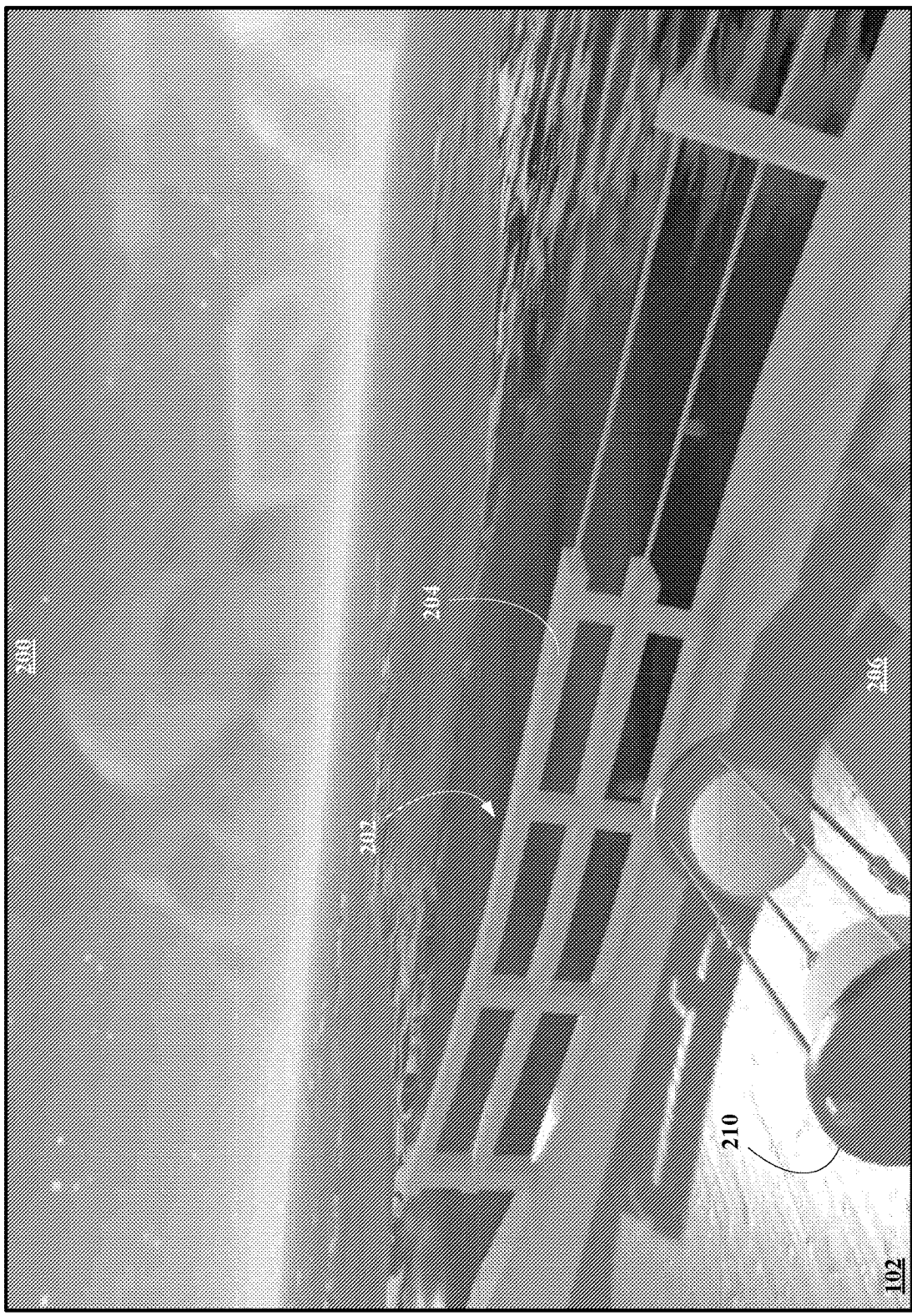
Figure 2A:
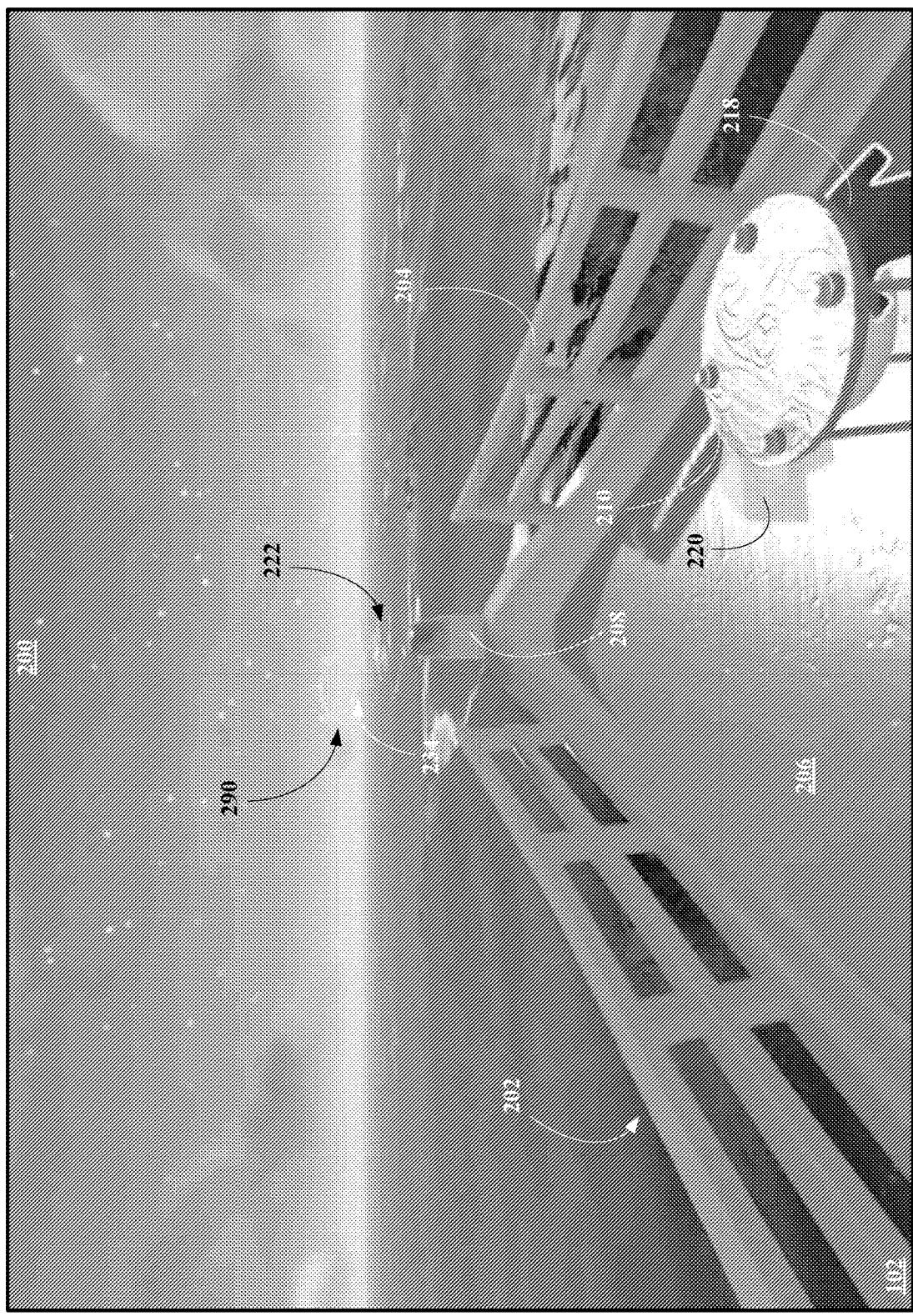
Figure 2A:
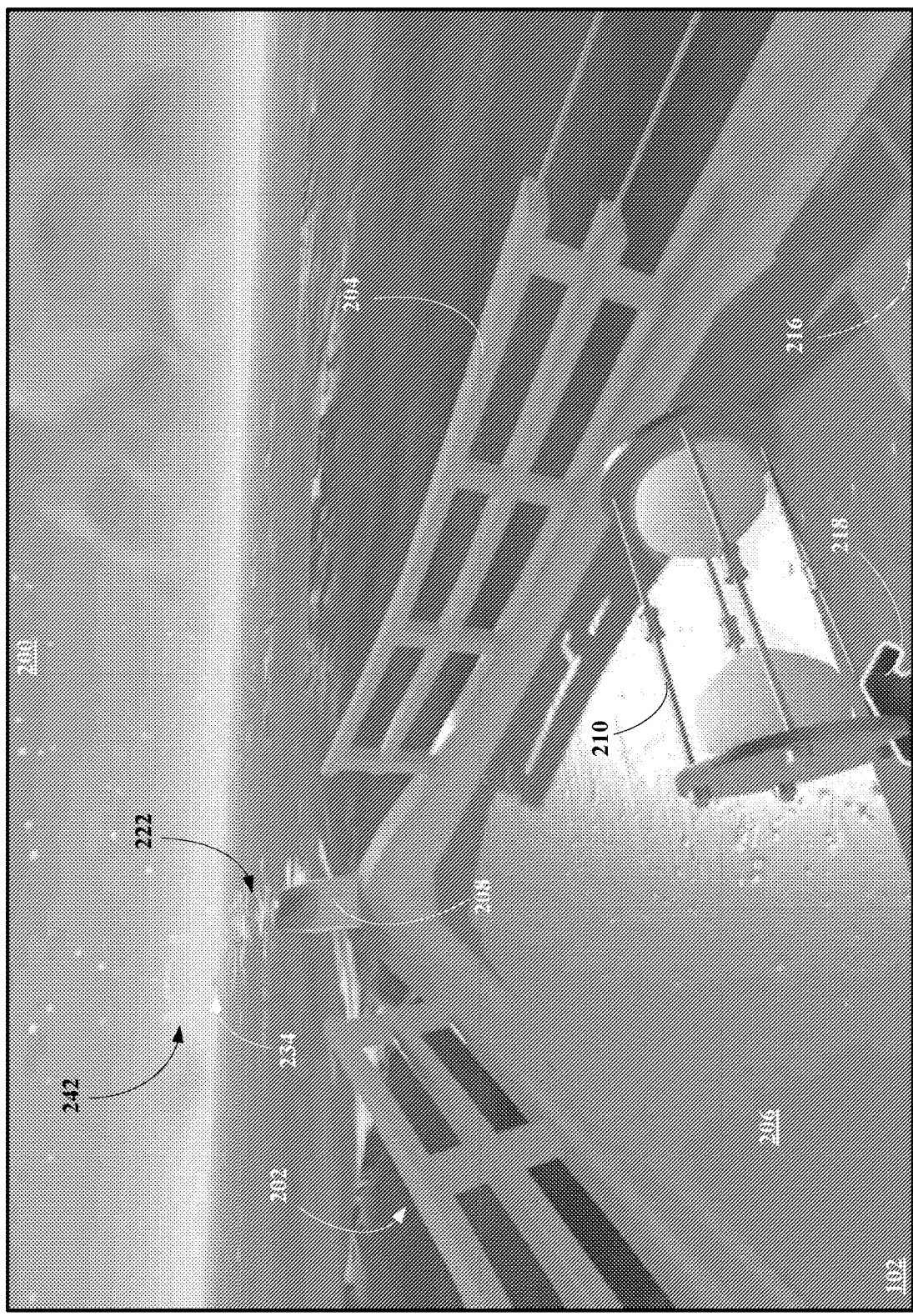
Figure 2A:
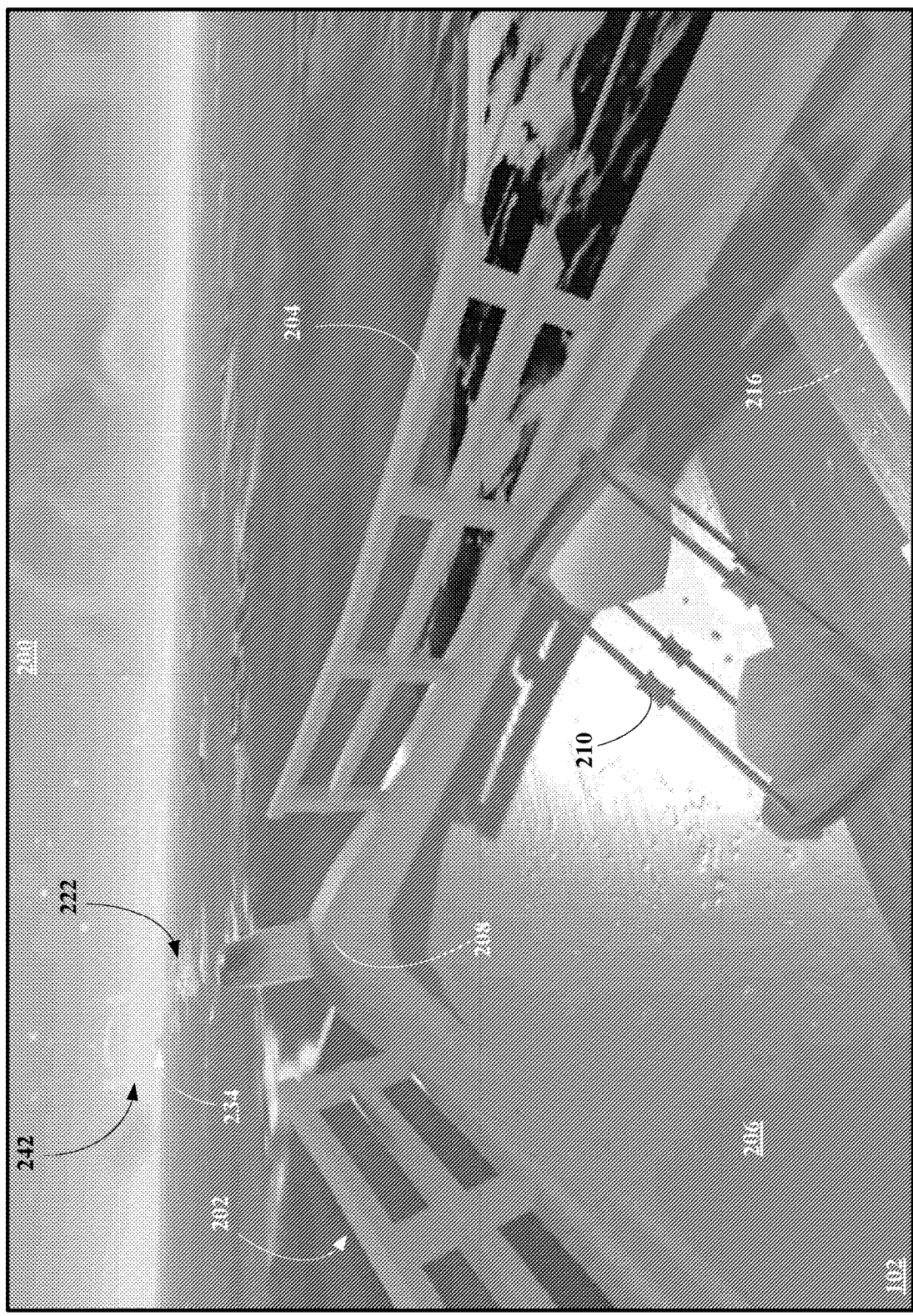
Figure 2B:
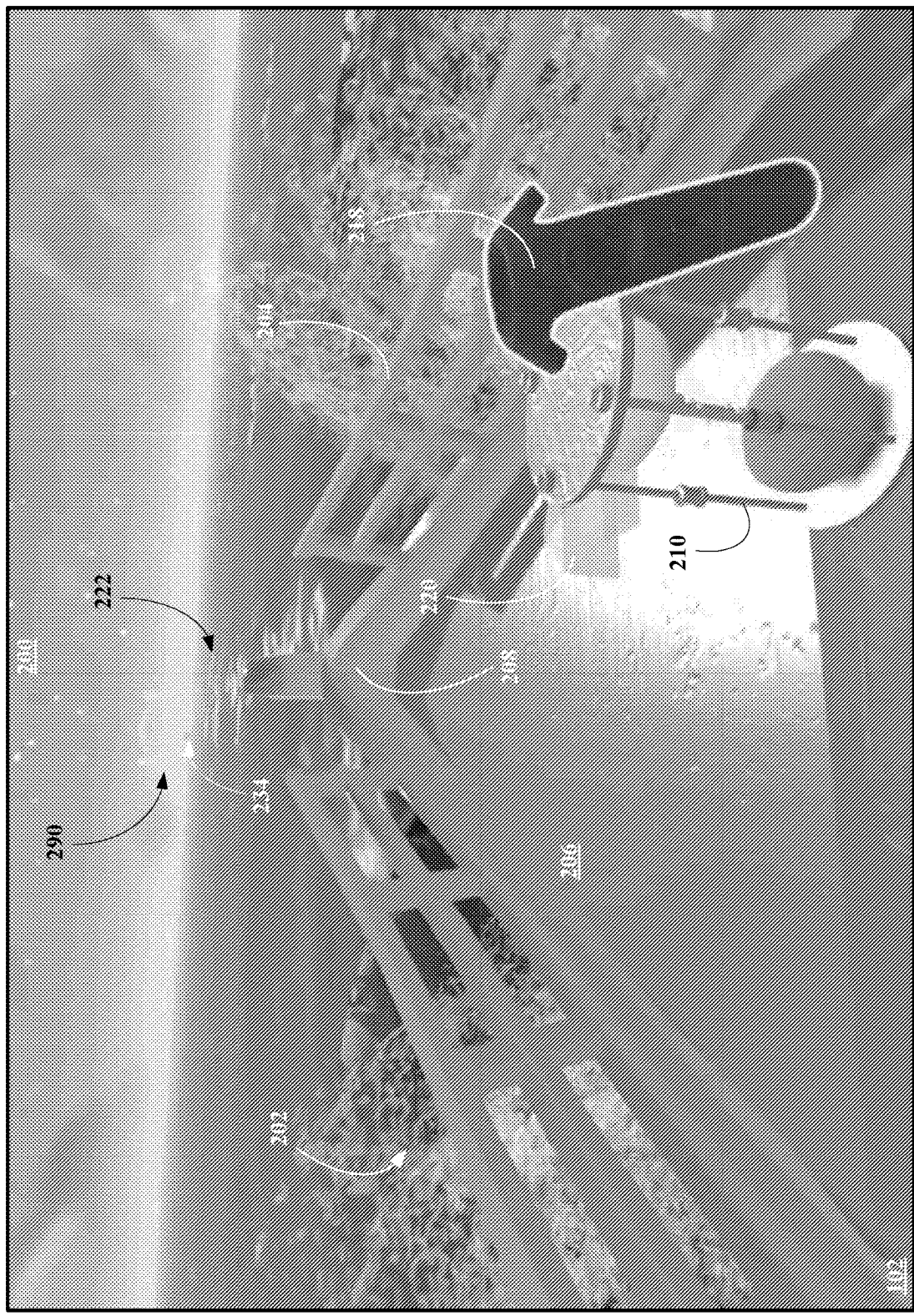
Figure 2B:
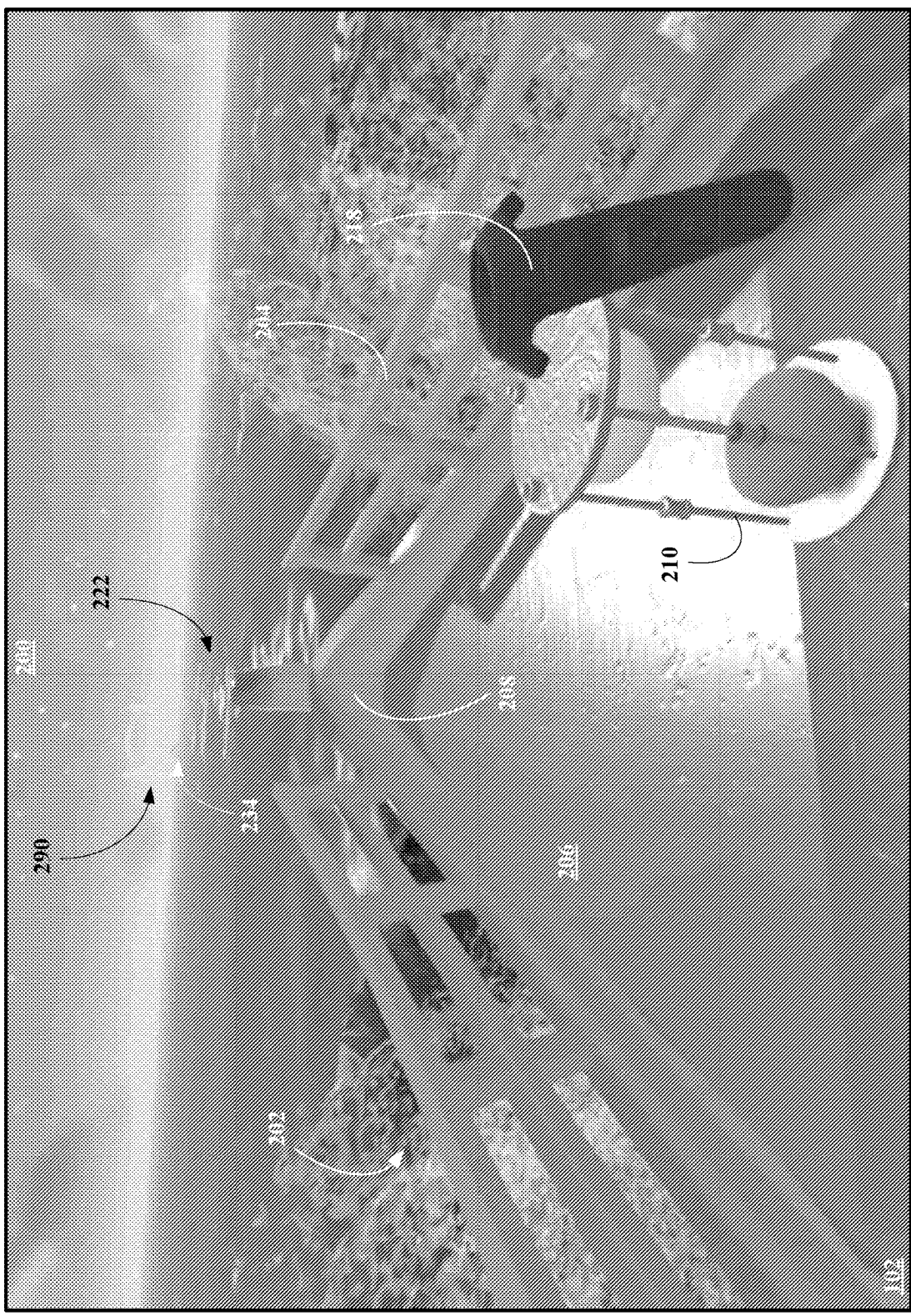
Figure 2B:
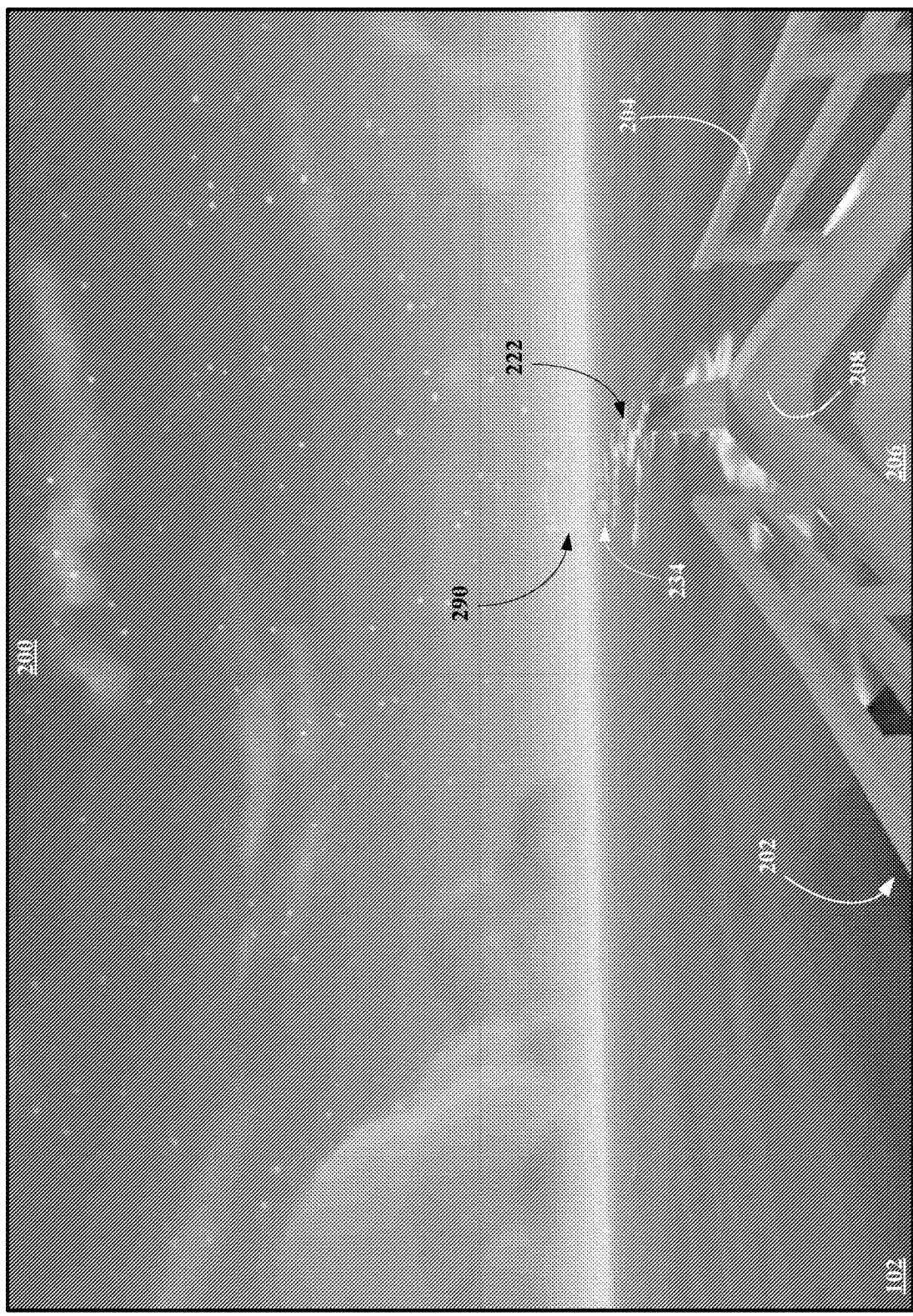
Figure 2B:
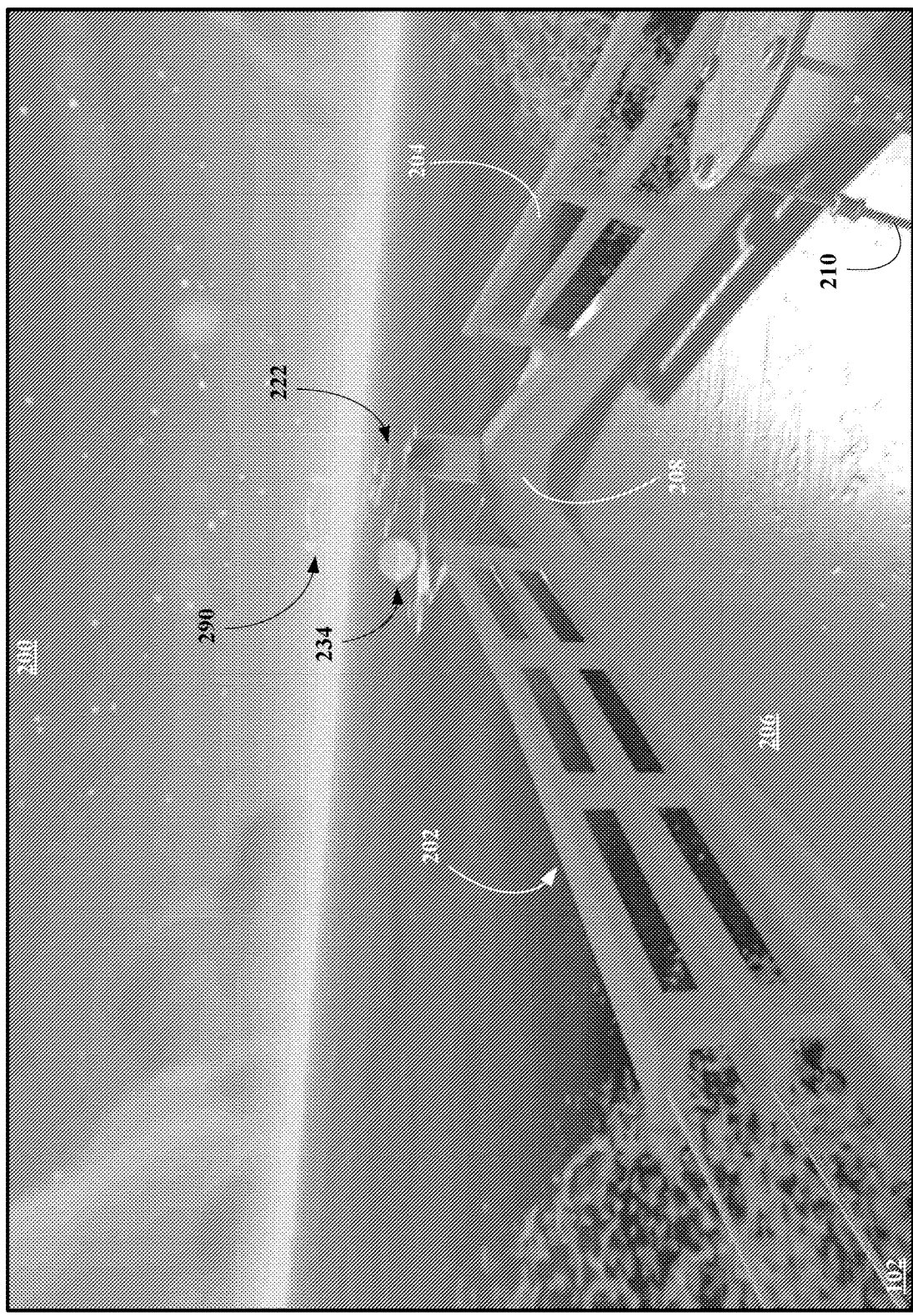
Figure 2B:
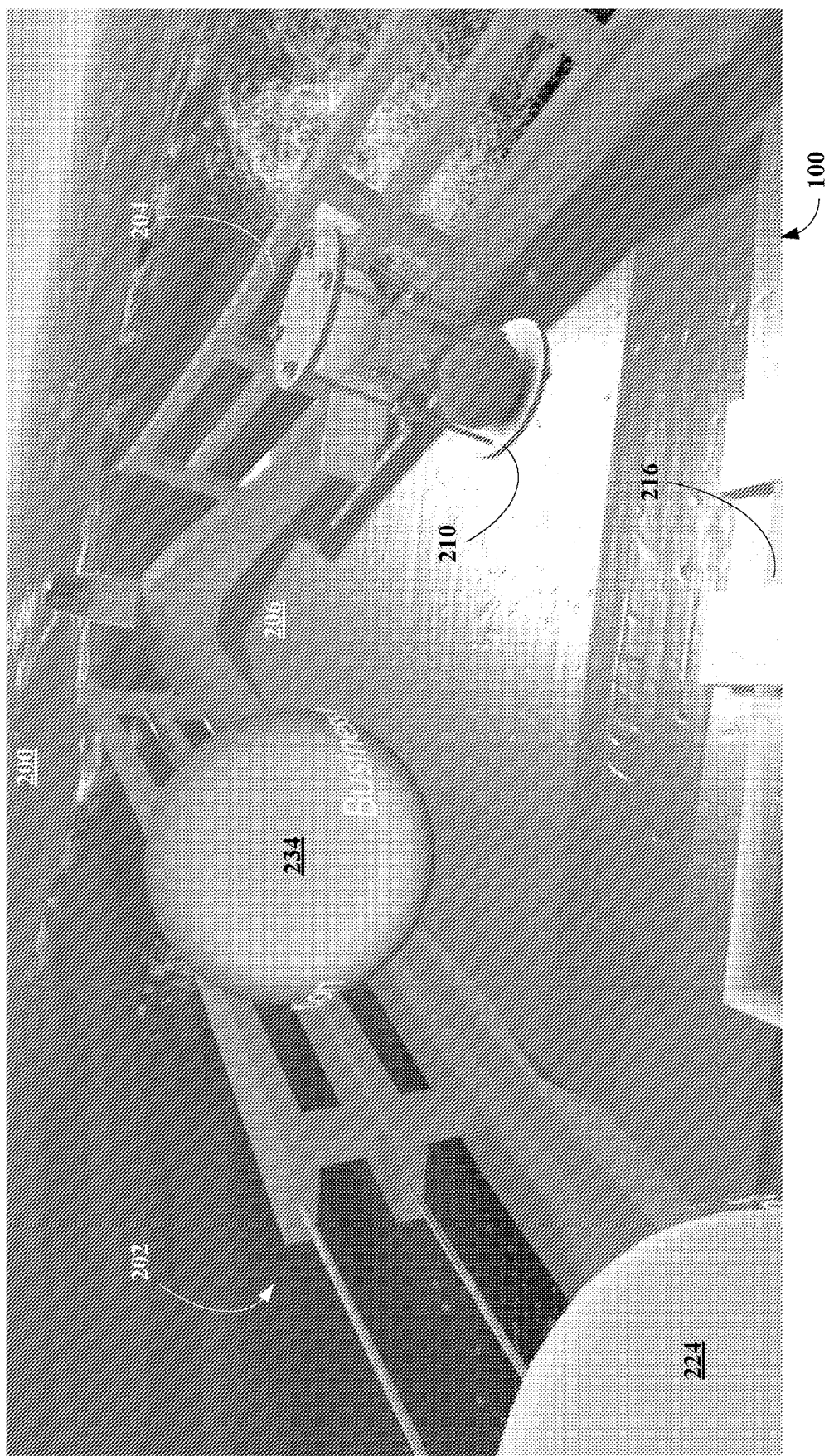
Figure 2B:
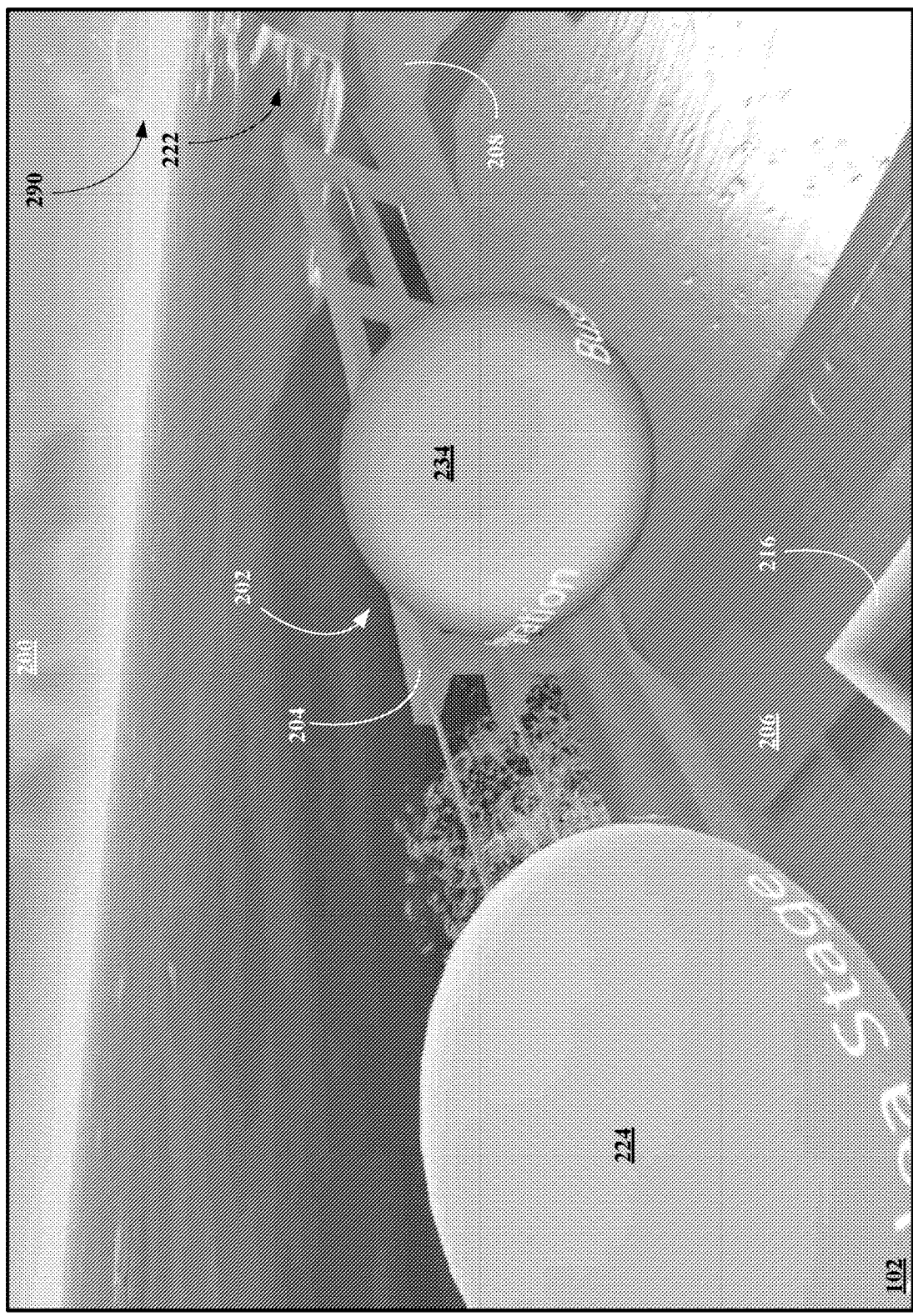
Figure 2B:
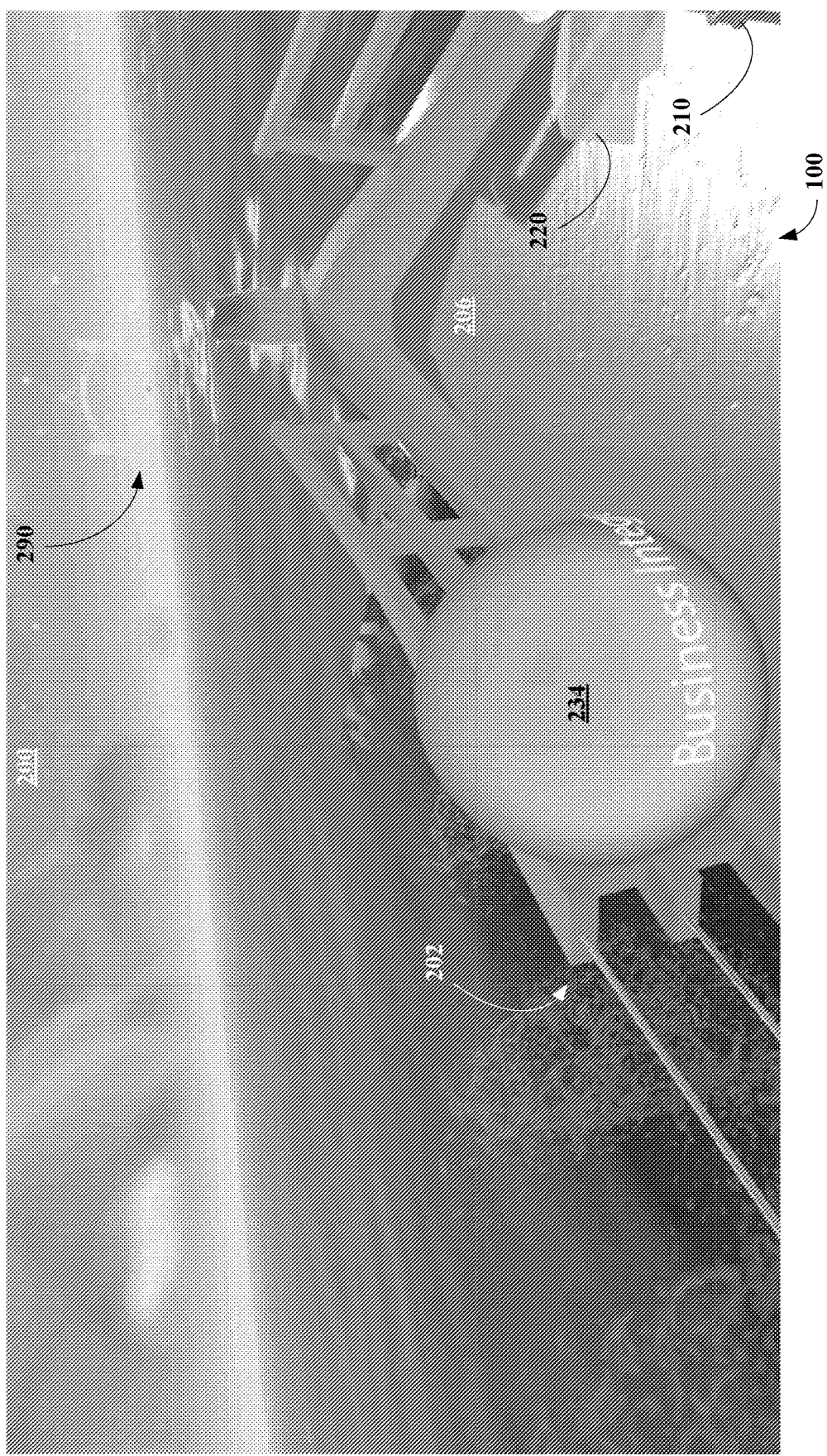
Figure 2B:
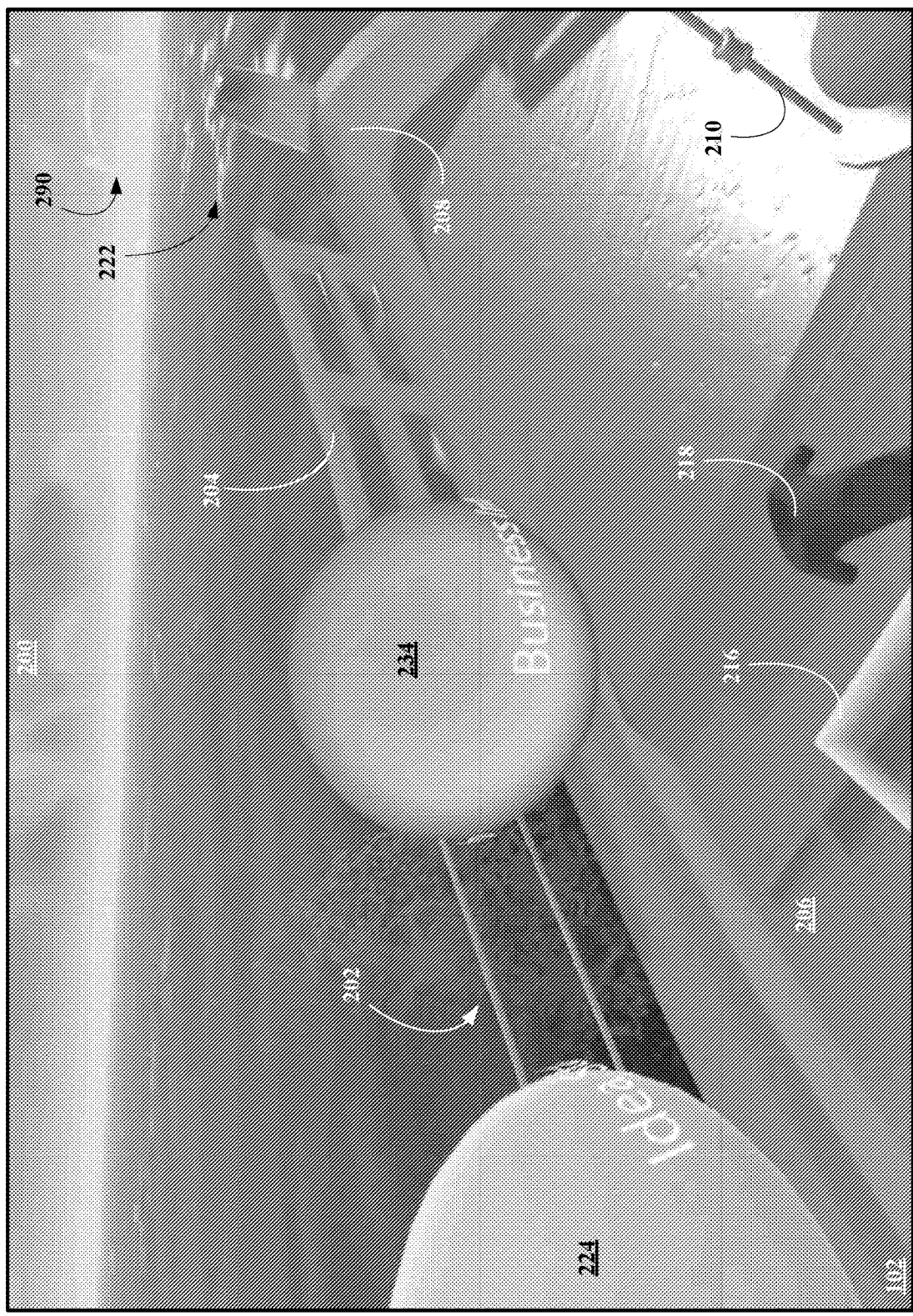
Figure 2B:
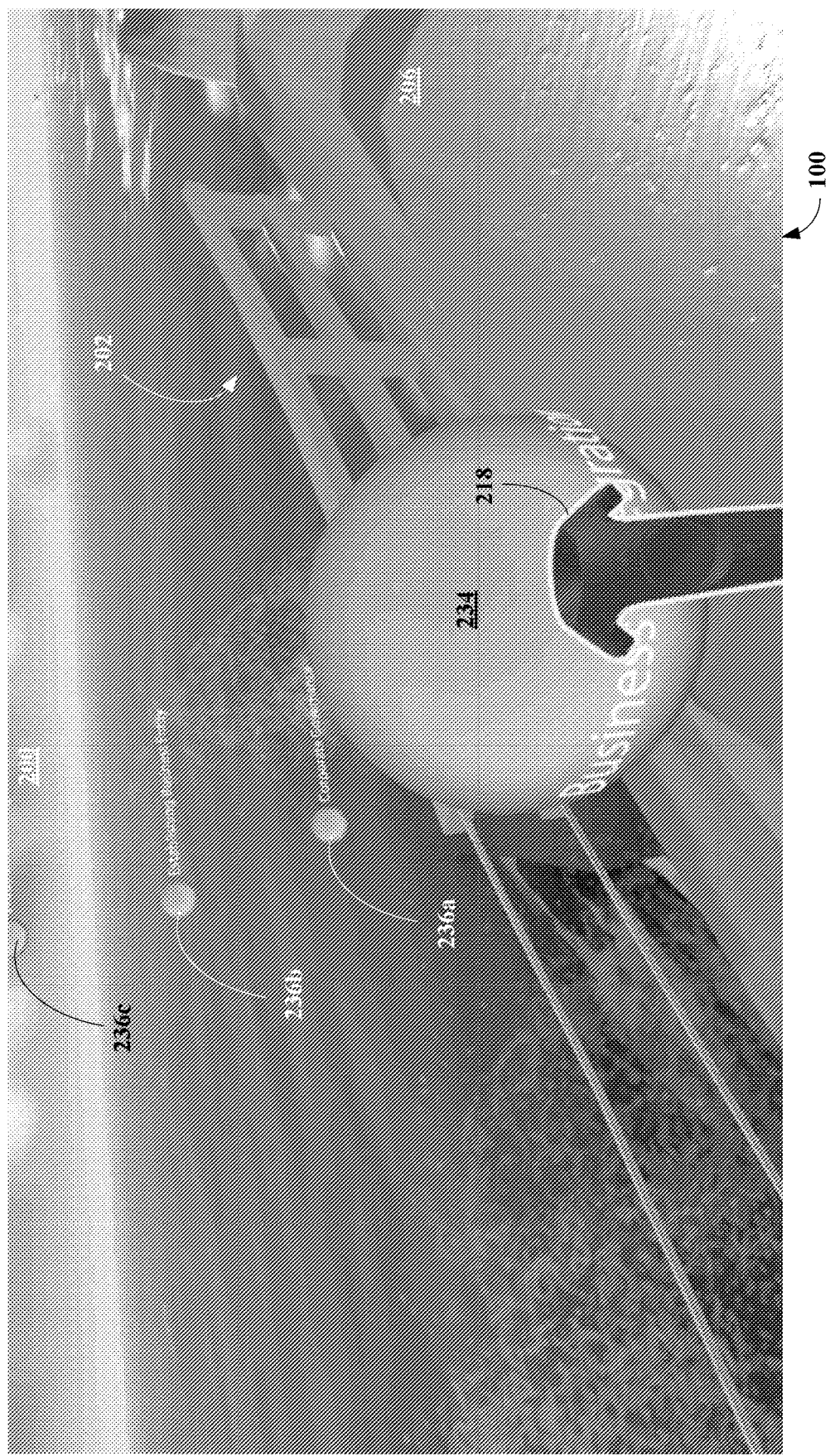
Figure 2B:
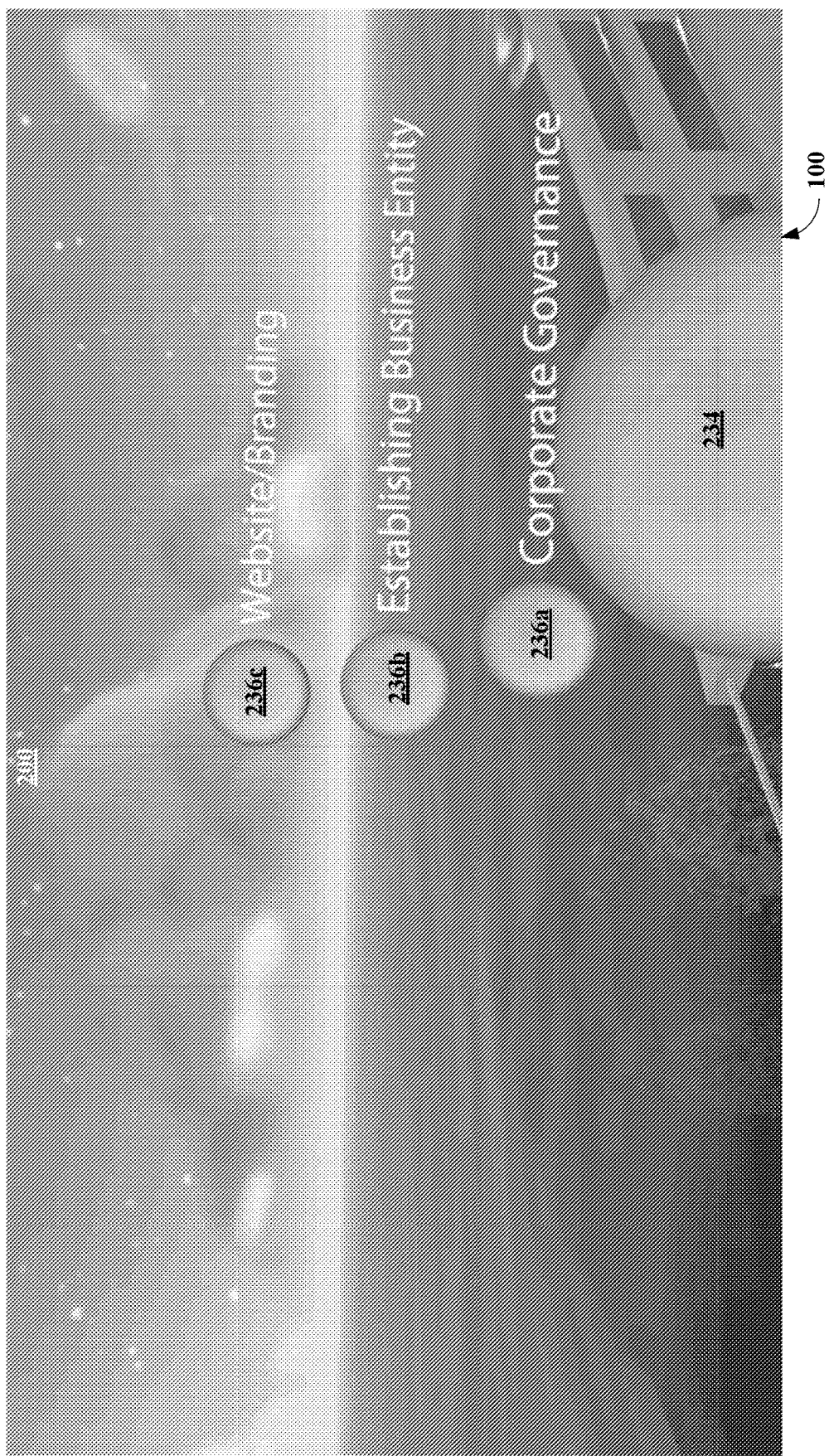
Figure 2B:
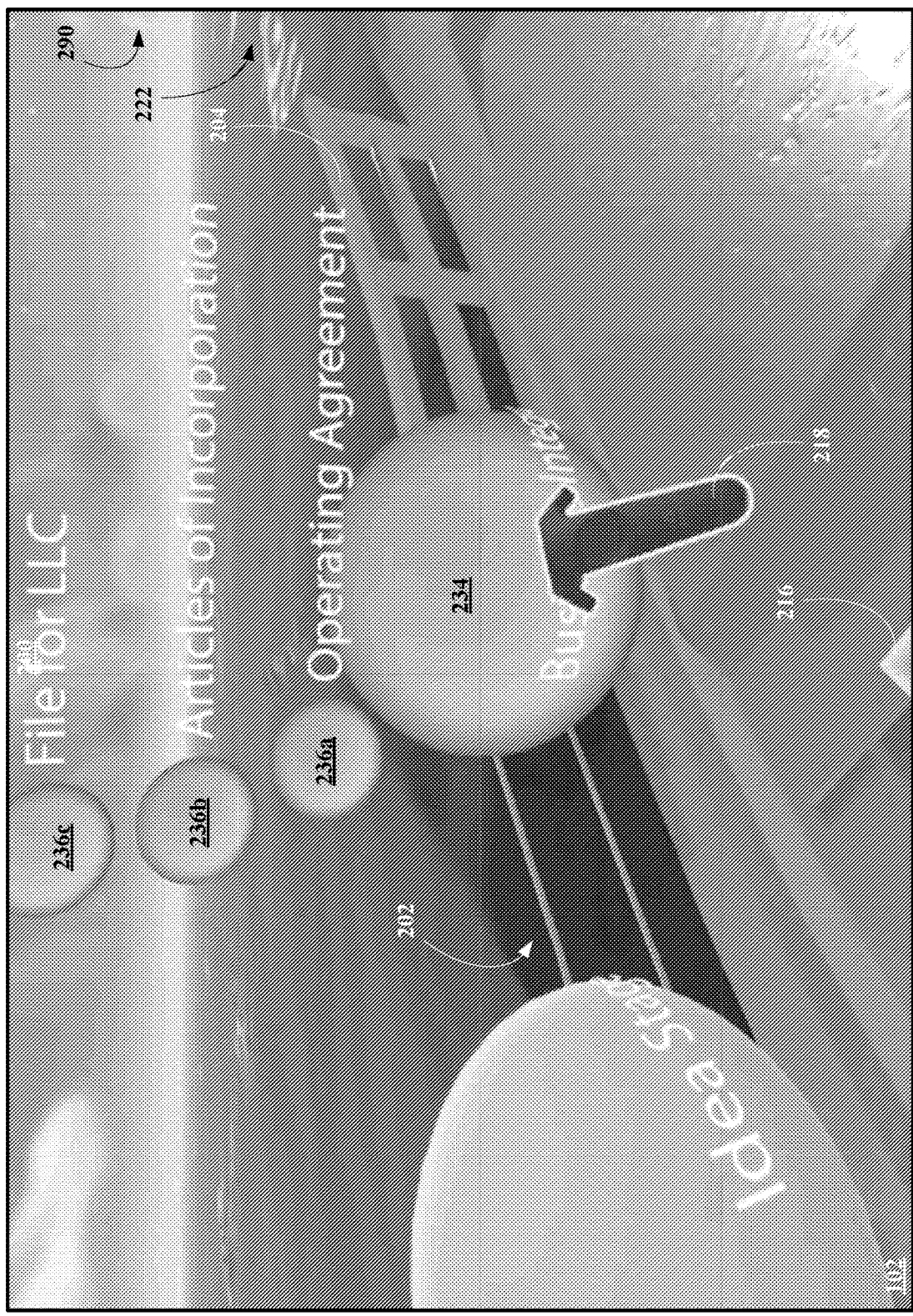
Figure 2B:
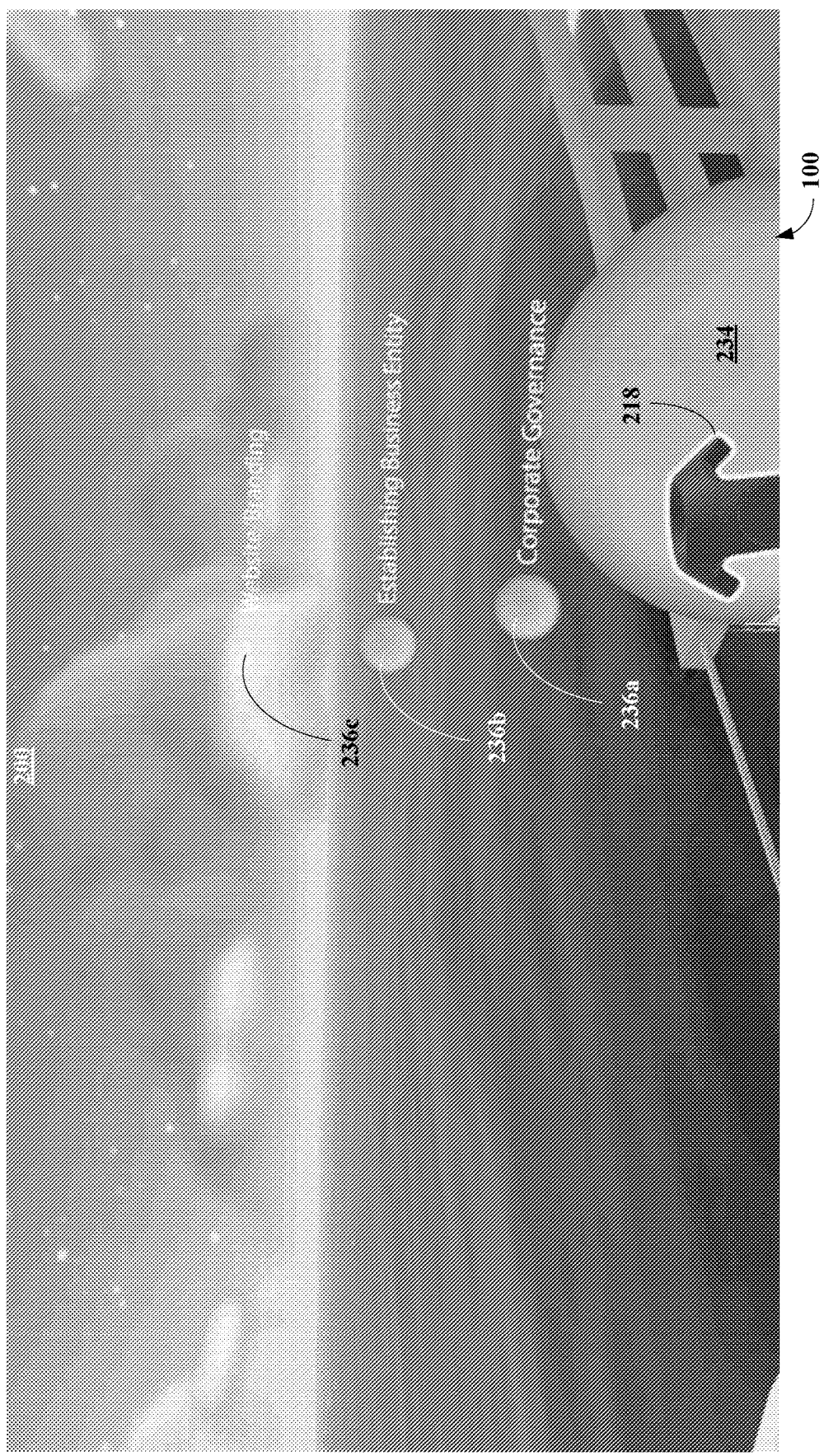
Figure 2B:
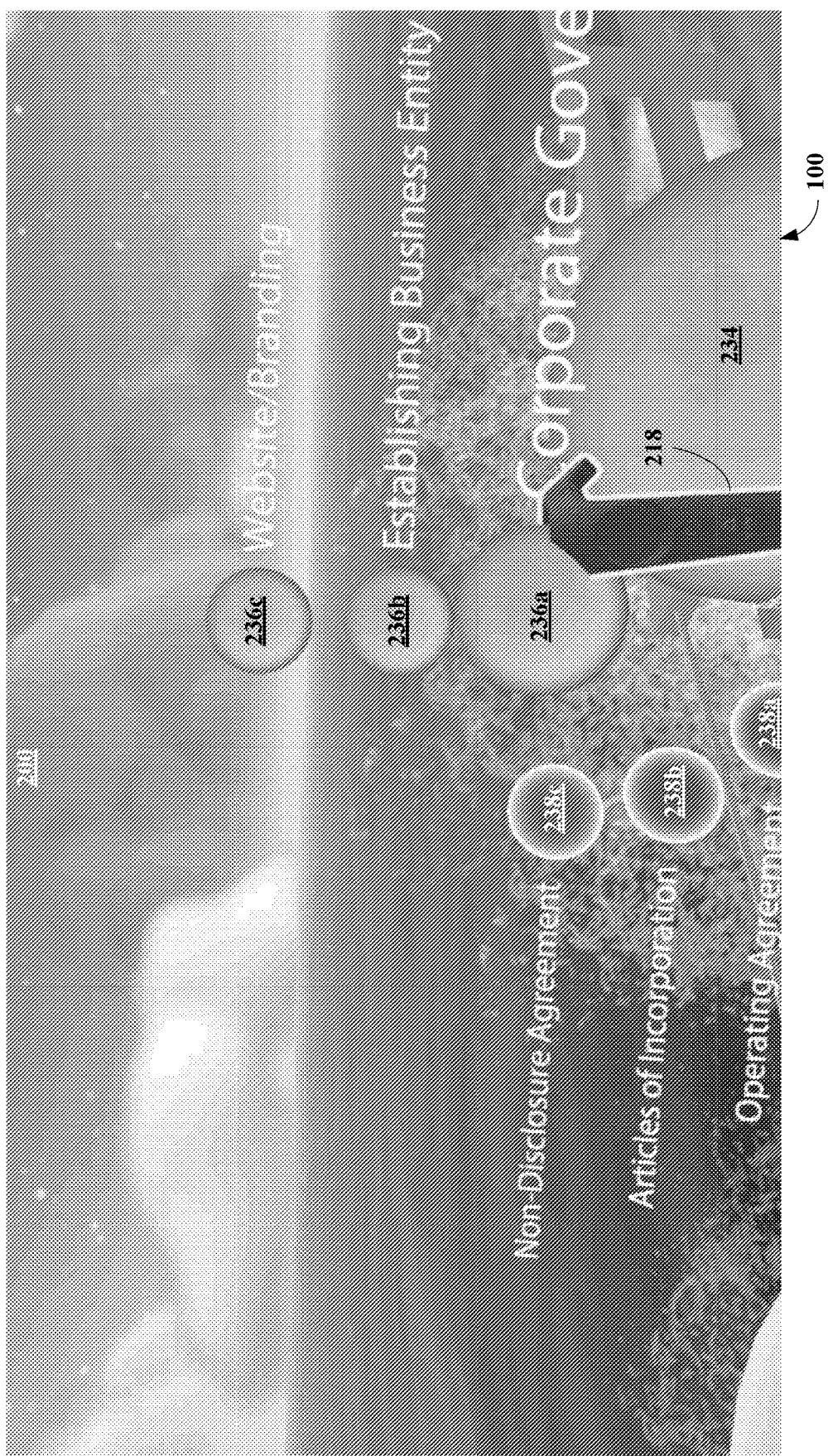
Figure 2B:
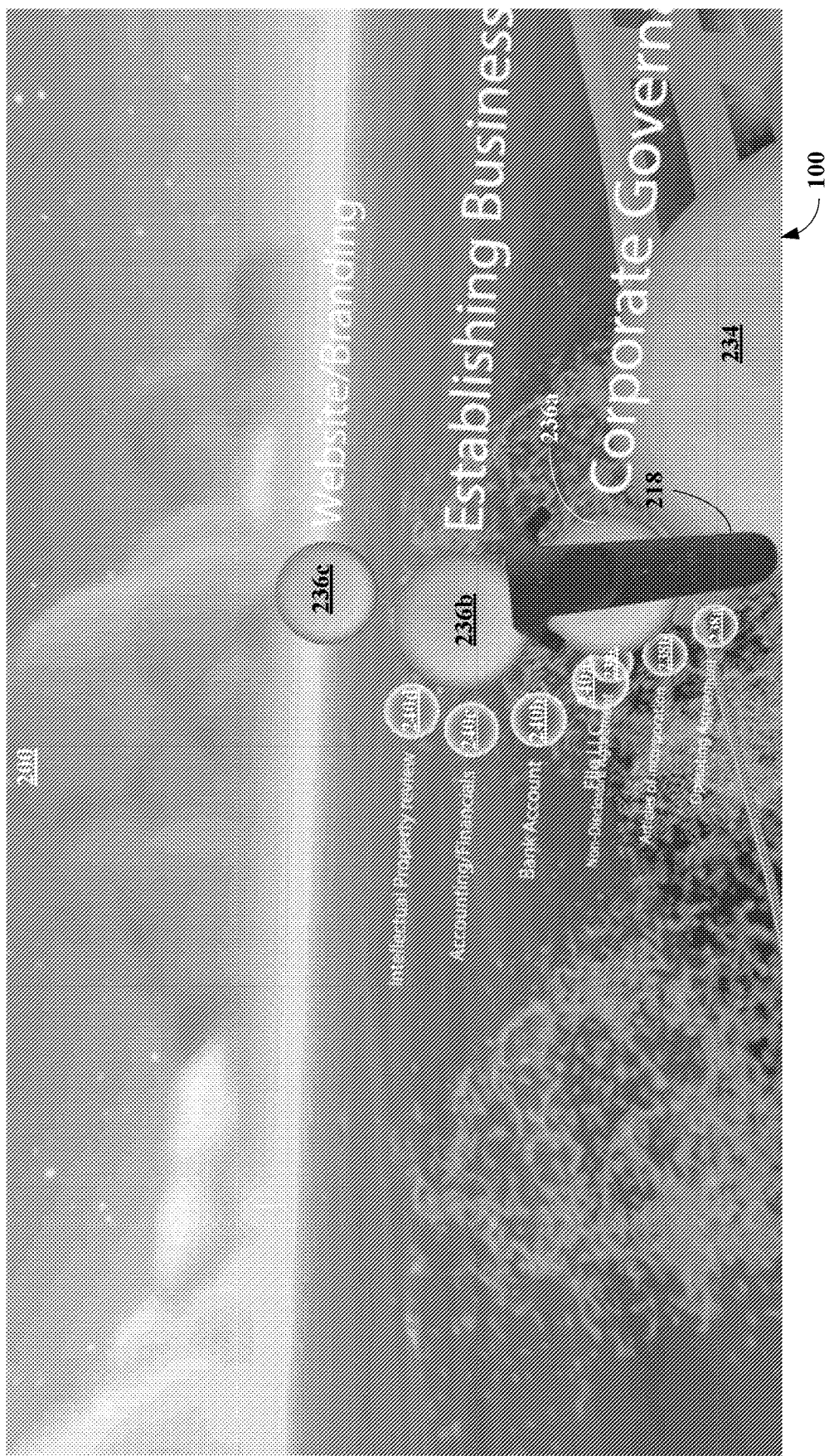
Figure 2B:
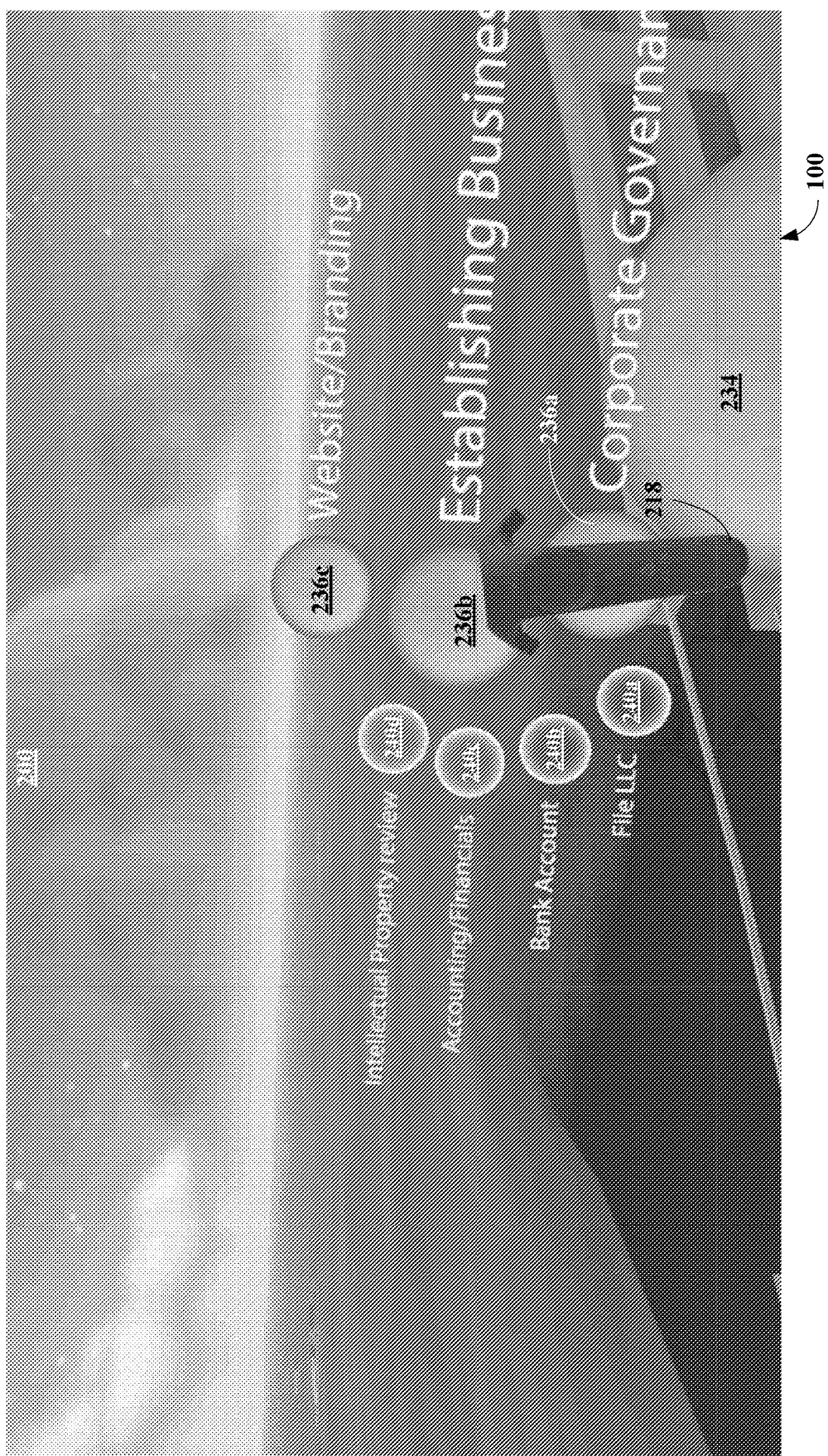
Figure 2B:
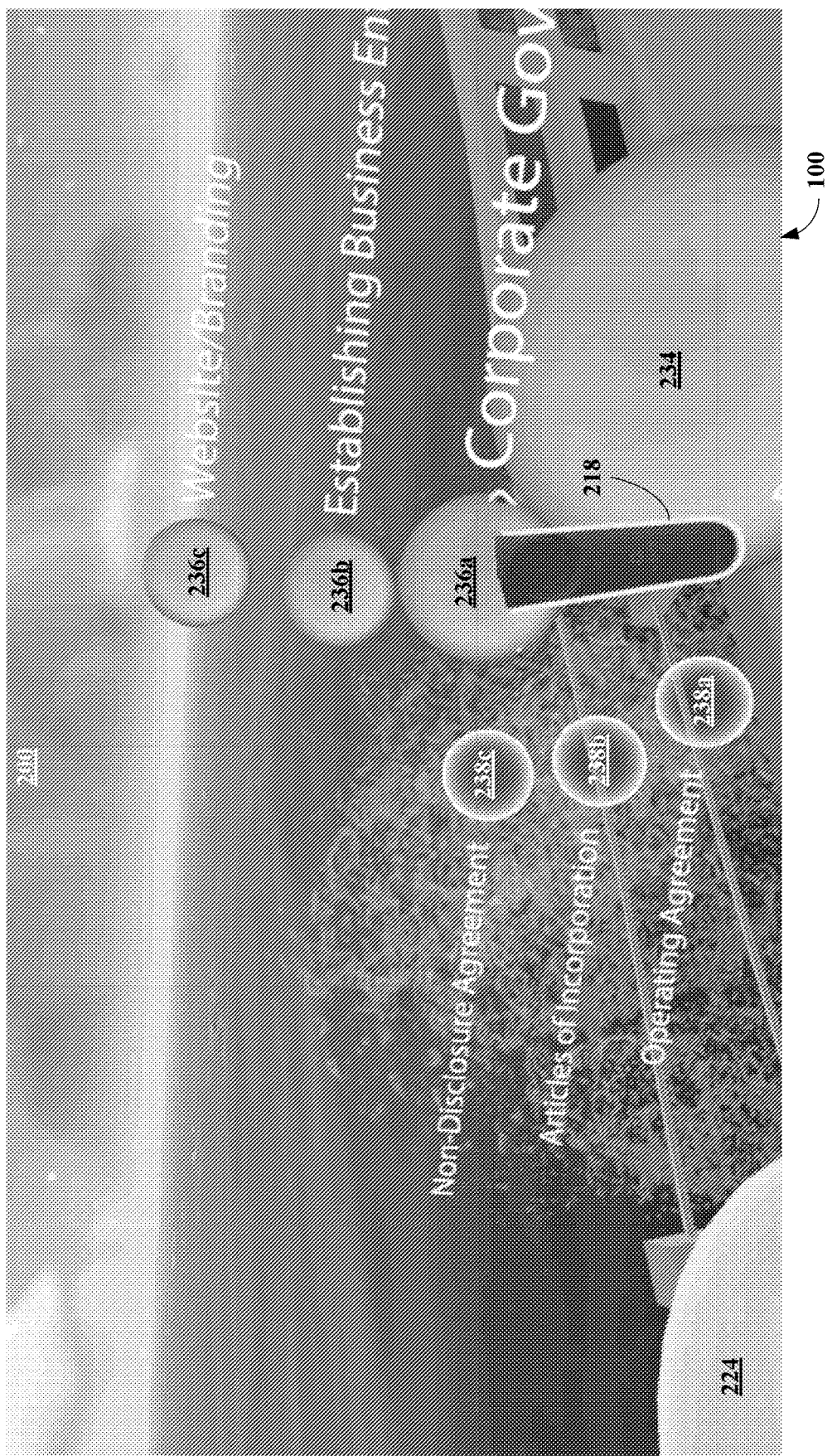
Figure 2B:
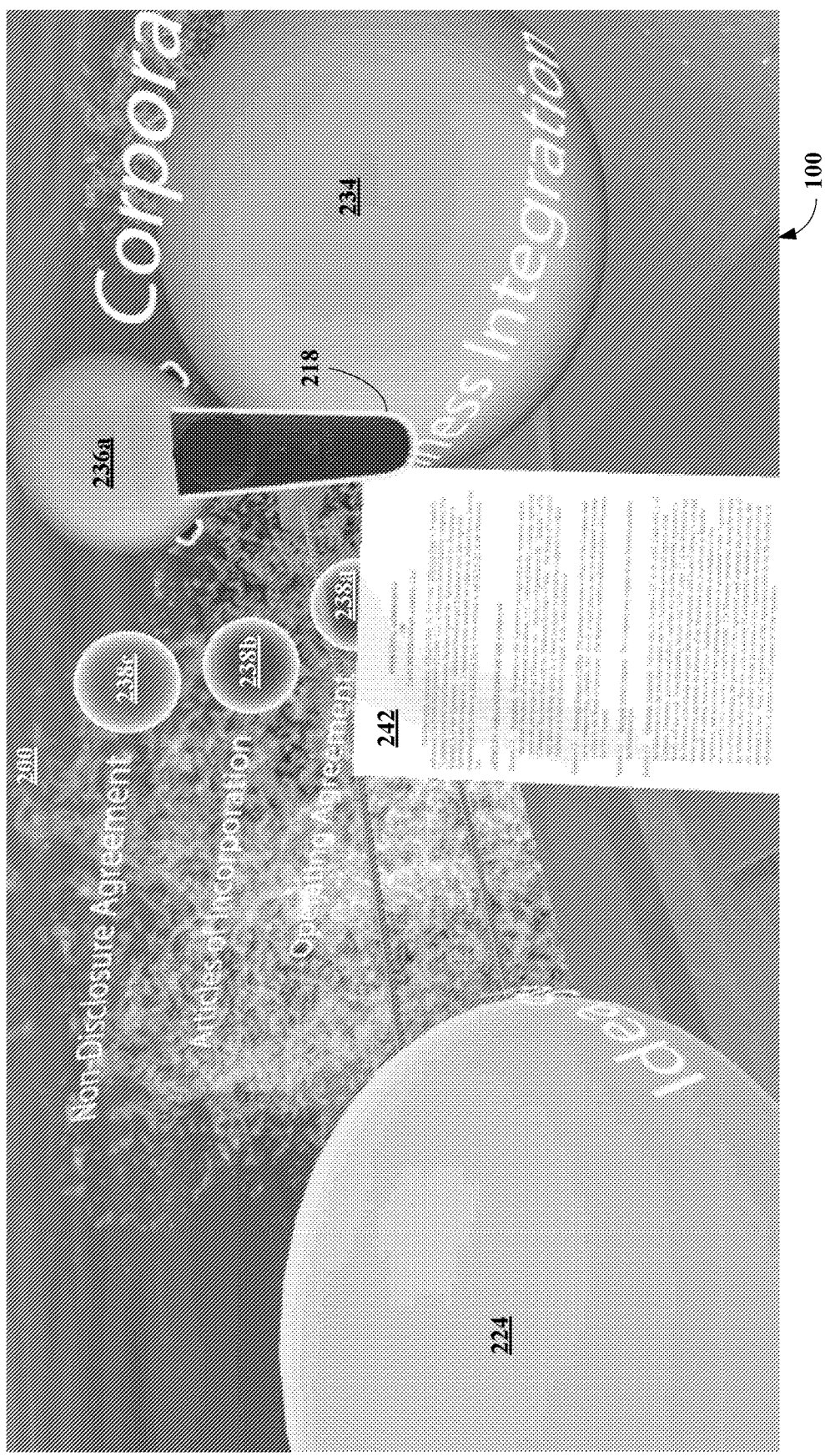
Figure 2B:
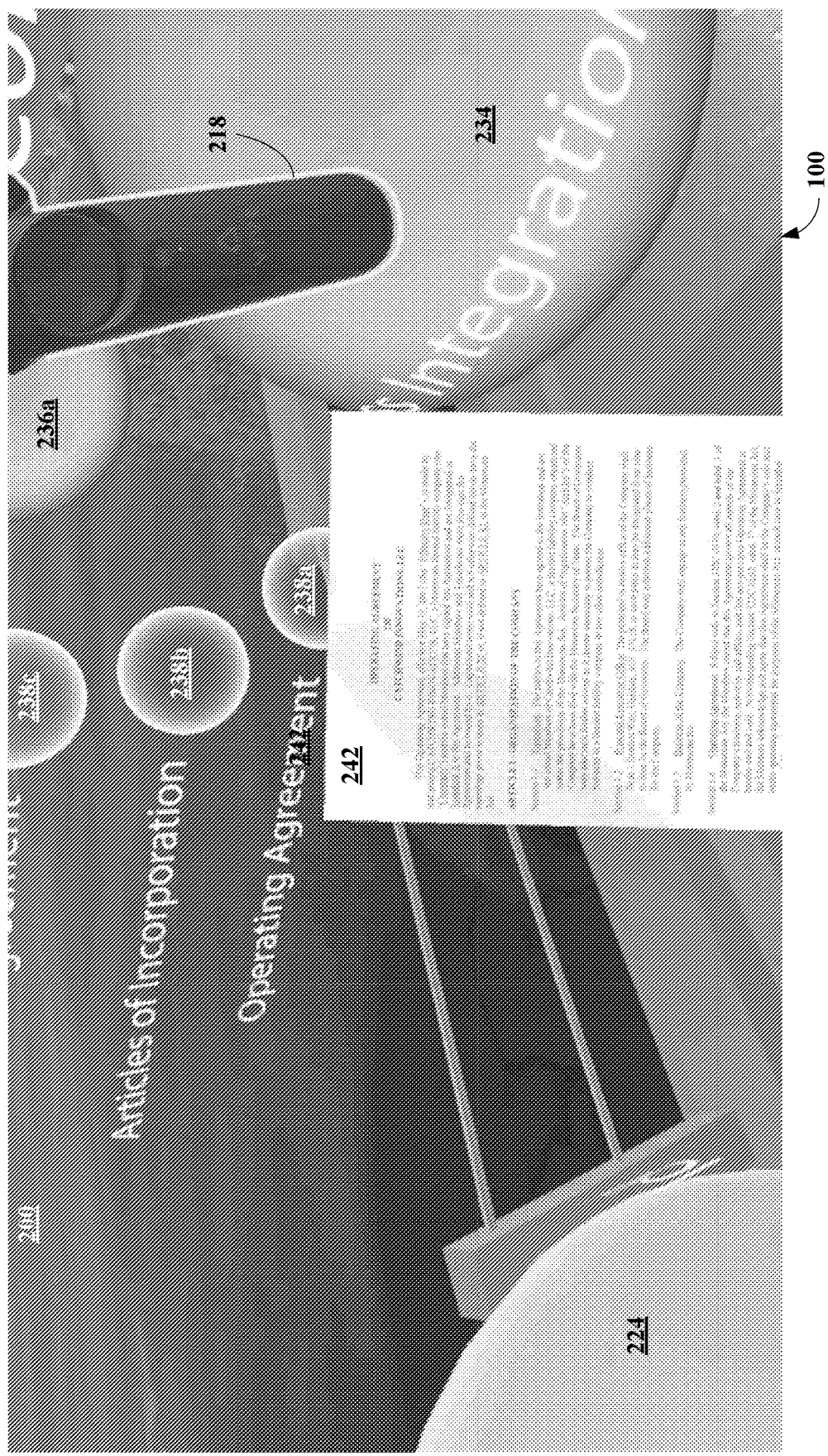
Figure 2B:
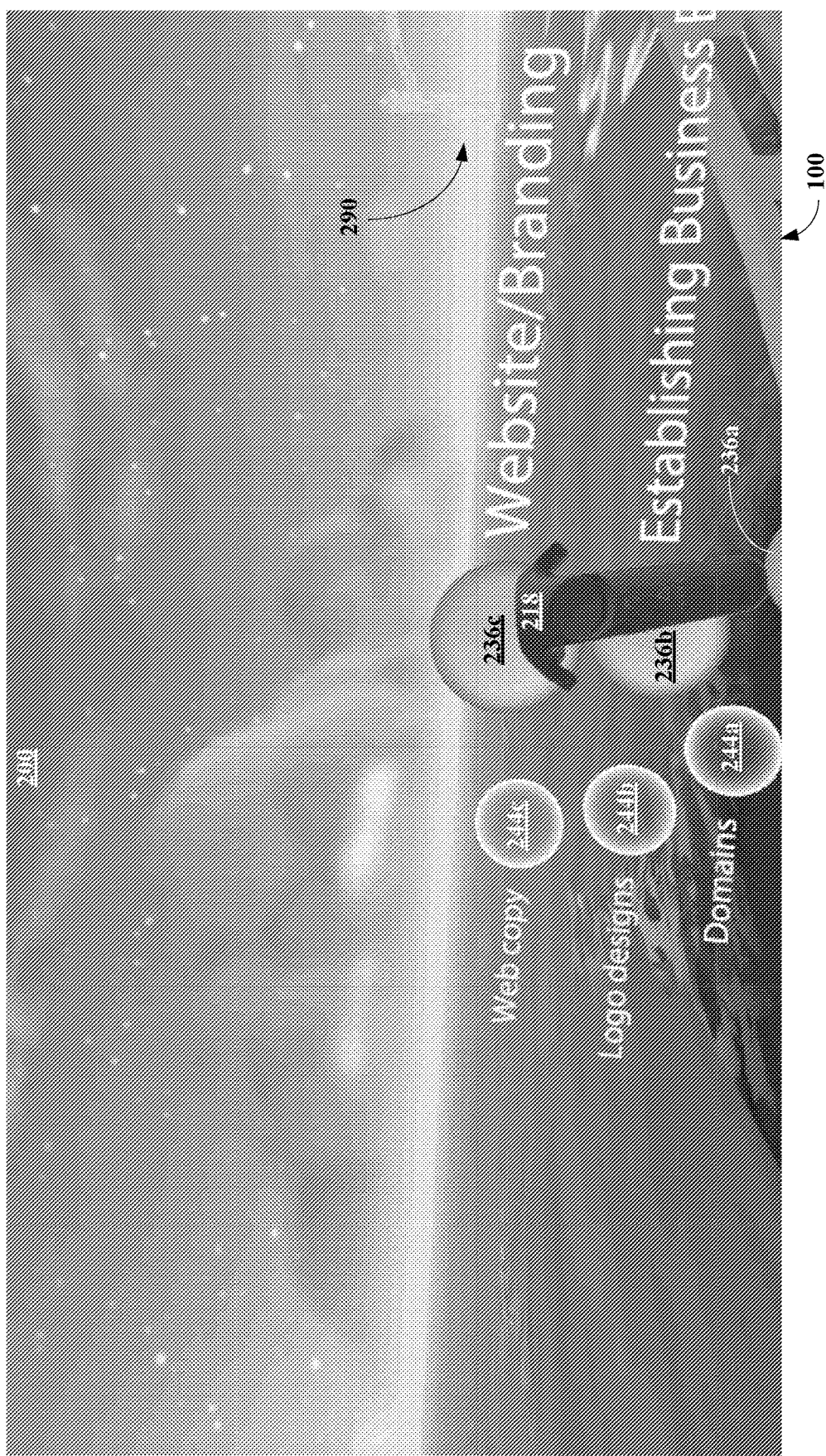
Figure 2B:
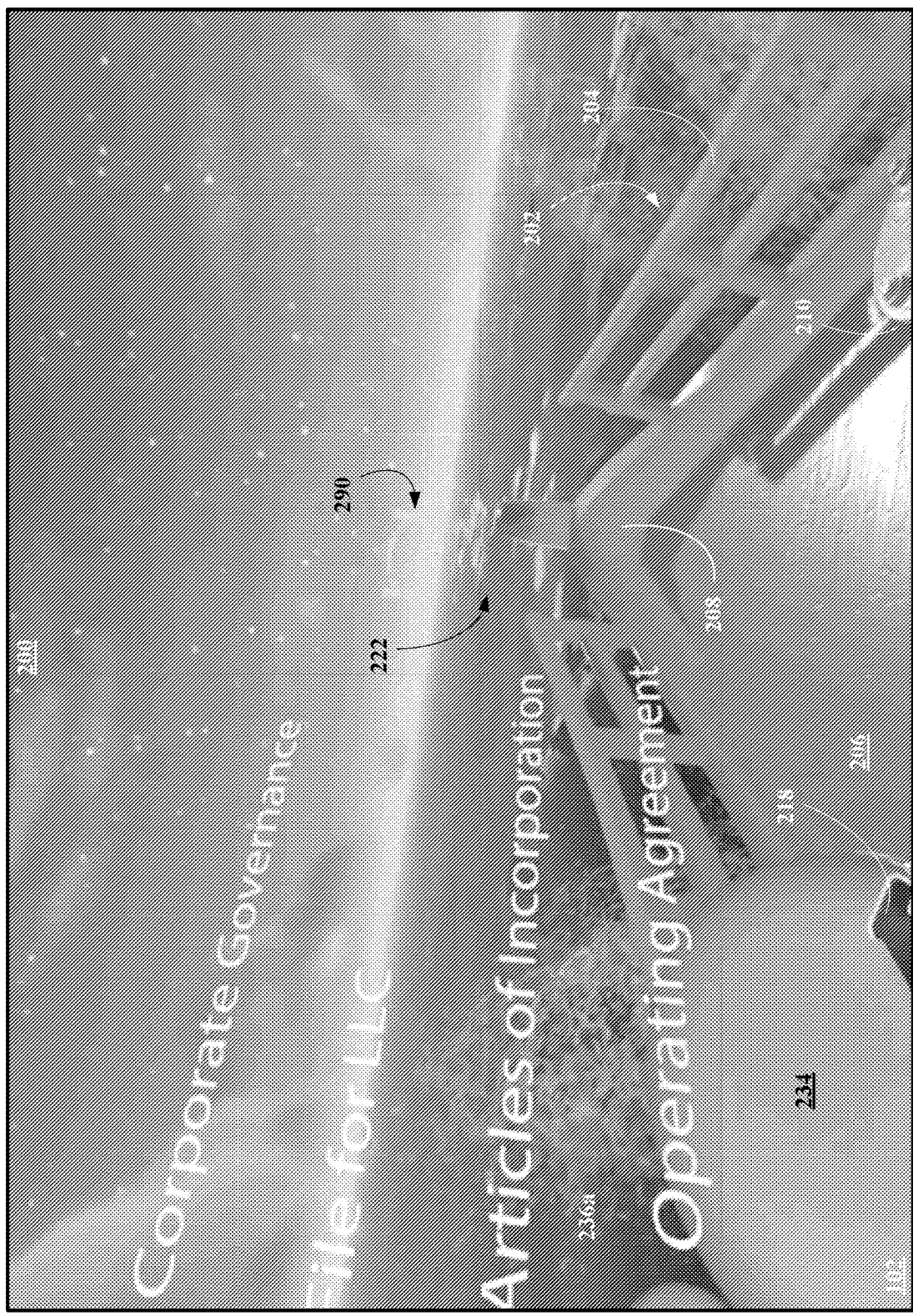
Figure 2B:
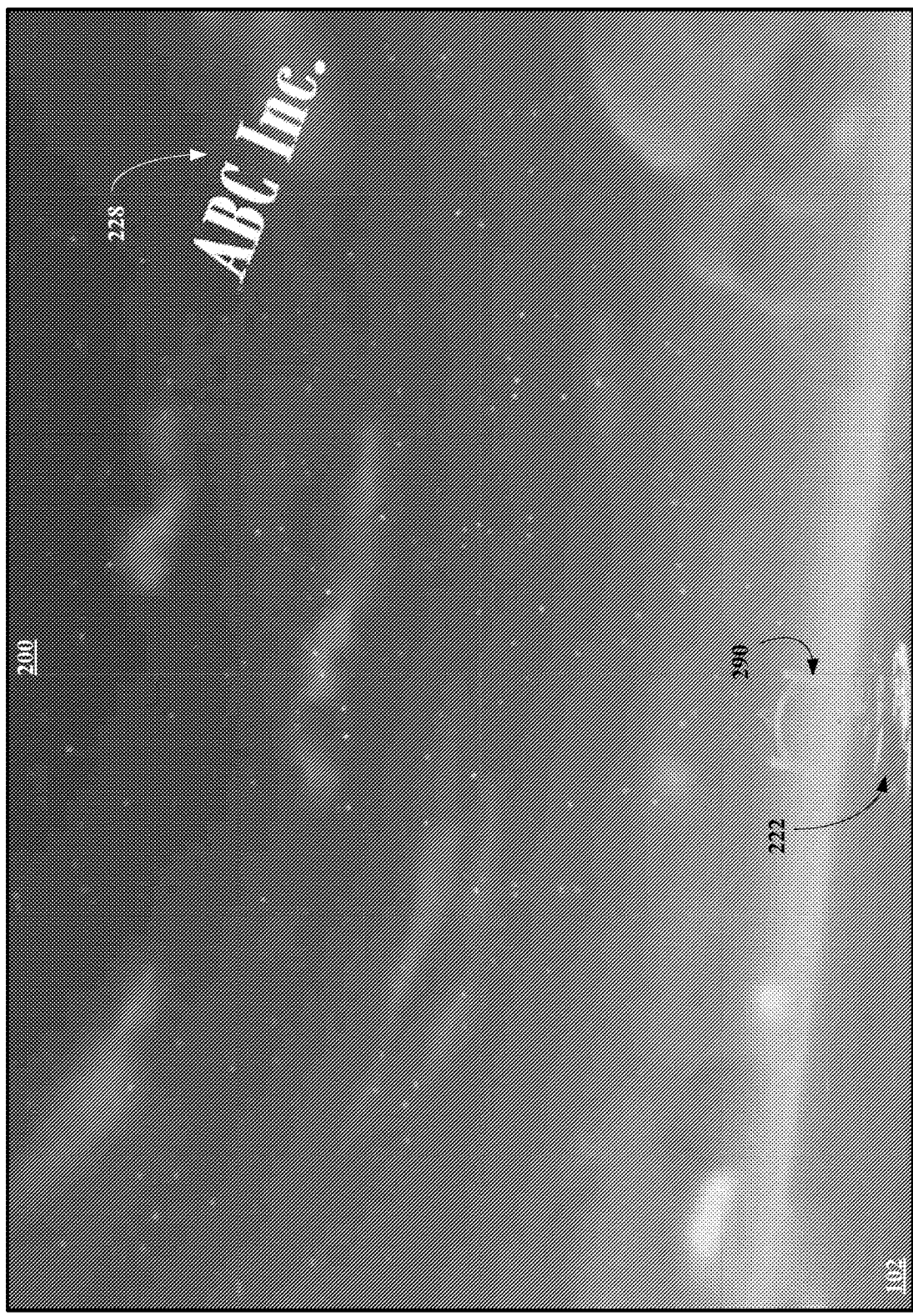
Figure 2B:
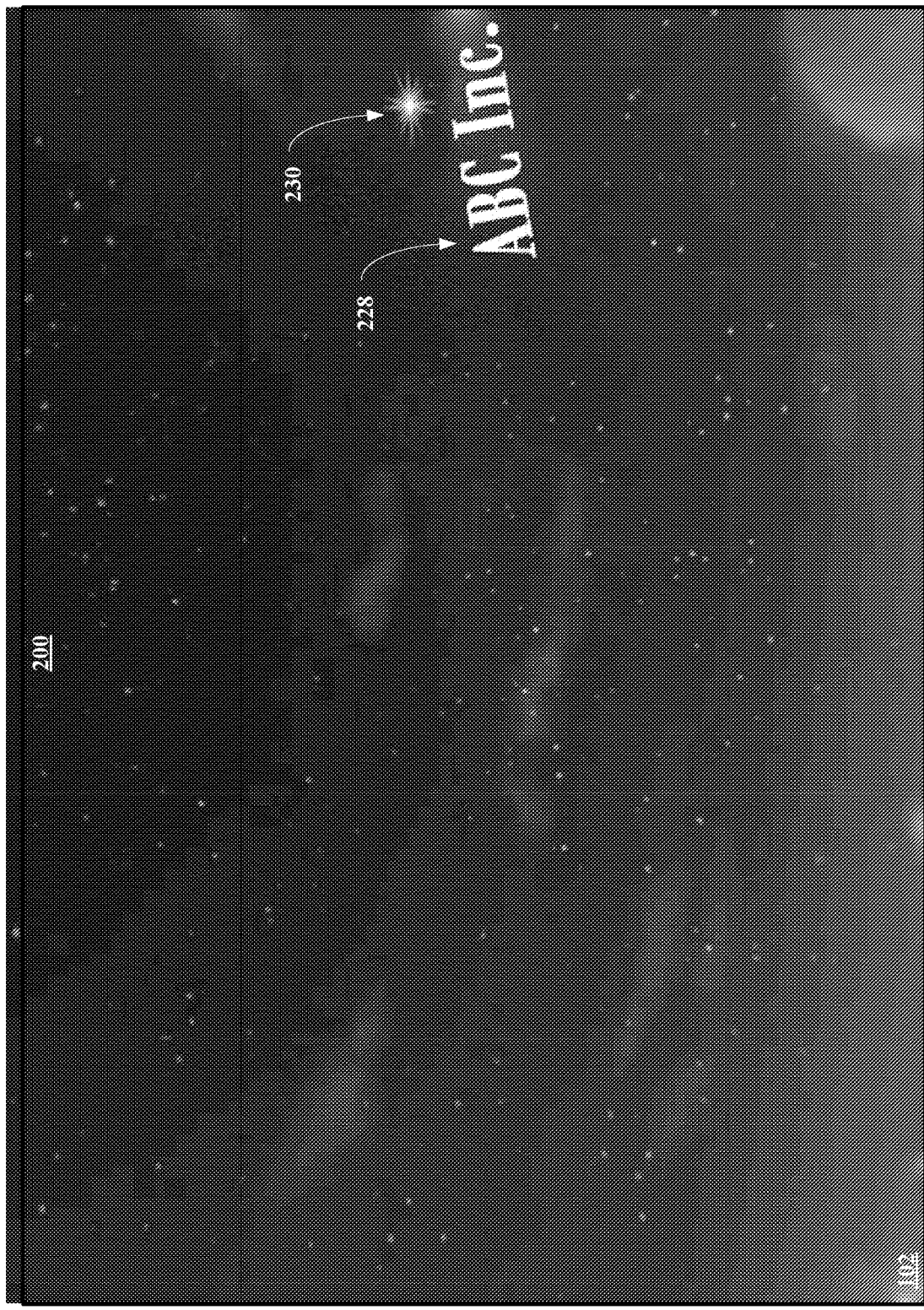
Figure 2B:
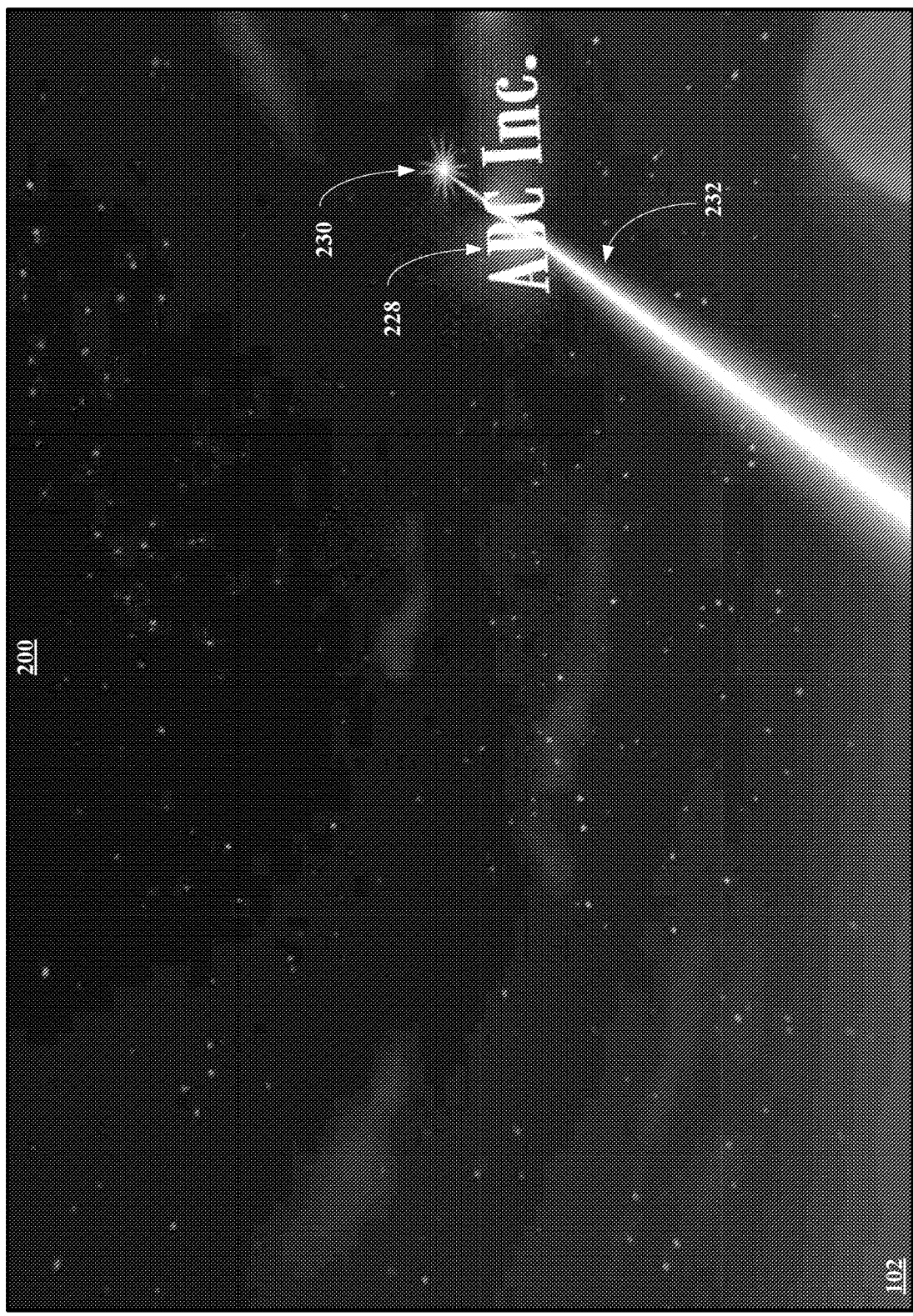
Figure 2B:
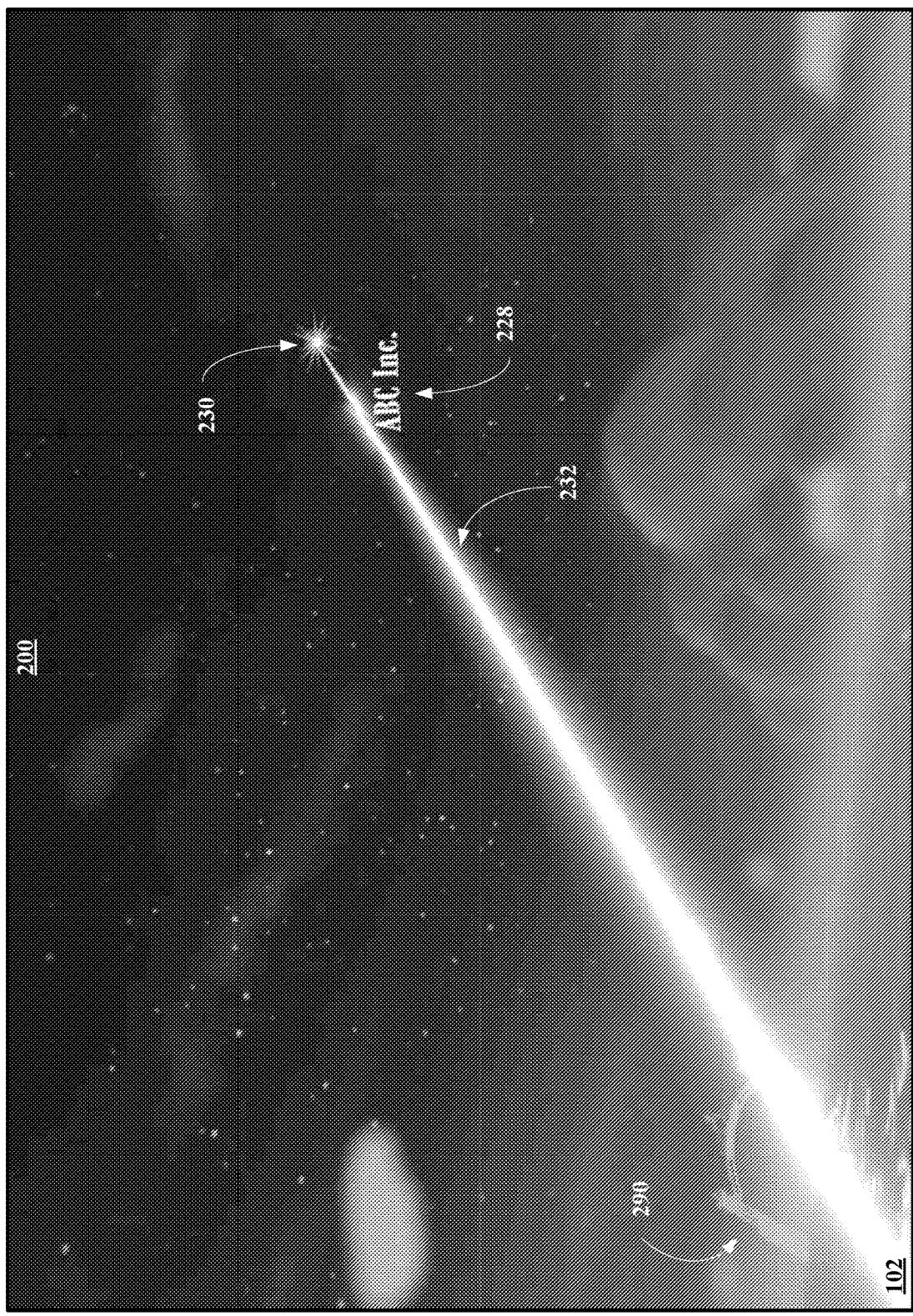
Figure 2B:
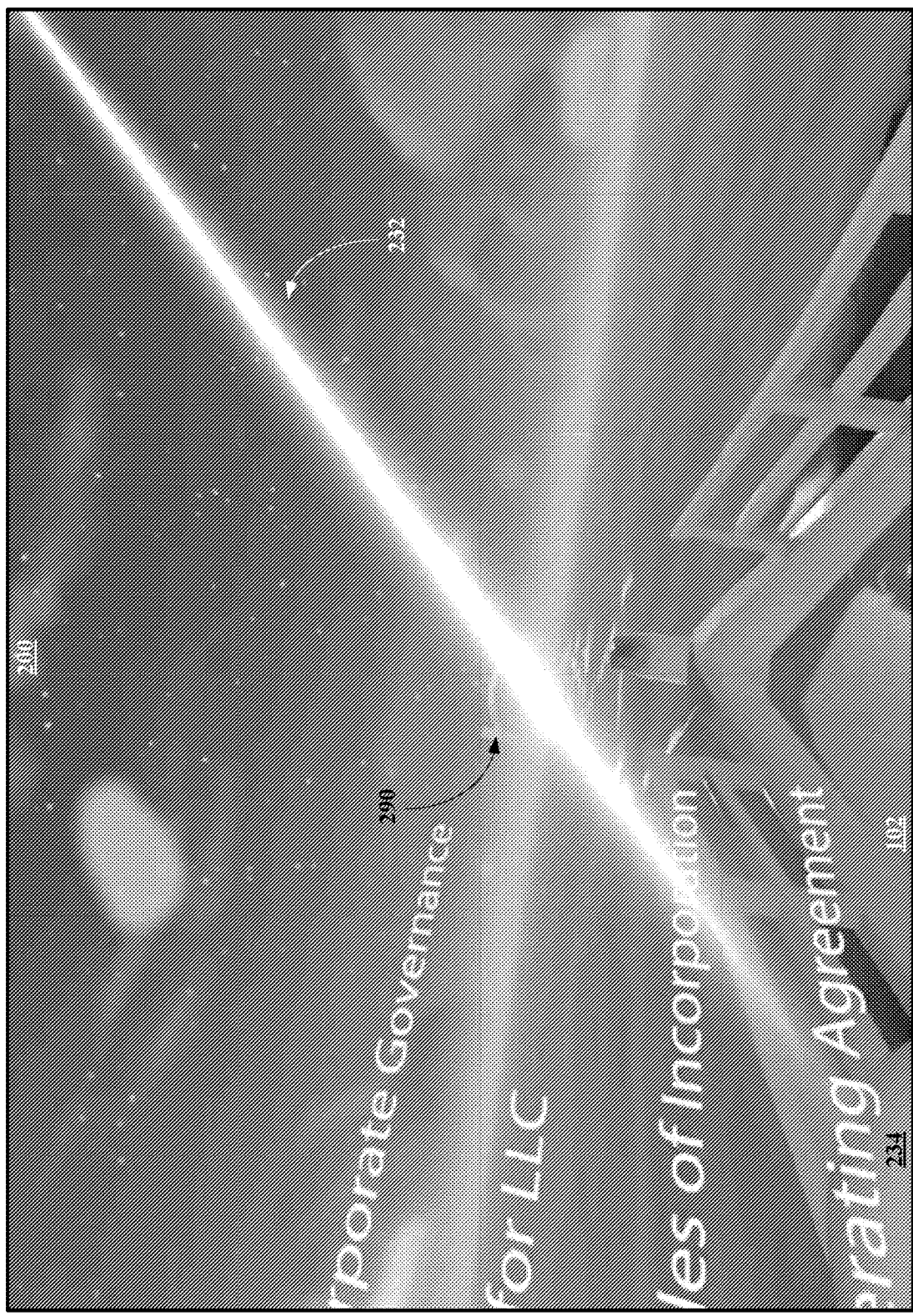
Figure 2B:
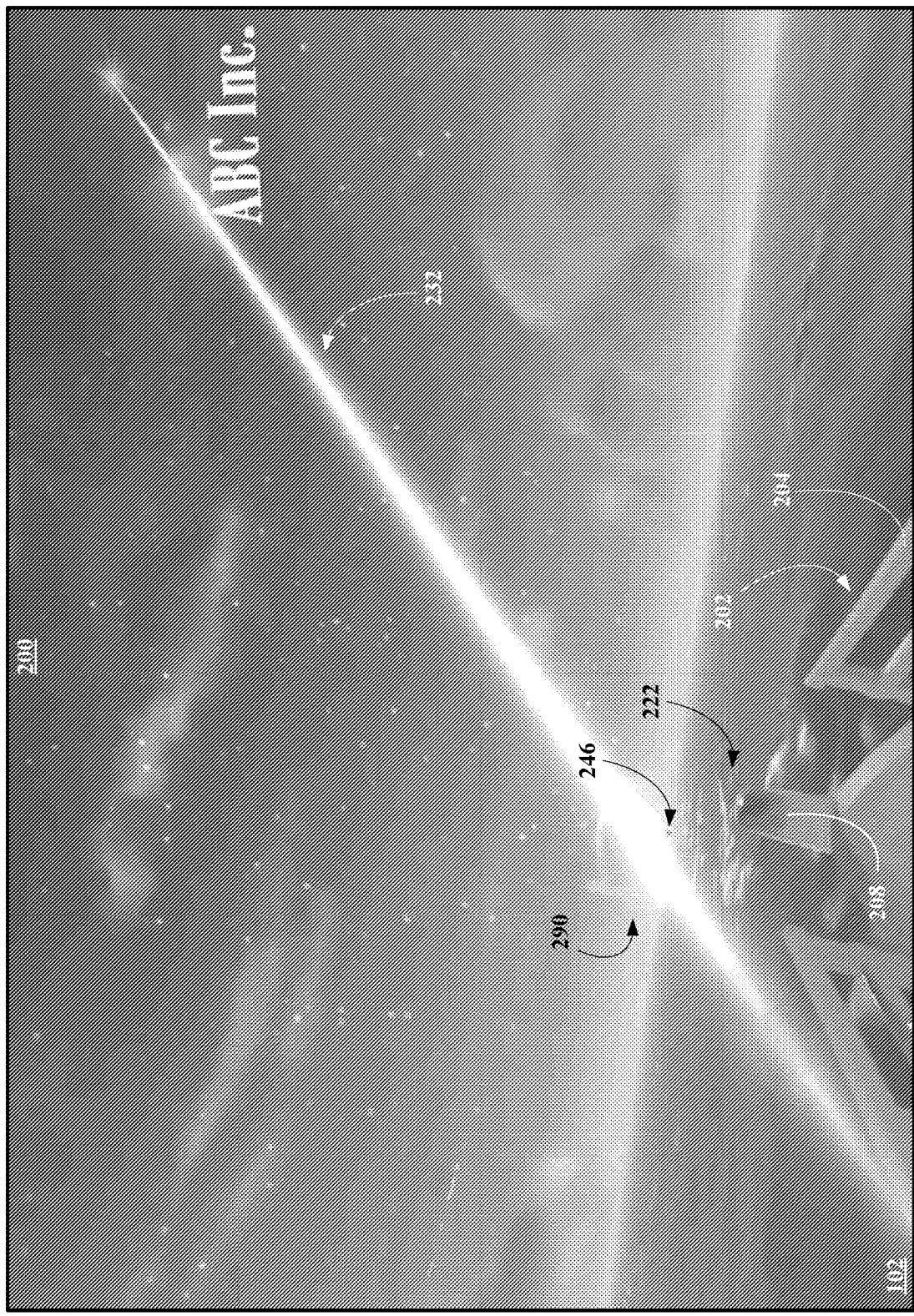
Figure 2C:
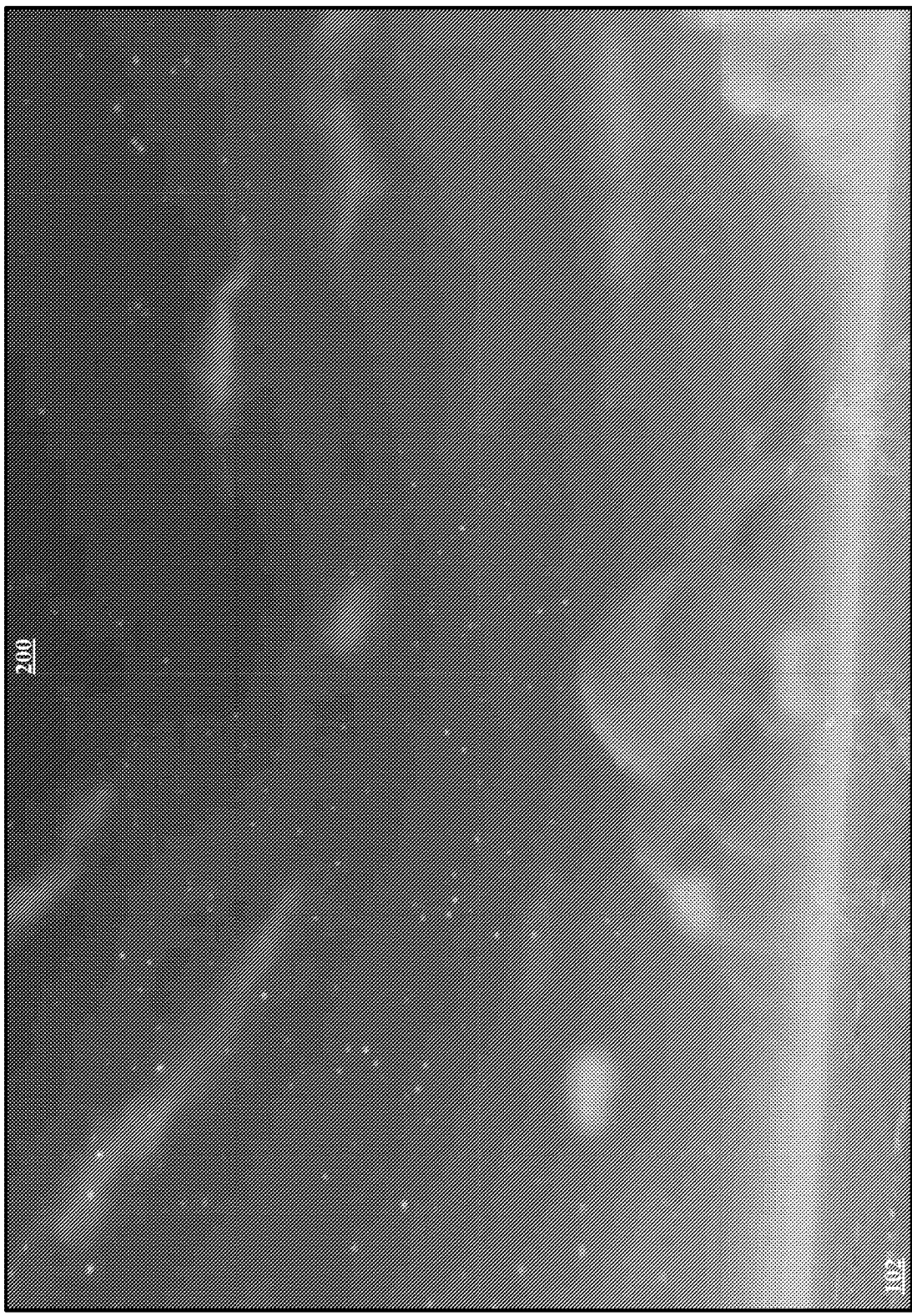
Figure 2C:
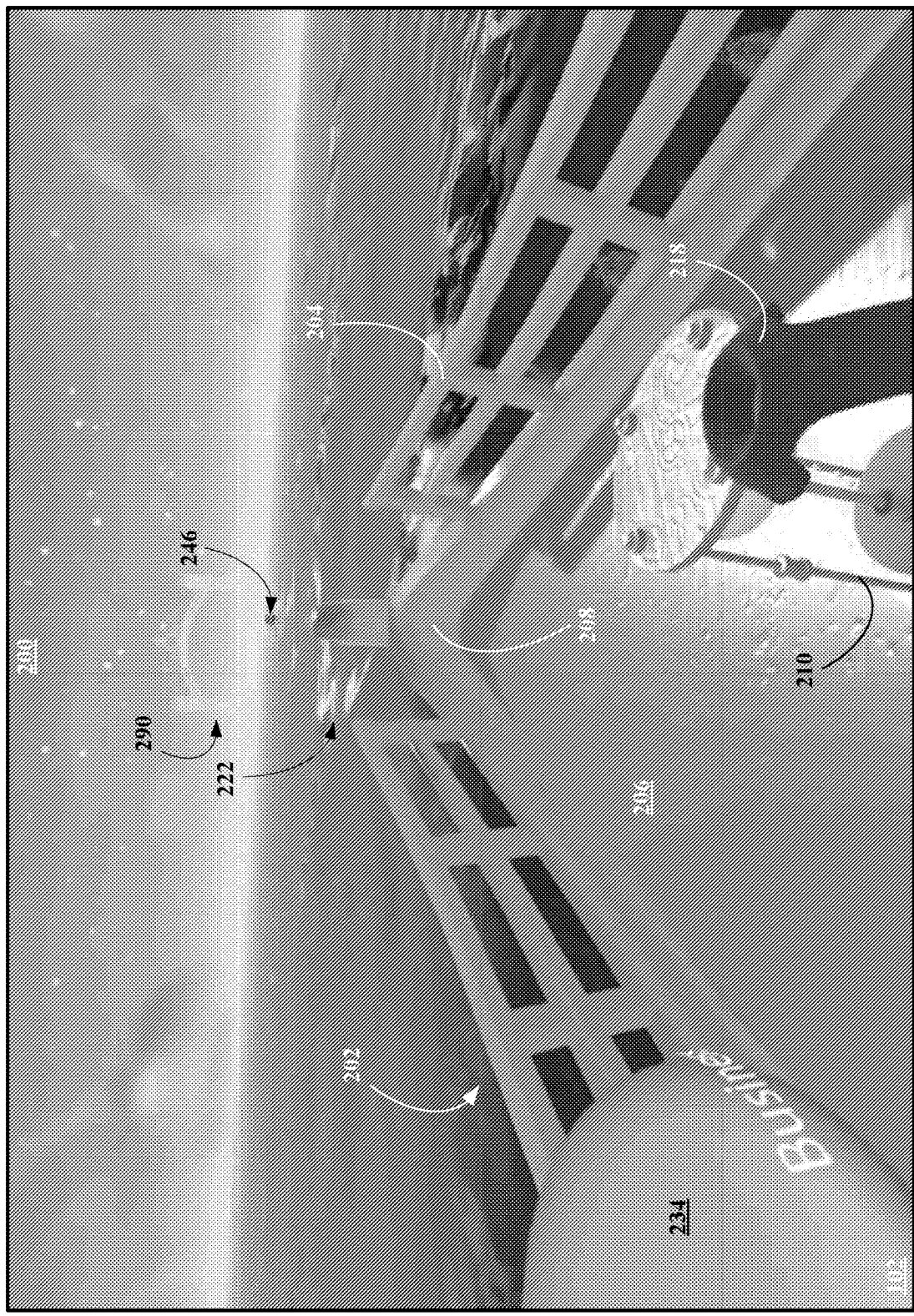
Figure 2C:
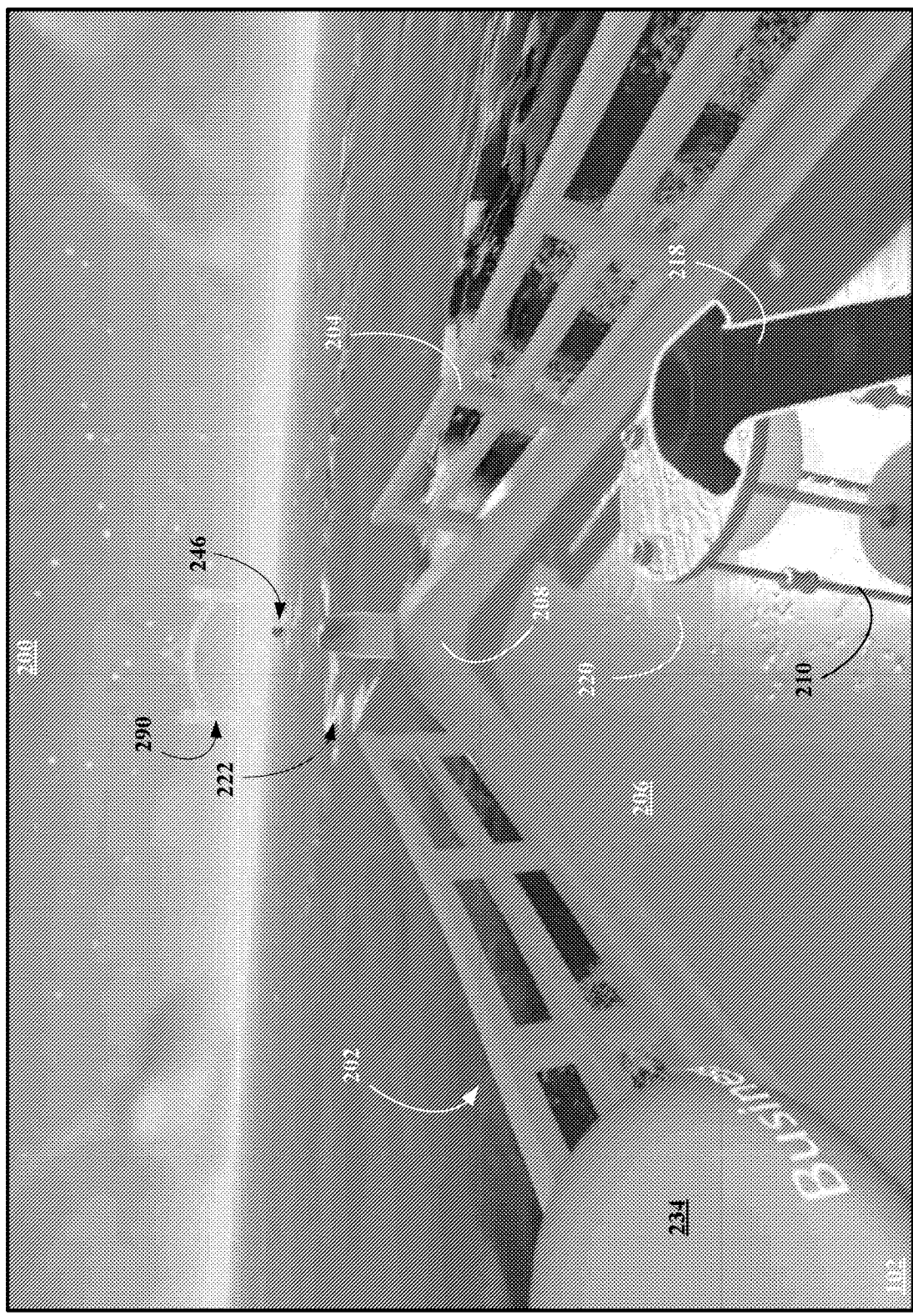
Figure 2C:
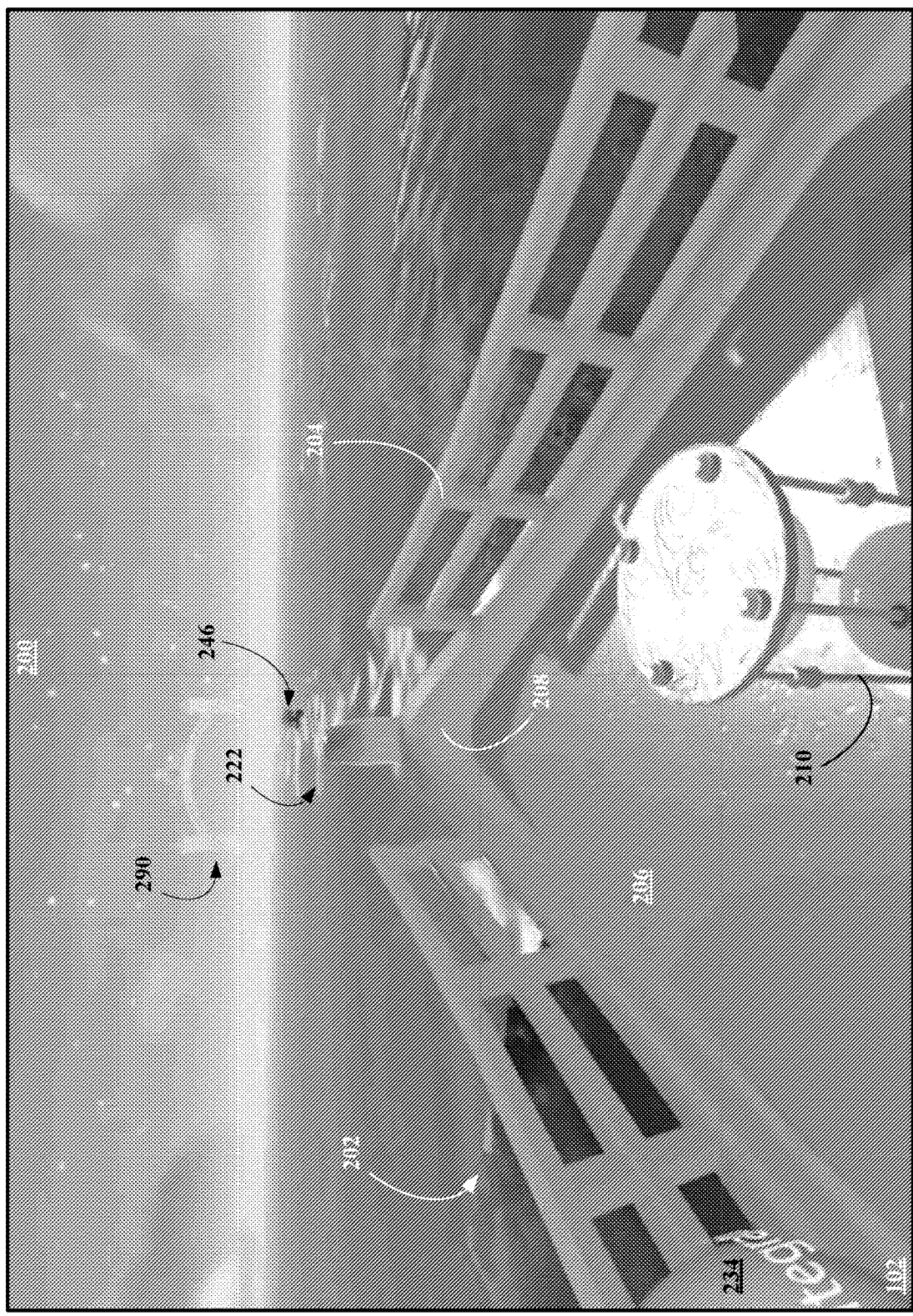
Figure 2C:
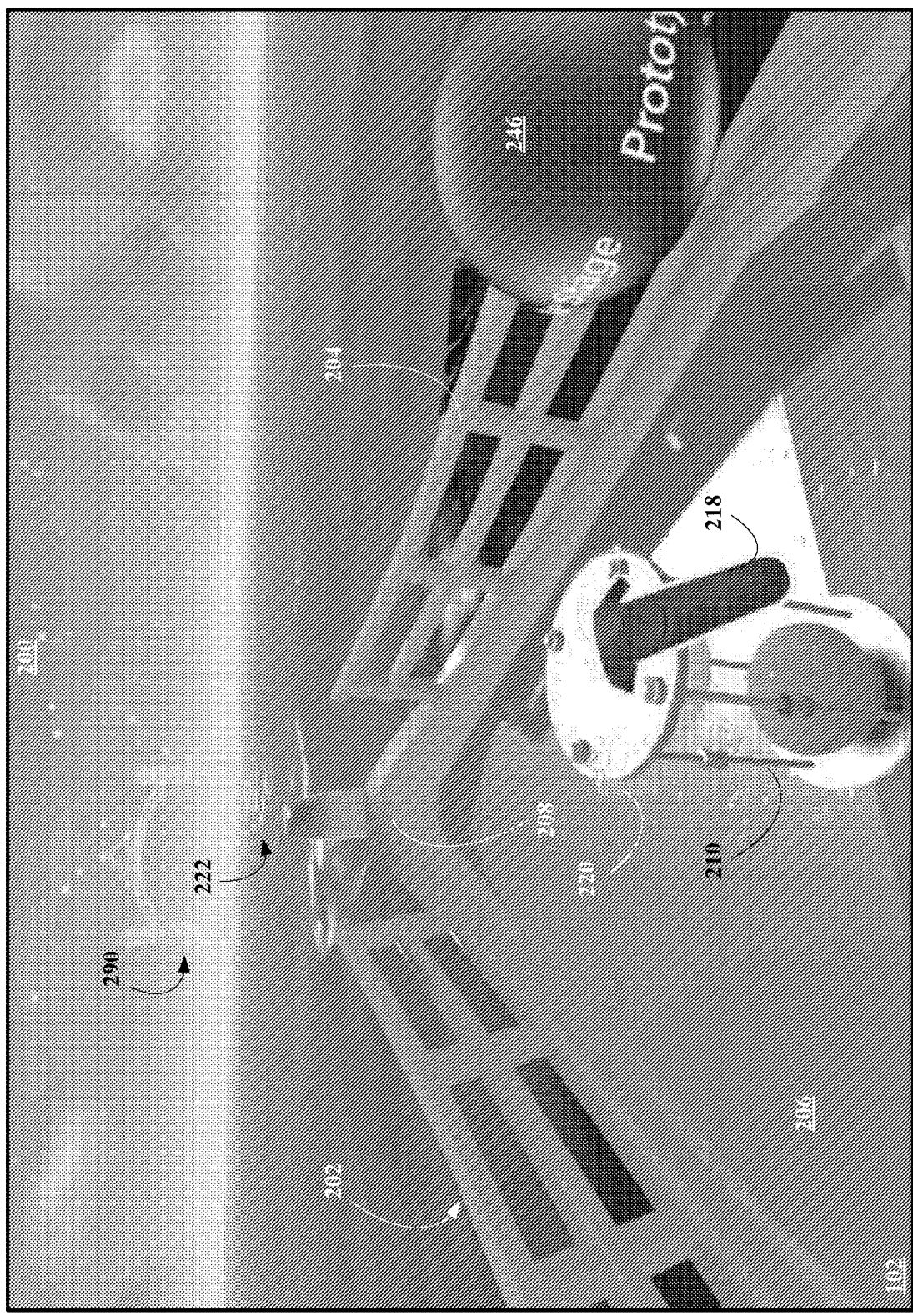
Figure 2C:
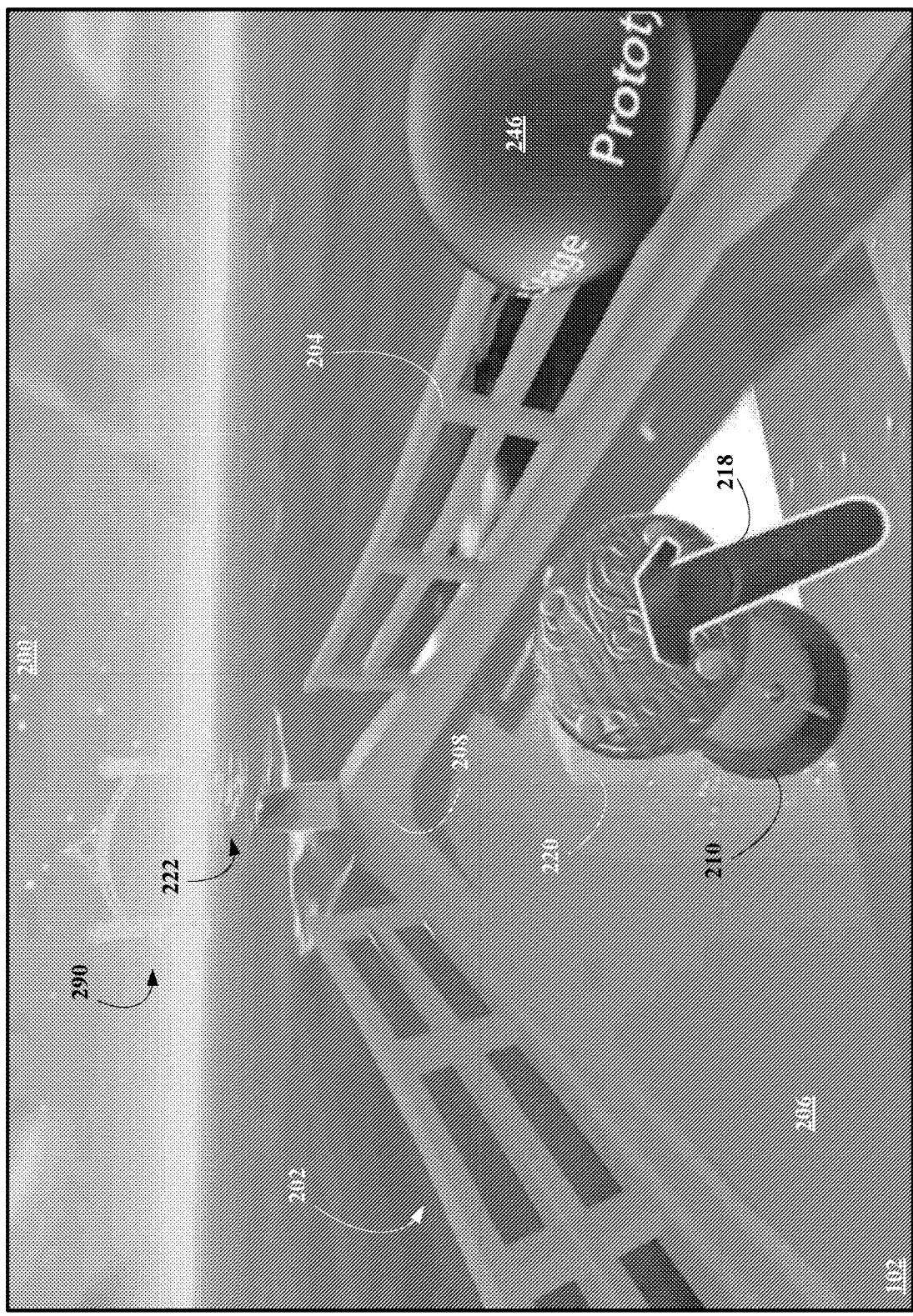
Figure 2C:
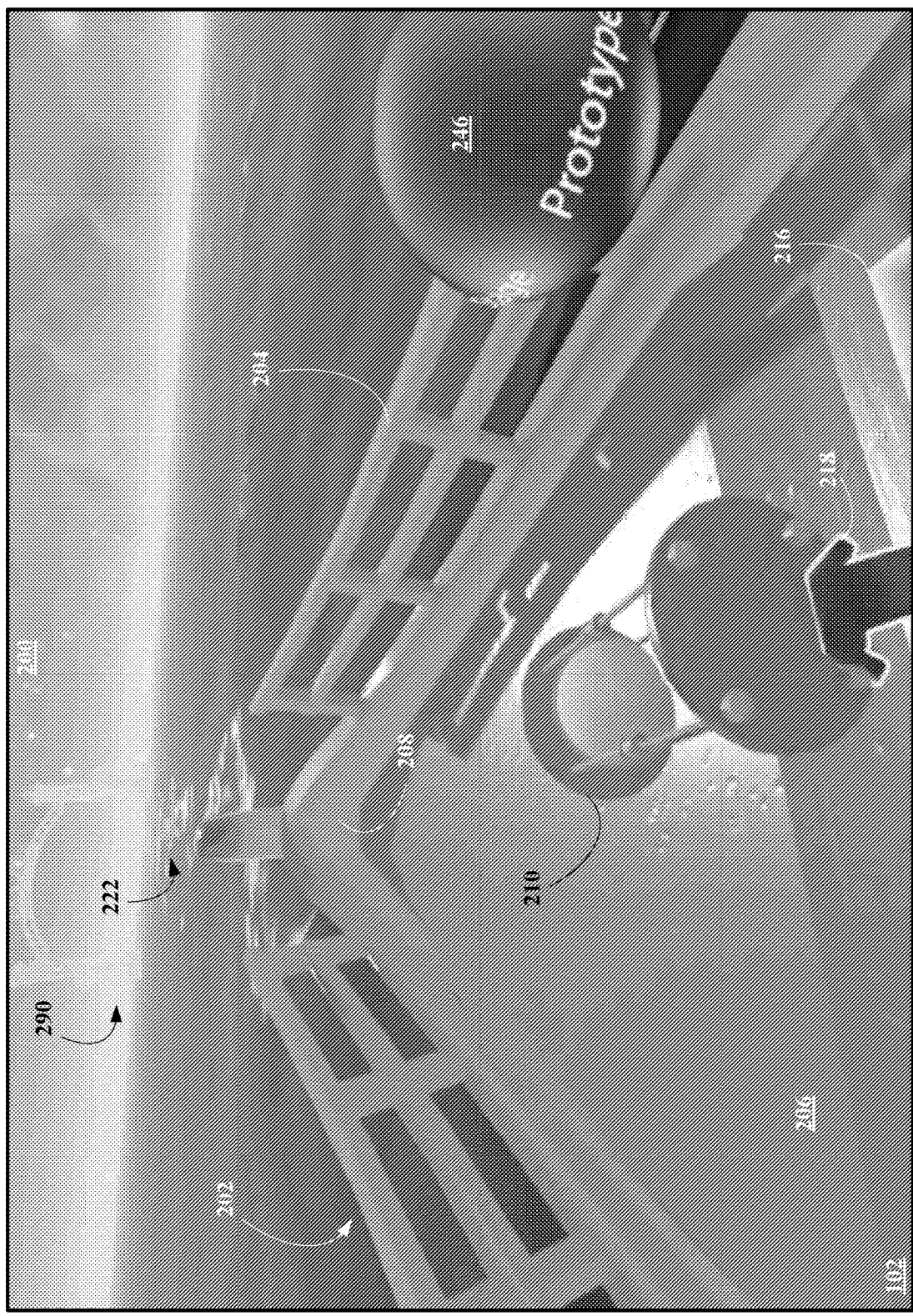
Figure 2C:
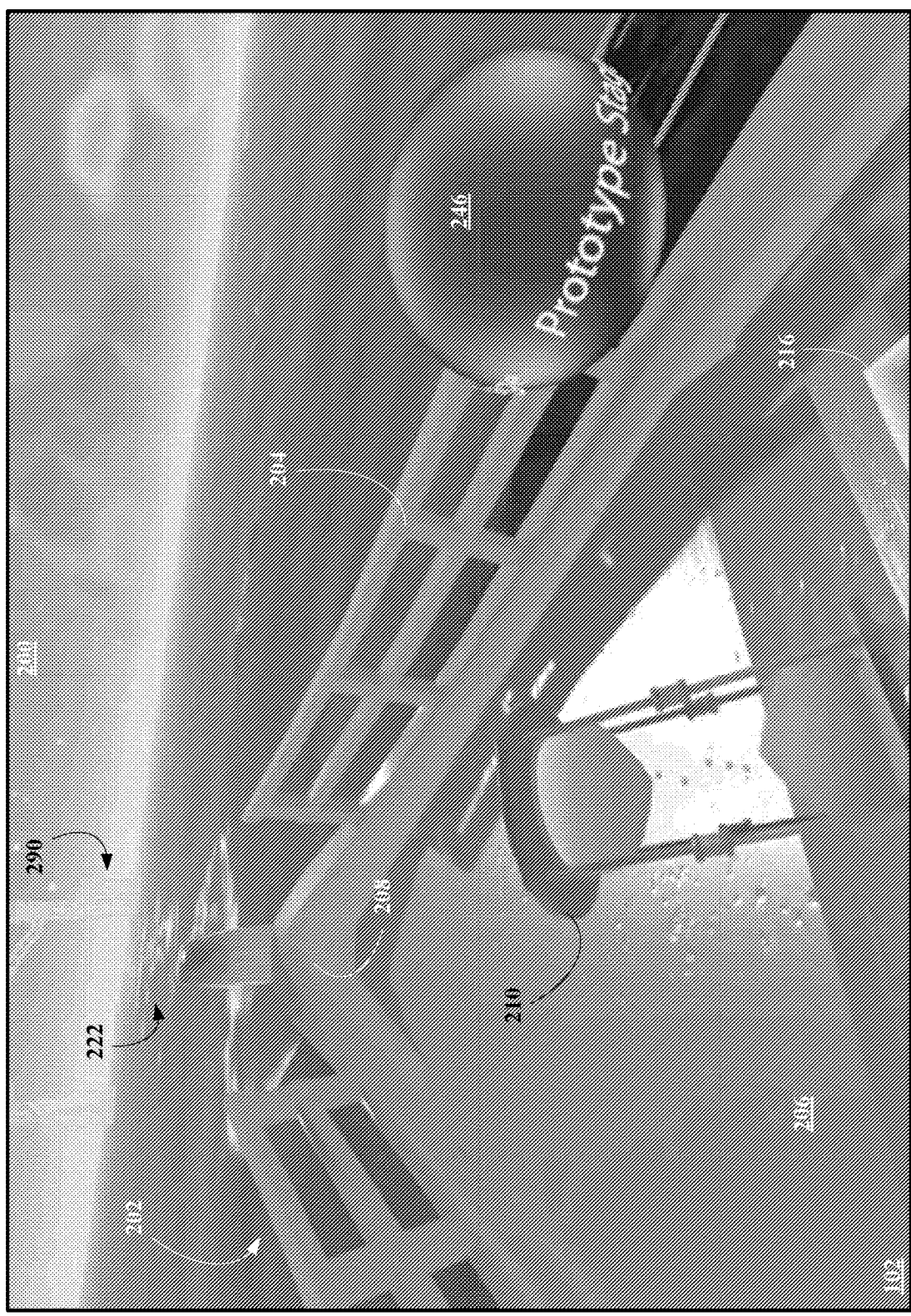
Figure 2C:
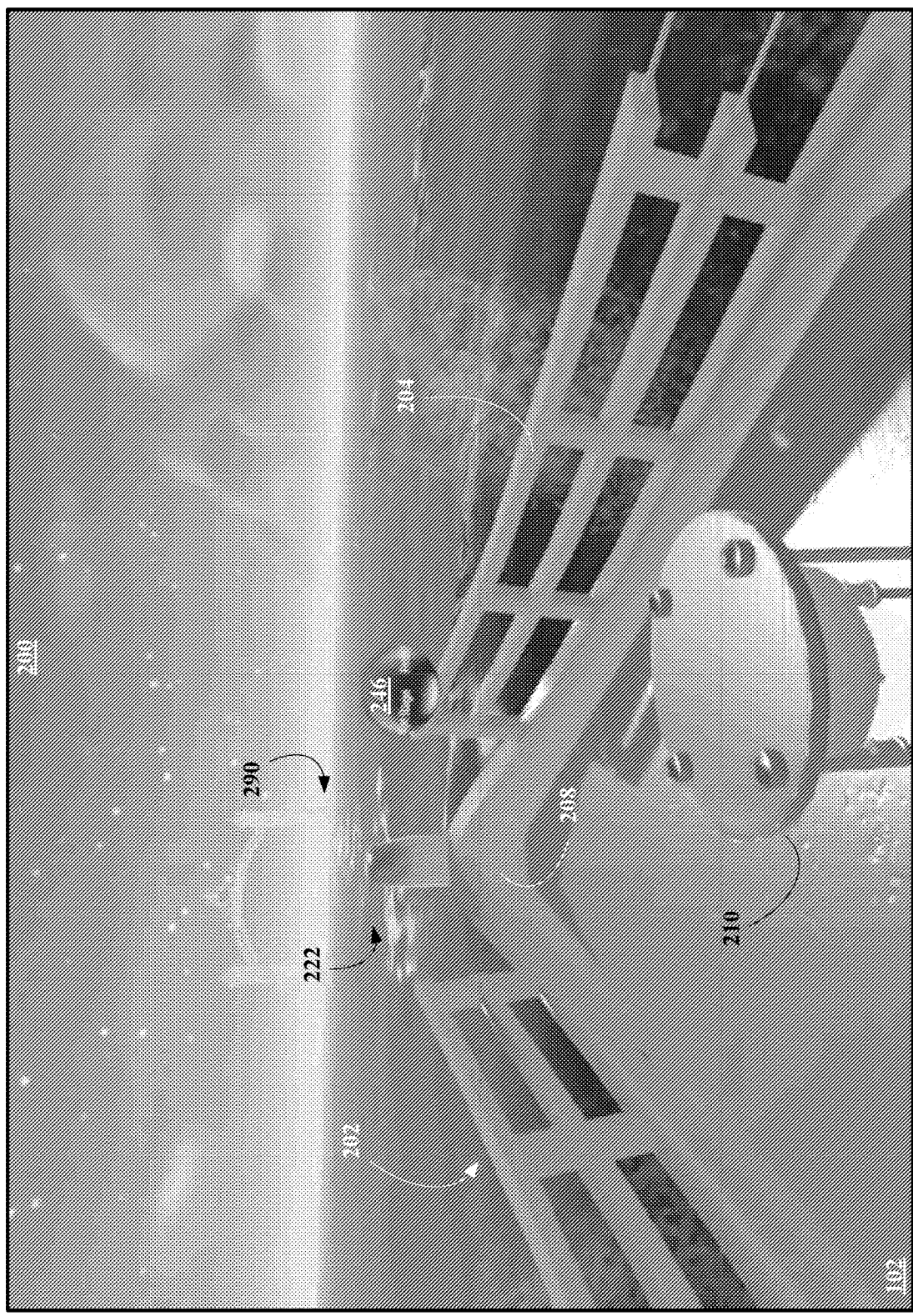
Figure 2C:
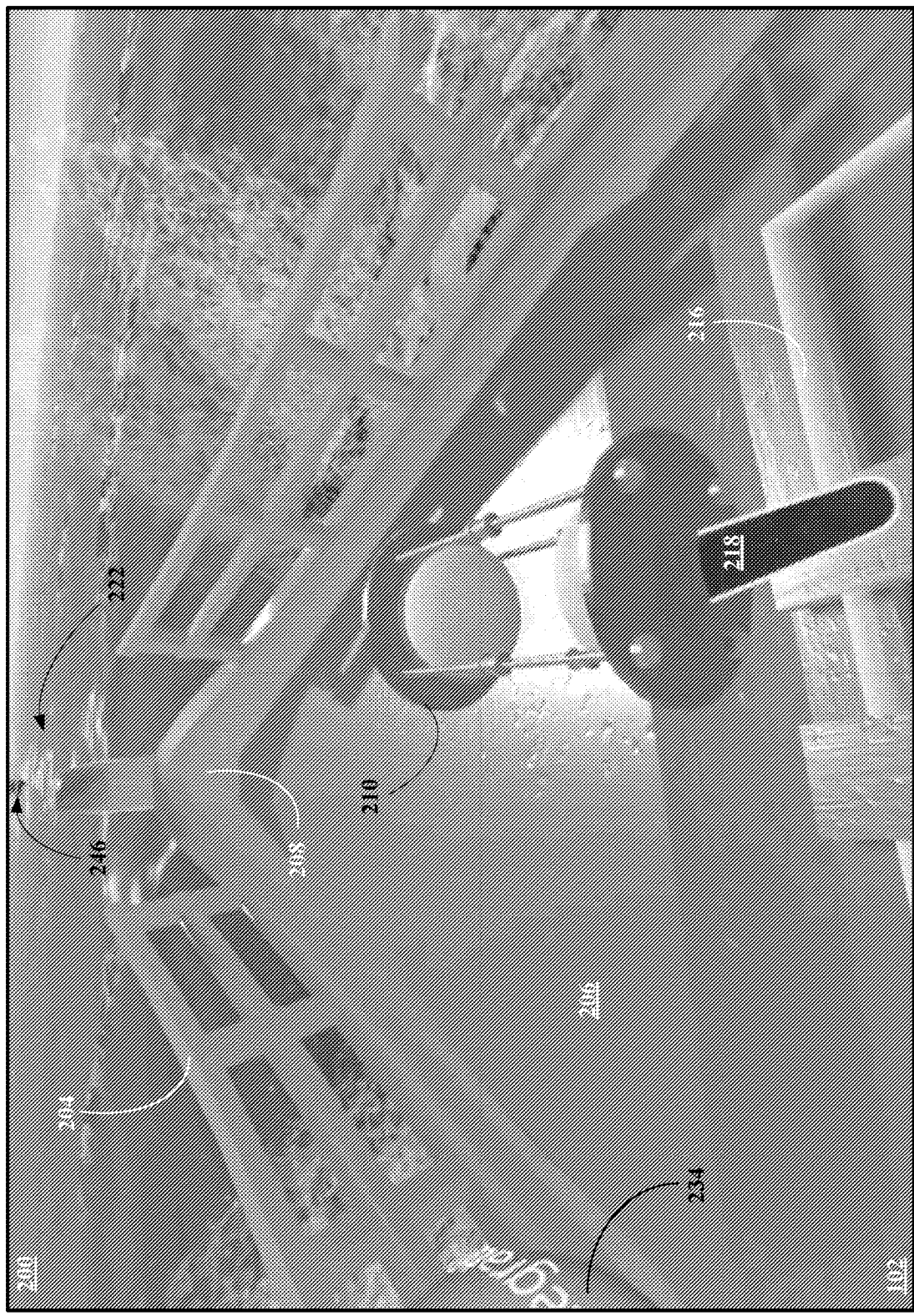
Figure 2C:
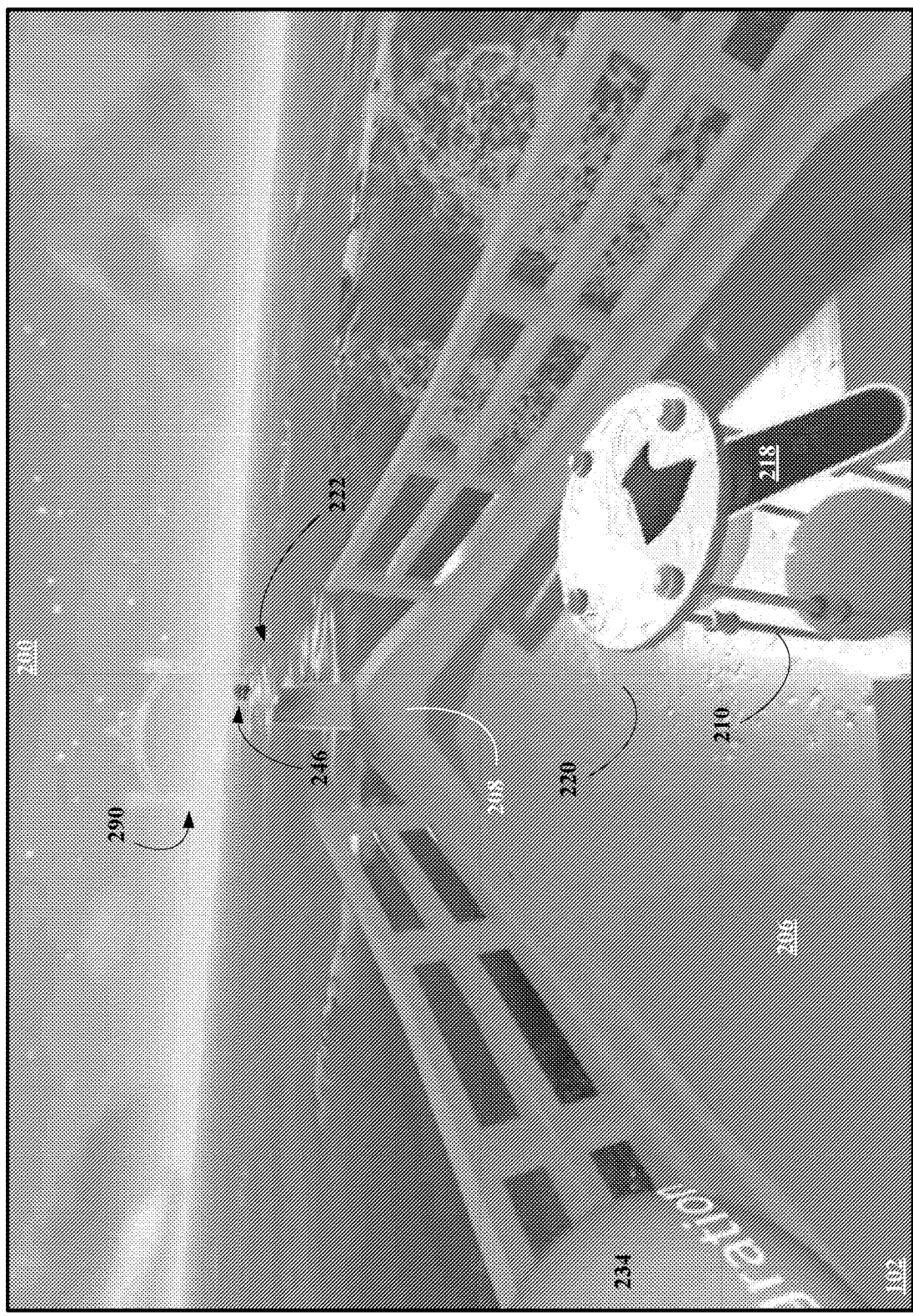
Figure 2C:
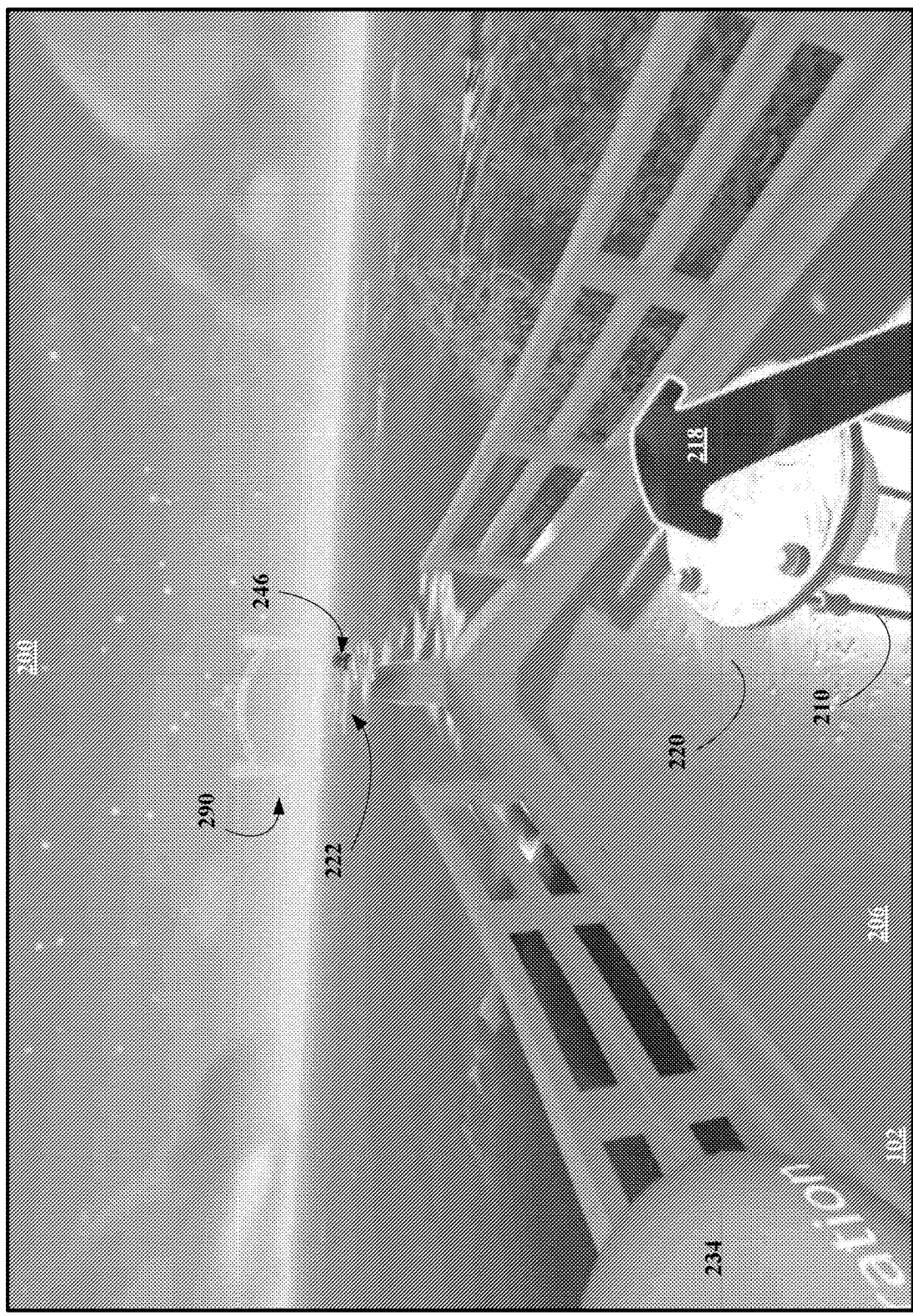
Figure 2C:
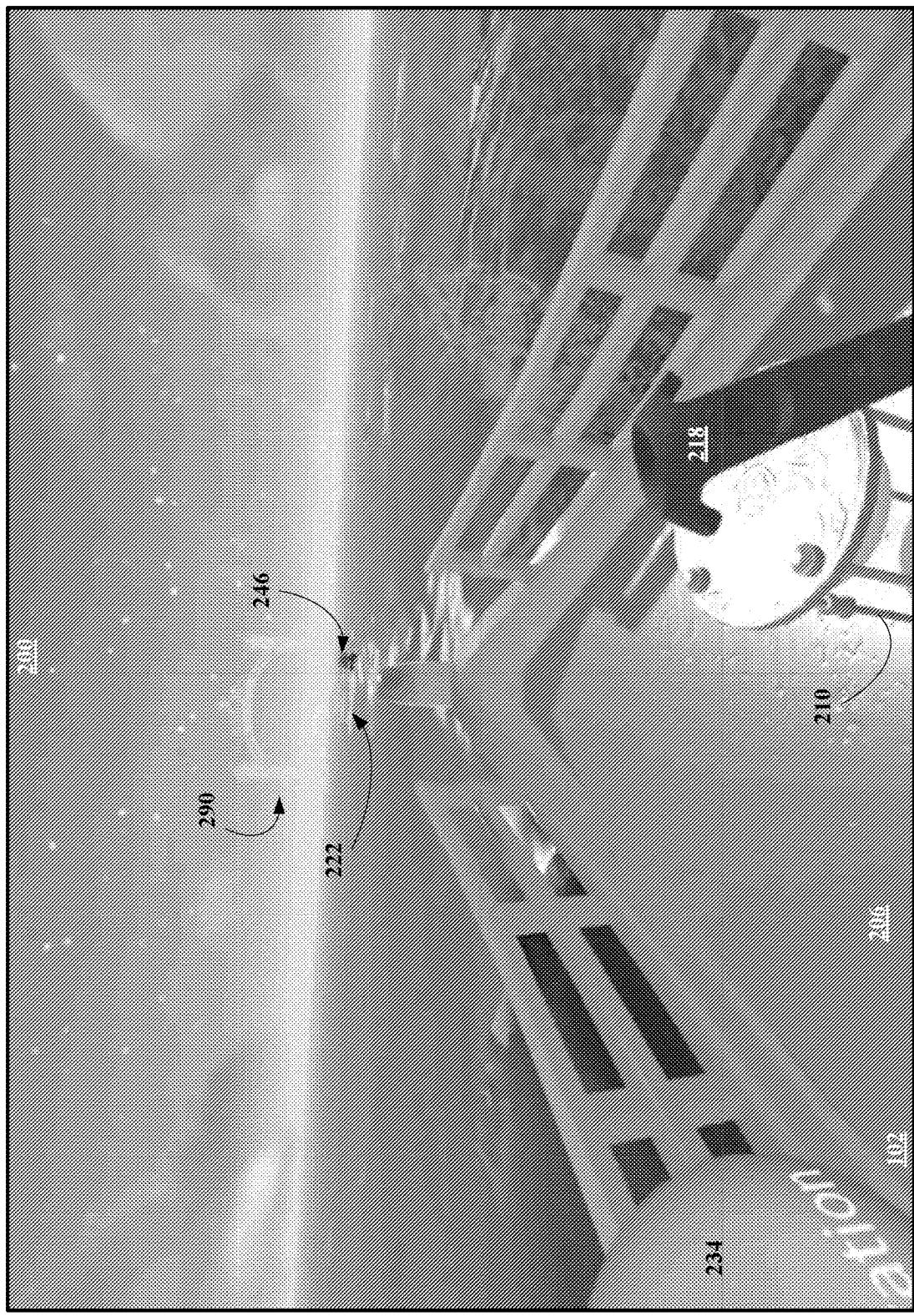
Figure 2C:
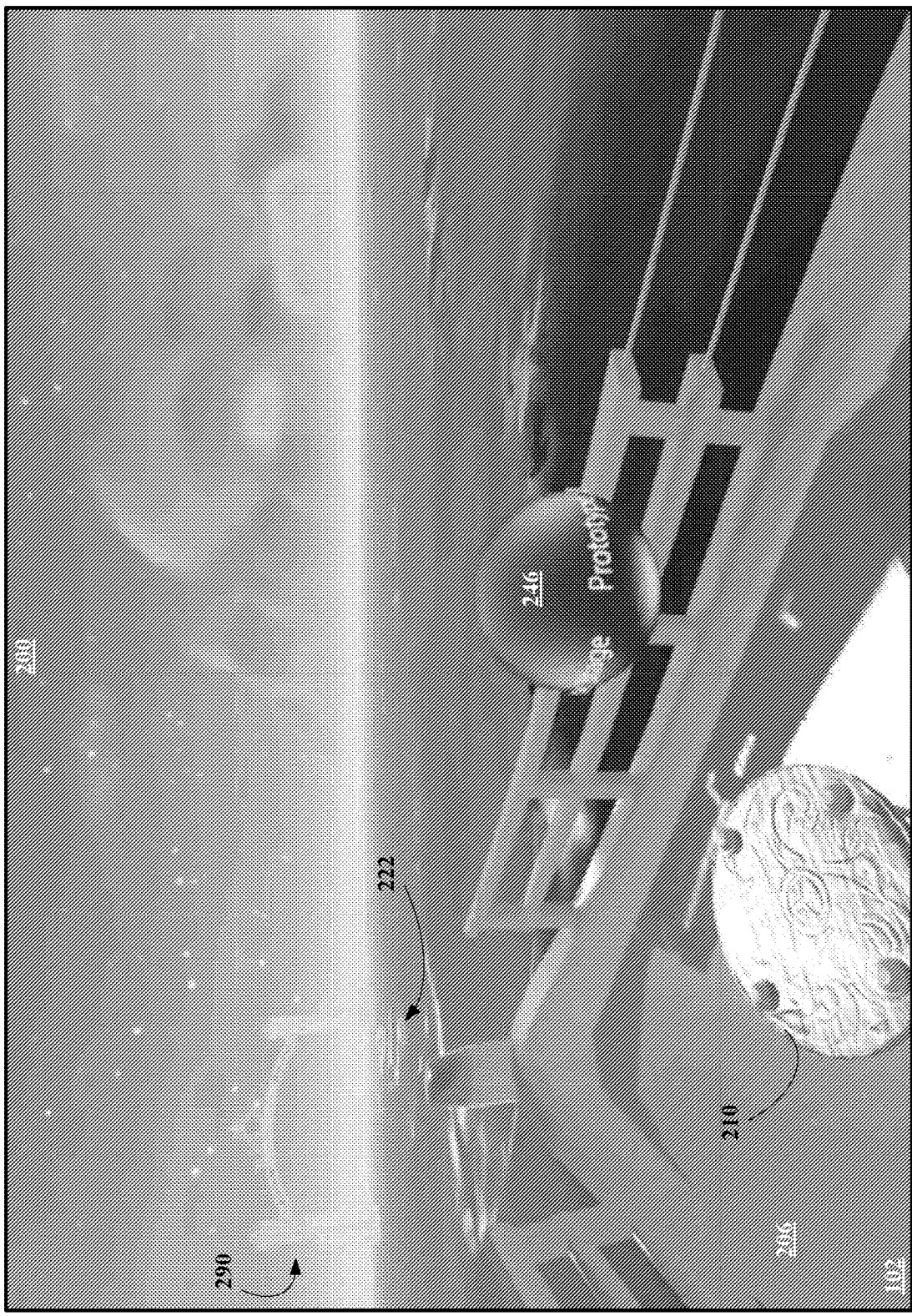
Figure 2C:
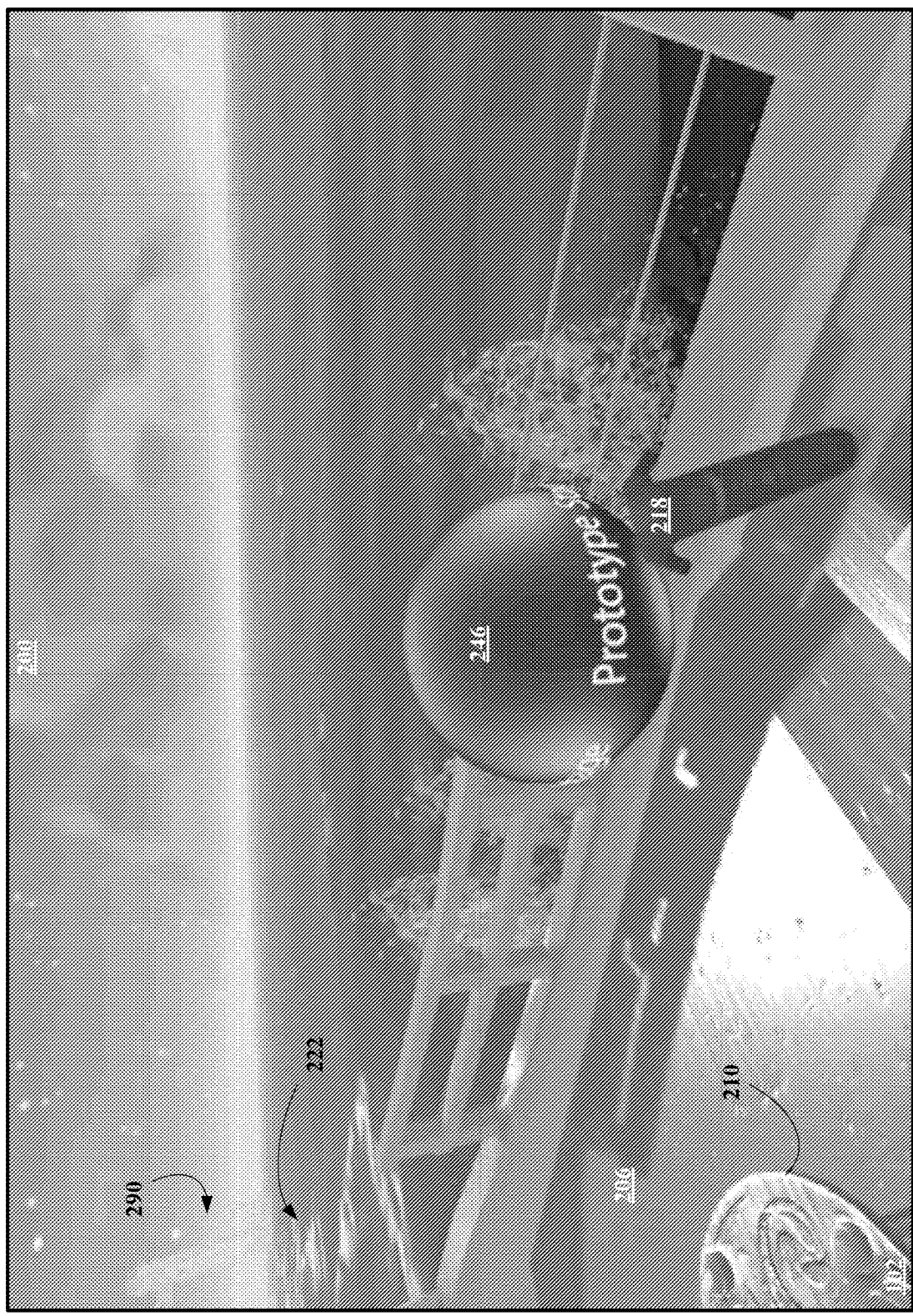
Figure 2C:
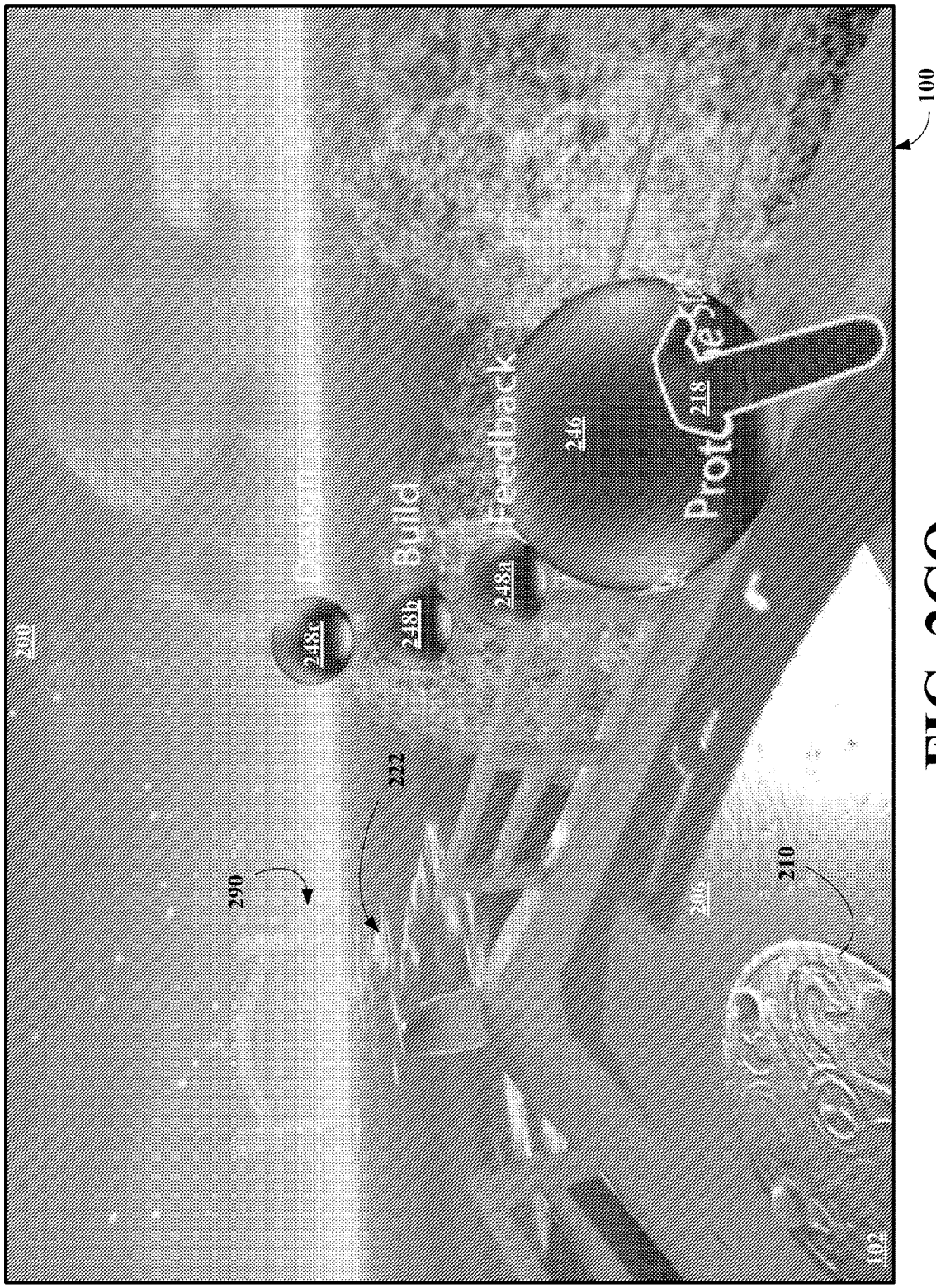
Figure 2C:
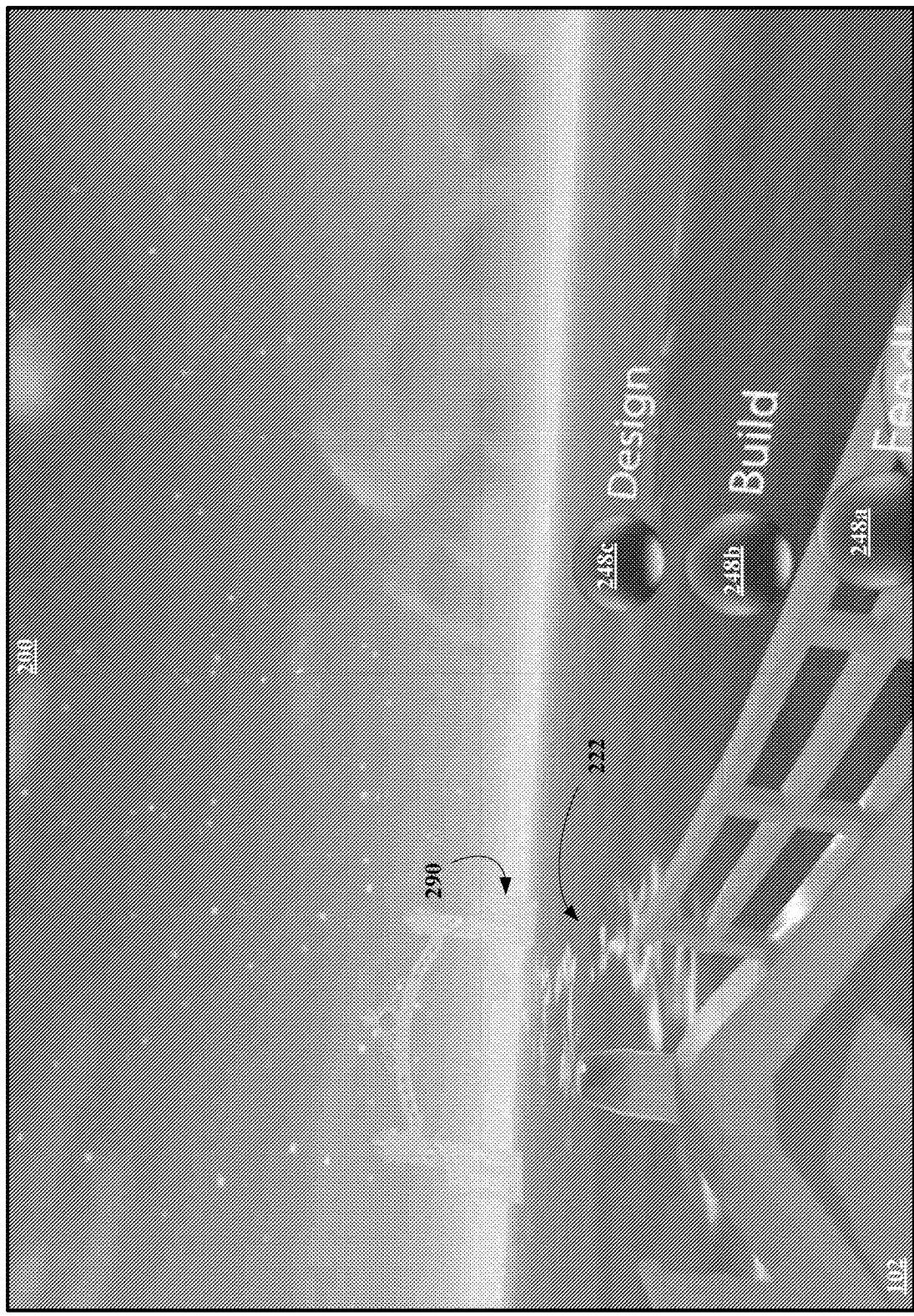
Figure 2C:
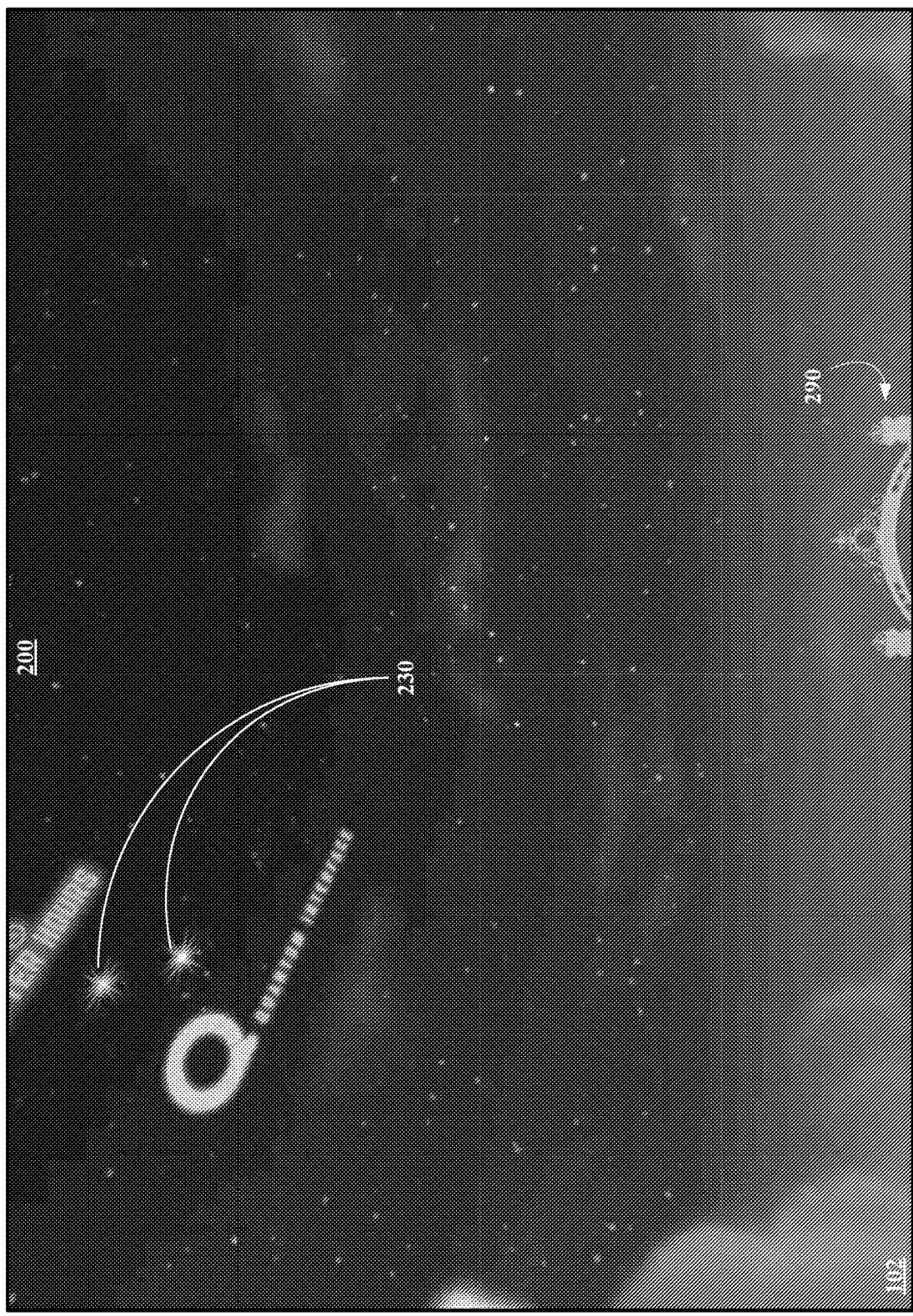
Figure 2C:
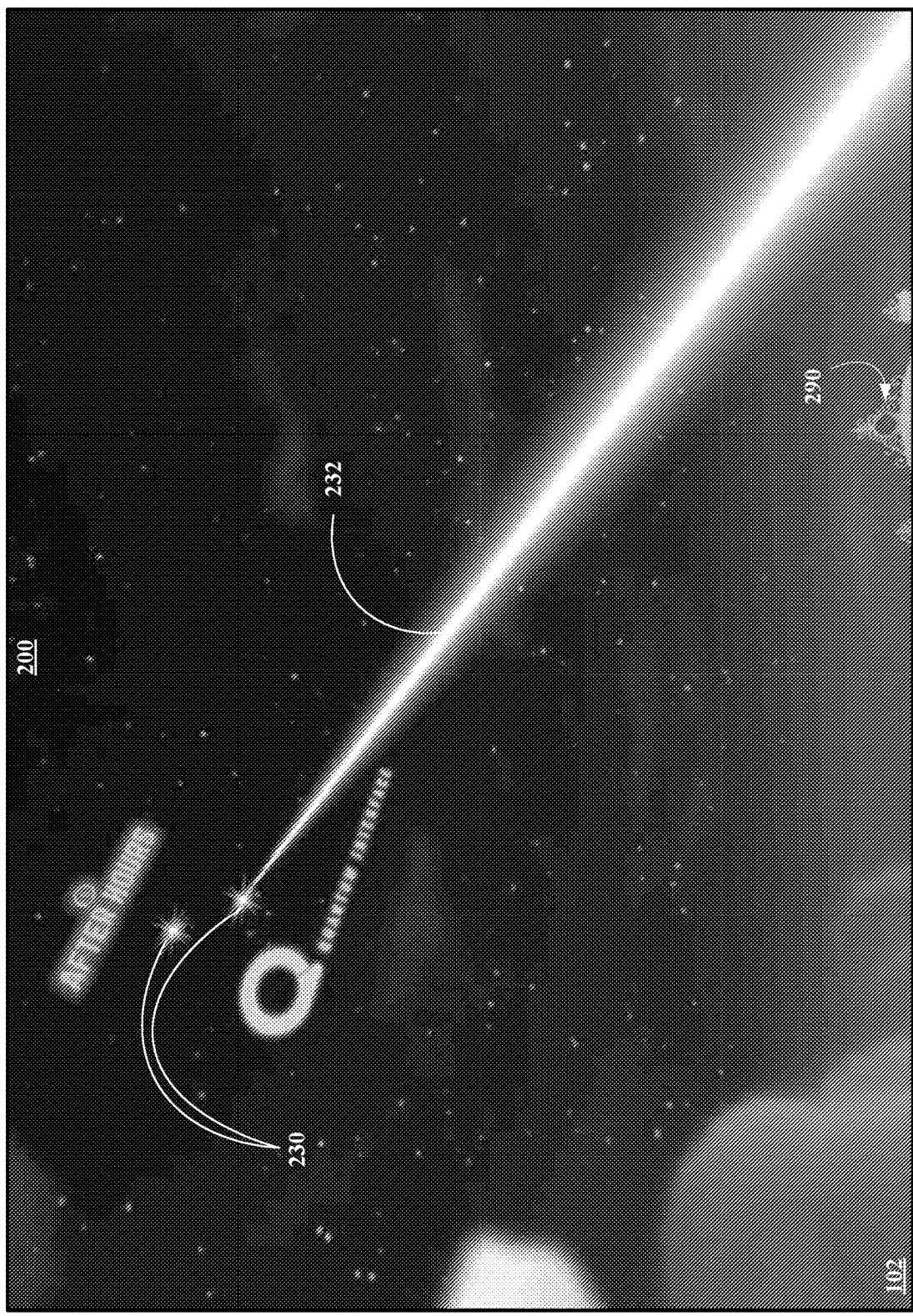
Figure 2C:
Figure 2C:
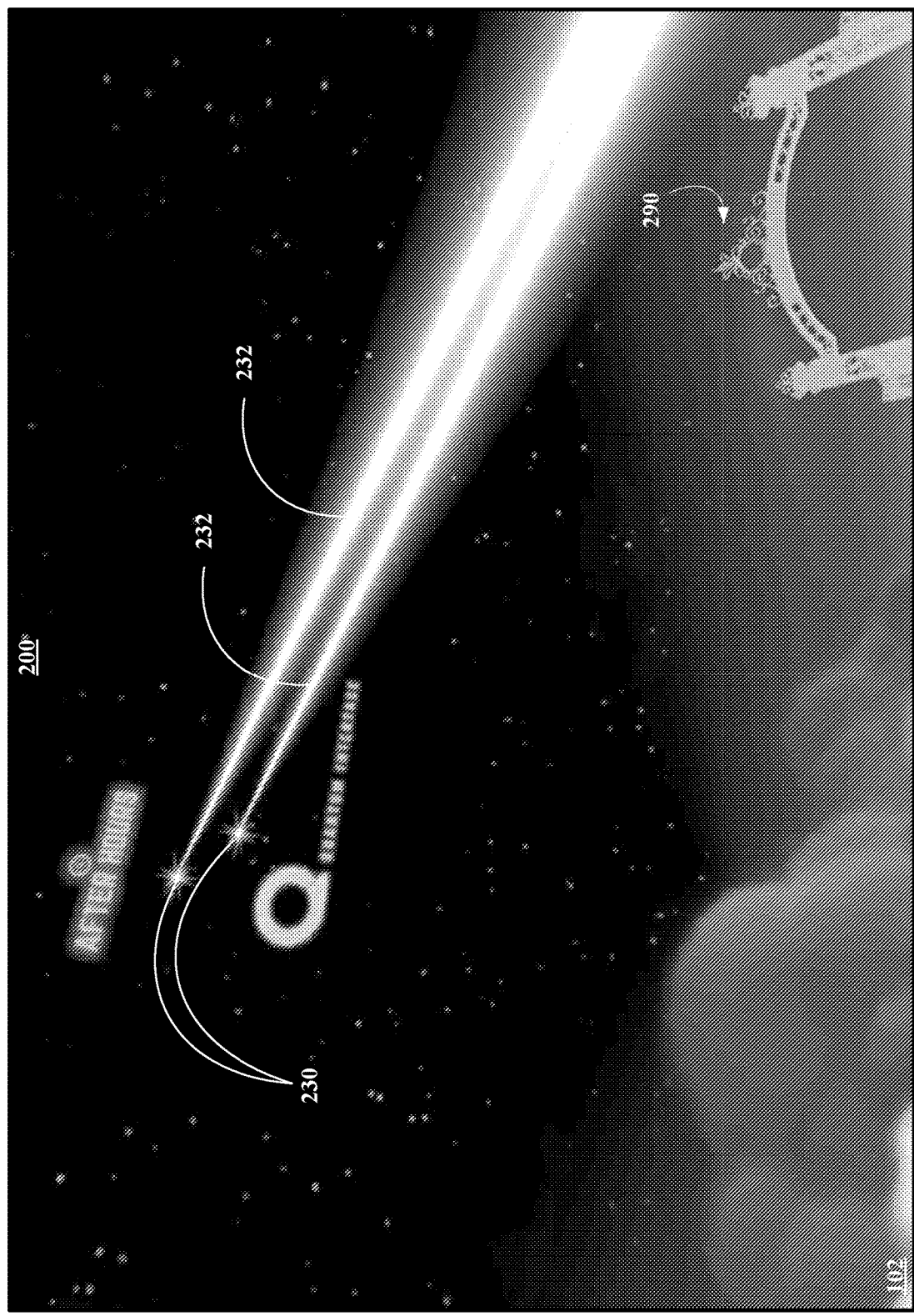
Figure 2C:
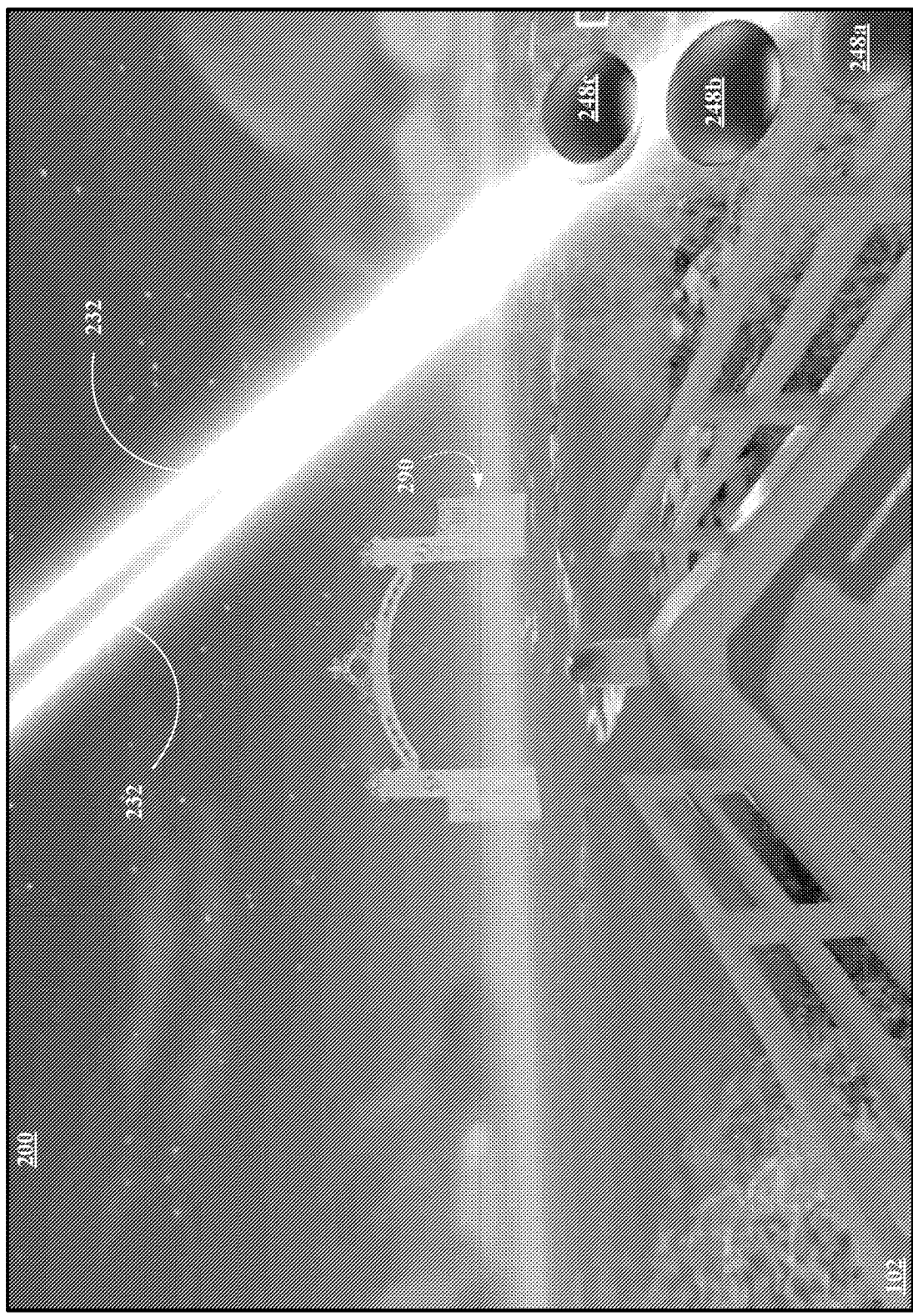
Figure 2C:
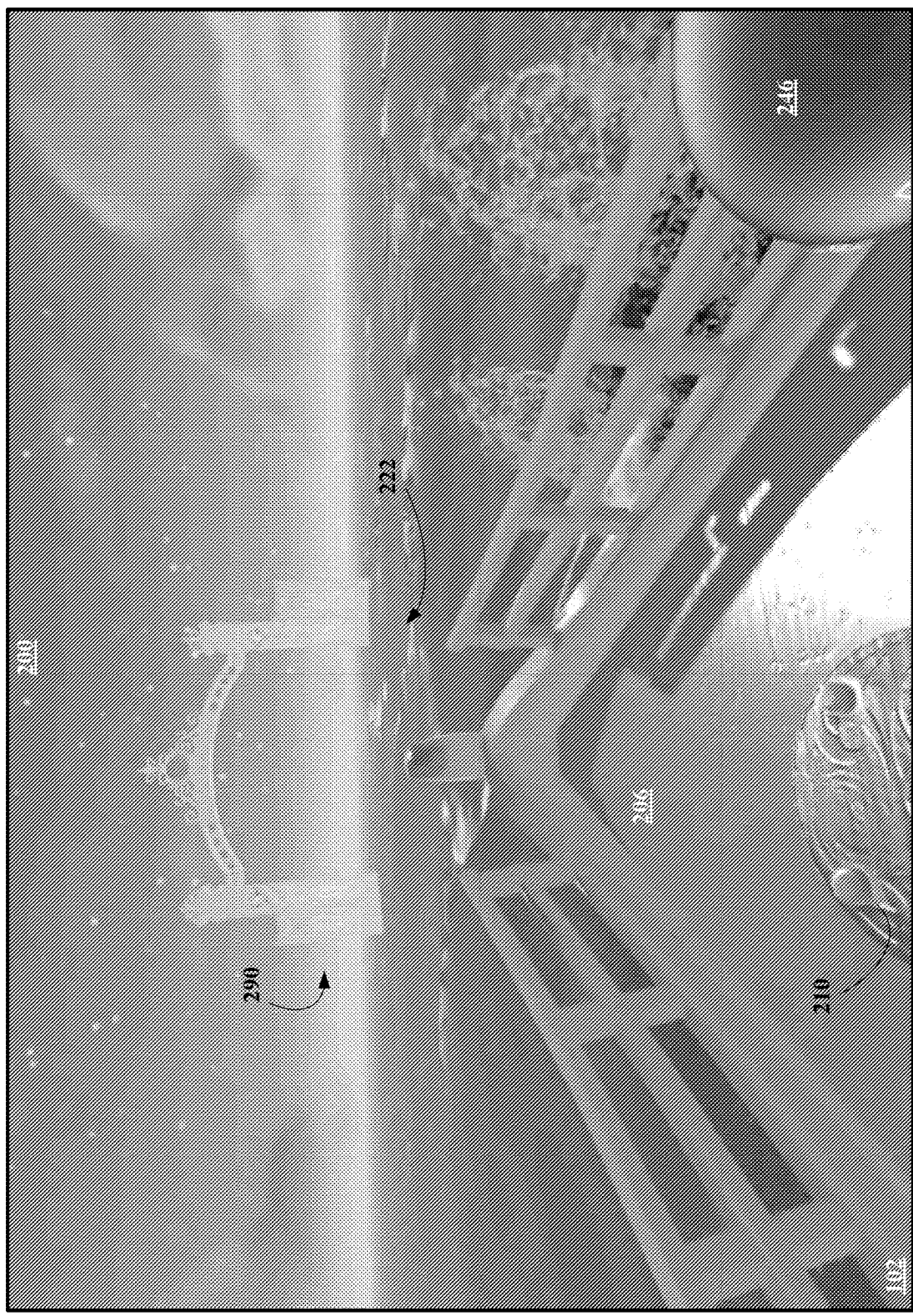
Figure 2C:
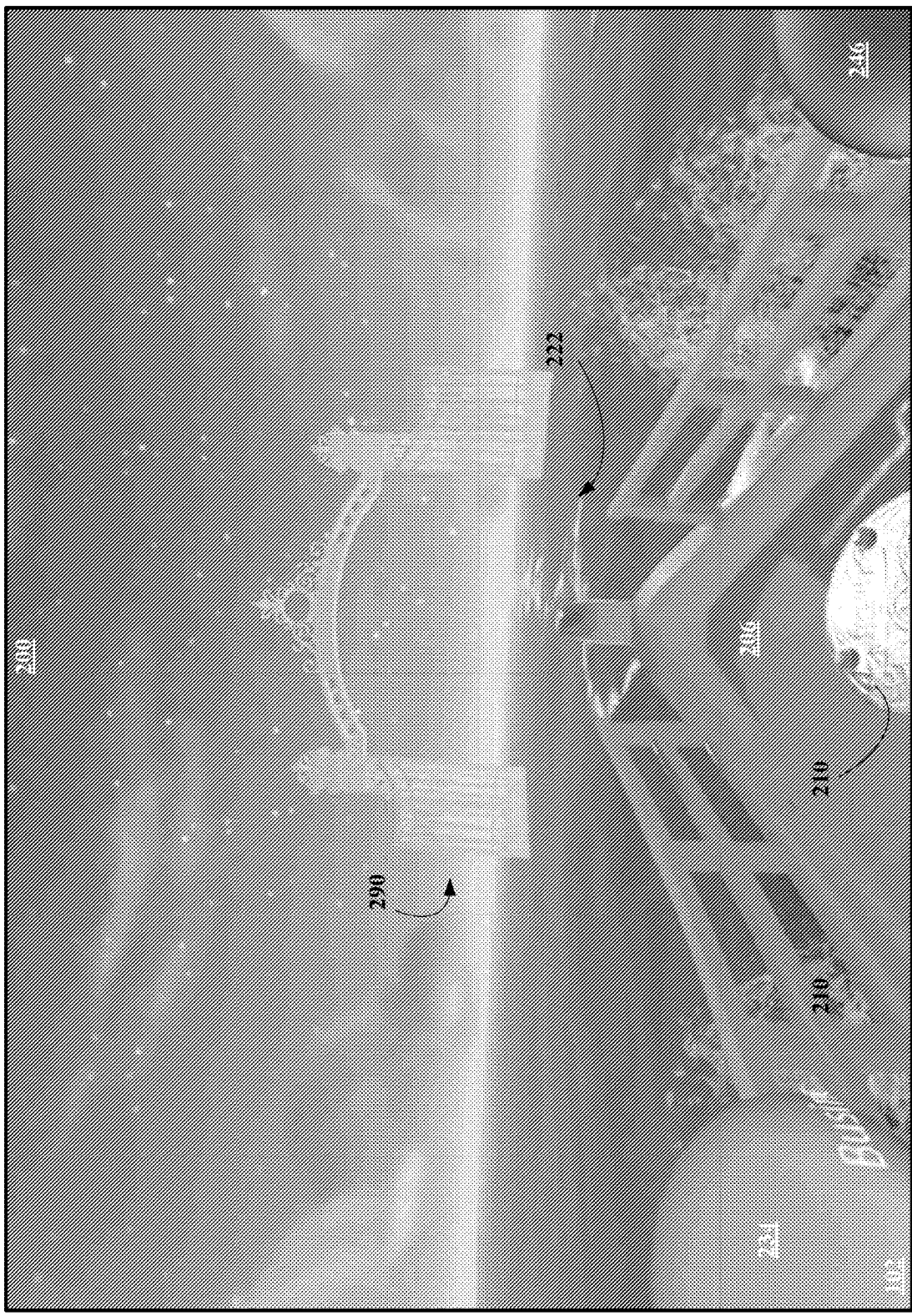
Figure 2C:
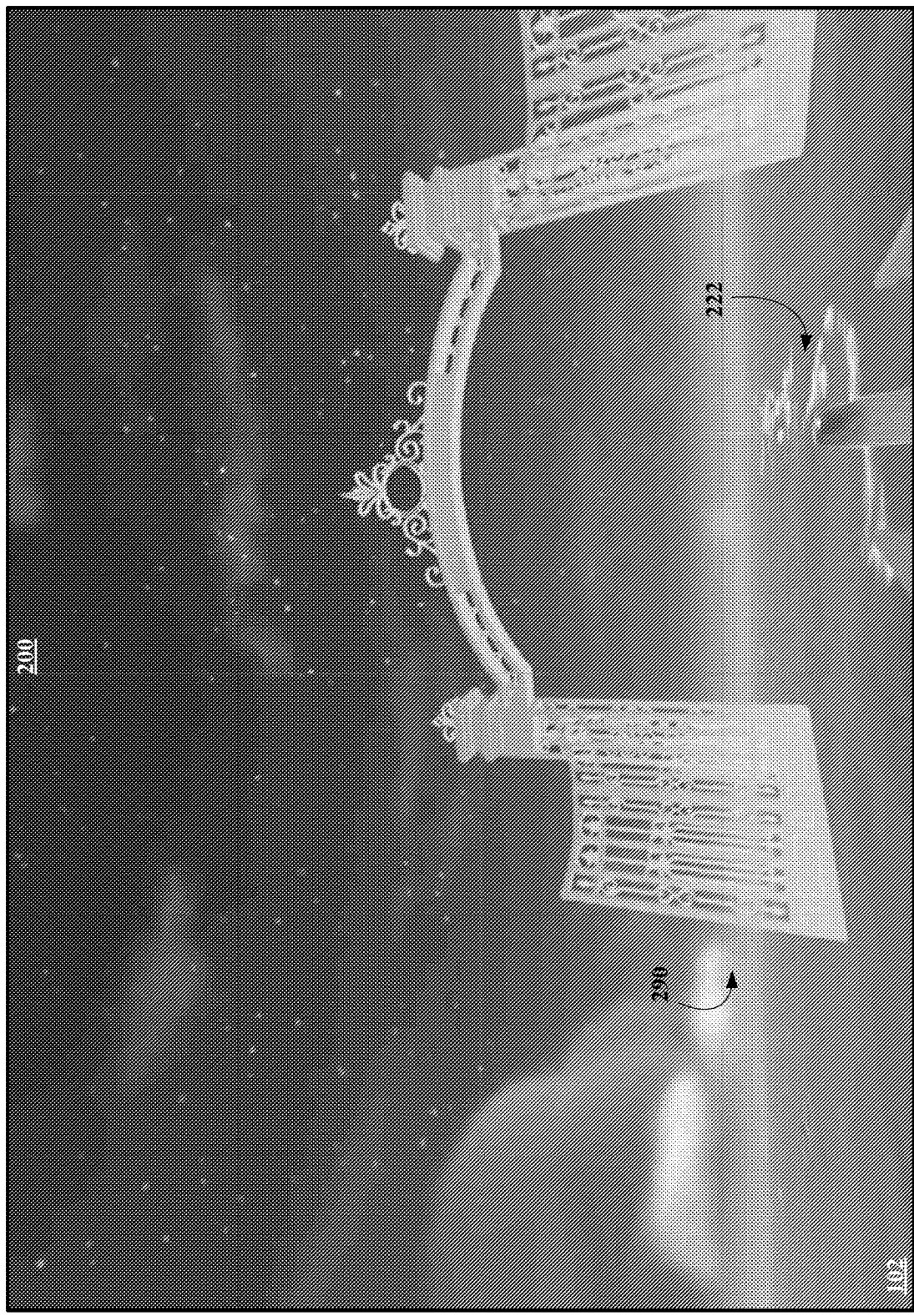
Figure 2D:
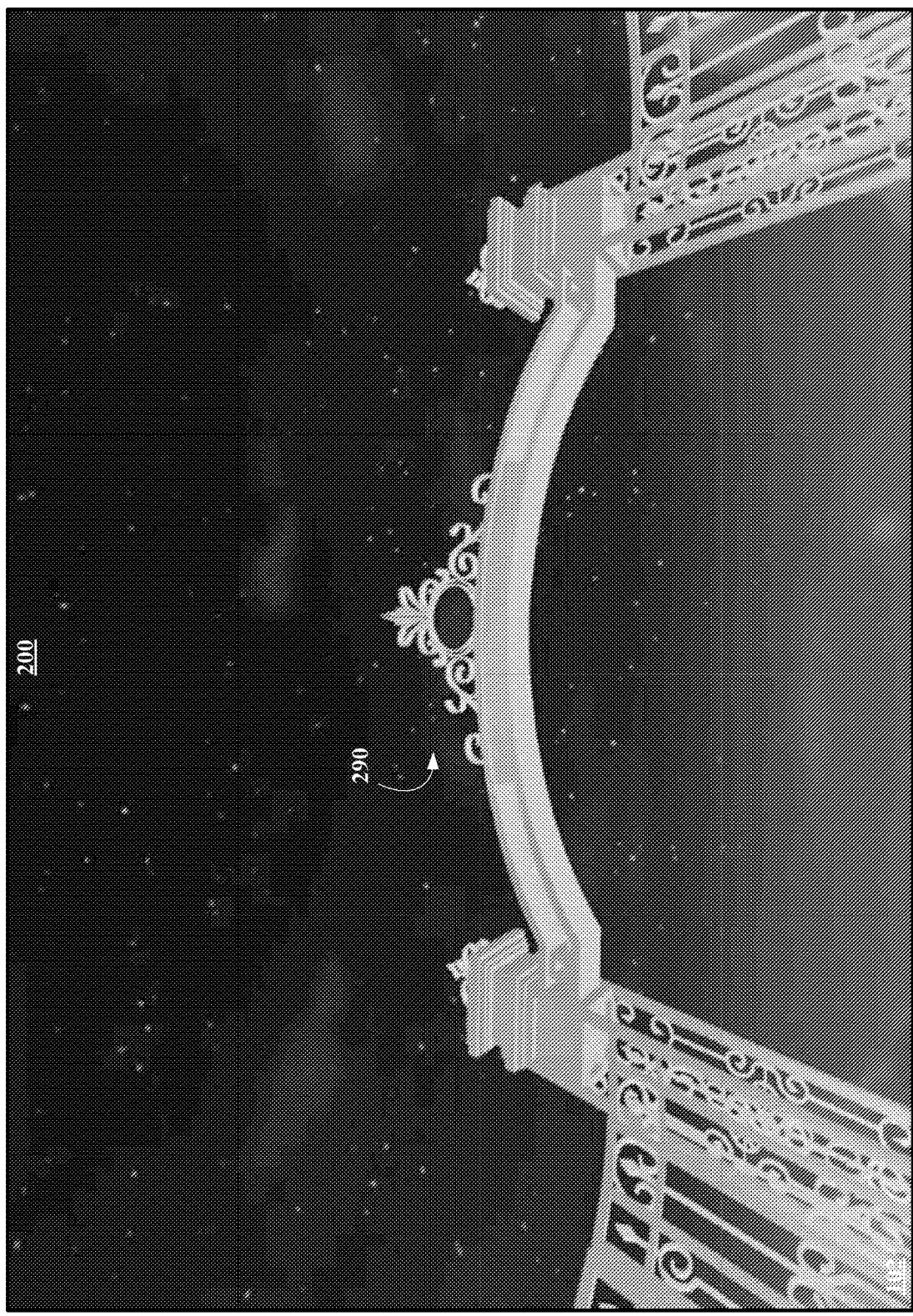
Figure 2D:
Figure 2D:
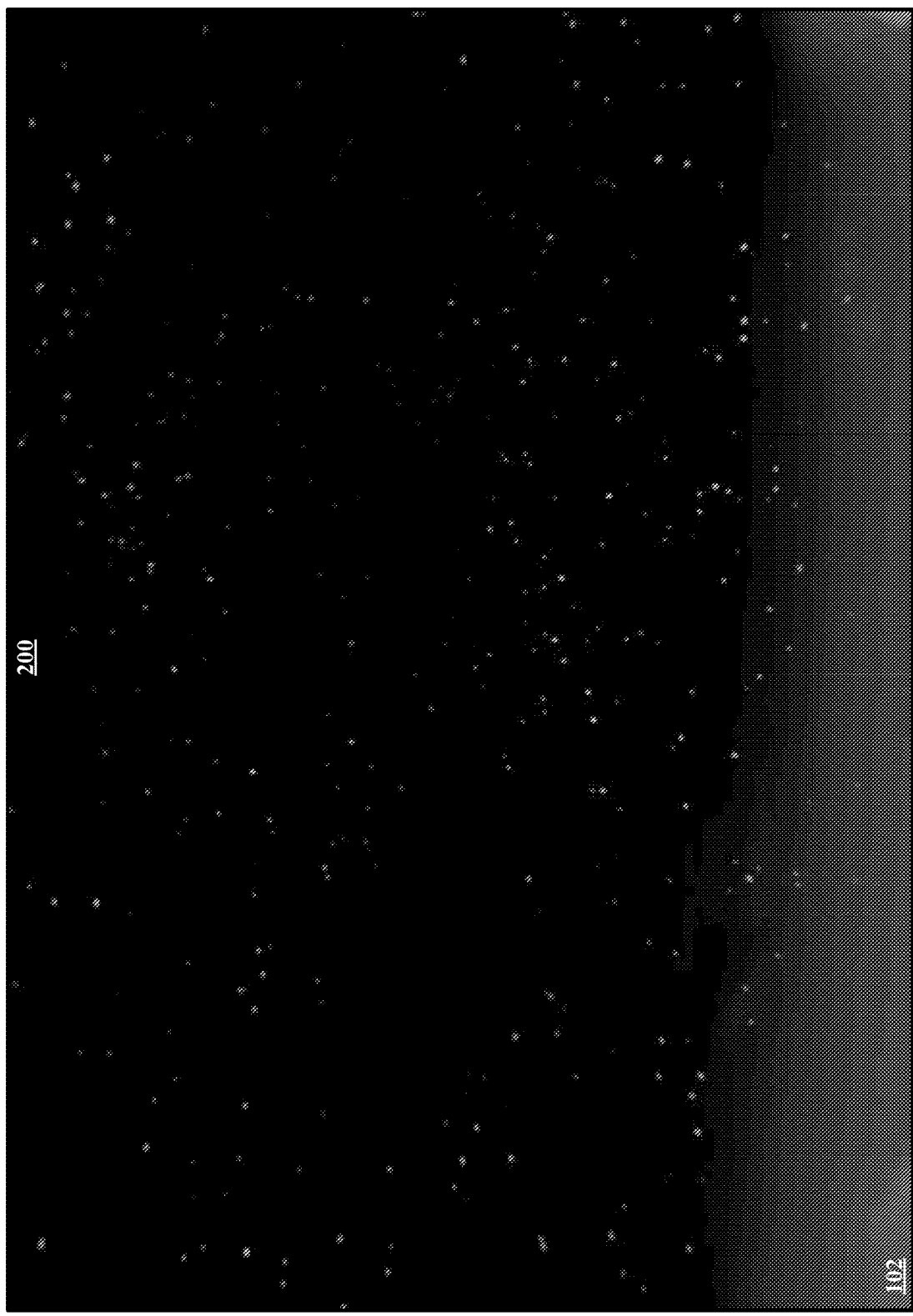
Figure 2D:
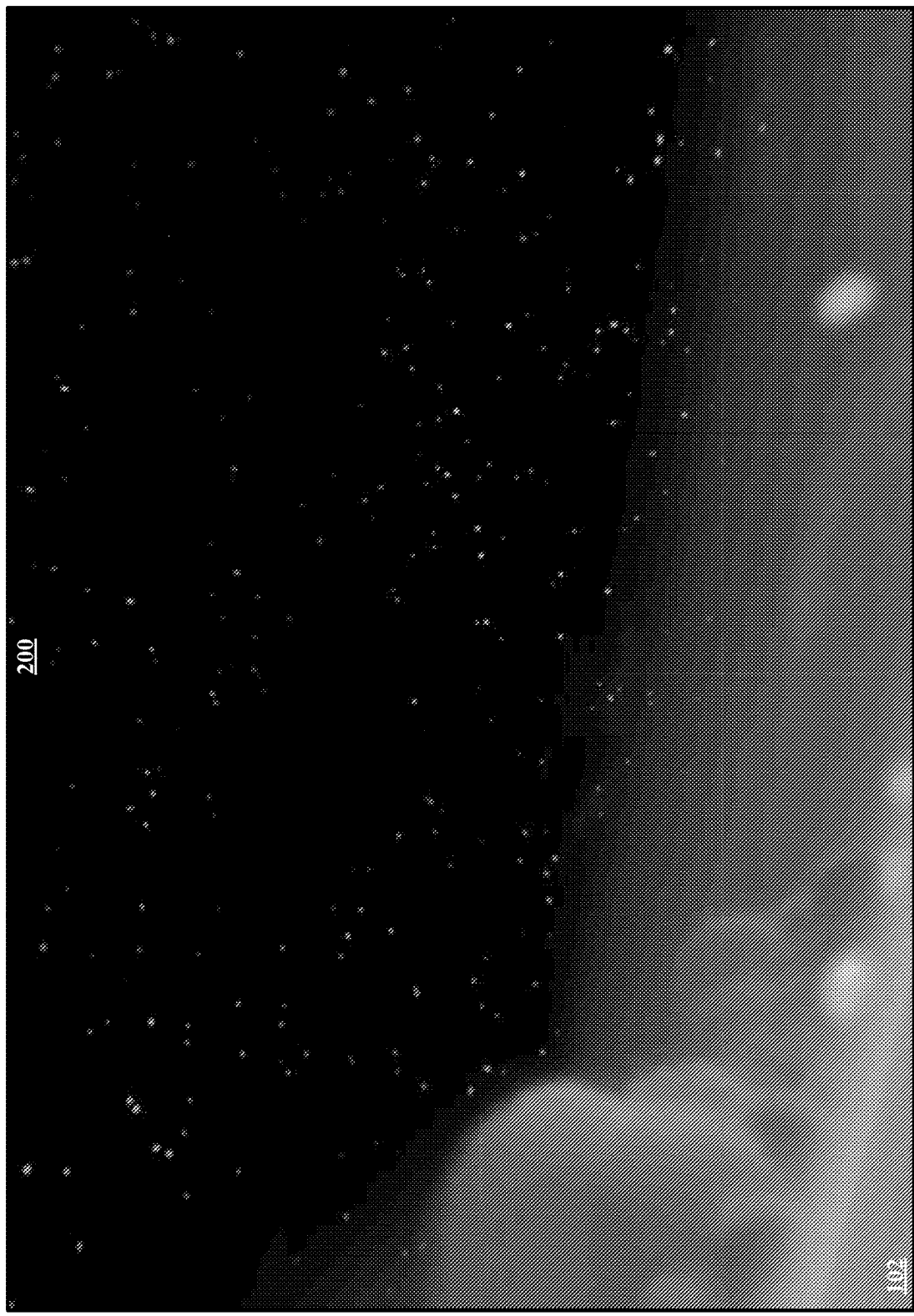

Looking at FIG. 2U, the system receives further input from the input device indicating that the user's moving the selection object 218 out of contact with or proximity to the temporal/sequence direction/control object 210 causing the selection object 218 to no longer be active in controlling the temporal/sequence direction/control object 210. Looking at FIG. 2V, the system receives further input from the input device indicating that the user's moving the selection object 218 further away from the temporal/sequence direction/control object 210. Looking at FIG. 2W, the system receives further input from the input device indicating that the user's gaze is moving to port. Looking at FIG. 2X, the system receives further input from the input device indicating that the user's gaze is moving to further to port evidencing the speed of the sailboat 202 forward. Looking at FIG. 2Y, the system receives further input from the input device indicating that the user's gaze has moved back to the bow 208 and showing an orb 224 and bringing the temporal/sequence direction/control object 210 into view. Looking at FIG. 2Z, the system receives further input from the input device indicating that the user's is moving the selection object 218 back into view. Looking at FIG. 2AA, the system receives further input from the input device indicating that the user's is moving the selection object 218 towards the temporal/sequence direction/control object 210. Looking at FIG. 2AB, the system receives further input from the input device indicating that the user has moved the selection object 218 into contact with or proximity to the temporal/sequence direction/control object 210 activating the selection object 218 and bringing the indicator 220 back into view so that speed and direction may be adjusted. Looking at FIG. 2AC, the system receives further input from the input device indicating that the user's using the selection object 218 to rotate the temporal/sequence direction/control object 210 reducing the forward speed to the sailboat 202. Looking at FIG. 2AD, the system receives further input from the input device indicating that the user's is using the selection object 218 to rotate the temporal/sequence direction/control object 210 further reducing the forward speed to the sailboat 202. Looking at FIG. 2AE, the system receives further input from the input device indicating that the user's is using the selection object 218 to rotate the temporal/sequence direction/control object 210 increasing the forward speed to the sailboat 202. Looking at FIG. 2AF, the system receives further input from the input device indicating that the user's is moving the selection object 218 away from the temporal/sequence direction/control object 210. Looking at FIG. 2AG, the system receives further input from the input device indicating that the user's has moved the selection object 218 away from the temporal/sequence direction/control object 210 a sufficient distance to deactivate the selection object 218. Looking at FIG. 2AH, the system receives further input from the input device indicating that the user's is watching the orb 224 near the sailboat's port side. Looking at FIG. 2AI, the system receives further input from the input device indicating that the user's is watching the orb 224 at it enters the sailboat 202. Looking at FIG. 2AJ, the system receives further input from the input device indicating that the user's showing the active deck portion 216 with the orb 224 in the sailboat 202. Looking at FIG. 2AK, the system receives further input from the input device indicating that the user's is moving the selection object 218 into view and towards the orb 224 with in the sailboat 202. Looking at FIG. 2AL, the system receives further input from the input device indicating that the user's is moving the selection object 218 further towards the orb 224 with in the sailboat 202. Looking at FIG. 2AM, the system receives further input from the input device indicating that the user's is moving the selection object 218 into contact with or proximity to the orb 224 activating the selection object 216 and the orb 224 causing the display of suborbs 226a-c. Looking at FIG. 2AN, the system receives further input from the input device indicating that the user's gaze is moving upward to the sky bringing into view a corporate name(s) and simultaneously changing the sky attribute from one level to another 228. Looking at FIG. 2AO, the system receives further input from the input device indicating that the user's gaze is moving further upward to the sky causing the sky to darken further and bringing into view a star 230 associated with the corporate name 228. Looking at FIG. 2AP, the system receives further input from the input device indicating that the user's gaze is moving further upward to the sky causing the sky to darken and bringing into view the star and change the star attribute 230 associated with the corporate name 228 and a light beam 232 representing the relationship between that entity and a process. Looking at FIG. 2AQ, the system receives further input from the input device indicating that the user's gaze is moving downward from the sky, which is still darkened and bringing the sailboat 202 back into view along with the star 230 associated with the corporate name 228 and the light beam 232. The display 200 also displays a completion archway 290. Looking at FIG. 2AR, the system receives further input from the input device indicating that the user's gaze is directed to the selection object 218 and showing the star 230 associated with the corporate name 228 and the light beam 232 touching the orb 224. Looking at FIG. 2AS, the system receives further input from the input device indicating that the user has moved the selection object 218 away from the orb 224 sufficient to deactivate the selection object 218 and the orb 224 causing the star 230 associated with the corporate name 228 and the light beam 232 to disappear.

Again, it should be recognized that the selection object 218, shown here as an actual CG object may equally be part of an avatar of the user. Thus, the selection object 218 may be a figure of an avatar or a hand or eye or head so that the selection object 218 may be operate on head or eye movement, eye gazing, or hand or finger movement or movement of any other part of an avatar or other part of a CG construct.

FIG. 2AT through FIG. 2CA illustrate the system traversing the time line 106q using the directional control object and selection object to control traversal through the time line 106q and manipulating and selecting a second event orb.

Looking at FIG. 2AT, the system receives further input from the input device indicating that the user have moved the selection object 218 (now in a passive state) away from the object 224 (no longer visible) back to the directional control object 210 and changing the view orientation looking at the bow 208 along the path 222 toward the goal archway 290 also displaying a second orb 234. Looking at FIG. 2AU, the system receives further input from the input device indicating the selection object 218 now in its active state and engaging the direction control object 210 and showing a change in the viewing orientation towards to starboard side of the sailboat 202.

Looking at FIG. 2AV, the system receives further input from the input device indicating that the user rotated the directional control object 210 towards the port with the view orientation turned more towards the starboard so that the direction indication 220 indicates the viewing orientation. Looking at FIG. 2AW, the system receives further input from the input device indicating that the user has rotated the directional control object 210 so that it is horizontally oriented above the deck 206 indication that forward motion has stopped and the sailboat 202 is stationary or drifting forward with out added speed using the directional control object 210.

Looking at FIG. 2AX, the system receives further input from the input device indicating that the user has moved the directional control object 210 back to its vertical orientation and evidencing a change in the viewing orientation back towards the bow 208 as indicated by the direction arrow 220. The display 200 also shows the goal archway 290, the second orb 234, and the path 222. Looking at FIG. 2AY, the system receives further input from the input device indicating the sailboat 202 progressing forward and the directional control object 210 rotated so that the object 210 is horizontal with the deck 206 holding the sailboat 202 stationary or backing up a little, but drifting allowing the user to see what's coming. Looking at FIG. 2AZ, the system receives further input from the input device indicating that the user has rotated the directional control object 210 back towards its vertical orientation and showing the active deck area 216, the bow 208, the path 222, the second orb 234, and the goal archway 290.

Looking at FIG. 2BA, the system receives further input from the input device indicating that the user has rotated the directional control object 210 back to its vertical orientation and showing the selection object 218 in its active state with the direction arrow 220 pointing forward to the goal archway 290 with the second orb 234 in view. Looking at FIG. 2BB, the system receives no further input from the input device showing the sailboat 202 moving forward towards the archway 290 and showing the second orb 234 and the selection object 218 in its passive or non-active state. Looking at FIG. 2BC, the system receives no further input from the input device showing the sailboat 202 moving further forward towards the archway 290 and showing the second orb 234 coming closer. Looking at FIG. 2BD, the system receives no further input from the input device showing the sailboat 202 moving yet further forward towards the archway 290 and showing the second orb 234 even closer to the bow 208 of the sailboat 202. Looking at FIG. 2BE, the system receives no further input showing the second primary level orb 234 positioned above the deck 206 and identified as "Business Integration", but may be any object, item, list, menu, attribute, property, characteristic, event, action, or any other actionable component associated with and distributed along the temporal object time-line or sequence object sequence. The display field 200 also shows the temporal/sequence direction/control object 210. Looking at FIG. 2BF, the system receives further input from the input device indicating that the user has focused attention on the second orb 234. Looking at FIG. 2BG, the system receives further input from the input device indicating that the user has focused attention on the second orb 234 and showing the direction arrow 220 pointing forward towards the archway 290. Looking at FIG. 2BH, the system receives further input from the input device indicating that the user has moved the directional control object 218 in its passive state towards the second orb 234 and showing the archway 290.

Looking at FIG. 2BI, the system receives further input from the input device indicating that the user has moved the selection object 218 into close proximity to the orb 234 causing the system to display subobjects 236a-c. The system is configured to display objects, items, lists, menus, attributes, properties, characteristics, events, actions, or any other actionable components associated with an object or orb as the selection object 218 or avatar body part or head or eye tracking input moves into the orb or into an active zone surrounding the orb. In this way, different navigational levels associated with a give orb or object may be displayed so the user may move the selection object 218 to select and activate a particular object, item, list, menu, attribute, property, characteristic, event, action, or any other actionable component at any level of a navigable menu or list structure or tree. Looking at FIG. 2BJ, the system indicated the activation of the orb 234 now showing the three subobjects 236a-c expanded in size and moved closer about the orb 234 and identified as "Corporate Governance", "Establishing Business Entity", and "Website/Branding".

Looking at FIG. 2BK, the system receives further input from the input device indicating that the user has moved the selection object 218 forward towards the arrayed subobjects 236a-c, which have been reduced in size to make selection easier. Looking at FIG. 2BL, the system receives further input from the input device indicating that the user has moved the selection object 218 into contact with the subobject or suborb 236a which has increased in size and causing the display 100 to display another level of selectable orbs 238a-c associated with the ord 236a and identifies as "Operating Agreement", "Articles of Incorporation", and "Non-Disclosure Agreement". Thus, the display 100 now shows three level of a tree structure associated with the primary orb 234. It should be recognized that the view from the vehicle (sailboat) 202 changes depending on the gaze of the user, the orientation of an avatar representing the user, or the orientation of the selection object 218. Thus, the view has changed from a prow orientation to port orientation as the orb 234 is situated above the port side of the sailboat 202. Of course, the sailboat 202 may be any other vehicle and the surrounding may be any other surroundings including CG surroundings based on real scenery or CG constructed surroundings. Again, the seascape includes horizon features to reduce nausea and other symptoms associated with traversing CG environments. It should also be noted that the selection object 218 is active when outlined and passive when not outlined.

Looking at FIG. 2BM, the system receives further input from the input device indicating that the user moved the selection object 218 through or from the orb 236a to the orb 236b causing the orbs 238a-c associated with 263a to be reduced in sized and to cluster tightly around the parent orb 236a and four selectable subobjects or suborbs 240a-c associated with the ord 236b and identifies as "File LLC", "Bank Account", "Accounting/Financials", and "Intellectual Property review". Looking at FIG. 2BN, the system receives further input from the input device indicating that the user has moved the selection object 218 (here shown in passive state) into contact with the orb 236b causing the orbs 238a-c associated with the orb 236b and the orbs 240a-d are enlarged for improved selectability. It should be noted that orb color may change with level or type or characteristics. Additionally, the objects may not be orbs and may not have the same shape or color or shading and may be 2D or 3D or 4D (shaded and changing color or shading over time). Looking at FIG. 2BO, the system receives further input from the input device indicating that the user has moved the selection object 218 still in its passive state over the orb 236b causing the orbs 238a-c to disappear and the orb 240a-d to expand for making selection easier.

Looking at FIG. 2BP, the system receives further input from the input device indicating that the user has moved the selection object 218 in its active state from the orb 236b back to and into the orb 236a so that the upper portion of the selection object 218 appears to be inside the orb 236a causing the orbs 240a-d to disappear and the orbs 238a-c to reappear along with the orb 224. Looking at FIG. 2BQ, the system receives further input from the input device indicating that the user has moved the selection object 218 further into the orb 236a causing display to display the actual operating agreement document 242 associated with the orb 238a, while the other orbs 236b&c continued to be display along with the orb 224. Looking at FIG. 2BR, the system receives further input from the input device causing the display to enlarge the document 242 and narrowing the field of view. Again, the selection object 218 (now in active state) still have its top portion inside the orb 236a. Looking at FIG. 2BS, the system receives further input from the input device indicating that the user has moved the selection object 218 (now in passive state) from the orb 236a towards the orb 236c causing the display to display suborbs 244a-c identified as "Domains", "Logo designs", and "Web copy", while still displaying orbs 236a&b.

Looking at FIG. 2BT, the system receives further input from the input device indicating that the user has moved the selection object 218 away from the second orb 234 back towards the an orientation forward. Looking at FIG. 2BU, the system receives further input from the input device indicating that the user has moved the selection object 218 upward as the user looks up into the sky to see the ABC Inc. object 228. Looking at FIG. 2BV, the system receives further input from the input device indicating that the user has moved the selection object 218 further upward so that the display 200 still shows the ABC Inc. object 228 and along side it a star 230. Looking at FIG. 2BW, the system receives further input from the input device indicating that the user is still looking up and now showing a beam 232 of light radiating from the star 230 toward the second orb 234. Looking at FIG. 2BX, the system receives further input from the input device indicating that the user is looking down showing the beam 232 of light radiating from the star 230 toward the second orb 234. Looking at FIG. 2BY, the system receives further input from the input device indicating that the user is looking further down showing the beam 232 of light radiating from the star 230 and contacting the second orb 234. Looking at FIG. 2BZ, the system receives further input from the input device indicating that the user is looking further down showing the beam 232 of light radiating from the star 230 fading with the viewing orientation back towards the archway 290 showing a third orb 246.

It should be recognized that the horizons in all of these screen images may include fixed features that do not move to reduce nausea associated with traversing CG environments. Here the fixed features include fog or haze line at the horizon, but any other stationary feature will work as well.

FIG. 2CA through FIG. 2CW illustrate the system traversing the time line 106q using the directional control object and selection object to control traversal through the time line 106q and manipulating and selecting a third event orb.

Looking at FIG. 2CA, the system receives further input from the input device indicating that the user has changed gaze orientation to the starboard and upward to look at the sky.

Looking at FIG. 2CB, the system receives further input from the input device indicating that the user has moved the selection object 218 in its passive state towards the directional control object 210 with the viewing orientation again towards the archway 290 and now showing a third event or sequence orb 246 along the path 222. Looking at FIG. 2CC, the system receives further input from the input device indicating that the user has moved the selection object 218 in its active state in contact with the directional control object 210 evidenced by the arrow 220 point forward towards the archway 290 with the third orb 246 coming closer. Looking at FIG. 2CD, the system receives no further input from the input device indicating the sailboat 202 moving closer to the third orb 246.

Looking at FIG. 2CE, the system receives no further input from the input device now showing the third orb 246 named "Prototype Stage" located on the sailboat 202 hovering over on the starboard side of the sailboat and indicating the user using the selection object 218 to interact with the directional control object 210 to change the progress of the sailboat 202 towards the archway 290. Looking at FIG. 2CF, the system receives further input from the input device indicating that the user has moved the selection object 218 so that the directional control object 210 rotates backward resulting in the sailboat 202 stopping forward progress along the path 222. Looking at FIG. 2CG, the system receives further input from the input device indicating that the user has moved the selection object 218 so that the directional control object 210 rotates backward to a horizontal orientation with respect to the deck 206 resulting in the sailboat 202 beginning to move backward along the path 222. Looking at FIG. 2CH, the system receives further input from the input device indicating that the user has moved the selection object 218 so that the directional control object 210 rotates upward from the horizontal orientation with respect to the deck 206 towards its vertical orientation resulting in the sailboat 202 changing direction and moving backward along the path 222. Looking at FIG. 2CI, the system receives further input from the input device indicating that the user has moved the selection object 218 so that the directional control object 210 rotates back to its vertical orientation and backing the sailboat 202 backward along the path 222 and the third orb 246 moving towards the bow 208. Looking at FIG. 2CJ, the system receives further input from the input device indicating that the user has moved the selection object 218 in its active state so that the directional control object 210 is rotated forward to its horizontal orientation relative to the deck 206 and changing the direction of travel of the sailboat 202 forward back toward the third orb 246 now located in front of the sailboat along the path 222. Looking at FIG. 2CK, the system receives further input from the input device indicating that the user has moved the selection object 218 in its active state so that the directional control object 210 is rotated back to its vertical orientation relative to the deck 206 resulting in the sailboat 202 moving forward towards the third orb 246 now located in front of the sailboat along the path 222 as indicated by the arrow 220. Looking at FIG. 2CL, the system receives further input from the input device indicating that the user has moved the selection object 218 in its active state so that the directional control object 210 is rotated forward from its vertical orientation relative to the deck 206 resulting in the sailboat 202 moving forward towards the third orb 246 now located in front of the sailboat along the path 222 as indicated by the arrow 220. Looking at FIG. 2CM, the system receives further input from the input device indicating that the user has moved the selection object 218 in its active state so that the directional control object 210 is rotated forward from its vertical orientation relative to the deck 206 resulting in the sailboat 202 moving further forward towards the third orb 246 now located in front of the sailboat along the path 222 as indicated by the arrow 220. Looking at FIG. 2CN, the system receives further input from the input device indicating that the user has moved the selection object 218 not shown so that the directional control object 210 is rotated backward to slow forward progress of the sailboat 202 along the path 222 as indicated by the arrow 220.

Looking at FIG. 2CO, the system receives further input from the input device indicating that the user has moved the selection object 218 not shown so that the directional control object 210 is rotated back to vertical orientation with the third orb 246 now positions hovering over the starboard side of the sailboat 202. Looking at FIG. 2CP, the system receives further input from the input device indicating that the user has moved the selection object 218 in its inactive state towards the third orb 246 now positions hovering over the starboard side of the sailboat 202. Looking at FIG. 2CQ, the system receives further input from the input device indicating that the user has moved the selection object 218 in its active state to the third orb 246 now positions hovering over the starboard side of the sailboat 202 resulting in the display of suborbs 248a-c identified as "Feedback", "Build", and "Design". Looking at FIG. 2CR, the system receives further input from the input device indicating that the user has moved the selection object 218 not shown showing the display of suborbs 248a-c with the third orb 246 barely visible due to a change in the viewing orientation toward the starboard. Looking at FIG. 2CS, the system receives further input from the input device indicating that the user has moved the user gaze upward toward that sky to display the Quantum Interface logo and stars 230 and an after hours object. Looking at FIG. 2CT, the system emitting a light beam 232 from one of the stars 230 towards one of the orbs not shown. Looking at FIG. 2CU, the system emitting another light beam 232 from other the star 230 towards one of the orbs not shown. Looking at FIG. 2CV, the system receives further input from the input device indicating that the user has moved the viewing downward to see where the beams 232 are pointing. Looking at FIG. 2CW, the system receives further input from the input device indicating that the user has moved the viewing downward to the sailboat 202 showing on beam striking the orb 238c and the orb 246 not shown.

FIG. 2CX through FIG. 2DD illustrate the system traversing the time line 106q using the directional control object and selection object to control traversal through the time line 106q and entering the archway 290 and completing the traversal.

Looking at FIG. 2CX, the system receives further input from the input device indicating that the user has moved the selection object 218 so that the directional control object 210 now propels the sailboat 202 forward and the beams 232 and suborbs 248a-c have disappeared. Looking at FIG. 2CY, the system receives further input from the input device indicating that the user has moved the selection object 218 so that the directional control object 210 now propels the sailboat 202 forward and showing the second orb 234 and the third orb 246. Looking at FIG. 2CZ, the system receives further input from the input device indicating that the user has changed gaze towards the sky showing the archway 290 and the path 222 leading through the archway 290. Looking at FIG. 2DA, the system receives further input from the input device indicating that the user has moved has changed gaze towards the sky showing only the archway 290. Looking at FIG. 2DB, the system receives further input from the input device indicating that the user has changed gaze towards the sky as the sailboat travels through the archway 290. Looking at FIG. 2DC, the system receives further input from the input device indicating that the user has still gazing towards the sky as the sailboat passes through the archway showing only the sky. Looking at FIG. 2DD, the system receives further input from the input device indicating that the user has changed gaze back towards the horizon after the sailboat not shown has passed through the archway not shown.

Horizontally Oriented Temporal or Sequence Objects

Referring to FIGS. 3A-C depict a top view of a sequence of display screens is displayed populated with a plurality of time lines, each time line different tasks, goals, events, etc. represented by orbs distributed along each time line and a selection object situated in a center of the first screen, wherein the processor is configured to select a particular time line or a set of time lines or systems (such as business system) that may be represented by a sequence of tasks, goals, objectives, events, etc., traverse along the selected time line or line and activate particular tasks, goals, objectives, events, etc. along the selected time line or lines, wherein the selection may be to the start, finish or anywhere along the time line. Selection of a particular time line or lines causes the other time line to be displayed in a faded format and the active time line or line displayed in non-faded format. Selection again is evidence by light beams radiating from the selection object to a particular time line, wherein each selected time line remains active. The traversal along a time line can appear as shown in FIG. 2A-2DD or as any other vehicle traverses a scape—sea scape, air scape, land scape, or space scape.

Looking at FIG. 3A, a display, generally 300, is shown to include a display area 302. Once activated by a signal from the input device that exceeds at least one threshold input criterion, the display area 302 is populated by a selection object 304 and a plurality of time lines 306a-f (here 6), wherein the time line 306a-f include start objects 308a-f, gate or end objects 310a-f, and a plurality of goal, event, task, etc. objects 312a-f. The system responds to output signals from an input device. If the signal that populated the display area 302 is directed at a particular time line, a particular start object, or a particular goal object associated with a particular time line, then the system selects and activates the particular time line and/or the particular goal object; otherwise the system awaits further output from the input device to determine a direction of motion sufficient to discriminate between a particular time line, a particular start object or process, and/or a particular goal object. Here, the system detects output from the input device causing a light beam 314 to be generated radiating from the selection object 304 to the time line 306*e* causing the selection of time line 306*e*, wherein the extent and direction of the beam 314 is controlled by the input signal.

Looking at FIG. 3B, the selection object 304 has been moved to the time line 306*e* causing all other time lines 306*a-d* and 306*f* to fade and show the selection object 304 rotating with signal from the input device again causing the light beam 314 (representing a relationship) to be generated from the selection object 304 to a particular object 316 of the object 312*e* and causing subobjects or attributes 318*a-d* to appear about the particular object 316.

Looking at FIG. 3C, the selection object 304 is not rotated and the light beam 314 radiates from the selection object 304 to the start object 308*b* of the time line 306*b* activating the time line 306*b* and causing the system to generate another selection object 304*a*.

Referring to FIGS. 4A-D, a sequence of display screens is displayed populated with a plurality of time lines and associated scenes, each time line different tasks, goals, events, etc. represented by orbs distributed along each time line and a selection object situated in a center of the first screen, wherein the processor is configured to select a particular time line or a set of time lines, traverse along the selected time line or line and activate particular tasks, goals, events, etc. along the selected time line or lines, wherein the selection may be to the start, finish or anywhere along the time line. Selection of a particular time line or lines causes the other time line to be displayed in a faded format and the active time line or line displayed in non-faded format. Selection again is evidence by light beams radiating from the selection object to a particular time line, wherein each selected time line remains active. The traversal along a time line can appear as shown in FIG. 2A-2CR or as any other vehicle traverses a scape sea scape, air scape, land scape, or space scape.

Figure 4A:
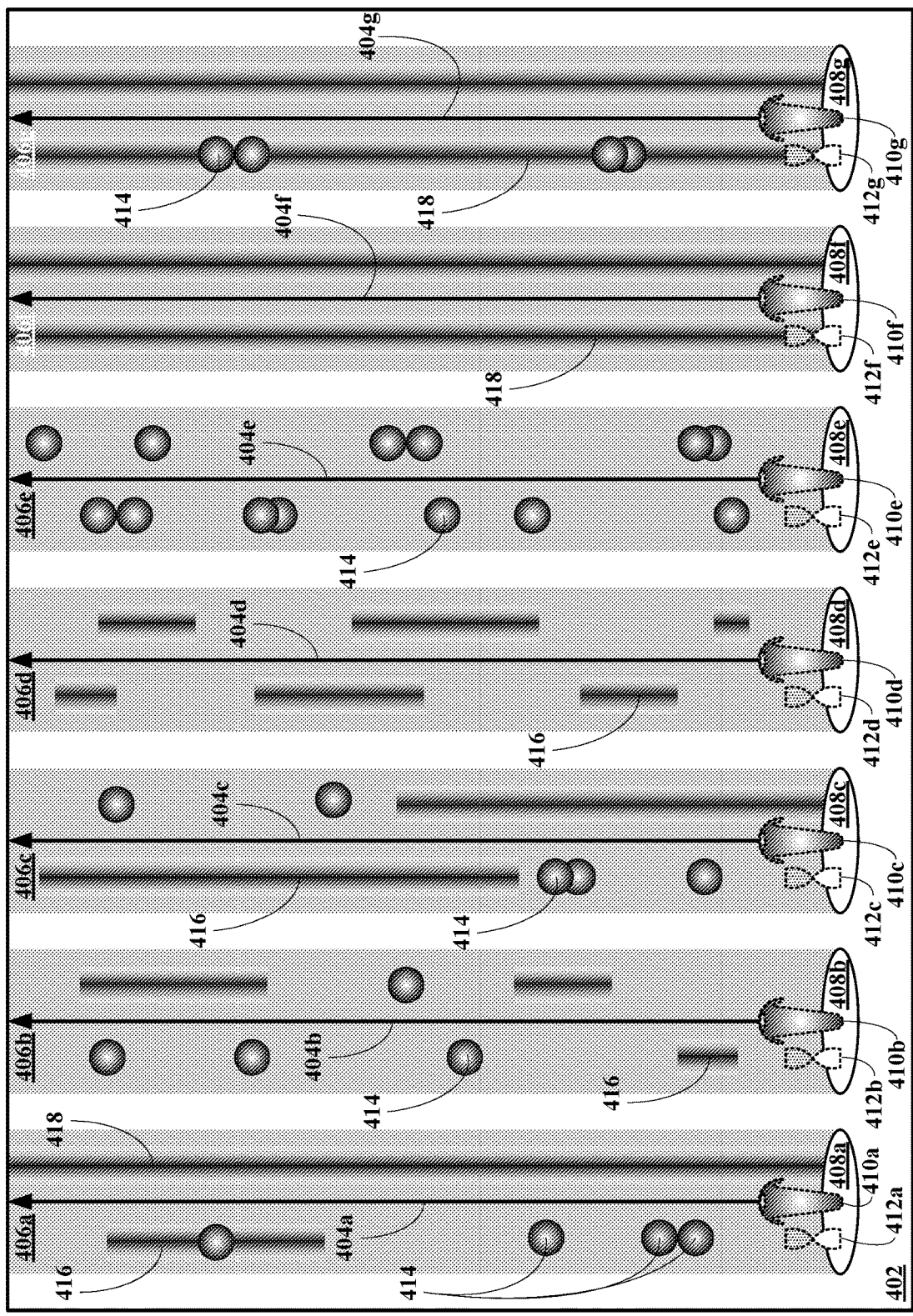

Looking at FIG. 4A, a display, generally 400, is shown to include a display area 402. Once activated by a signal from the input device that exceeds at least one threshold input criterion, the display area 402 is populated by a plurality of time lines 404*a-g* (here 7) including associated time line scenes 406*a-g*, wherein the time line 404*a-g* include time line traversing vehicles 408*a-g* having selection objects 410*a-g* and temporal/sequence direction/control objects 412*a-g* and discrete goal, event, task, etc. objects 414, continuous segment goal, event, task, etc. objects 416, and continuous goal, event, task, etc. objects 418, wherein each of the time lines 404*a-g* may include only discrete, continuous segment or continuous goal, event, task, etc. objects 414, 416, or 418 or any mixtures of discrete, continuous segment or continuous goal, event, task, etc. objects 414, 416, or 418. Here, all of the time lines 404*a-g* are inactive evidenced by the selection objects 408*a-g* and the temporal/sequence direction/control objects 410*a-g* shown in dashed lines.

Figure 4B:
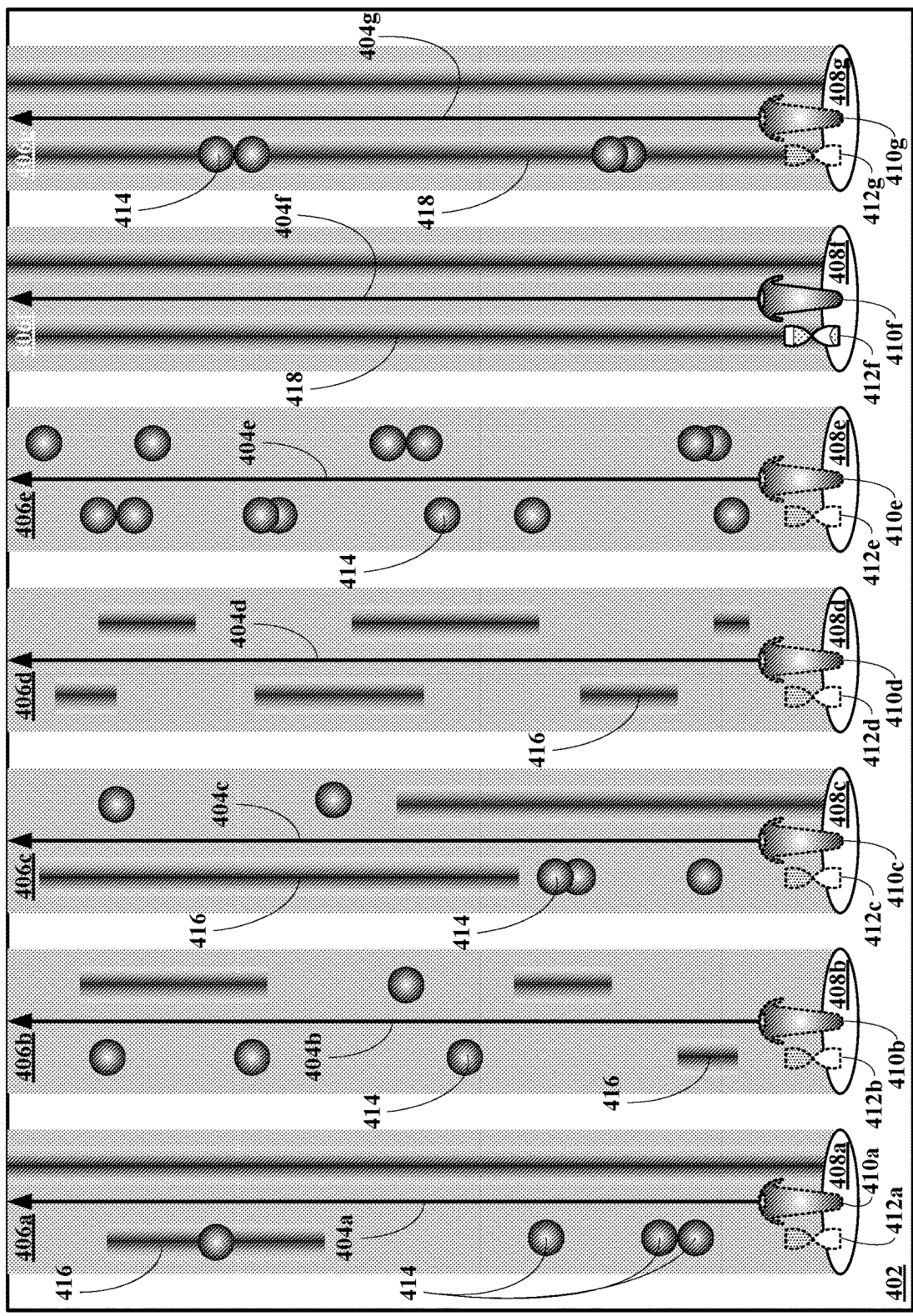

Looking at FIG. 4B, the system receives a signal from the input device indicating that time line 404*f* has been selected causing the 408*f* and 410*f*.

Figure 4C:
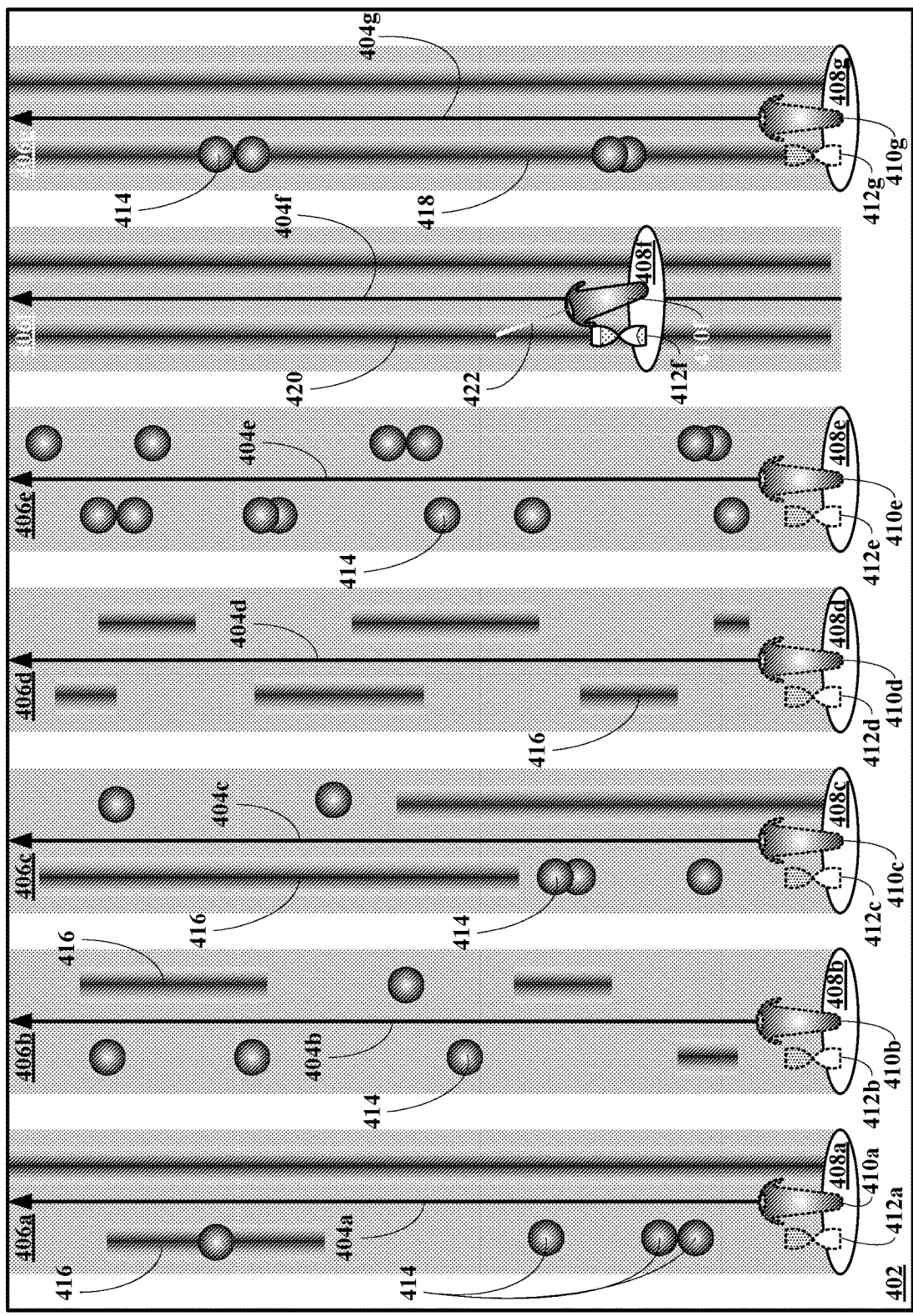

Looking at FIG. 4C, the system receives a signal from the input device causing the vehicle 408*f* to move up the time line 404*f* and rotated toward the continuous object 420 as evidenced by a light beam 422 emanating from the selection object 410*f*.

Figure 4D:
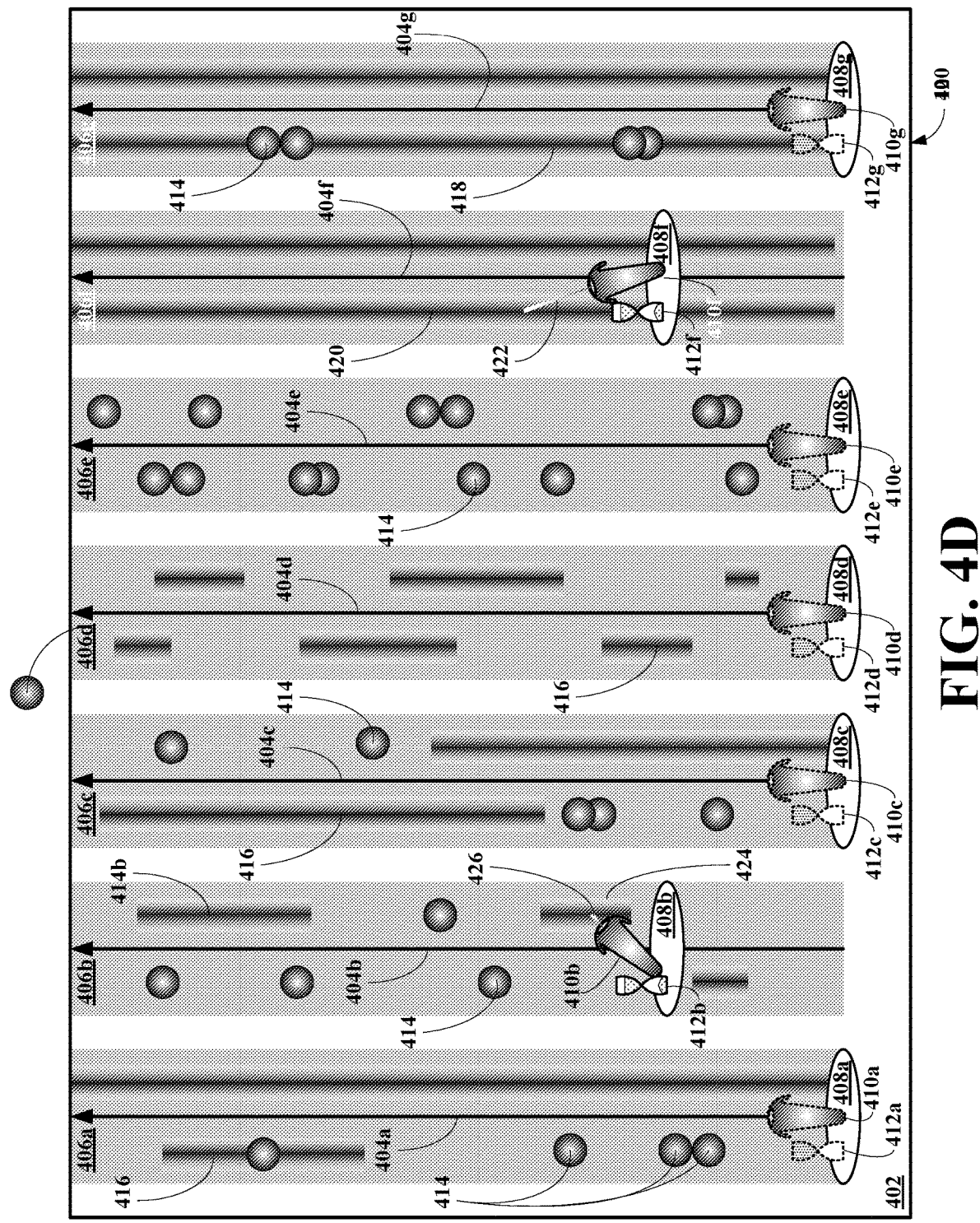

Looking at FIG. 4D, the system receives a signal from the input device causing the vehicle 408*b* to move up the time line 404*b* to the same location along the time line 404*b* as in time line 404*f* and rotated toward the continuous segment object 424 as evidenced by a light beam 426 emanating from the selection object 410*b*.

Discrete goal, event, task, etc. objects represent fixed time goals, events, tasks, etc., i.e., tasks that take place at the specific time or location along the time line such as a docketed event in a litigation or a patent prosecution, filing deadlines, payment deadlines, contract milestones, etc. Continuous segment goal, event, task, etc. objects represent goals, events, tasks, etc. that occur over a set period of time such as school semesters, quarters, mortgages, peoples lives, duration of countries, etc. Continuous goals, event, task, etc. objects represent goals, events, tasks, etc. that occur along the duration of the time line such as weather, population, people lives, etc.

Referring to FIGS. 5A-C, a sequence of display screens is displayed populated with a time line having a number of branches and a selection object or selection objects and time direction object and processor configured to traverse the time line along one branch, some, or all of the branches based on output signal from an input device.

Looking at FIG. 5A, a display, generally 500, is shown to include a display area 502. Once activated by a signal from the input device that exceeds at least one threshold input criterion, the display area 502 is populated with a time line traversing vehicle 504 having a selection objects 506 and a temporal/sequence direction/control object 508 and a branched time line 510. The branched time line 510 is shown with branch points 512*a-g* producing branches 514*a-n*, each of the branches one or more discrete, continuous segment or continuous goal, event, task, etc. objects 516, 518, or 520.

Looking at FIG. 5B, the system receives a signal from the input device indicating traversal along both branches 514*a* and 514*f* of the time line 510 spawning a second time line traversing vehicle 522 having a second selection objects 524 and a second temporal/sequence direction/control object 526, wherein each selection object 506 and 524 may be individually or collectively controlled and each selection object 506 and 524 generates light beams for selection objects associated with the branches 514*a* and 514*f* of the time line 510.

Looking at FIG. 5C, the system receives further signals from the input device indicating further traversal along branches 514*c* and 514*i* of the time line 510, wherein each selection object 506 and 524 may be individually or collectively controlled and each selection object 506 and 524 generates light beams for selection objects associated with the branches 514*c* and 514*i* of the time line 510. Of course, the system could have spawned additional a time line traversing vehicles, selection objects, and temporal/sequence direction/control objects. The signals from the input device may include information for activating and deactivating selection objects. Again, the temporal/sequence direction/control object controls the direction and speed of traversal along the time line or sequence, wherein the hour glass sand indicates that progress along the time line or branch thereof.

Referring to FIGS. 6A-C, a sequence of display screens is displayed evidencing screen split in two different time lines in different scape formats, four different time lines in different scape formats, or sixteen different time lines in different scape formats.

Looking at FIG. 6A, a display, generally 600, is shown to include a display area 602. Once activated by a signal from the input device that exceeds at least one threshold input criterion, the display area 602 is populated with two time line windows 602*a-b* having an associated scape scene

604a-b, here a water scape and a road scape, respectively. The windows 602a-b include traversing vehicles 606a-b, selection objects 608a-b and temporal/sequence direction/control objects 610a-b. The system allows the two windows to be separately or collectively controlled using one or more input devices, wherein directionally activatable control objects may be used to switch between separate and collective control. Of course, the windows 602a-b may include one or more discrete, continuous segment or continuous goal, event, task, etc. objects. For additional information on directionally activatable control objects the reader is referred to PCT/US16/64499.

Looking at FIG. 6B, a display, generally 600, is shown to include a display area 602. Once activated by a signal from the input device that exceeds at least one threshold input criterion, the display area 602 is populated with four time line windows 602a-d having an associated scape scene 604a-d, here a water scape and a road scape, respectively. The windows 602a-d include traversing vehicles 606a-d, selection objects 608a-d and temporal/sequence direction/control objects 610a-d. The system allows the two windows to be separately or collectively controlled using one or more input devices, wherein directionally activatable control objects may be used to switch between separate and collective control. Of course, the windows 602a-d may include one or more discrete, continuous segment or continuous goal, event, task, etc. objects. For additional information on directionally activatable control objects the reader is referred to PCT/US16/64499.

Looking at FIG. 6C, a display, generally 600, is shown to include a display area 602. Once activated by a signal from the input device that exceeds at least one threshold input criterion, the display area 602 is populated with four time line windows 602a-p having an associated scape scene 604a-p, here a water scape and a road scape, respectively. The windows 602a-p include traversing vehicles 606a-p, selection objects 608a-p and temporal/sequence direction/control objects 610a-p. The system allows the two windows to be separately or collectively controlled using one or more input devices, wherein directionally activatable control objects may be used to switch between separate and collective control. Of course, the windows 602a-p may include one or more discrete, continuous segment or continuous goal, event, task, etc. objects. For additional information on directionally activatable control objects the reader is referred to PCT/US16/64499.

It should be recognized that these time lines or sequences may not be confined to traversing 2D or 3D environments, but may traverse high dimensional constructs using higher dimensional selection/control objects or sequence direction/control objects.

Referring to FIGS. 7A-C, a sequence of display screens is displayed evidencing interacting with a text based sequential task project relating to digital training manual.

Looking at FIG. 7A, a display, generally 700, is shown to include a display area 702 displaying a textual text based sequential task project having at least one highlighted textual area and four ⊕ selectable objects. Looking at FIG. 7B, a selection object here a cursor arrow is shown moved into contact with the top ⊕ selectable object. Looking at FIG. 7C, once in contact with the top ⊕ selectable object, associated objects and/or attributes (colored elongated rounded rectangular objects) are displayed arcuately about the top ⊕ selectable object—Definition, Examples, Indicators, Accountability, and Assessment. Looking at FIGS. 7D-G, show the cursor moving towards the Examples object which move towards the cursor until the cursor contacts the Examples object. Looking at FIG. 7H, once the cursor contacts the Examples object, three associated image objects are displayed and the associated objects and/or attributes disappear. Looking at FIGS. 7I-J, show the cursor moving towards one of the images (middle object) and the middle image moving towards the cursor. Looking at FIG. 7K, once the cursor contacts the middle image expands and may be controlled by the cursor is the image has active fields. Looking at FIG. 7L, the image and faded by moving the cursor out of the image space and the cursor is not located within the display 702. Looking at FIG. 7M, the cursor has been moved to the highlighted text "travel". Looking at FIG. 7N, once the cursor contacts the text, associated objects and/or attributes (colored elongated rounded rectangular objects) are displayed arcuately about the text—Definition, Examples, Relevant Information, and Assessment. Looking at FIG. 7O, shows the cursor moving toward the Relevant Information object and it moves towards the cursor. Looking at FIGS. 7P-R, a image associated with the Relevant Information object is displayed and the figures show the cursor moving toward the image and the image move toward the cursor until the cursor contacts the image. Looking at FIG. 7S, once the cursor contacts the image, the image expands and the cursor can be used to activate active field within the image. Looking at FIG. 7T, the image and faded by moving the cursor out of the image space and the cursor is not located within the display 702. Looking at FIG. 7U, the cursor has been moved back to the highlighted text "travel". Looking at FIG. 7V, once the cursor contacts the text, the associated objects and/or attributes (colored elongated rounded rectangular objects) are displayed arcuately about the text—Definition, Examples, Indicators, Accountability, and Assessment. Looking at FIGS. 7W-X, shows the cursor moving towards the Definition object and it moves towards the cursor until the cursor contacts the Definition object. Looking at FIGS. 7Y-Z, once the cursor contacts the image, the image expands and the cursor can be used to activate active field within the Definition object, the definition areas in a text box and shows the cursor moving into contact with the definition. Looking FIG. 7AA, once the cursor contacts the text box, the text box expands. Looking FIG. 7AB, the text box has faded and the cursor has been moved to the ⊕3 selectable object and causing associated objects and/or attributes (colored elongated rounded rectangular objects) are displayed arcuately about the text—Definition, Examples, Indicators, Accountability, and Assessment—to be displayed as shown in FIG. 7AC. Looking FIGS. 7AD-E, the cursor is moved from the ⊕3 selectable object to the ⊕2 selectable object causing associated objects and/or attributes (colored elongated rounded rectangular objects) are displayed arcuately about the text—Definition, Examples, Indicators, Accountability, and Assessment to—be displayed as shown in FIG. 7AF. Looking FIGS. 7AG-H, the cursor is moved from the ⊕2 selectable to the ⊕4 selectable object until the cursor is in contact with the ⊕4 selectable object causing associated objects and/or attributes (colored elongated rounded rectangular objects) are displayed arcuately about the text—Definition, Examples, Indicators, Accountability, and Assessment to—be displayed. Looking at FIGS. 7J-K, show the cursor moving towards the Examples object which move towards the cursor until the cursor contacts the Examples object causing three images to appear and fading the Examples object as shown in FIG. 7AL. Looking at FIGS. 7AM-N, the cursor moves towards the top image and the top image move towards the cursor until the cursor contacts the top image causing the top image to expand so the cursor can activate active fields within the top image as shown in FIG. 7AO.

CLOSING PARAGRAPH OF THE DISCLOSURE

All references cited herein are incorporated by reference for all permitted purposes. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. A user interface, implemented on an apparatus including one or more input devices, one or more display devices, and a processing unit in communication with the input devices and the display devices, comprising:
in response to a first motion input that exceeds at least one threshold criterion and that has motion properties including direction, velocity, acceleration, changes thereto or any combination thereof:
display:
one or more selectable temporal objects, each of the selectable temporal objects includes one or more selectable objects and/or selectable attributes distributed along a time line and one, some or all of the selectable objects and/or selectable attributes (a) have one or more subobjects or subattributes associated therewith or (b) form a navigation tree,
one or more selectable sequence objects, each of the sequence objects includes one or more one selectable objects and/or selectable attributes distributed along a sequence and one, some or all of the selectable objects and/or selectable attributes (a) have one or more subobjects or subattributes associated therewith or (b) form a navigation tree;
select a particular temporal object or a particular sequence object that aligns or is substantially aligned with a first direction; and
display a computer generated (CG) environment associated with the selected temporal object or the selected sequence object and comprising:
a scene or scape including:
a sky,
a horizon,
a path,
a control object,
a vehicle or platform, and
one or more environment objects, wherein one or more environment objects are related to each of the selectable objects and each of the one or more subobjects and wherein the one or more related environment objects include information and content concerning each of the selectable objects and subobjects; and
in response to a further motion input that exceeds at least one threshold criterion and that has motion properties including direction, velocity, acceleration, changes thereto or any combination thereof:
activate the control object; and
once activated,
rotate the control object (a) forward to propel the vehicle or platform forward along the path or (b) backward to propel the vehicle or platform backward along the path,
move the control object towards a selectable object or attribute as the selectable object or attribute comes into or alongside the vehicle or platform as the vehicle or platform progresses along the path, and
simultaneously or after the move, highlight the selectable object or attribute and if the selectable object or attribute has associated subobjects or subattributes, display the subobjects or subattributes.

2. The interface of claim 1, further comprising:
prior to selecting the particular temporal object or the particular sequence object and in response to a first input from the same or different input device,
confirm the selection of the particular temporal object or the particular sequence object.

3. The interface of claim 1, further comprising:
contact the selectable object or selectable attribute with the control object to select the selectable object or the selectable attribute.

4. The interface of claim 3, further comprising:
prior to selecting the selectable object or the selectable attribute and in response to a second input from the same or different input device,
confirm the selection of the selectable object or the selectable attribute, and/or
if a user looks up,
generate a graphic, haptic, and/or audible effect evidencing a relationship between the one or more related environment objects and the selectable object or the selectable attribute, and
if the selected object or the selected attribute or the one or more related environment objects includes information or content, display the information or context.

5. The interface of claim 4, further comprising:
move the control object toward a subobject or a subattribute, and
highlight the subobject or the subattribute, and
contact the subobject or the subattribute with the control object to select the subobject or the subattribute.

6. The interface of claim 5, further comprising:
prior to selecting the subobject or the subattribute and in response to a third input from the same or different input device,
confirm the selection of the subobject or the subattribute, and/or
if the user looks up,
generate a graphic, haptic, and/or audible effect evidencing the relationship between the one or more related environment objects and the subobject, and
if the subobject or the one or more related environment objects includes information or content, display the information or context.

7. The interface of claim 6, wherein:
the selectable objects or the selectable attributes and the subobjects or the subattributes comprise tasks, goals, events, and combinations thereof,
the graphic effect comprises a ray, a light beam, a chord, or combinations thereof,
the ray, light beam, and/or chord includes properties selected from a group consisting of flashing, pulsing, brightness, identifiers, and combinations thereof, and
a speed of propelling the vehicle or platform forward or backward relates to a degree of rotation of the control object, the larger the rotation, the greater the speed, the smaller the rotation, the slower the speed.

8. The interface of claim 7, further comprising:
repeat one, some, or all of the actions until the vehicle or platform progresses to an end of the path or the user stops interacting with the CG environment.

9. The interface of claim 3, wherein:
the input devices comprise an eye tracking sensor, head tracking sensor, gloves, a body sensor, a controller, a camera, a body position sensor, an optical sensor, an electromagnetic field (EMF) sensor, a wave form sensor, a motion sensor, or any combination thereof, and
the environment objects include one or more avatars, one or more anti-nausea objects, computer generated (CG) environmental elements, or combinations thereof.

10. The interface of claim 3, wherein:
the apparatus comprises a mobile device, a wearable device, or a stationary device.

11. A method, implemented on an apparatus including one or more input devices, one or more display devices, and a processor in communication with the input devices and the display devices and including a user interface, comprising:
in response to receiving a first motion input that exceeds at least one threshold criterion and that has motion properties including direction, velocity, acceleration, changes thereto or any combination thereof:
displaying:
one or more selectable temporal objects, each of the selectable temporal objects includes one or more selectable objects and/or selectable attributes distributed along a time line and one, some or all of the selectable objects and/or selectable attributes (a) have one or more subobjects or subattributes associated therewith or (b) form a navigation tree,
one or more selectable sequence objects, each of the sequence objects includes one or more one selectable objects and/or selectable attributes distributed along a sequence and one, some or all of the selectable objects and/or selectable attributes (a) have one or more subobjects or subattributes associated therewith or (b) form a navigation tree;
selecting a particular temporal object or a particular sequence object that aligns or is substantially aligned with a first direction; and
displaying a computer generated (CG) environment associated with the selected temporal object or the selected sequence object and comprising:
a scene or scape including:
a sky,
a horizon,
a path,
a control object,
a vehicle or platform, and
one or more environment objects, wherein one or more environment objects are related to each of the selectable objects and each of the one or more subobjects and wherein the one or more related environment objects include information and content concerning each of the selectable objects and subobjects; and
in response to receiving a further motion input that exceeds at least one threshold criterion and that has motion properties including direction, velocity, acceleration, changes thereto or any combination thereof:
activating the control object; and
after activating,
rotating the control object (a) forward to propel the vehicle or platform forward along the path or (b) backward to propel the vehicle or platform backward along the path,
moving the control object towards a selectable object or attribute as the selectable object or attribute comes into or alongside the vehicle or platform as the vehicle or platform progresses along the path, and
simultaneously or after the moving, highlighting the selectable object or attribute and if the selectable object or attribute has associated subobjects or subattributes, display the subobjects or subattributes.

12. The method of claim 11, further comprising:
prior to selecting the particular temporal object or the particular sequence object and in response to receiving a first input from the same or different input device,
confirming the selection of the particular temporal object or the particular sequence object.

13. The method of claim 11, further comprising:
contacting the selectable object or selectable attribute with the control object to select the selectable object or the selectable attribute.

14. The method of claim 13, further comprising:
prior to selecting the selectable object or the selectable attribute and in response to receiving a second input from the same or different input device,
confirming the selection of the selectable object or the selectable attribute, and/or if a user looks up,
generating a graphic, haptic, and/or audible effect evidencing a relationship between the one or more related environment objects and the selectable object or the selectable attribute, and
if the selected object or the selected attribute or the one or more related environment objects includes information or content, displaying the information or context.

15. The method of claim 14, further comprising:
moving the control object toward a subobject or a subattribute, and
highlighting the subobject or the subattribute, and
contacting the subobject or the subattribute with the control object to select the subobject or the subattribute.

16. The method of claim 15, further comprising:
prior to selecting the subobject or the subattribute and in response to receiving a third input from the same or different input device,
confirming the selection of the subobject or the subattribute, and/or
if the user looks up,
generating a graphic, haptic, and/or audible effect evidencing the relationship between the one or more related environment objects and the subobject, and
if the subobject or the one or more related environment objects includes information or content, displaying the information or context.

17. The method of claim 16, wherein:
the selectable objects or the selectable attributes and the subobjects or the subattributes comprise tasks, goals, events, and combinations thereof,
the graphic effect comprises a ray, a light beam, a chord, or combinations thereof,
the ray, light beam, and/or chord includes properties selected from a group consisting of flashing, pulsing, brightness, identifiers, and combinations thereof, and a speed of propelling the vehicle or platform forward or backward relates to a degree of rotation of the control object, the larger the rotation, the greater the speed, the smaller the rotation, the slower the speed.

18. The method of claim 17, further comprising:
repeat one, some, or all of the actions until the vehicle or platform progresses to an end of the path or the user stops interacting with the CG environment.

19. The method of claim 13, wherein:
the input devices comprise an eye tracking sensor, head tracking sensor, gloves, a body sensor, a controller, a camera, a body position sensor, an optical sensor, an electromagnetic field (EMF) sensor, a wave form sensor, a motion sensor, or any combination thereof, and
the environment objects include one or more avatars, one or more anti-nausea objects, computer generated (CG) environmental elements, or combinations thereof.

20. The method of claim 13, wherein:
the apparatus comprises a mobile device, a wearable device, or a stationary device.

* * * * *